(12) United States Patent
Nishizaki et al.

(10) Patent No.: US 7,604,088 B2
(45) Date of Patent: Oct. 20, 2009

(54) ELECTRIC POWER STEERING SYSTEM

(75) Inventors: Katsutoshi Nishizaki, Nabari (JP); Shirou Nakano, Minamikawachi-Gun (JP); Ken Matsubara, Matsubara (JP); Toshiaki Oya, Sakai (JP); Yasuhiro Kamatani, Kitakatsuragi-gun (JP); Masahiko Sakamaki, Okazaki (JP); Yoshikazu Kuroumaru, Kashihara (JP); Shigeki Nagase, Nabari (JP); Takayasu Yamazaki, Souraku-gun (JP); Yasuhiro Saitou, Kashiwara (JP); Takeshi Ueda, Yamatokooriyama (JP)

(73) Assignee: JTEKT Corporation, Osaka-Shi (JP)

( * ) Notice: Subject to any disclaimer, the term of this patent is extended or adjusted under 35 U.S.C. 154(b) by 118 days.

(21) Appl. No.: 11/579,902

(22) PCT Filed: May 9, 2005

(86) PCT No.: PCT/JP2005/008428

§ 371 (c)(1),
(2), (4) Date: Mar. 13, 2007

(87) PCT Pub. No.: WO2005/108187

PCT Pub. Date: Nov. 17, 2005

(65) Prior Publication Data

US 2007/0205041 A1 Sep. 6, 2007

(30) Foreign Application Priority Data

May 11, 2004 (JP) ............. 2004-141661

(51) Int. Cl.
*B62D 5/04* (2006.01)

(52) U.S. Cl. .................... 180/446; 180/444

(58) Field of Classification Search .......... 180/443, 180/444, 446; 701/41, 42
See application file for complete search history.

(56) References Cited

U.S. PATENT DOCUMENTS

| 5,699,248 | A | 12/1997 | Nakagami et al. |
| 6,008,599 | A | 12/1999 | Beck |
| 6,450,287 | B1 | 9/2002 | Kurishige et al. |
| 2002/0166716 | A1 | 11/2002 | Shimizu et al. |
| 2005/0096813 | A1* | 5/2005 | Heilig et al. ............. 701/41 |

FOREIGN PATENT DOCUMENTS

JP 62-38579 B2 8/1987

(Continued)

*Primary Examiner*—Lesley D Morris
*Assistant Examiner*—Marc A Scharich
(74) *Attorney, Agent, or Firm*—Birch, Stewart, Kolasch & Birch, LLP

(57) ABSTRACT

An electric power steering system is provided which is capable of providing a favorable steering feeling without using compensation logics such as of inertia compensation and friction compensation. The electric power steering system includes road-noise suppression control means (213) for controlling a steering assist motor (9) in a manner to damp torque transmission in a higher frequency region representing road noises than a frequency region representing road information. A friction value of a steering mechanism (A) is decreased enough to allow the intrinsic vibrations of the steering mechanism (A) to appear. Rotor inertia of the steering assist motor (9) is set to a value small enough to allow the frequencies of the intrinsic vibrations to be present in the frequency region where the torque transmission is damped by the road-noise suppression control means (213).

3 Claims, 51 Drawing Sheets

FOREIGN PATENT DOCUMENTS

| | | | |
|---|---|---|---|
| JP | 3-178868 A | 8/1991 |
| JP | 6-227410 A | 8/1994 |
| JP | 8-91236 A | 4/1996 |
| JP | 8-119132 A | 5/1996 |
| JP | 8-308198 A | 11/1996 |
| JP | 2782254 B2 | 5/1998 |
| JP | 10-278818 A | 10/1998 |
| JP | 11-124045 A | 5/1999 |
| JP | 2000-238655 A | 9/2000 |
| JP | 2000-289638 A | 10/2000 |
| JP | 2001-1917 A | 1/2001 |
| JP | 2001-18822 A | 1/2001 |
| JP | 2001-122146 A | 5/2001 |
| JP | 2001-133343 A | 5/2001 |
| JP | 2001-151121 A | 6/2001 |
| JP | 2001-233234 A | 8/2001 |
| JP | 2001-275325 A | 10/2001 |
| JP | 2001-334948 A | 12/2001 |
| JP | 2002-59860 A | 2/2002 |
| JP | 2002-331946 A | 11/2002 |
| JP | 2002-372469 A | 12/2002 |
| JP | 2003-40120 A | 2/2003 |
| JP | 2003-40128 A | 2/2003 |
| JP | 2003-61272 A | 2/2003 |
| JP | 2003-175835 A | 6/2003 |

* cited by examiner (a)

(b)

(c)

(a)

(b)

(a)

(b)

(a)

(b)

(c)

ELECTRIC POWER STEERING SYSTEM

TECHNICAL FIELD

The present invention relates to an electric power steering system.

BACKGROUND ART

Important elements for the electric power steering system to receive high evaluation in respect of steering feeling are to move tires (vehicle) linearly in response to an active input torque (to make a turn or K-turn), to provide a direct transmission of road information (frequency band<5 to 10 Hz), and the like.

However, the conventional electric power steering systems offer low steering performance having poor linearity and difficulty in assessing road conditions, so that drivers have an unnatural steering feeling.

Specifically, frictions at torque transmission elements (manual steering gear, reduction gear assembly for steering assist motor, and the like) of the conventional electric power steering system are considered as necessary evil and are set to relatively high values.

At first view, setting the frictions at the torque transmission elements to high values provide the following merits. That is, a handle (steering member) is stabilized against passive input torque (straight-ahead drive, retention of steering angle, turn back of handle), is less susceptible to road noises (unwanted frequency band>5 to 10 Hz) (road noise resistance), and is improved in convergence.

However, if the torque transmission elements have great frictions, the system is decreased in the efficiency of transmitting the active input torque. In addition, the system having the great frictions requires a high power motor or a reduction gear having a high reduction ratio in order to provide a required assist force. This consequently results in the increase of rotor inertia about a steering shaft.

The increase of inertia leads to a lowered response in the transmission of an input steering torque (positive input). What is more, the handle return is also impaired significantly.

As described above, the system having the great friction and inertia is incapable of providing the good steering feeling.

As solutions to these problems, compensation logics (inertia compensation, friction compensation, damping compensation, handle return control and the like) have been proposed and applied to the systems, the logics designed to permit the high friction/high inertia characteristics of the system and requiring various determination conditions for making determinations to make compensations.

Unfortunately, however, these compensation logics not only impair the coordination of the overall system but also entail the following problem. Since the individual compensation logics are independent from one another, it is inevitable that plural compensation outputs are active at all times so as to interfere with one another in actual driving conditions where operating conditions of the system vary in various ways.

As a result, the state-of-the-art electric power steering systems provide the unnatural steering feeling with poor linearity and offers difficulty in assessing the road conditions, so that drivers experience some awkwardness.

That is, the improvement of the steering feeling based on the compensation logics is a kind of stopgap measure, which rather causes the drivers to experience some awkwardness.

Japanese Unexamined Patent Publication No.2003-40120, for example, discloses a technique (hereinafter, referred to as Prior Art 1) wherein an inertia converted to a value about handle-shaft is defined to be $4 \times 10^{-2}$ kg·m$^2$ or more and $10 \times 10^{-2}$ kg·m$^2$ or less, the inertia determined based on an inertia of a brushless motor and a reduction gear ratio of a reduction gear portion. Prior Art 1 permits the relatively great inertia of $4 \times 10^{-2}$ kg·m$^2$ or more in order to suppress the road noises such as kick-back from road surface, and provides an inertia compensation control such as to compensate for the steering feeling degraded by the inertia feeling resulting from the great inertia. That is, Prior Art 1 is designed to compensate for the inertia feeling based on the inertia compensation. This is nothing but a stopgap measure.

Japanese Unexamined Patent Publication No.2001-334948 discloses a technique (hereinafter, referred to as Prior Art 2) wherein a complementary sensitivity function is defined to approximate 1 in a frequency band containing disturbances to be suppressed whereas the complementary sensitivity function is defined to approximate 0 in a frequency band containing disturbances to be transmitted. According to Prior Art 2, as well, the suppression of disturbances is accomplished by permitting the relatively great motor inertia. Specifically, the inertia of the motor is positively utilized for suppressing the unwanted disturbances, while the motor inertia perceived by the driver steering the handle is compensated by a torque control system. When the inertia is increased, resonant frequency of a steering mechanism is decreased. If the relatively great inertia is permitted, there may sometimes arise a problem that even a frequency band of road information as the disturbances to be transmitted must be damped. This makes it impracticable to realize an electric power steering system providing the ease of assessing the road conditions.

Furthermore, Japanese Unexamined Patent Publication No.2001-18822 discloses a technique (hereinafter, referred to as Prior Art 3) wherein determination is made as to whether the disturbances are present in a region where the driver is sensitive to the steering feeling and based on the determination result, a control gain is changed or correction using a non-interactive control correction value or a pulsating torque correction value is provided or not.

Furthermore, Japanese Unexamined Patent Publication No.2003-40128 discloses a technique (hereinafter, referred to as Prior Art 4) wherein the system includes correcting means for correcting a current command value used for controlling the magnetic field of the motor and wherein the current command value for the control of the magnetic field of the motor is corrected when a steering speed is high.

Furthermore, Japanese Unexamined Patent Publication No. H3(1991)-178868 discloses a technique (hereinafter, referred to as Prior Art 5) wherein a viscous-friction compensation value is corrected according to a detected vehicle speed in a manner that the viscous friction is increased when the vehicle speed is high and that the current has such a polarity as to eliminate the viscous friction and a small absolute value when the vehicle speed is low.

The controls provided by Prior Art 3 and 4 involve discontinuous torque variations when the control modes are switched based on the determination result. The correction proposed by Prior Art 5 also involves unnatural torque variations in conjunction with the vehicle speed variations.

Furthermore, Japanese Unexamined Patent Publication No. 2000-238655 (Prior Art 6) discloses a technique wherein a torque ripple of the motor is reduced to 10% or less, a response frequency of a torque sensor is set to 20 Hz or more and a frequency band of torque control is set to 20 Hz or more. A steering system normally has a mechanical resonance point at frequencies of 15 to 20 Hz. In actual fact, the system is prone to vibrations if the frequency band of torque control is set to 20 Hz or more.

The other documents related to the invention disclosed herein are as follows:
Prior Art 7: Japanese Unexamined Patent Publication No.2001-275325;
Prior Art 8: Japanese Unexamined Patent Publication No.2003-61272;
Prior Art 9: Japanese Unexamined Patent Publication No. H6(1994)-227410;
Prior Art 10; Japanese Unexamined Patent Publication No. 2001-133343;
Prior Art 11; Japanese Examined Patent Publication No. S62 (1987)-38579;
Prior Art 12; Japanese Unexamined Patent Publication No. H11(1999)-124045;
Prior Art 13; Japanese Unexamined Patent Publication No. 2000-289638;
Prior Art 14; Japanese Unexamined Patent Publication No. H8(1996)-91236;
Prior Art 15; Japanese Unexamined Patent Publication No. H10(1998)-278818;
Prior Art 16; Japanese Unexamined Patent Publication No. 2001-233234;
Prior Art 17; Japanese Unexamined Patent Publication No. H8(1996)-119132;
Prior Art 18; Japanese Unexamined Patent Publication No. H8(1996)-308198;
Prior Art 19; Japanese Unexamined Patent Publication No. 2001-151121;
Prior Art 20; Japanese Unexamined Patent Publication No. 2002-372469;
Prior Art 21; Patent Publication No. 2782254

DISCLOSURE OF THE INVENTION

As described above, if the improvement of the steering feeling relies upon the various compensation logics proposed by the prior art, the linearity of the steering system is rather impaired so that the good steering feeling is not provided.

Therefore, the electric power steering system may not be able to provide an excellent steering feeling if the system relies upon the compensation logics for improving the steering feeling.

The invention is directed to the improvement of the steering feeling by taking a different approach from the prior-art approaches which rely upon the compensation logics.

The present inventors have made intensive studies on the electric power steering system to find that the steering performance and the steering feeling depend upon the followability of the mechanical system.

The inventors have accomplished the invention, noting the fact that both the friction and the inertia are set to the relatively great values in the prior art, the great friction and inertia impairing the followability of the mechanical system and necessitating the compensation based on the compensation logics, which results in the impaired linearity of the steering feeling.

According to the invention, an electric power steering system for providing a steering assist by applying a power of a steering assist motor to a steering mechanism, the system comprises road-noise suppression control means for controlling the steering assist motor in a manner to damp torque transmission in a higher frequency region representing road noises than a frequency region representing road information, and is characterized in that a friction value of the steering mechanism is decreased enough to allow intrinsic vibrations of the steering mechanism to appear, and that rotor inertia of the steering assist motor is set to a value small enough to allow a frequency of the intrinsic vibrations to be present in the frequency region where the torque transmission is damped by the road-noise suppression control means.

According to the invention, the friction is reduced so that the steering feeling is improved by virtue of decreased friction sensation. A frictional element as an element to suppress the intrinsic vibrations of the steering mechanism has such a decreased value as to allow the intrinsic vibrations to appear.

Provided that an elastic constant of an elastic element such as a torsion bar is represented by K[Nm/rad] and that the inertia is defined as J[kg·m²]=[Nm·s²/rad], an intrinsic angular frequency ωn is expressed as follows:

$$\omega n = \sqrt{(K/J)}.$$

Since the invention decreases the rotor inertia, the inertia feeling is decreased to improve the steering feeling.

What is more, the invention decreases the friction enough to allow the intrinsic vibrations to appear, whereas the low rotor inertia raises the intrinsic vibration frequency to the frequency region where the torque transmission is damped by the road-noise suppression control means (as apparent from the above equation, the inertia J may be decreased to increase the intrinsic vibrations).

If the intrinsic vibration frequency is present in the frequency region of the road information, the road-noise suppression control means is unable to suppress the intrinsic vibrations. This leads to the necessity of complicated condition determinations in order to accomplish both the suppression of the intrinsic vibrations and the prevention of the elimination of the road information in the road-information frequency region where the elimination of the road information per se is not so desired. However, if the intrinsic vibration frequency is present in the frequency region of the road noises, it is easy to suppress the road noises.

According to the invention as described above, the steering mechanism as the mechanical system features good followability based on low friction/low inertia. Because of the low friction sensation and inertia feeling, the steering mechanism needs not perform dynamics compensation logics impairing the linearities of friction compensation/inertia compensation and the like. Hence, the steering feeling is improved.

According to another aspect of the invention, an electric power steering system operating to apply a torque of a steering assist motor to a steering mechanism including a steering gear via a reduction gear assembly and permitting a friction of the steering gear and a friction of the reduction gear assembly to act as resistance for reducing the transmission of the torque of the steering assist motor, the steering system is characterized in that a motor having a rotor inertia (converted to a value about a steering shaft) of 0.012 kgm² or less is employed as the steering assist motor, and that the sum of the friction of the steering gear and the friction of the reduction gear assembly (converted to a value about the steering shaft) is defined to be 1 Nm or less.

According to the above constitution, the value of the rotor inertia is decreased enough to allow the drivers to perceive less inertia feeling and hence, a good steering feeling with less inertia feeling may be provided. Since the frictions at the individual parts of the system are decreased so as to allow even a small motor with low inertia to provide a required assist force, the system has a high torque transmissibility and is capable of providing the required assist force even if the reduction gear assembly has a low reduction ratio.

Thus is obtained the steering mechanism of low friction/low inertia. By virtue of the low friction/low inertia characteristics, the steering mechanism is capable of providing a natural steering feeling.

According to still another aspect of the invention, the electric power steering system may preferably comprise means for controlling the steering assist motor in a manner to damp torque transmission in a frequency region representing road noises. In this case, the steering system is adapted to provide the good steering feeling based on the low friction/low inertia characteristics and also to achieve an enhanced road noise resistance.

BEST MODES FOR CARRYING OUT THE INVENTION

Figure 1:
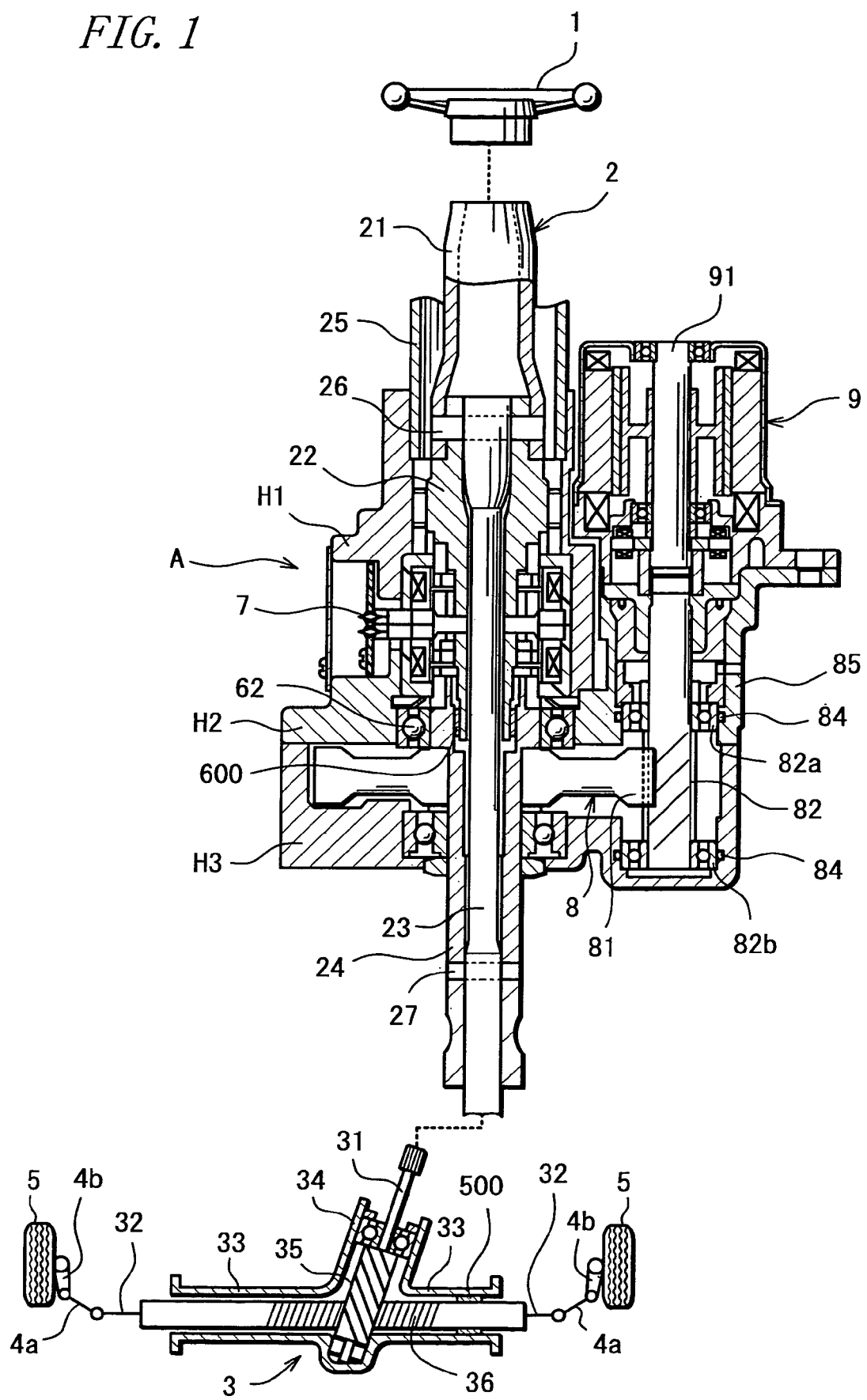
FIG. 1 is a schematic diagram showing an arrangement of a principal part of an electric power steering system.

The following descriptions are composed as follows:
[1. Steering System]
　[1.1 General Constitution of the Steering System]
　[1.2 Road Noise Suppressing Means; Phase Compensating Unit]
　[1.3 Consideration for System Components]
　　[1.3.1 Elasticity]
　　[1.3.2 Damping, Viscous Friction]
　　[1.3.3 Inertia]
　　[1.3.4 Friction]
　[1.4 Intrinsic Vibration Frequencies of Steering Mechanism]
[2. Principal Frictions in Mechanical System of Steering System]
　[2.1 Manual Steering Gear]
　　[2.1.1 Consideration for Friction at Manual Steering Gear]
　　[2.1.2 Preferred Mode of Pinion Teeth]
　[2.2 Reduction Gear Assembly]
　　[2.2.1 Consideration for Reduction Gear Assembly]
　　[2.2.2 Preferred Mode of Reduction Gear Assembly]
　[2.3 Consideration for Friction of Manual Steering Gear and Reduction Gear Assemblys]
[3. Steering Assist Motor; Rotor Inertia]
[4. Motor Drive Circuit (Drive Circuit)]
　[4.1 Consideration for Motor Drive Circuit]
　[4.2 Fundamental Consideration for Prior-Art Motor Drive Circuit]
　[4.3 General Constitution of Control Unit Including Drive Circuit (Drive Circuit)]
　[4.4 Constitution of Principal Part of Motor/Drive Circuit System]
　[4.5 Action and Effect of Drive Circuit of the Embodiment]
　[4.6 Modifications of Drive Circuit]
[5. Linearity of Steering Feeling]
　[5.1 Torque Pulsation Compensation]
　　[5.1.1 Consideration for Torque Pulsation Compensation]
　　[5.1.2 Constitution of Electric Motor and Overview of Drive Control Thereof]
　　[5.1.3 Constitution and operation of ECU]
　　[5.1.4 Constitution and Frequency Characteristics of Current Control System]
　　[5.1.5 Constitution and Operations of Magnetic Field Distortion Compensating Portion]
　　[5.1.6 Constitution and Operations of High-Order-Current Distortion Compensating Portion]
　[5.2 Dead Zone]
　　[5.2.1 Consideration for Dead Zone]
　　[5.2.2 Preferred Mode Related to Dead Zone]
　[5.3 Changeover of Phase Compensation Characteristics]
　　[5.3.1 Consideration for Phase Compensation Characteristic]
　　[5.3.2 Preferred Mode of Phase Compensation Means]
　[5.4 Compensation for Transverse Vehicle Wandering]
　　[5.4.1 Consideration for Transverse Vehicle Wandering]
　　[5.4.2 Preferred Mode of Suppressing Transverse Vehicle Wandering]
　[5.5 Compensation for Temperature Characteristic of Current Detector]
　　[5.5.1 Consideration for Temperature Characteristic of Current Detector]
　　[5.5.2 Preferred Mode of Compensation for Temperature Characteristic]
　　[5.5.3 Modifications]
　[5.6 Phase Alignment in Reduction Gear Assembly]
　　[5.6.1 Consideration for Mesh of Gear Teeth of Reduction Gear Assembly and Torque Variation Thereof]
　　[5.6.2 Preferred Mode of Reducing Torque Variations]
[6 Non-Interactive Control]
[7 Damping of Road Noise in Rack Shaft]
　[7.1 Consideration for Road Noise]
　[7.2 Preferred Mode of Viscoelastic Member]
[8 Vibration Suppression in Steering Mechanism (Improvement of Convergence]
　[8.1 Consideration for Vibration Suppression in Steering Mechanism]
　[8.2 Preferred Mode of Viscoelastic Member]

[1. Steering System]

[1.1 General Constitution of the Steering System]

FIG. 1 is a schematic diagram showing an arrangement of a principal part of an electric power steering system according to one embodiment of the invention. Referring to the figure, the system is mounted to an automotive vehicle, for example, and includes a steering shaft 2 for changing the direction of steerable wheels 5 according to a steering operation by a driver manipulating a steering member (steering wheel) 1. The steering shaft 2 includes: a cylindrical mounting shaft 21 having the steering member 1 mounted to an upper end thereof; a cylindrical input shaft 22 unitarily rotatably coupled to the mounting shaft 21; and a cylindrical output shaft 24 coaxially coupled to the input shaft 22 with a torsion bar 23.

Figure 37:
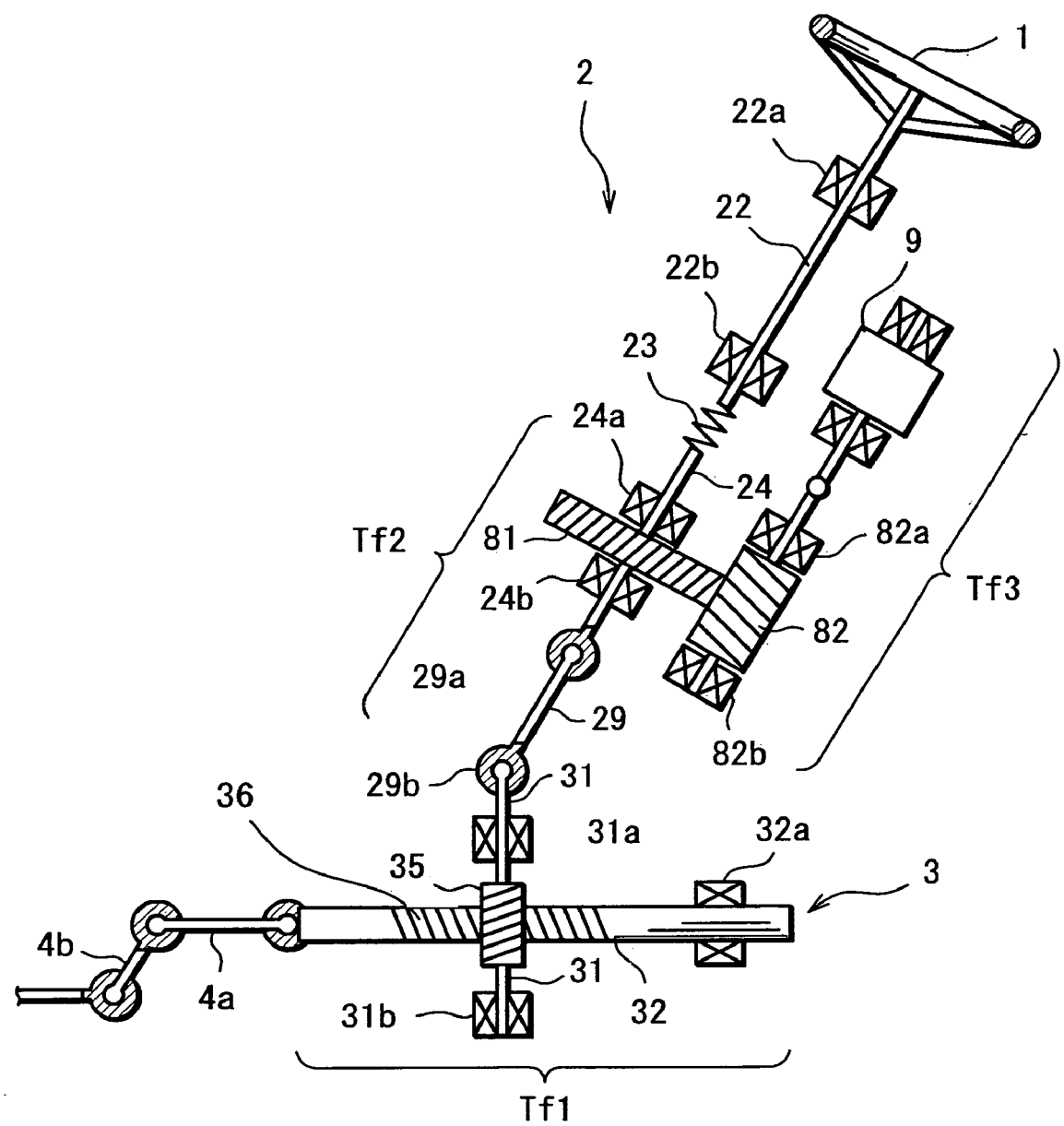
FIG. 37 is a schematic diagram schematically showing a steering mechanism of the electric power steering system.

A lower end of the steering shaft 2 (output shaft 24) is coupled with a manual steering gear 3 by means of universal joints (29a, 29b; FIG. 37) and the like. The manual steering gear 3 is a rack and pinion type which includes a pinion shaft 31 and a rack shaft 32. The rack shaft 32 is axially movably carried in a cylindrical rack housing 33. Transversely opposite ends of the rack shaft 32 are coupled with the right-hand and left-hand steerable wheels 5 by means of a tie rod 4a and a knuckle arm 4b, respectively.

The rack housing 33 is connected with a pinion housing 34 at a longitudinally intermediate portion thereof in a manner that the respective axes thereof intersect each other. The pinion shaft 31 is carried in the pinion housing 34 as allowed to rotate about its axis. The pinion shaft 31 is coupled to the lower end of the steering shaft 2 by means of the universal joints 29a, 29b and the like.

A lower half part of the pinion shaft 31 extended though the pinion housing 34 is increased in diameter to define a great diameter portion extending for a suitable length. The great diameter portion is formed with pinion teeth 35 on an outer periphery thereof. On the other hand, the rack shaft 32 carried in the rack housing 33 is formed with rack teeth 36 which are arranged in a suitable length. The range of the rack teeth includes a portion facing the pinion shaft 31. The rack teeth 36 are meshed with the pinion teeth 35 formed on the peripheral surface of the pinion shaft 31.

The above constitution works as follows. When the steering member 1 is turned for steering purpose, the pinion shaft 31 coupled to the steering member 1 via the steering shaft 2 is brought into rotation, which is converted into a movement in a longitudinal direction of the rack shaft 32 by way of a meshing engagement portion between the pinion teeth 35 and the rack teeth 36 whereby the rack shaft 32 is moved in rightward or leftward direction.

Such a movement of the rack shaft 32 is transmitted to the right-hand and left-hand knuckle arms 4b, 4b by means of the tie rods 4a, 4a coupled to the opposite ends of the rack shaft 32. These knuckle arms 4b, 4b operate to pull or push the steerable wheels (front wheels) 5, 5 thereby turning the steerable wheels in an operated direction of the steering member 1 till the steerable wheels are angled in correspondence to an operation quantity. Thus, the steering of the vehicle is accomplished.

The mounting shaft 21 is fixed to a vehicle body as accommodated in a steering column 25 and has a lower end thereof coupled to an upper end of the input shaft 22 by means of a pin 26. One end of the torsion bar 23 is fixedly fitted in the input shaft 22, whereas the other end of the torsion bar 23 is fixedly fitted in a lower end of the output shaft 24.

The input shaft 22 and the output shaft 24 are rotatably mounted in first, second and third housings H1, H2 and H3 by means of bearings. The first, second and third housings H1, H2 and H3 are fixed to the vehicle body and are separable from one another in a vertical direction as seen in the figure.

The output shaft 24 is coupled with an electric motor 9 by means of a reduction gear assembly 8. The reduction gear assembly 8 includes a driving gear 82 and a driven gear 81 meshed therewith. The driving gear 82 is unitarily rotatably mounted with an output shaft 91 of the motor 9, such that the rotation of the electric motor 9 is transmitted to the output shaft 24 by means of the driving gear 82 and the driven gear 81.

The electric motor 9 is driven according to a detection result supplied from a steering action detector (device for detecting a steering torque and/or a steering angle) 7. That is, the electric motor 9 generates a steering assist force according to a steering torque inputted from the steering member 1.

These reduction gear assembly 8 and the drive motor 9 constitute a steering assist portion for applying the motor-powered steering assist force to a steering mechanism A extending from the steering member 1 to the steerable wheels 5. In this embodiment, the steering mechanism is a steering-shaft assist type (column assist) steering mechanism (C-EPS)A which applies the steering assist force to the steering shaft 2.

[1.2 Road Noise Suppressing Means; Phase Compensating Portion]

Figure 27:
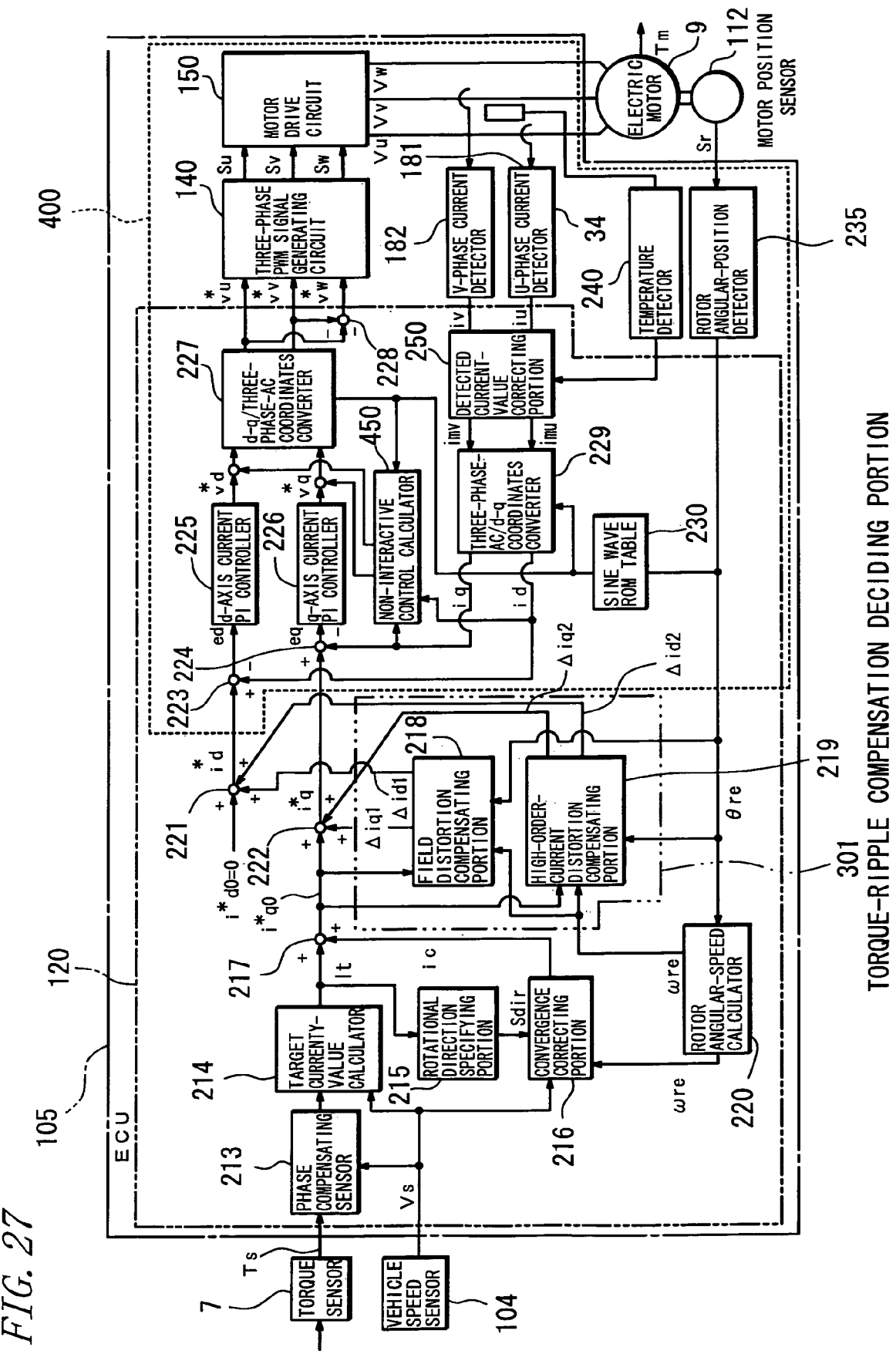
FIG. 27 is a block diagram showing an example of a more specific arrangement of the ECU.

FIG. 27 is a block diagram showing an example of a specific arrangement of an ECU 105 for controlling the electric motor 9. As shown in the figure, the ECU 105 includes a variety of functions such as a phase compensating portion (phase compensator) 213 which receives a torque signal Ts from a torque sensor 7.

The phase compensating portion 213 constitutes road noise suppressing means of the invention. The phase compensating portion 213 is supplied with a torque detection signal from the torque sensor 7. The phase compensating portion 213 advances the phase of the torque detection signal thereby improving the overall system in responsivity in respect of a practical frequency band.

The phase compensating portion 213 also functions as a filter portion for suppressing road noises. Specifically, the phase compensating portion 213 is characterized by a transfer function represented by the following equation:

$Gc(s)=(s^2+2\zeta_2\omega_2 s+\omega_2^2)/(s^2+2\zeta_1\omega_1 s+\omega_1^2)$, where s denotes the Laplace operator; $\zeta_1$ denotes the compensated damping coefficient; $\zeta_2$ denotes the damping coefficient of a compensated system; $\omega_1$ denotes the compensated natural angular frequency; and $\omega_2$ denotes the natural angular frequency of the compensated system.

Figure 2:
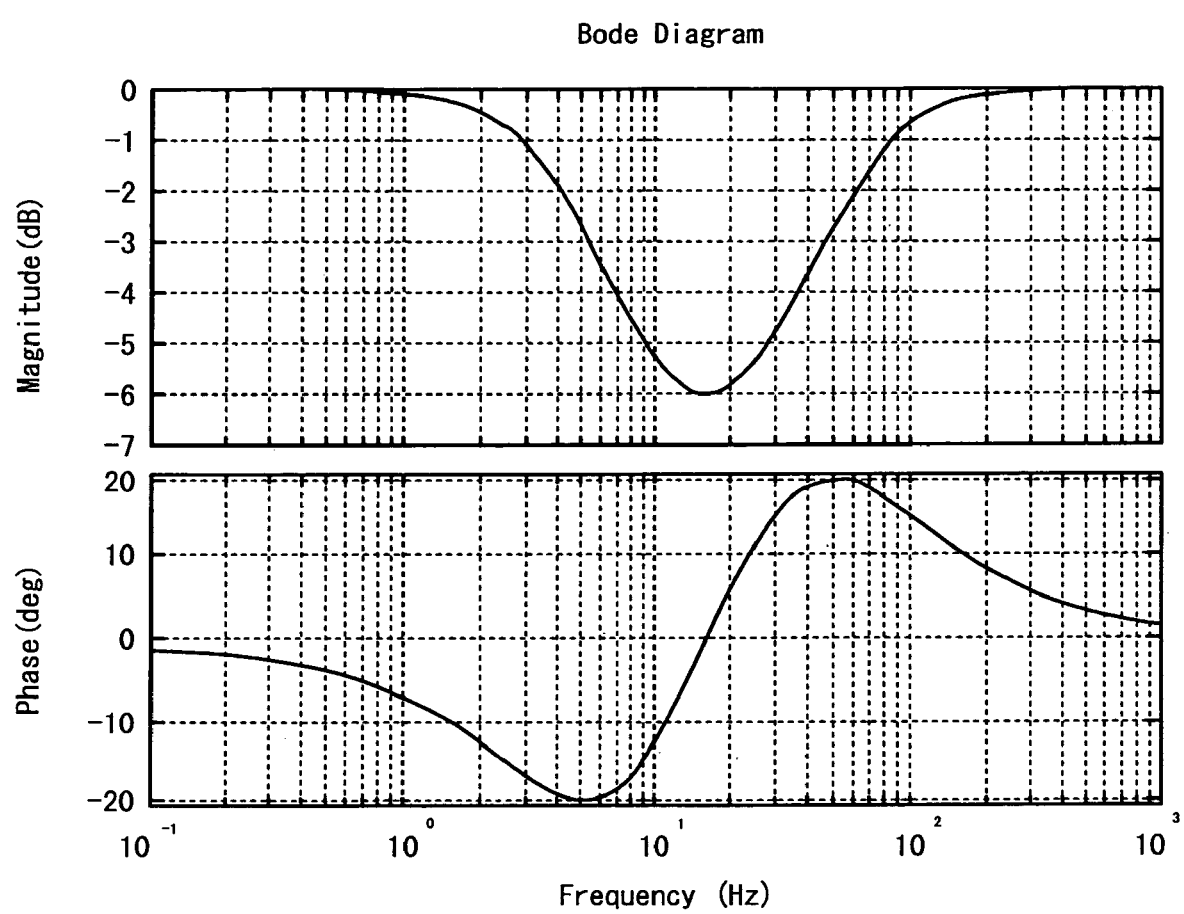
FIG. 2 is a Bode diagram showing characteristics of a phase compensating portion.

FIG. 2 is a Bode diagram of the phase compensating portion 213 wherein the function Gc(s) has values $\zeta_1=1.8$ and $\zeta_2=0.15$. As seen from the Bode diagram of FIG. 2, Gc(s) represents the same characteristic as that of a band elimination filter (BEF). In the figure, the gain is minimized at 16.5 Hz near an intrinsic vibration frequency of the steering mechanism A.

Figure 3:
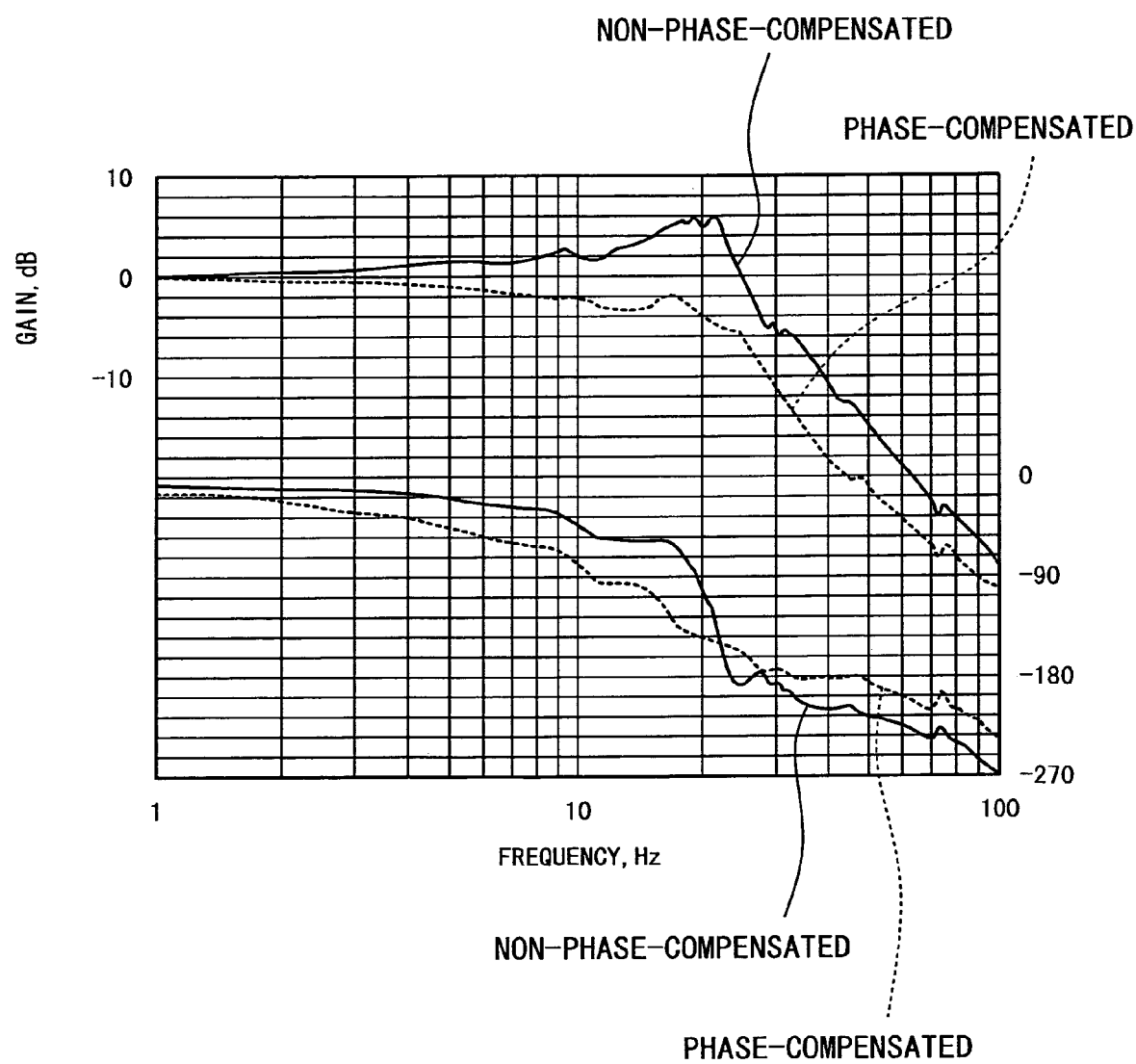
FIG. 3 is a Bode diagram showing characteristics of the electric power steering system.

FIG. 3 shows Bode diagrams of a steering system subjected to phase compensation and a steering system un-subjected to the phase compensation. The solid line in the figure represents a non-phase-compensated characteristic, whereas the broken line represents a phase-compensated characteristic. In the figure, the upper characteristic curves represent the gain, whereas the lower characteristic curves represent the phase.

Figure 4:
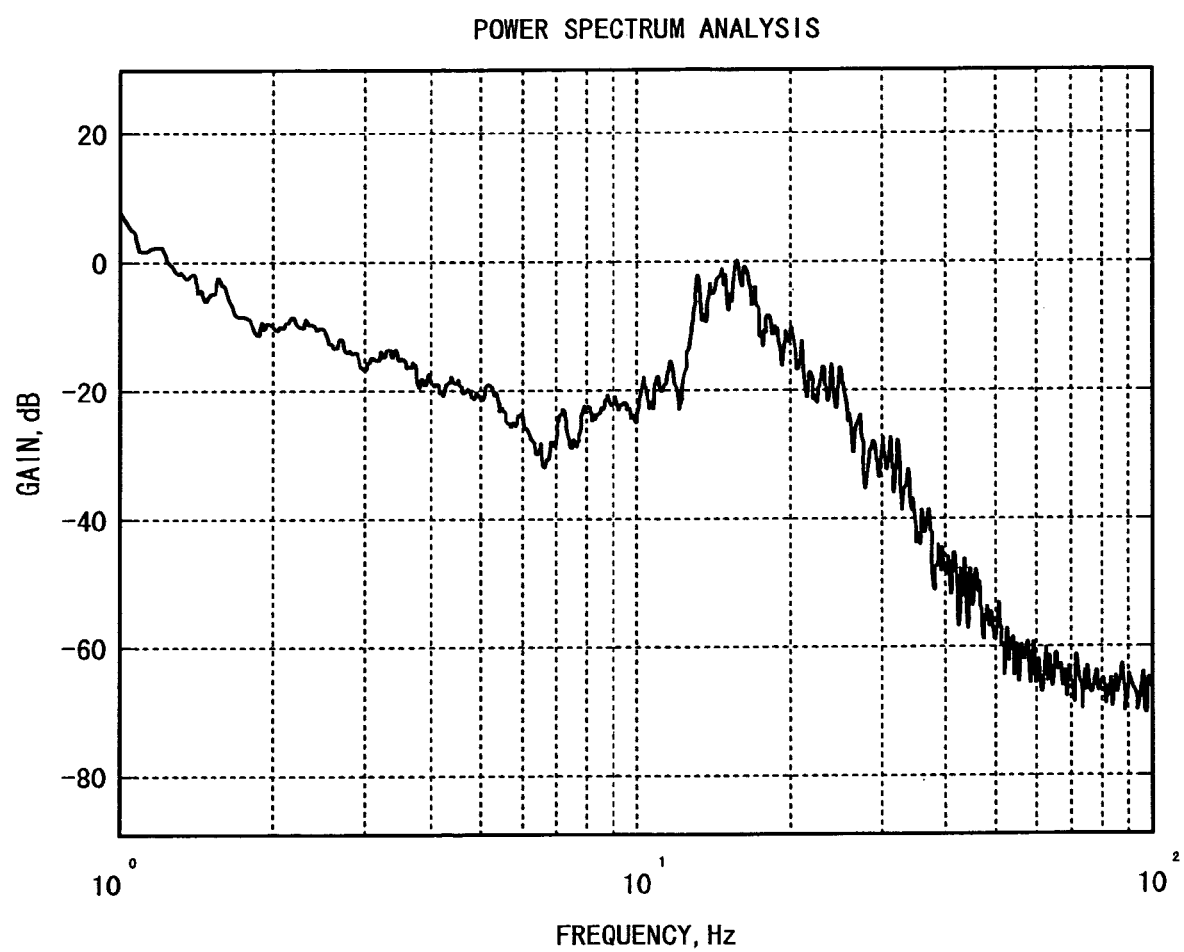
FIG. 4 is a graph showing the results of power spectrum analysis on the electric power steering system not providing phase compensation.
Figure 5:
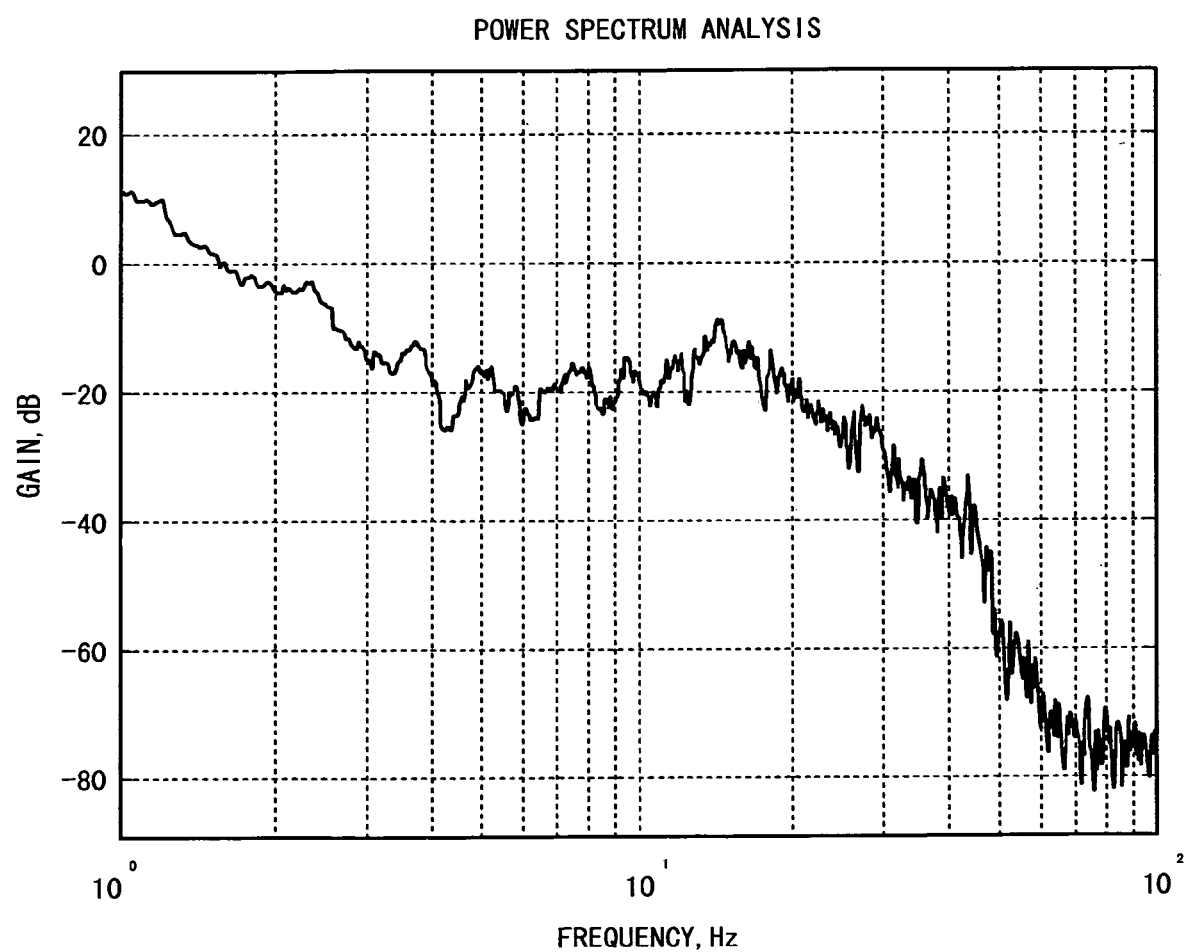
FIG. 5 is a graph showing the results of power spectrum analysis on the electric power steering system providing the phase compensation.

FIG. 4 graphically shows the results of power spectrum analysis on the system not subjected to the phase compensation, whereas FIG. 5 graphically shows the results of power spectrum analysis on the system subjected to the phase compensation.

While the frequency regarded as the road noise varies depending upon required specifications, it is assumed here that frequencies of 10 Hz or more are regarded as the road noise and frequencies less than 10 Hz are regarded as road information. As seen in FIG. 3 to FIG. 5, the gain decreases at frequencies of 10 Hz or more which constitute the road noise. This indicates that torque transmission is damped at the frequency region equivalent to the road noise. In the frequency region of less than 10 Hz which constitute the road information, on the other hand, the torque transmission is damped little.

It is noted here that the embodiment employs the phase compensating portion 213 having the transfer function Gc(s) for achieving both the damping of the road noise and the improvement of the phase characteristic. In the damping of road noises having frequencies of a predetermined value or more, however, a low-pass filter (LPF) may also be employed in place of the phase compensating portion 213 having the transfer function Gc(s). The low-pass filter transmits frequencies of less than the predetermined value but cuts off the frequencies of the predetermined value or more. Otherwise, the above low-pass filter may be used in combination with the phase compensating portion 213 having the transfer function Gc(s).

[1.3 Consideration for System Components]

Next, a brief description is made on an influence which is exerted on steering feeling by principal dynamic components of the steering system shown in FIG. 1. A transfer function of a spring-mass system receiving a torque (steering torque) T as an input and providing an angle (steering angle) θ as an output is represented by the following second-order equation:

[Mathematical Equation 1]

$$\theta(s) = \frac{1}{Js^2 + Cs + K} T(s) \quad (1)$$

where, J denotes the inertia [kg·m$^2$]=[Nm·s$^2$/rad]; C denotes the viscous-friction constant [Nm·s/rad]; T denotes the torque [Nm]; and θ denotes the angle [rad].

The equation (1) may be converted into the following equation (1a):

[Mathematical Equation 1a]

$$\theta(s) = \frac{\frac{1}{J}}{s^2 + \frac{C}{J}s + \frac{K}{J}} T(s) \quad (1a)$$

Thus are obtained the following equations (2) and (3).

[Mathematical Equation 2]

$$\omega_n = \sqrt{\frac{K}{J}} \quad [\text{rad/s}] \quad (2)$$

[Mathematical Equation 3]

$$\zeta = \frac{C}{2\sqrt{KJ}} \quad (3)$$

Based on the equation (3), the viscous-friction constant C may be represented by the following equation (4):

[Mathematical Equation 4]

$$C = 2\zeta\sqrt{KJ} \quad (4)$$

The equations (2) and (4) indicate that it is desirable to decrease the inertia J in order to increase the intrinsic vibration frequency and to obtain a proper viscous-friction coefficient ζ from a small viscous-friction constant C.

[1.3.1 Elasticity]

Principal elastic elements K of a torque transmission system for power steering include: the torsion bar 23, the universal joints 29a, 29b (interposed between the steering shaft 2 and the manual steering gear 3; FIG. 37), a mount bush of the manual steering gear 3, tires 5 and a mount bracket of the steering shaft (column) 2. In the electric power steering system of the column assist type, in particular, principal inertial elements J (steering wheel 1, motor 9, hubs and wheels) are disposed at places forwardly or rearwardly of these elastic elements. Accordingly, the torque transmission system makes a vibratory system having plural intrinsic vibrations in a low frequency region (10 to 80 Hz). This is also indicated by the above equation (2). For positive suppression of all these intrinsic vibrations, the system must damp gains, with respect to an open-loop torque frequency characteristic, in a wide frequency region.

It is also understood from the equation (3) that a viscous-frictional element C, whether in mechanism, control or otherwise, is necessary for implementing the damping performance. Finally, however, the system is faced with trade-off between the stability of handle behavior and a smooth steering feeling, as will be described hereinlater. Unless the elastic element is involved in some function, it is desirable to opt for the following strategy with due consideration of the above discrepancy. That is, the system is increased in rigidity (such as rigidities of the column bracket, the universal joints and the like) as much as possible, while the use of the elastic element is minimized. Alternatively, the intrinsic vibration frequency region is shifted to a higher frequency region (100 Hz or more)

[1.3.2 Damping, Viscous Friction]

As seen from the equation (3), the viscous friction C in the second-order system (the torque input-angle output system) constitutes an element of suppressing the intrinsic vibrations. In the first-order system (torque input-speed output system), on the other hand, the viscous friction C serves as a factor to decrease a time constant and to decrease an output (speed) gain. In order for the system to provide a consistent handle behavior by mechanically stabilizing the above intrinsic vibrations in the case of an extremely small friction, a proper viscous-frictional element for each of the intrinsic frequencies is indispensable. In the meantime, the viscous-frictional element constitutes a significant viscous-frictional resistance (heavy handle motion) to a steering input. This results in a non-smooth steering feeling.

A principal mechanical viscous-frictional element includes grease viscous friction of bearings carrying sliding, and rotary portions. A principal electrical viscous-frictional element includes a speed-related resistance associated with a counter-electromotive force of the motor. Care must be taken in positioning and distributing these elements in the system. Specifically, if a significant viscous-frictional element exists between the reduction gear assembly 8 and the motor 9, the heavy handle motion is abruptly decreased when the steering member is shifted from a non-assist state to an assist state, so that the driver may have an uncomfortable feeling. This is an important factor involved in the linearity of steering torque variations at the start of steering from a neutral-steer position. It is therefore desirable to minimize the viscous friction at this portion.

In a case where the above proper viscous friction is to be implemented by way of motor torque control, as well, the system is similarly faced with trade-off between the stability of handle behavior and the smooth steering feeling when tuning is performed.

[1.3.3 Inertia]

As seen from the equation (2), the inertial element J in the second-order system (the torque input-angle output system) may also serve as a factor to shift the intrinsic vibration frequencies to a lower frequency side and also to decrease the output gain in a higher frequency region than the intrinsic frequencies (the equation (1a)). In the first-order system (torque input-speed output system), on the other hand, the inertial element also acts to increase the time constant. Therefore, the inertial element works to decrease torque transmission responsivity to a positive input (steering torque) and also to cut off an inverse input (disturbances).

A sensory term "high rigidity" may be used synonymously with a sensory term "low inertia". The high rigidity or low inertia depends upon balance between the elastic element and the inertial element disposed at place closer to the output side. That is, when the intrinsic frequency represented by the equation (2) based on the combination of these elements is at such a high value as not to be perceived by the driver, the high intrinsic frequency may be perceived as high rigidity and low inertia.

In order for the system to attain a high-rigidity handle behavior with respect to the positive input (steering torque) and to cut off the inverse input, it is desirable to increase the inertial element relative to the elastic element, the inertial element disposed at place closer to the input side than the elastic element.

In a case where the motor 9 is interposed between two elastic elements (the torsion bar 23 and the universal joints (not shown)), a cutoff frequency for torque transmission from the higher elastic constant side (the universal joints) to the lower elastic constant side (the torsion bar 23) is relatively decreased. In the meantime, phase delay at frequencies lower than the cutoff frequency is increased so that a loadless steering feeling with low rigid handle behavior may result. On this account, it is desirable to minimize the inertia.

[1.3.4 Friction]

Friction does not depend upon input frequencies and acts as a constant resistance against both of the positive and inverse inputs. That is, the friction is a major causative factor of the decrease of torque transmissibility. The friction is always perceived as a dragging feeling in terms of the steering feeling. On the other hand, the friction presents a filtering effect against the disturbances. Unfortunately, the friction goes so far as cutting off the necessary road information. This dictates the need for considering trade-off between the elimination of disturbance and the road information.

Just as in the case of the viscous friction, how to distribute frictional elements in the system is important. The friction interposed between the reduction gear assembly 8 and the motor 9 produces difference between a dragging feeling in the assist state and a dragging feeling in the non-assist state. It is therefore desirable to minimize such a friction.

Static friction is greater than dynamic friction and is instable in value so as to cause unrepeatable stick-slip motions. Therefore, the static friction is particularly unfavorable. Anyway, the frictions are non-linear elements which are difficult to handle. From the viewpoint of the overall system, the frictions may preferably be minimized.

[1.4 Intrinsic Vibration Frequencies of Steering Mechanism]

The electric power steering system according to the embodiment, which will be described in details hereinlater, are determined to have intrinsic vibration frequencies on the order of 17 Hz (fn1), 40 Hz (fn2) and 50 Hz (fn3). The intrinsic vibration frequencies are produced in accordance with the equation (2) based on an elastic constant Kt of the torsion bar 23, an elastic constant Ki of the universal joints 29a, 29b, a rotor inertia Jm, an under-spring inertia (inertia on a downstream side from the torsion bar (steerable-wheel-5 side)) J1 and the like.

Since the rotor inertia Jm is decreased in this embodiment, all the intrinsic vibrations occurring at the steering mechanism A are in the frequency region of the road noises. By virtue of the decreased rotor inertia Jm, in particular, the intrinsic vibration frequency fn1 based on the under-spring inertia J1 and the elastic constant Kt of torsion bar is successively increased to the road noise frequency region (e.g., 10 Hz or more).

The elastic constant Kt of the torsion bar as a spring element is determined as follows.

$$Kt = 29 \text{ [kgf} \cdot \text{cm/deg]}$$
$$= 29 \times 9.8 \times 10^{-2} 180/\pi \text{ [Nm/rad]}.$$

The rotor inertia Jm of the motor 9 is determined as follows.

$$Jm = 0.67 \times 10^{-4} \text{ [kg} \cdot \text{m}^2\text{]}$$
(design value about the motor output shaft 91)
$$= 0.67 \times 10 - 4 \times 9.7^2 \text{ [kg} \cdot \text{m}^2\text{]}$$
(about the steering shaft 2; reduction ratio: 9.7)
$$= 0.0063 \text{ [Nm} \cdot \text{s}^2\text{/rad]}$$

The under-spring inertia (the inertia on the downstream side from the torsion bar (steerable-wheel-5 side)) J1 is determined as follows.

$$J1 = 0.0148 \text{[Nm} \cdot s^2\text{/rad]}$$

Out of the under-spring inertia J1, inertia Jw except for the rotor inertia is determined as follows:

$$Jw = 0.0085 \text{[Nm} \cdot s^2\text{/rad]}$$

The intrinsic frequency fn2 is based on Ki, Jw, whereas the intrinsic frequency fn3 is based on Kt, Ki, Jm.

According to the embodiment, the above intrinsic frequencies (particularly the intrinsic frequency fn1) are prone to develop because the steering mechanism as a whole is decreased in friction by reducing the frictions at the principal frictional elements such as the manual steering gear 3 and the reduction gear assembly 8, as will be described hereinlater. However, the intrinsic frequencies are present in the road-noise frequency region so that the intrinsic frequencies can be damped by means of the phase compensating portion 213.

[2. Principal Frictions in Mechanical System of Steering System]

The principal frictional element in the mechanical system of the steering system includes the manual steering gear 3 and the reduction gear assembly 8.

[2.1 Manual Steering Gear]

[2.1.1 Consideration for Friction at Manual Steering Gear]

In the steering systems of the rack and pinion type, a variety of proposals have heretofore been made on various tooth factors of the pinion teeth and rack teeth (pressure angle, module, teeth number and the like) aiming at maintaining a proper meshing engagement between the pinion teeth formed on the pinion shaft and the rack teeth formed on the rack shaft thereby providing the driver with a comfortable steering feeling (Prior Art 11).

In the above rack-and-pinion type steering system, the various tooth factors of the pinion teeth formed on the pinion shaft are so selected as to satisfy design conditions imposed by the vehicle in which the pinion shaft is mounted. Specifically, the various tooth factors are selected to ensure strength such that the pinion teeth may withstand required load conditions with respect to the quantity of movement of the rack shaft per one revolution of the pinion shaft or a circumference of a length limited by a stroke ratio.

In many cases, the pressure angle of the above tooth factors is defined to be a standard value (20° or 14.5°) specified by JIS (Japanese Industrial Standard). In a case where this standard value is used, the other tooth factors selected according to a common stroke ratio (35 to 60 mm/rev) are a module on the order of 2.5 and a teeth number of 5.

However, the rack-and-pinion type steering system adopts a specific meshing engagement mode in order to reduce rattling noises at the meshing engagement portion between the pinion teeth and the rack teeth thereby preventing the degradation of the steering feeling. The specific meshing engagement mode uses pre-load means based on a spring load for pressingly biasing the rack shaft toward the pinion shaft, thereby bringing the pinion teeth and the rack teeth into a backlash-free meshing engagement.

In a case where the tooth factors of such pinion teeth are selected according to the aforesaid relatively small standard pressure angle, the rack teeth is excessively pressed into the pinion teeth by the above pre-load means so that the pinion teeth is increased in meshing friction with respect to the rack teeth. Accordingly, the driver manipulating the steering member coupled to the pinion shaft tends to receive less reaction force transmitted from the road surface. This results in the degraded steering feeling.

As described above, the selected teeth number of the pinion shaft is small (5 tooth). In a case where the pinion teeth of such a pinion shaft are meshed with the rack teeth, there occurs a so-called trochoid interference, a phenomenon wherein tips of the rack teeth located beyond a normal meshing engagement position act to bore roots of the pinion teeth. This leads to a further increase of the meshing friction between the pinion teeth and the rack teeth, which further aggravates the aforementioned problem. Furthermore, in the case of a significant trochoid interference, the thickness of the roots of the pinion teeth is progressively decreased with time as abraded by the tips of the rack teeth, so that the pinion teeth are decreased in strength. This leads to a fear that the pinion teeth may be broken before the lapse of a required endurance time.

Furthermore, the following problems are encountered by the electric power steering system of the column assist type which includes the steering assist motor disposed at some intermediate place of the steering shaft (column shaft) interconnecting the steering member and the pinion shaft and which is adapted to transmit the torque of the motor to the pinion shaft for assisting the aforementioned steering operation. In addition to a steering torque applied to the steering member by the deriver, the rotational torque of the motor is applied to the pinion teeth formed on the pinion shaft and hence, the aforementioned fear of teeth breakage increases. What is more, the system is decreased in responsivity in the transmission of the rotation of the motor to the rack shaft via the pinion shaft, thus failing to provide the good steering feeling.

Prior Art 11 merely suggests a method wherein a run-out angle and a pressure angle of the rack teeth are selected based on a relation with a sectional configuration of the rack shaft. This method is directed to the prevention of a roll-on phenomenon where the rack teeth roll on the pinion teeth in conjunction with the rotational displacement of the rack shaft about its axis, the phenomenon occurring at the meshing engagement portion between the pinion teeth and the rack teeth, which are formed as spiral teeth. That is, the prior art does not offer a measure overcoming the aforementioned problems resulting from the meshing friction and the trochoid interference.

In order to prevent the trochoid interference, the prior art adopts a measure wherein the pinion teeth and the rack teeth meshed therewith are formed as low teeth so as to define a predetermined clearance therebetween, the low teeth having a tooth height smaller than 1 module, the tooth height ranging from a pitch circle to the tooth tip. In this case, it is difficult for the rack teeth and the pinion teeth to achieve a transverse contact ratio of 1 or more. Thus, the rack teeth and the pinion teeth make discontinuous contact therebetween. This leads to another drawback that a smooth movement of the rack shaft for steering operation is impaired.

The rack-and-pinion type steering system may preferably have the following constitution in order that the steering system may reliably provide the smooth and favorable steering feeling over an extended period of time by forming the pinion teeth which adopts the great pressure angle for reducing the meshing friction with respect to the rack teeth and have the other tooth factors set to optimum values based on the adopted pressure angle.

That is, the preferred rack-and-pinion type steering system has the constitution wherein the pinion teeth formed on the periphery of the pinion shaft are in backlash-free meshing engagement with the rack teeth formed on the periphery of the rack shaft, wherein the rotation of the pinion shaft coupled to the steering member is transmitted to the rack shaft via the meshing engagement portion between the pinion teeth and the rack teeth, and wherein the rack shaft is longitudinally moved at a predetermined stroke ratio thereby steering the steerable wheels. This rack-and-pinion type steering system is characterized in that the pinion teeth have a pressure angle $\alpha$ set in the range of $24° \leq \alpha \leq 30°$ and have a module m, a teeth number z, a tooth height h and run-out angle $\beta$ selected based on the pressure angle $\alpha$ and the stroke ratio in a manner to satisfy predetermined design conditions and set in respective ranges as below:

Module m: $1.8 \leq m \leq 2.0$
Teeth number z: $7 \leq z \leq 13$
Tooth height h: $2m \leq h \leq 2.5m$
Run-out angle $\beta$: $\beta \leq 35°$ According to the above constitution, the pressure angle $\alpha$ of the pinion teeth formed on the pinion shaft is defined to be 24° or more, which is substantially greater than the standard pressure angle. Thus, the pinion teeth are decreased in the meshing friction even under the pre-load pressingly applied by the rack teeth, thereby achieving a smooth torque transmission. The pressure angle $\alpha$ has an upper limit of 30°, which is posed by machining reasons. Then, the other tooth factors are decided as follows. Based on the pressure angle $\alpha$ so selected and the stroke ratio, proper values of the module m and the teeth number z are so selected as to satisfy geometrical conditions to provide the trochoid interference clearance and a sufficient thickness of the tooth tip as well as to satisfy strength requirements to ensure strength at the tooth root and fatigue strength of tooth flank. At this time, a proper tooth height h is so selected as to minimize dislocation and to suppress sliding movement at the meshing engagement portion. In the meantime, a proper value of the run-out angle $\beta$ is so selected as to reduce load on the bearings supporting the pinion shaft. Thus is provided the smooth torque transmission to the rack shaft including the rack teeth in the backlash-free meshing engagement. What is more, the smooth torque transmission is assuredly carried out to realize the good steering feeling.

The pinion teeth may preferably have a modified tooth-flank configuration wherein a pressure angle error in a direction to increase the stress of meshing engagement with the rack teeth is provided along a tooth profile direction, and a tooth flank is centrally protruded. Furthermore, the pinion teeth may preferably have a modified tooth-flank configuration wherein the tooth flank is provided with crowning in a tooth-trace direction.

In these cases, a modified tooth-flank configuration wherein either the correction of pressure angle in the tooth profile direction or the crowning in the tooth-trace direction is provided alone or these modifications are provided in combination is adopted to improve teeth contact causing torque variations during the steering operation, whereby the steering feeling is improved. Furthermore, an insufficient strength of the pinion teeth is compensated for by uniformalizing wear of the tooth flank.

The preferred electric power steering system may preferably have a constitution wherein the steering assist motor is disposed between the steering member and the pinion shaft and wherein the torque of the motor is transmitted to the pinion shaft for assisting the steering implemented according to the rotation of the pinion shaft.

In this case, the electric power steering system, wherein the combination of the force applied to the steering member by the driver and the force generated by the motor is applied to the meshing engagement portion between the pinion teeth and the rack teeth, employs the pinion teeth having the aforementioned tooth factors for eliminating the fear of tooth breakage and for preventing the degraded responsivity due to the influence of the meshing friction, whereby the good steering feeling is provided.

By virtue of the proper selection of the tooth factors of the pinion teeth formed on the pinion shaft, the rack-and-pinion type steering system of the above constitution is adapted to bring the pinion teeth into backlash-free meshing engagement with the rack teeth formed on the rack shaft under the smallest possible meshing friction without entailing the trochoid interference. Thus, the above system may present an excellent working effect such as to reliably provide the smooth and favorable steering feeling over an extended period of time.

[2.1.2 Preferred Mode of Pinion Teeth]

Figure 6:
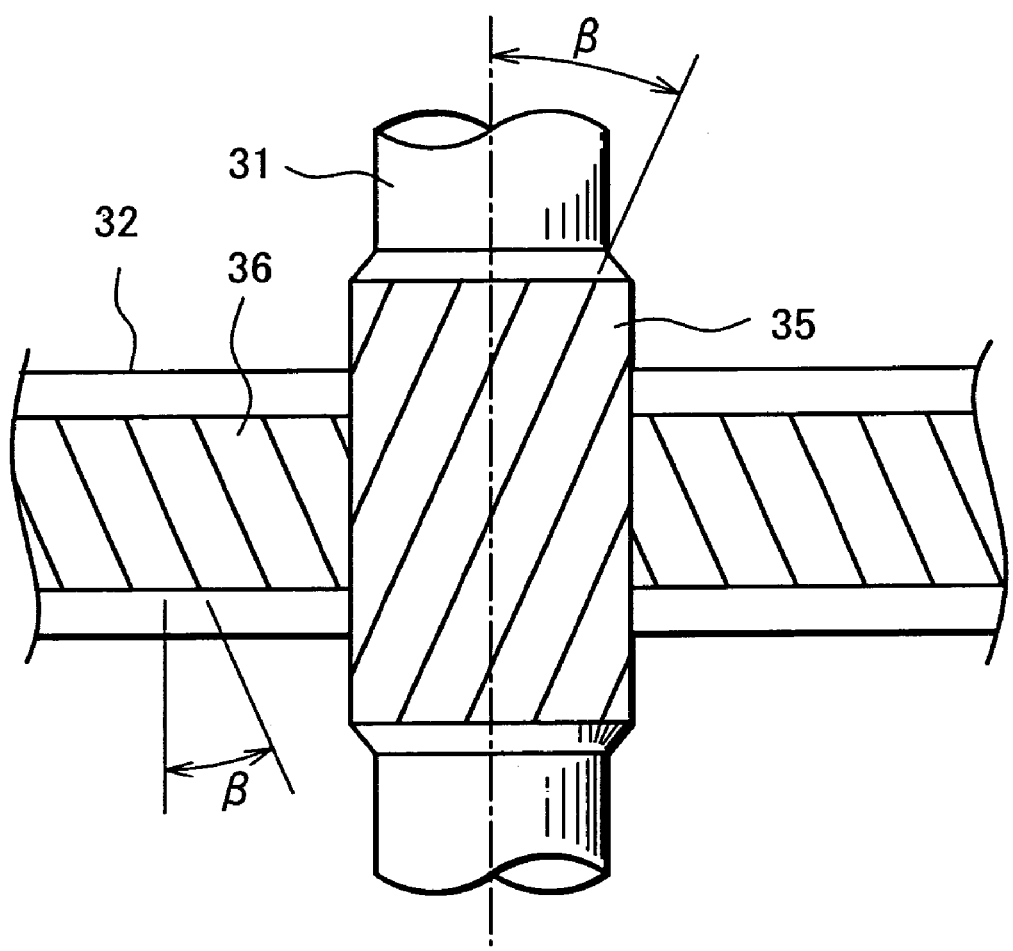
FIG. 6 is an enlarged view showing an area of an intersection of a rack shaft and a pinion shaft.

FIG. 6 is an enlarged view showing an area of an intersection of the rack shaft 32 and the pinion shaft 31. As schematically shown in the figure, the pinion teeth 35 formed on the pinion shaft 31 are formed as helical teeth having a predetermined helix angle β with respect to an axis of the pinion shaft 31. On the other hand, the rack teeth 26 formed on the rack shaft 32 are formed as spiral teeth inclined at an angle corresponding to the helix angle β with respect to a direction orthogonal to the longitudinal direction of the rack shaft 32. The rack teeth 26 are meshed with the pinion teeth 35 at the intersection of the rack shaft 32 and the pinion shaft 31.

Figure 7:
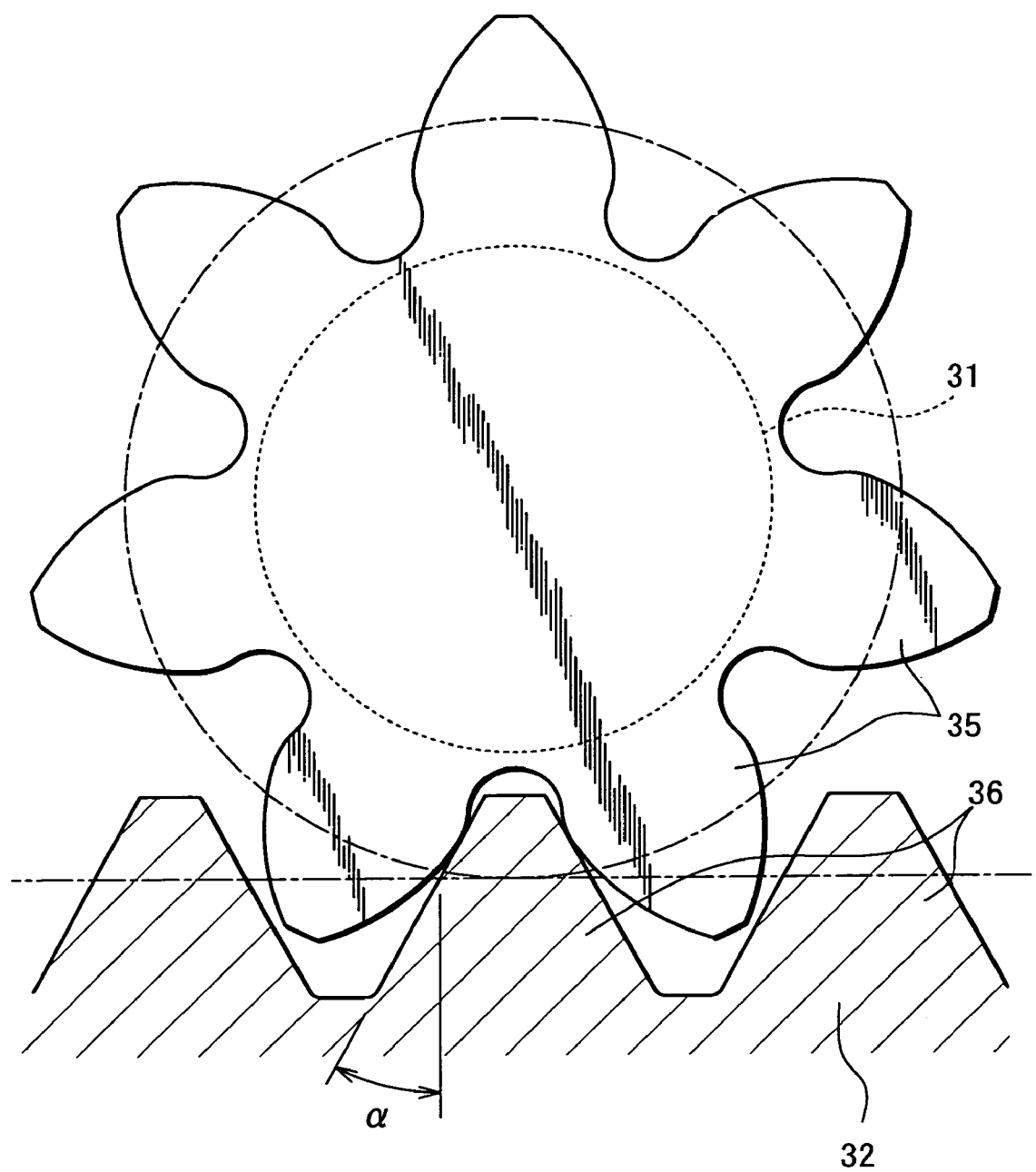
FIG. 7 is a transverse sectional view showing a meshing engagement portion between rack teeth and pinion teeth.

FIG. 7 is a transverse sectional view showing the meshing engagement portion between rack teeth 36 and pinion teeth 35. As shown in the figure, the rack teeth 36 has the pressure angle α that the tooth flank forms with respect to the tooth profile direction. The pinion teeth 35 meshed with the rack teeth 36 also have the same pressure angle α.

It is noted here that the rack shaft 32 is pressingly biased toward the pinion shaft 31 by means of the known pre-load means based on the spring load, so that the rack teeth 36 and the pinion teeth 35 are in the backlash-free meshing engagement as shown in FIG. 7. This is effective to reduce the rattling noises caused by tooth-to-tooth collision at the meshing engagement portion between the rack teeth 36 and the pinion teeth 35, the collision occurring when, for example, steering direction is changed by inversely turning the steering member 1 or when the inverse input is applied from the rack shaft 32.

On the other hand, the rack teeth 36 and the pinion teeth 35 in the backlash-free meshing engagement have a great meshing friction. The influence of the meshing friction is transmitted to the steering member 1 coupled to the pinion shaft 31 via the steering shaft 2, so as to be physically perceived by the driver manipulating the steering member 1. This results in the degraded steering feeling.

For achieving the good steering feeling by reducing such a meshing friction, it is effective to increase the pressure angle α of the pinion teeth 35 (and of the rack teeth 36), for example, thereby weakening a wedge effect between the rack teeth 36 and the pinion teeth 35 in the backlash-free meshing engagement. On the other hand, the pressure angle α has the upper limit posed by the machining reasons, so that a pressure angle α exceeding 30° may no be adopted. The rack-and-pinion type steering system according to the embodiment has an object to achieve the greatest possible reduction of the meshing friction as circumventing the limitation posed by the machining reasons. That is, the pressure angle α of the pinion teeth 35 is selected from the range of $24° \leq \alpha \leq 30°$, which is substantially greater than the standard pressure angle specified by JIS.

The rack-and-pinion type steering system is subjected to a stroke ratio S representing the quantity of movement of the rack shaft 32 per one revolution of the pinion shaft 31, the stroke ratio being a requirement from the vehicle in which the steering system is mounted. The stroke ratio is in the range of $35 \text{ mm} \leq S \leq 60 \text{ mm}$ according to common vehicles.

The module m, the teeth number z, the tooth height h and the helix angle β as the other tooth factors of the pinion teeth 35 are each selected according to the following procedure using the above pressure angle α and the stroke ratio S selected from the respective ranges.

Figure 8:
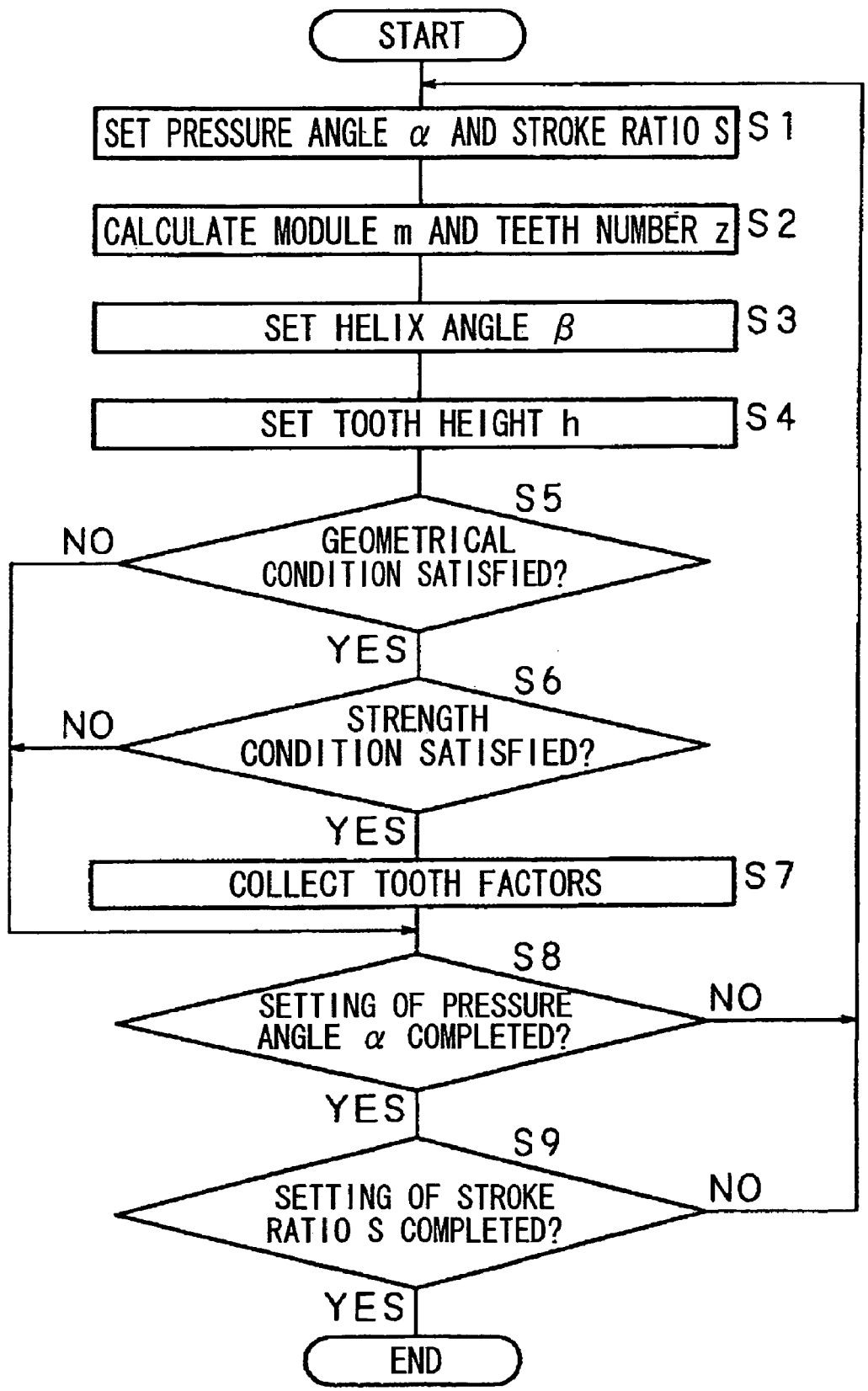
FIG. 8 is a flow chart showing a procedure for selecting various tooth factors of the pinion teeth.

FIG. 8 is a flow chart showing the procedure for selecting the individual tooth factors of the pinion teeth 35. In this selection procedure, the pressure angle α and the stroke ratio S are first set (Step 1)

Since a gear cutting tool limits adoptable pressure angles α, the aforesaid lower limit (=24°) is set as an initial value, for example. The following procedure is repeated as varying the set value for each pitch determined under the limitation posed by the cutting tool, till the initial value is increased to the upper limit (=30°). In an actual design process, the stroke ratio S is a fixed value which is given as a design requirement from the vehicle in which the steering system is mounted. In order to define proper ranges of the module m and the teeth number z, the following procedure is performed as varying stepwise the set value of the stroke ratio from the lower limit (=35 mm) to the upper limit (=60 mm).

After the pressure angle α and the stroke ratio S are set in the aforementioned manners, these set values are used to calculate the module m and the teeth number z of the pinion teeth 35 (Step 2). The calculation is performed according to a known procedure using peripheral dimensions including an outside diameter of the pinion shaft 31 on which the pinion teeth 35 are formed, an axis-to-axis distance between the pinion shaft 31 and the rack shaft 32 and the like, and the above pressure angle α and stroke ratio S. The module m and the teeth number z are given as a combination of a teeth number z limited to integers and a corresponding module m.

Next, the helix angle β of the pinion teeth 35 is set to plural values within a range below a predetermined upper limit angle (Step 3). The tooth height h is set to plural values within a predetermined range including the module m (Step 4).

The upper limit of the helix angle β depends upon a thrust load carrying capacity of the bearings carrying the pinion shaft 31 with the pinion teeth 35 in the pinion housing. The upper limit is commonly defined to be 40° or so.

On the other hand, in a case where the helix angle β is small, a length of path of contact between the pinion teeth 35 and the rack teeth 36 with respect to the tooth trace direction is decreased so much that the strength conditions to be described hereinlater may not be satisfied. In the actual design process, therefore, a helix angle β is selected from the range of 30° to 35°, which approximates the upper limit angle. In order to define the proper ranges of the module m and the teeth number z, however, the embodiment performs the following procedure with the helix angle β set to each of the values ranging from the upper limit angle (=40°) to the lower limit angle (=0°).

The tooth height h is set to a value in the range of 2 m≦h≦2.5 m (m denotes module). This range is decided such that a tooth profile analogous to that of a full depth tooth (h=2.25 m) is adopted to provide a tooth height of 1 module or so on the tip side and that the meshing engagement portion between the pinion teeth 35 and the rack teeth 36 has a transverse contact ratio of 1 or more thereby to suppress the occurrence of discontinuous contact.

Subsequently, determination is made as to whether each of the tooth factors satisfies the predetermined geometrical conditions or not (Step 5). The tooth factors are determined by sequentially combining the module m and the teeth number z calculated in Step 2 with each of the plural helix angles β and tooth heights h set in Step 3 and 4. Then, determination is made as to whether each of the tooth factors satisfies the predetermined strength conditions or not (Step 6). Subsequently, only tooth factors satisfying both of the above conditions are collected (Step 7). Next, determination is made as to whether the setting of the pressure angle α and stroke ratio S has be done in respect of the overall range or not (Steps 8, 9). If not, the operation flow returns to Step 1, where the pressure angle α and stroke ratio S are set again and the same procedure is repeated.

One of the geometrical conditions based on which the determination is made in Step 5 is whether the pinion teeth 35 are meshingly engageable with the rack teeth 36 without interference or not. The other condition is whether the pinion tooth has a sufficient thickness at its tip or not. The former condition or the acceptability of the meshing engagement status is judged based on whether a trochoid interference clearance of 0.3 mm or more is ensured or not. The trochoid interference clearance is calculated based on the following equation, for example.

[Mathematical Equation 5]

$$t = \sqrt{(100AB)^2 + \left[(AC+mX)\sin\left\{\cos^{-1}\frac{B}{1+2X\cos\beta/C}\right\}\right]^2} - \qquad (11)$$

$$(100A+m) > 0$$

$$\begin{cases} A = m/2\cos\beta \\ B = \cos\{\tan^{-1}(\tan\alpha/\cos\beta)\} \\ C = 100+z \end{cases}$$

In the equation, X denotes the dislocation coefficient which is given by dividing the quantity of dislocation set with respect to the pinion tooth 35 by the module m. On the other hand, t denotes the trochoid interference clearance and is used as an index indicating whether a so-called trochoid interference occurs or not. The trochoid interference means a phenomenon wherein when the rack teeth 36 and the pinion teeth 35 are in the meshing engagement as shown in FIG. 7, the tips of the rack teeth 36 dislocated beyond a predetermined meshing engagement position behave to bore the roots of the pinion teeth 35.

FIG. 9 is a diagram explanatory of the trochoid interference clearance t. In the figure, $P_1$ denotes the base circle of the pinion teeth 35, whereas $P_2$ denotes the tip circle of the pinion teeth 35. On the other hand, $R_1$ in the figure denotes the base circle of the rack teeth 36, whereas $R_2$ denotes the tip circle of the rack teeth 36.

Furthermore, $\alpha_{bs}$ in the figure denotes the working pressure angle. The working pressure angle $\alpha_{bs}$ at the meshing engagement portion between the rack teeth 36 and the pinion teeth 35 is equal to the pressure angle α of the rack teeth 36 and of the pinion teeth 35.

Figure 9A:
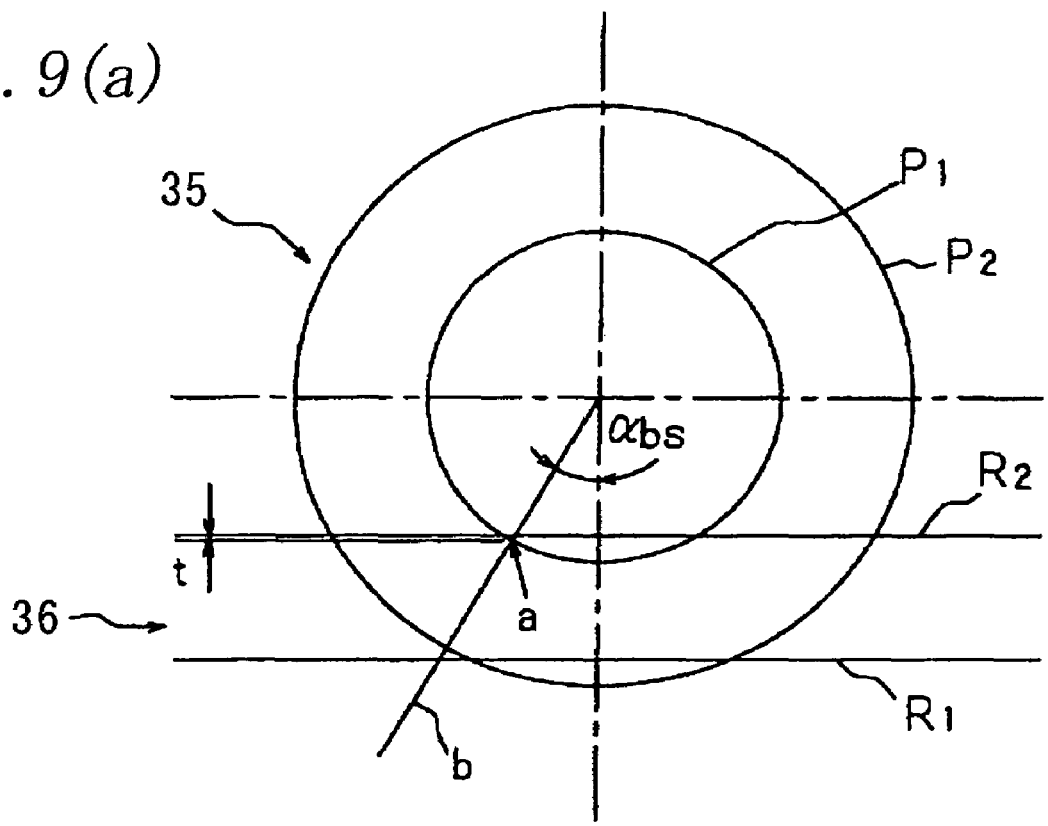
FIG. 9 is a group of diagrams explanatory of a trochoid interference clearance.
Figure 9B:
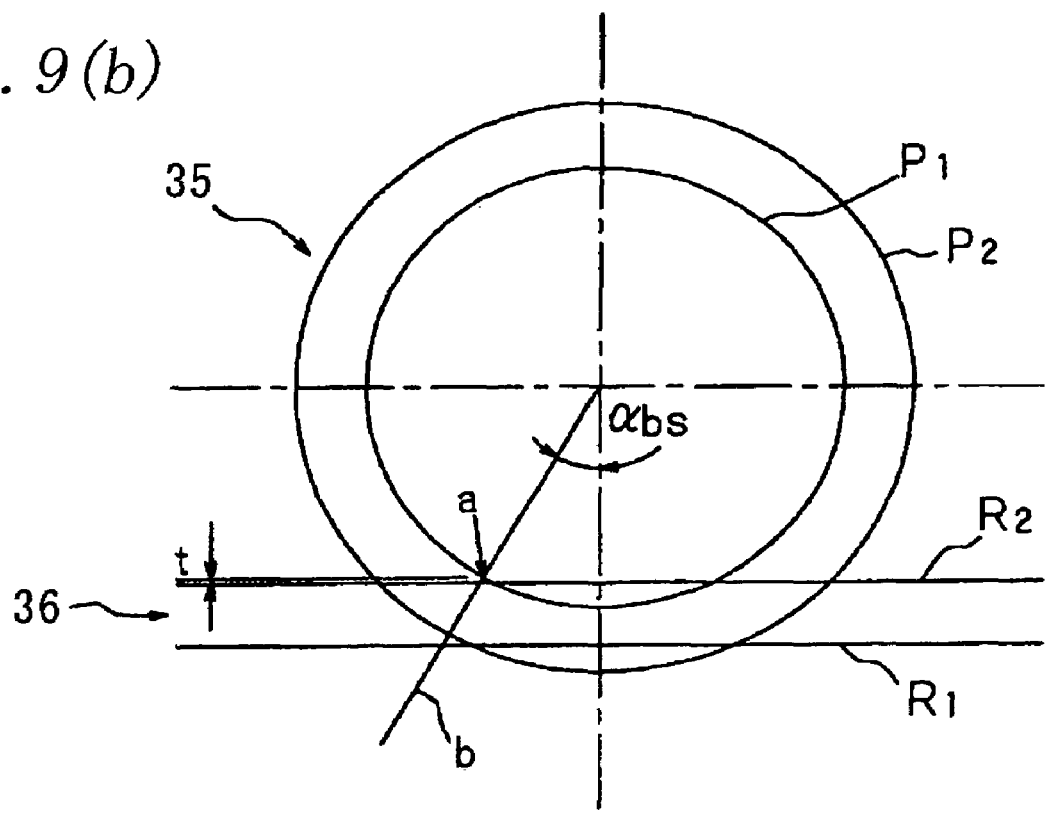

FIG. 9(a) illustrates a case where the diameters of the base circle $P_1$ and the tip circle $P_2$ of the pinion teeth 35 have a great difference, whereas FIG. 9(b) illustrates a case where the above diameters have a small difference. The trochoid interference clearance t is defined as a distance between a point 'a' where a working line b intersects the base circle $P_1$ of the pinion teeth 35 and the tip circle $R_2$ of the rack teeth 36, the working line inclined at the working pressure angle $\alpha_{bs}$ toward one side of an axis of the meshing engagement.

Provided that the working pressure angle $\alpha_{bs}$ is constant, the intersection 'a' of FIG. 9(a) is located inwardly of the tip circle $R_2$ of the rack teeth 36 (on the root side), whereas the intersection 'a' of FIG. 9(b) is located outwardly of the tip circle $R_2$ of the rack teeth 36. The trochoid interference between the rack teeth 36 and the pinion teeth 35 occurs in the state shown in FIG. 9(a).

The trochoid interference t in the equation (11) is based on a geometrical positional relation between the rack teeth 36 and the pinion teeth 35 shown in FIG. 9, assuming a negative value in the state shown in FIG. 9(a) or assuming a positive value in the state shown in FIG. 9(b). In Step 5, the trochoid interferences t are sequentially determined by substituting the pressure angle α, the helix angle β, the module m and the teeth number z, as set in the aforementioned manner, in the equation (11). The clearance having a value of 0.3 mm or more is determined as the acceptable meshing engagement. The reason for defining a lower limit of the trochoid interferences t to be 0.3 mm is to eliminate the influence of the machining errors of the pinion teeth 35 and the rack teeth 36 and to eliminate the influence of stress produced in the pinion teeth 35 or the rack teeth 36 during the aforementioned operation.

The latter condition or the acceptability of the tooth-tip thickness is defined for the purpose of preventing over heating during heat treatment following gear cutting. The acceptability is judged, for example, based on whether or not the pinion tooth 35 has a tooth-tip thickness (normal direction) $s_{kn}$ of not less than 0.3 m (m denotes module), which value is used as a design threshold value of a power transmission gear. The tooth-tip thickness is calculated based on the following equation.

[Mathematical Equation 6]

$$s_k = r_k \left\{ \frac{\pi + 4x\tan\alpha}{z} - 2(inv\alpha_{ks} - inv\alpha_s) \right\} \quad (12)$$

$$s_{kn} = s_k \cos\beta_k \quad (13)$$

In the equation, $s_k$ denotes the transverse tooth thickness of the pinion teeth 35, $r_k$ denotes the radius of the tip circle of the pinion teeth 35, and $\beta_k$ denotes the helix angle on the tip circle of the pinion teeth 35. Furthermore, $\alpha_{ks}$ denotes the gear rotational angle equivalent to a tooth-tip position, and $\alpha_s$ denotes the pressure angle of a reference pitch circle. These parameters are determined based on the following equations.

[Mathematical Equation 7]

$$\alpha_{kn} = \cos^{-1}\left(\frac{r_g}{r_k}\right)$$
$$\alpha_s = \tan^{-1}\left(\frac{\tan\alpha}{\cos\beta}\right) \quad (14)$$

In the equation, $r_g$ denotes the radius of the base circle of the pinion teeth 35. In Step 5, the tooth-tip thicknesses (normal direction) $s_{kn}$ of the pinion teeth 35 are sequentially determined by substituting the pressure angle $\alpha$, the teeth number z and the helix angle $\beta$, as set in the aforementioned manner, in the equations (12), (13) and (14). The tooth-tip thickness of 0.3 m or more is determined to be acceptable, as described above. The pinion teeth 35 tending to be decreased in the tooth-tip thickness may preferably be carburized and quenched. Furthermore, it is preferred to provide full topping on the tips of the pinion teeth 35 so as to eliminate acute angle portions and to suppress overheating during the heat treatment.

On the other hand, one of the strength conditions as a judgment criterion in Step 6 is bending strength at the roots of the pinion teeth 35, whereas the other condition is fatigue strength at tooth flank. The bending strength at root is evaluated using the following equation (Lewis Equation) used for calculating a bending stress $\sigma_B$ of spur gear.

[Mathematical Equation 8]

$$\sigma_B = \frac{F_N h_F \cos\omega}{\frac{s_F^2 b}{6}} \quad (15)$$

In the equation, $F_N$ denotes the flank normal load, which is given as a design requirement from the vehicle in which the rack-and-pinion type steering system is mounted. On the other hand, $\omega$ in the equation denotes the complementary angle formed between a load line and an axis of a tooth profile; $h_F$ denotes the distance from an intersection of the load line and the axis of tooth profile to a critical section; and $S_F$ denotes the thickness of the critical section. In the case of spiral pinion teeth 35, these parameters are determined based on the following equations.

[Mathematical Equation 9]

$$\omega = \sqrt{\left(\frac{mz + 2h_0}{mz\cos\alpha_0}\right)^2 - 1} - \left(\frac{\pi + 4x\tan\alpha_0}{2z} + inv\alpha_0\right) \quad (16)$$

$$h_F = \frac{mz}{2}\left[\frac{\cos\alpha_0}{\cos\omega} - \sin\left(\theta + \frac{\pi}{6}\right)\right] + \left[\frac{h_a - \rho_0 - mx}{\cos\theta} + \rho_0\right]\sin\frac{\pi}{6} \quad (17)$$

$$s_F = mz\cos\left(\theta + \frac{\pi}{6}\right) - 2\left[\frac{h_a - \rho_0 - mx}{\cos\theta} + \rho_0\right]\cos\frac{\pi}{6} \quad (18)$$

In the equations, $\alpha_0$ denotes the pressure angle of a tool; $\rho_0$ denotes the tip radius of the tool; and $h_a$ denotes the addendum, whereas $\theta$ is determined based on the following equation.

[Mathematical Equation 10]

$$\theta = \frac{\pi}{2} - \left(\varphi + \gamma_0 + \frac{\pi}{6}\right) \quad (19)$$

$$\varphi = \sqrt{\left(\frac{1}{2} + \frac{h_a - \rho_0 - mx}{mz}\right)^2 \tan^2\left(\gamma_0 + \frac{\pi}{6}\right) + 2\frac{h_a - \rho_0 - mx}{mz}} - \left(\frac{1}{2} + \frac{h_a - \rho_0 - mx}{mz}\right)\tan\left(\gamma_0 + \frac{\pi}{6}\right) \quad (20)$$

$$\gamma_0 = \frac{m\pi/2 + 2(h_a - \rho_0)\tan\alpha_0 + 2\rho_0\sec\alpha_0}{mz} \quad (21)$$

On the other hand, Hertz's Elastic Contact Theory is applied to the fatigue strength of tooth flank, which is evaluated based on a flank contact stress $\sigma_H$. The flank contact stress is determined based on the following equations.

[Mathematical Equation 11]

$$\sigma_H = \sqrt{0.35 \cdot E \cdot P_n \left(\frac{z_1 + z_2}{z_2}\right) \frac{\cos^2\beta_g}{N_b \cdot \varepsilon_s \cdot b \cdot d_b \cdot \sin\alpha_{bs}}} \quad (22)$$

In the equation, E denotes the vertical elastic modulus of a gear material; $z_1$ denotes the teeth number of a pinion; $Z_2$ denotes the teeth number of a wheel; $\beta_g$ denotes the helix angle of a base cylinder; $N_b$ denotes the effectiveness of facewidth; $\epsilon_s$ denotes the transverse contact ratio; b denotes the facewidth perpendicular to the axis; and $\alpha_{bs}$ denotes the transverse working pressure angle. Furthermore, $P_n$ denotes the tangential load perpendicular to the gear; and $d_b$ denotes the diameter of working pitch circle of the pinion. These parameters are determined based on the following equations.

[Mathematical Equation 12]

$$F_b = P_n \cos\beta_g \cos\alpha_s \quad (23)$$

$$d_b = \frac{m_n z_1}{\cos\beta_0} \quad (24)$$

In Step 6, the pinion teeth 35 having the pressure angle $\alpha$, the teeth number z and the helix angle $\beta$ set in the aforementioned manner is determined to satisfy the strength conditions if the bending stress $\sigma_B$ calculated based on the equation (15)

and the flank contact stress $\sigma_H$ calculated based on the equation (22) do not exceed an allowable stress of the material.

According to the aforementioned procedure, the tooth factors of the pinion teeth 35 are decided which provide the favorable meshing engagement and exhibit the sufficient bending strength and fatigue strength under the conditions that the pressure angle $\alpha$ is in the range of $24° \leq \alpha \leq 30°$ and the common stroke ratio S is in the range of 35 to 60 mm. The decided tooth factors are as follows:

Module m: $1.8 \leq m \leq 2.0$
Teeth number z: $7 \leq z \leq 13$
Tooth Height h: $2m \leq h \leq 2.5m$
Helix angle $\beta$: $\beta \leq 35°$ For example, in a case where the pressure angle $\alpha$ is set to 27° and where the helix angle $\beta$ is set to 33° under the common design conditions including a stroke ratio of 40 mm/rev, optimum tooth factors of the pinion teeth 35 are a module m of 1.8 mm and a teeth number z of seven, as shown in FIG. 7.

Standard tooth factors of the pinion teeth 35 commonly adopted in the art under the aforementioned design conditions are a pressure angle $\alpha$ of 14.5°, a module m of 2.5, and a teeth number z of five. According to the tooth factors of the embodiment, the module is at a smaller value while the teeth number z is at a greater value. That is, the pinion of the embodiment is constituted to be formed with a larger number of smaller pinion teeth 35.

Figure 10:
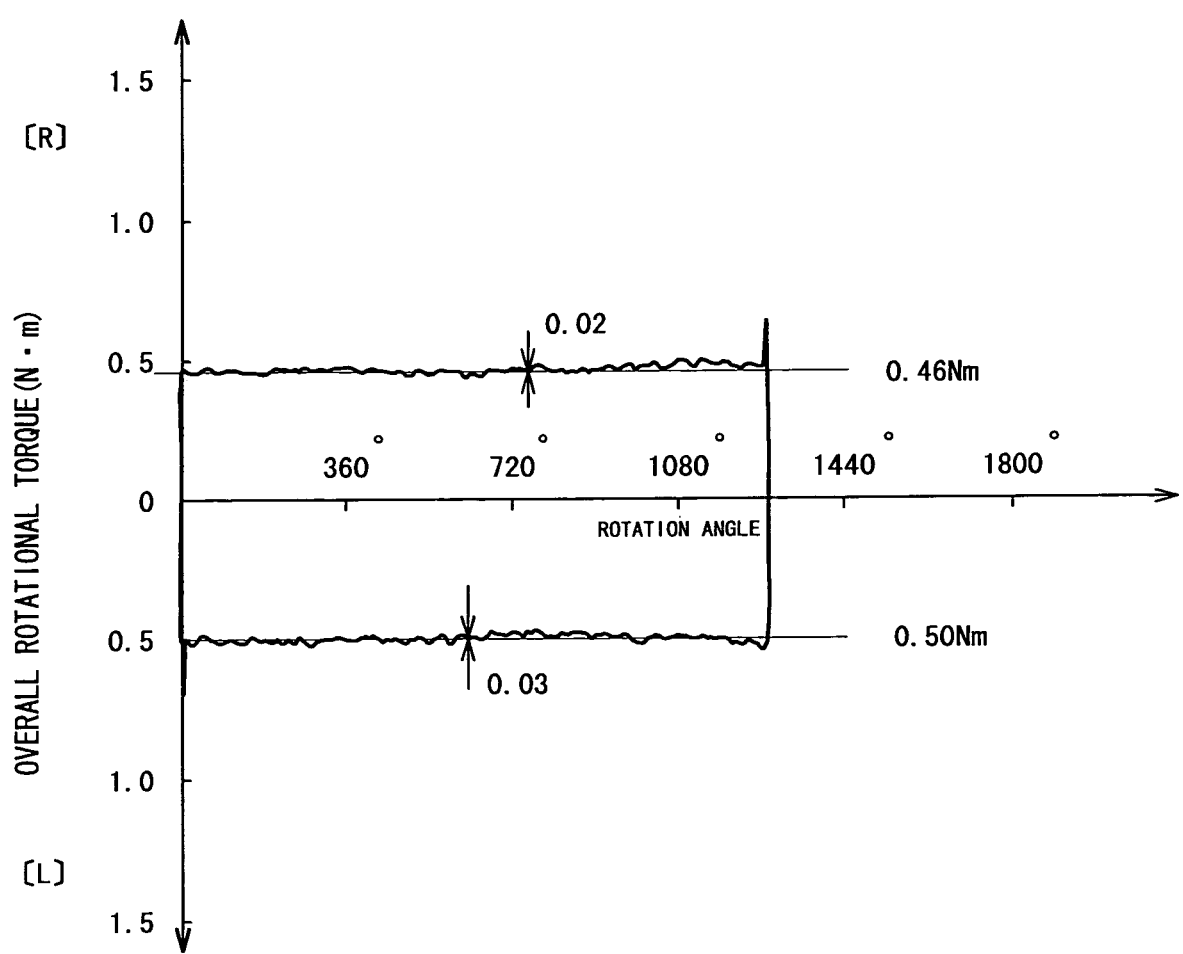
FIG. 10 is a graph showing measurement data on rotational torque of a rack-and-pinion type steering gear.

The rack-and-pinion type steering system having such tooth factors of the pinion teeth 35 was subjected to a test for measuring a rotational torque (torque about the steering shaft) required for rotating the pinion shaft 31 with no load applied to the rack shaft 32. As shown in FIG. 10, the results indicate that the required rotational torque is on the order of 0.4 to 0.5 Nm. In contrast, the results of the same test conducted on the conventional rack-and-pinion type steering system having the aforementioned standard tooth factors indicate that the required rotational torque is 1.2 Nm.

This rotational torque corresponds to a torque (about the steering shaft) equivalent of meshing friction between the rack teeth 36 and the pinion teeth 35. Allowing that condition setting errors at the test are counted in, this rack-and-pinion type steering system is apparently capable of achieving a dramatic reduction of the meshing friction. Specifically, the system can reduce the friction to 0.6 Nm or less. A preferred upper limit of the torque (about the steering shaft) equivalent of the meshing friction between the rack teeth 36 and the pinion teeth 35 is 0.5 Nm. The reduction of friction leads to the increase of the torque transmissibility of the manual steering gear 3. On the other hand, a lower limit of the above rotational torque is preferably 0.3 Nm, or more preferably 0.4 Nm.

Figure 11:
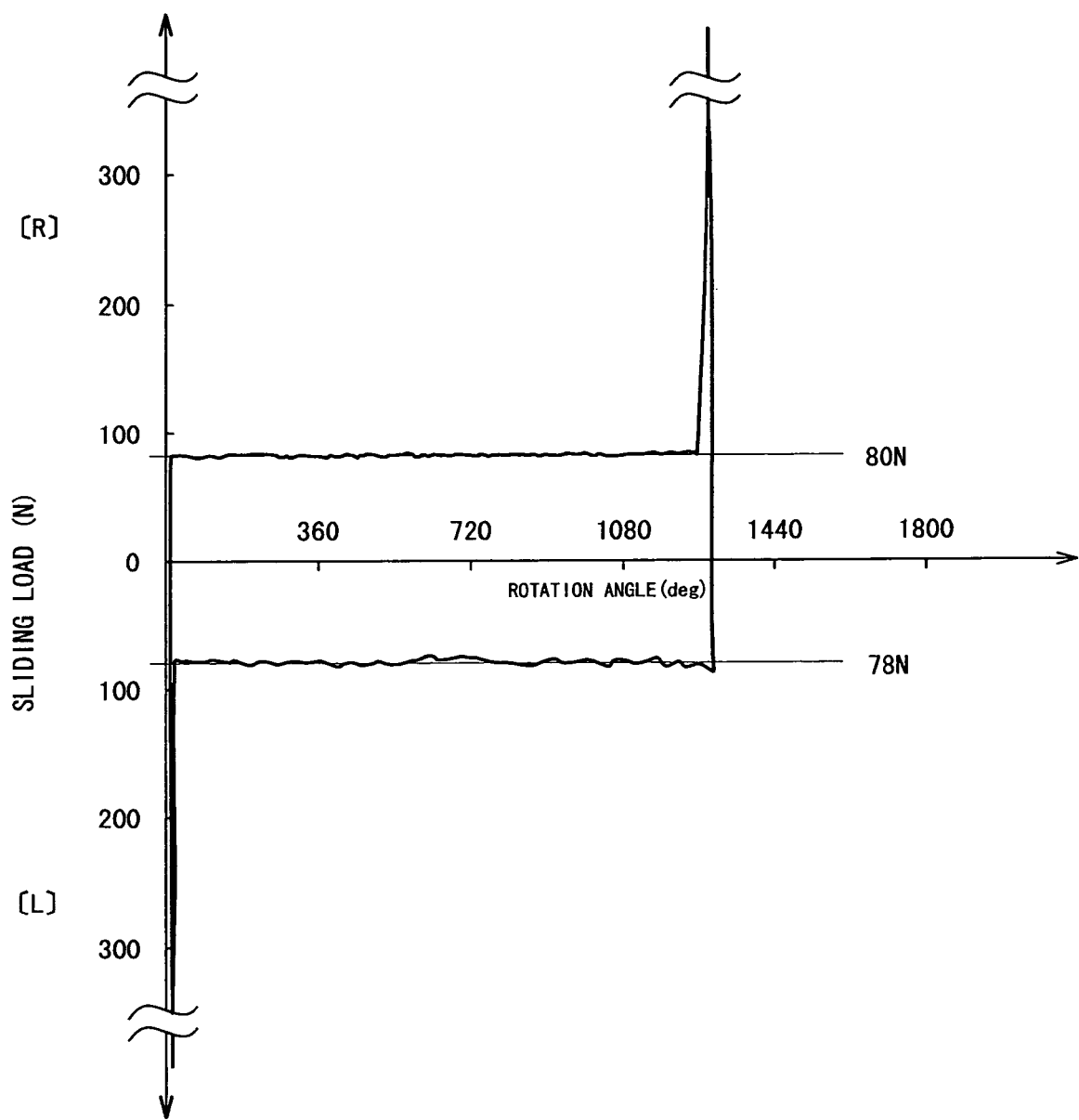
FIG. 11 is a graph showing measurement data on reverse input of the rack-and-pinion type steering gear.

Measurement data on the inverse input from the manual steering gear are shown in FIG. 11. The inverse input is on the order of 80 N.

As the result of reducing the friction of the manual steering gear, the reaction force from the road surface may be directly transmitted to the driver manipulating the steering wheel 1. For instance, the steering system may provide an improved steering feeling while the vehicle is running at high speed on a low-$\mu$ road featuring a low road-surface reaction force.

Although the adoption of the aforementioned tooth factors involves a fear that the pinion teeth 35 are decreased in strength at roots, the pinion teeth are increased in the face-width at roots by adopting the great pressure angle $\alpha$ and are also increased in the transverse contact ratio by the increased teeth number z, so that the decrease of the strength is compensated for. Therefore, the pinion teeth do not suffer a significantly decreased strength at roots, as compared with the case where the standard tooth factors are adopted. It is confirmed in an endurance test that a sufficient durability is achieved by the electric power steering system wherein the operation force from the steering wheel 1 and the torque from the motor 9 are applied, as described above.

It is preferred to adopt the following tooth-flank configuration modification in combination with the above tooth factors in order to compensate for the decreased strength at roots.

Figure 12:
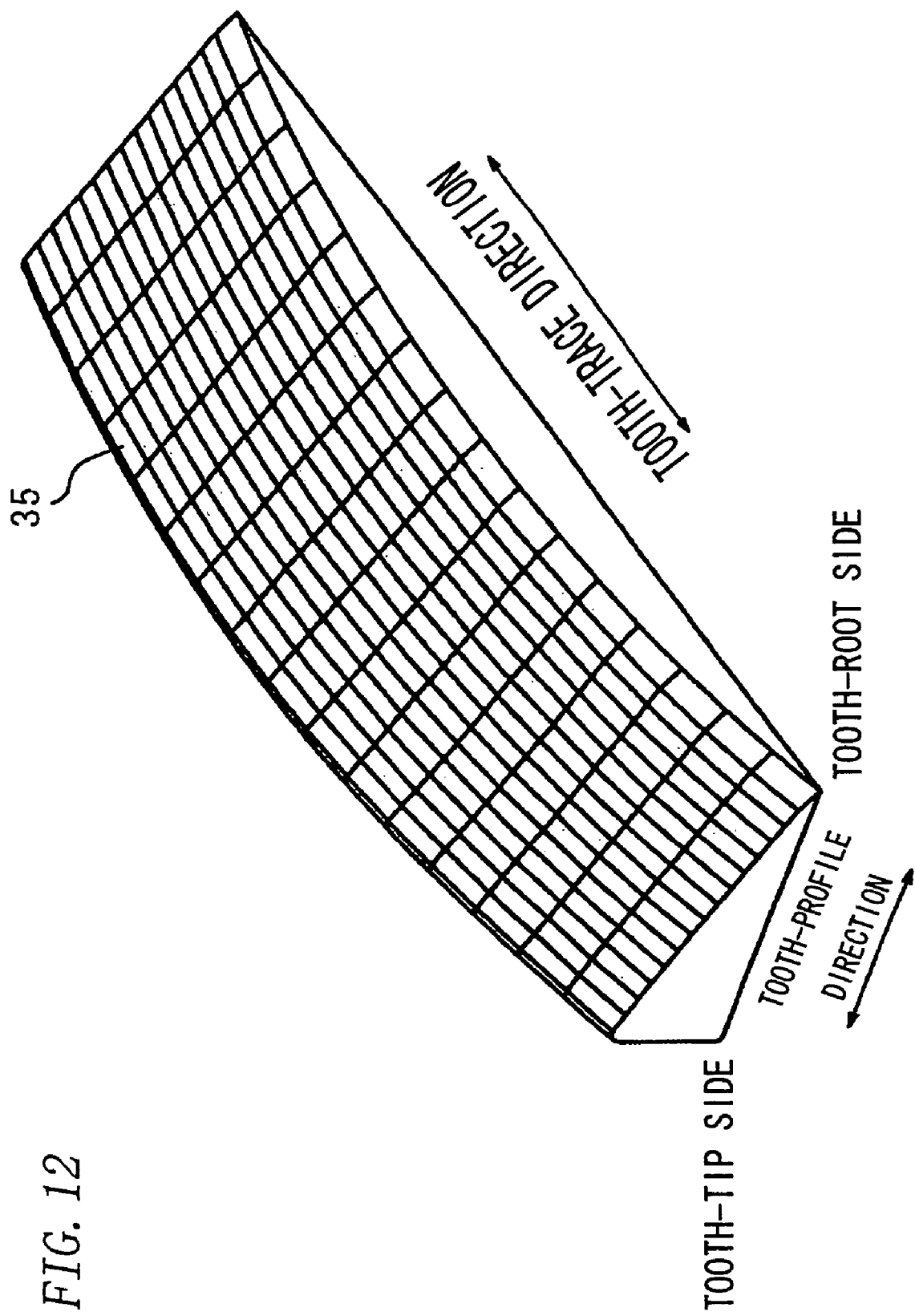
FIG. 12 is a diagram showing a preferred mode of modification of tooth-flank configuration.

FIG. 12 is a diagram explanatory of a preferred mode of modification of tooth-flank configuration. The figure depicts the flank of the pinion tooth 35 vertically and transversely divided in a mesh fashion. The flank is modified in a manner that a negative pressure angle error having a greater pressure angle at tip than a pressure angle at root is provided in the direction to increase the stress of meshing with the rack tooth 36, and that the flank is centrally protruded. Furthermore, the flank is provided with crowning in the tooth trace direction.

Such a modification of the tooth-flank configuration is effective at uniformly distributing the contact stress on the flank of the pinion tooth 35 in the trace direction and the profile direction, whereby the wear of the flank is prevented to compensate for the insufficient strength at root. Thus, the pinion teeth may be improved in durability. With respect to the pinion tooth 35 having the aforementioned tooth factors, a proper quantity of crowning at flank center is 10 μm or so in maximum, whereas a proper quantity of the thickness error at tip is 20 μm or so in maximum.

Figure 13:
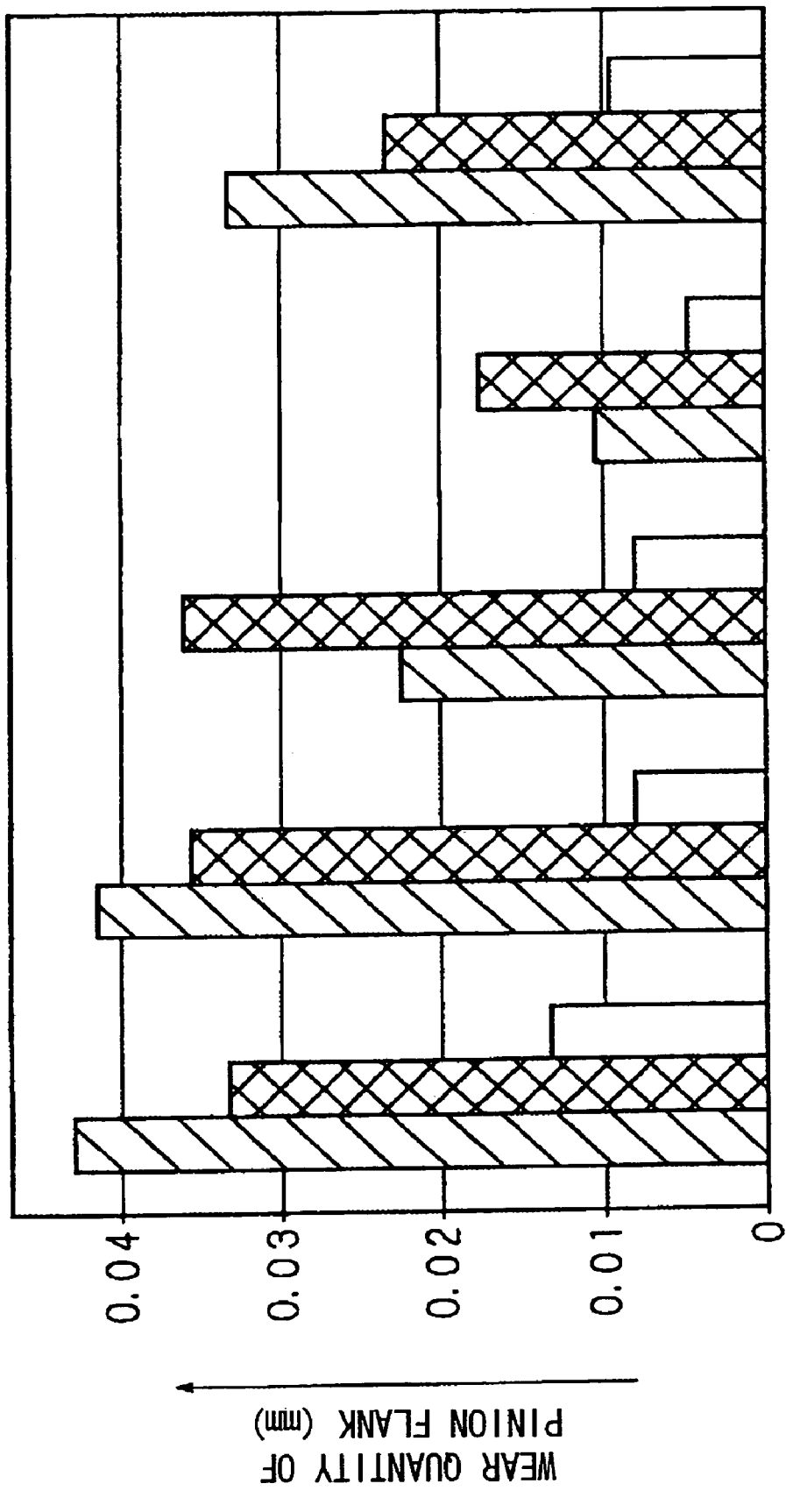
FIG. 13 is a graph showing the results of a test examining the effect of the modification of tooth-flank configuration.

FIG. 13 is a graph showing the measurement results of wear quantity on the flank of the pinion tooth 35, the measurement taken after a predetermined endurance test so as to examine the effect of the modification of tooth-flank configuration. In the graph, blank bars represent the results of the case where the aforementioned modification of tooth-flank configuration is provided, whereas hatched bars F represent the results of the case where the aforementioned modification of tooth-flank configuration is not provided. The cross-hatched bars in the graph represent the results of the case where only the crowning in the trace direction is provided.

Three sets of graph bars on the left-hand side show the distribution of the trace-ward wear quantities in the vicinity of the base circle. The bar sets individually represent the measurements taken in the vicinity of tooth-contact boundary on a distal-end side of the pinion shaft 31, taken in the vicinity of a trace-ward center of the pinion shaft 31, and taken in the vicinity of a tooth-contact boundary of a proximal-end side of the pinion shaft 31, in this order from the left-hand side. The graph shows that in the case where only the trace-ward crowning is provided, the total wear quantity is substantially equal to that of the case where the modification of tooth-flank configuration is not provided but the wear quantities are uniformly distributed in the trace direction. Furthermore, the graph shows that the aforementioned modification of tooth-flank configuration dramatically reduces the wear quantity in the overall length in the trace direction while maintaining the wear uniformalizing effect based on the crowning.

Two sets of graph bars on the right-hand side show the distribution of the profile-ward wear quantities. A left-hand bar set represents the measurements taken in the vicinity of the tip, whereas the right-hand bar set represents the measurements taken at a central area with respect to the profile direction. These bar sets indicate that the aforementioned modification of tooth-flank configuration also dramatically reduces the wear quantity in the profile direction while maintaining the wear uniformalizing effect based on the crowning.

According to the above description, the pressure angle error in the direction to increase the stress of meshing with the rack teeth 36 is implemented along the profile direction by providing the negative pressure angle error having the greater pressure angle at tip than the pressure angle at root. However, the increase of the meshing stress may also be achieved by providing a positive pressure angle error having a greater pressure angle at root than a pressure angle at tip.

[2.2 Reduction Gear Assembly]

[2.2.1 Consideration for Reduction Gear Assembly]

The conventional electric power steering systems are generally designed to transmit the rotational torque of the electric motor to the steering shaft by means of a worm gear.

However, the worm gear has a relatively low transmissibility for rotational torque on the order of 60 to 80%. With the reduction ratio fixed, therefore, the worm gear requires an electric motor of a greater output torque for transmitting a predetermined rotational torque. This results in an increased size of the electric motor, so that the steering system as a whole cannot be downsized. To overcome this problem, a reduction gear assembly is devised wherein the output shaft of the electric motor is assembled in parallel relation with the steering shaft and a spur gear or a spiral gear having a relatively high transmissibility is used.

The use of the spur gear or spiral gear increases the transmissibility for rotational torque to about 95%, so that the output torque of the electric motor may be reduced accordingly. That is, the prevention of the size increase of the electric motor makes it possible to downsize the steering system as a whole.

However, the problem that the steering system as a whole cannot be downsized is not still solved in a case where a reduction gear assembly employing the spur gear, for example, is used. In order for a reduction gear assembly of a one-stage constitution to attain a required reduction ratio, a pitch circle of a gear on a steering-shaft side must be increased. The one-stage constitution includes a gear assembled to the output shaft of the electric motor, and a gear assembled to the steering shaft and meshed with the former gear.

On the other hand, in a case where a reduction gear assembly employing the spur gear has a multiple-stage constitution having an intermediate gear interposed between the motor side and the steering shaft side, instead of the one-stage constitution, for example, other problems are encountered although the whole body of the steering system may be downsized. The other problems are, for example, that the comfortable steering feeling is impaired by the increase of backlash and that the structure of the reduction gear assembly is complicated to increase costs.

In order to solve the above problem, Prior Art 12 adopts the following constitution. That is, a reduction gear assembly including a pair of spur gears or spiral gears designed to have a high reduction ratio are accommodated in a housing while the electric motor is disposed in close proximity to the housing accommodating the steering shaft, whereby the whole body of the steering system that disposes with the electric motor and the reduction gear assembly is downsized.

The electric power steering system of Prior Art 12 ensures the flank strength by adopting a tooth profile based on some specific theory because the gears having a normal involute profile are incapable of ensuring an adequate strength.

In actual fact, however, a gear structure having the tooth profile based on the specific theory taught by Prior Art 12 is quite difficult to manufacture. This raises a question whether or not it is possible to supply high-quality reduction gear assemblies on a mass production basis. Because of the tooth profile based on the specific theory, the performance of the reduction gear assembly is particularly susceptible to the influence of gear alignment errors. Hence, the mass production process is required of high working precisions and high assembly precisions. Furthermore, many problems exist before the mass production process is actually carried out. The problems are, for example, that the existing manufacture plants are unable to process such gears, and that a method of examining the working precisions is not established.

Even a reduction gear assembly employing a spur gear pair or helical gear pair may preferably adopt the following constitution in order to achieve the predetermined reduction ratio and to ensure the adequate gear strength based on a simple gear structure.

That is, a preferred electric power steering system which is designed to transmit the rotational torque of the electric motor to the steering shaft by means of the driving gear assembled to the output shaft of the electric motor and the driven gear assembled to the steering shaft and which has a reduction ratio of 3 or more is characterized in that the steering shaft is disposed in substantially parallel to the output shaft of the electric motor, that an axis-to-axis distance between these shafts is 35 mm or more and 85 mm or less, and that the driving gear has a teeth number of 6 or more and 15 or less, a module of 0.8 or more and 1.5 or less, a tooth height of not more than 2.6 times the module, a pressure angle of 20° or more and 30° or less, and a run-out angle of 0° or more and 40° or less.

Since a gear pair with the steering shaft and the output shaft of the electric motor disposed in parallel relation is used, the electric power steering system has a high transmissibility for the rotational torque and can achieve the size reduction as a whole. Furthermore, even if gears manufacturable by the normal manufacture process are used in place of the gears having the tooth profile based on some specific theory, the dimensions based on the aforementioned tooth factors permit the gears to achieve optimum values of the trochoid clearance, the thickness at tooth tip and the flank stress.

It is further preferred that either one or both of the driving gear and the driven gear is an involute gear having a tooth profile formed in a manner to increase the pressure angle from the tooth tip toward the tooth root. By using the involute gear having the tooth profile so formed as to increase the pressure angle from the tooth tip toward the tooth root, the gear may be reduced in root stress under the maximum torque load. Thus is ensured the durability of the gear.

It is further preferred that either one or both of the driving gear and the driven gear is an involute gear provided with crowning in the trace direction. The flank stress is reduced by using the involute gear provided with the trace-ward crowning. This ensures the durability of the gear even when the gear assembly is continuously operated under the rated load conditions.

According to the above constitution employing a pair of gears with the steering shaft and the output shaft of the electric motor disposed in parallel relation, the electric power steering system may have a high transmissibility for the rotational torque and a compact layout as a whole. In addition, although the gears having the tooth profile based on the specific theory are not used, the dimensions based on the aforementioned tooth factors permit the gears to achieve optimum values of the trochoid clearance, the thickness at tooth tip and the flank stress.

[2.2.2 Preferred Mode of Reduction Gear Assembly]

As shown in FIG. 1, the reduction gear assembly 8 includes spur gears or spiral gears including the main gear (driven gear) 81 assembled to the output shaft 24 of the steering wheel 2 and the pinion (driving gear) 82 assembled to the output shaft 91 of the electric motor 9. The use of the spur gears or spiral gears permits the electric motor 9 to be disposed in parallel with the steering shaft 2. However, physical limitations for layout reasons are posed on the physical dimensions of the electric motor 9 according to an axis-to-axis distance L between the steering shaft 2 and the output shaft 91 of the electric motor 9. Because of the limitations for layout reasons, for example, the maximum allowable physical dimensions of the electric motor 9 are a diameter of 73 mm and a height of 95 mm. Provided that the rated torque is 4 Nm and the axis-to-axis distance L is 55 mm, the reduction ratio in this case is set to 10 or so (9.7) in order to provide a rotational toque of 35 Nm or more as a steering assist torque about the steering shaft. Specifically, the reduction ratio may preferably on the order of 11 to 8, or more preferably on the order of 10 to 9.

Figure 14:
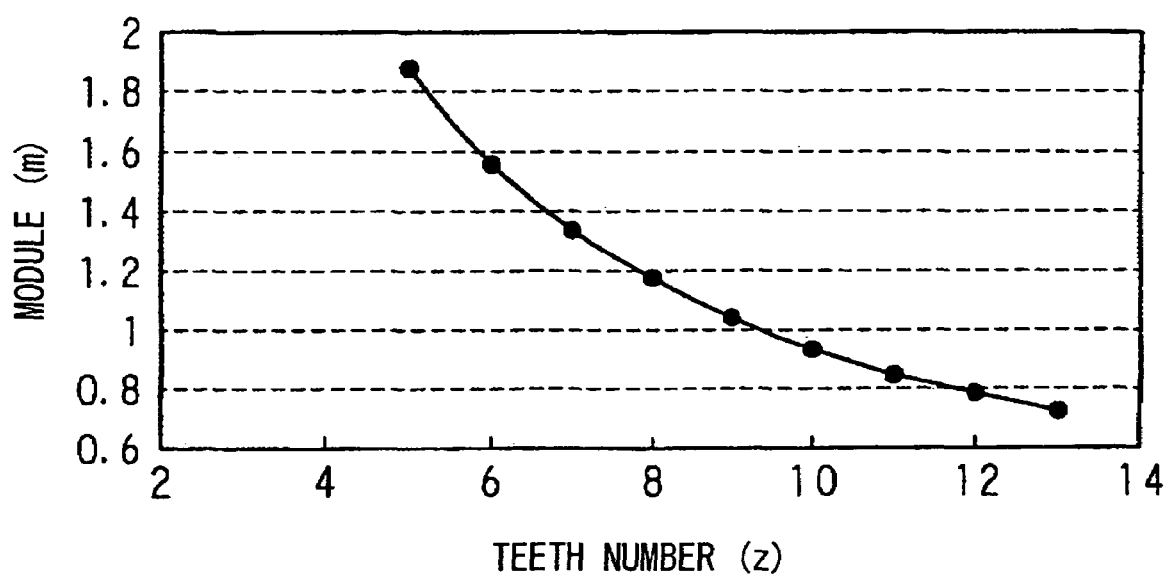
FIG. 14 is a graph showing a relation between the teeth number and the module of a pinion.

FIG. 14 is a graph showing a relation between the teeth number z of the pinion 82 and the module m of the pinion 82 in a case where the axis-to-axis distance L between the steering shaft 2 and the output shaft of the electric motor 9 is set to 55 mm; the reduction ratio is set to 10; and the helix angle β is set to 25°. While a diameter d (=ZXm) of a pitch circle of the pinion 82 is on the order of 8 to 10 mm, practicable ranges of the tooth factors are a teeth number z of 6 or more and 15 or less and a module m of 0.8 or more and 1.5 or less such as to obviate a state where the teeth number is extremely great or small.

Figure 15:
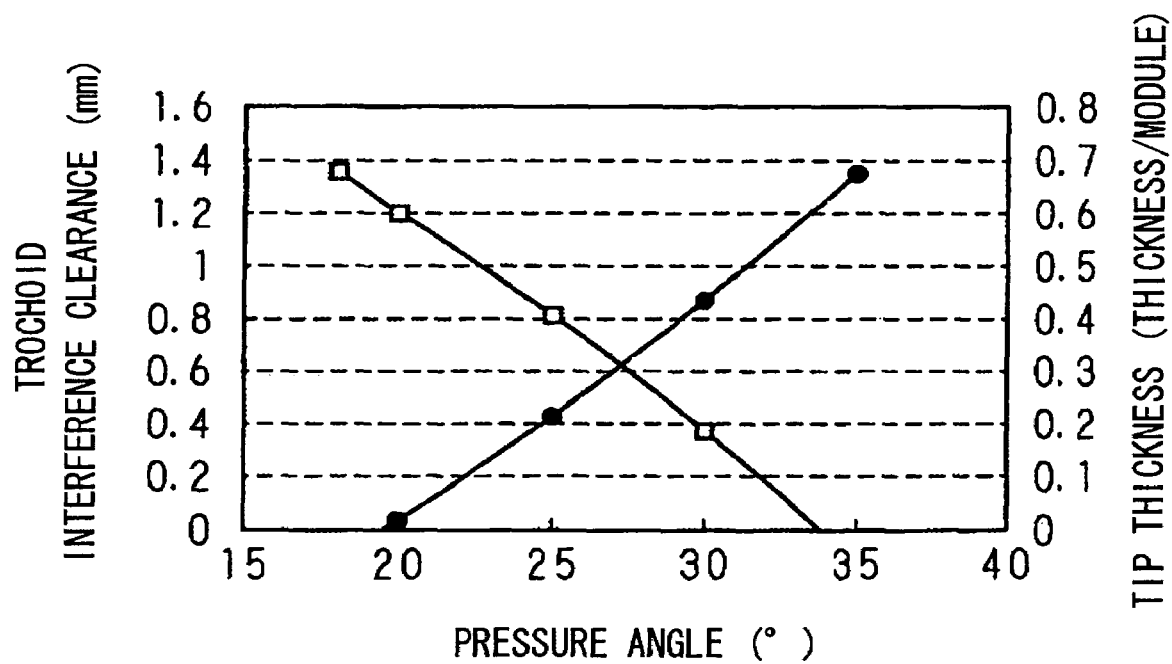
FIG. 15 is a graph showing relations of a pressure angle of the pinion with the trochoid interference clearance and with the thickness of tooth tip.

Next, in consideration of manufacture errors of the gears and the quantity of elastic deformation of the gear teeth during a rated load operation, such a pressure angle α as to provide optimum values of the trochoid interference clearance and the thickness of tooth tip. FIG. 15 is a graph showing relations of the pressure angle α of the pinion 82 with the trochoid interference clearance and with the thickness of tooth tip in a case where a teeth number z is 10; a module m is 0.95; and a tooth height h is 2.25 times the module m. In FIG. 15, the solid dots represent the trochoid interference clearance whereas the blank squares represent values given by dividing the thickness of tooth tip by the module value.

A trochoid interference clearance of 0.3 or more is required for preventing the occurrence of trochoid interference. In a case where the pressure angle α is in the range of 20° or more and 35° or less which is the standard values specified by JIS (Japanese Industrial Standard), the trochoid interference clearance is 0.3 mm or more in a region where the pressure angle α is 23° or more, as shown in FIG. 15. Therefore, the trochoid interference does not occur. On the other hand, the tooth tip requires a thickness of 0.3 or more times the module m in order to ensure the adequate tip strength. As shown in FIG. 15, the pressure angle α must be 27° or less in order to provide the tip thickness of 0.3 or more times the module m. Incidentally, a practicable range of the helix angle β is 0° or more and 40° or less.

In a case where a steel material is used for forming the pinion 82 and the main gear 81, a flank stress $\sigma_H$ corresponding to a tangential load $P_n$ perpendicular to the teeth of the pinion 82, as caused by an assist rotational torque, may be approximately determined based on the following equation.

[Mathematical Equation 13]

$$\sigma_H = \sqrt{0.35 \cdot E \cdot P_n \left[\frac{Z_1 + Z_2}{Z_2}\right] \frac{\cos^2\beta_g}{N_b \cdot \varepsilon_s \cdot b \cdot d_b \cdot \sin\alpha_b}} \quad (31)$$

In the equation (31), E denotes the vertical elastic modulus of the material of the gear (steel material according to the embodiment); $\varepsilon_s$ denotes the transverse contact ratio of the gear; b denotes the facewidth of the pinion 82; $d_b$ denotes the diameter of a working pitch circle of the pinion 82; $\alpha_b$ denotes the working pressure angle of the pinion 82; $\beta_g$ denotes the base-cylinder helix angle of the pinion 82; $Z_1$ denotes the teeth number of the pinion 82; $Z_2$ denotes the teeth number of the main gear 81; and $N_b$ denotes the effectiveness of the facewidth.

Figure 16:
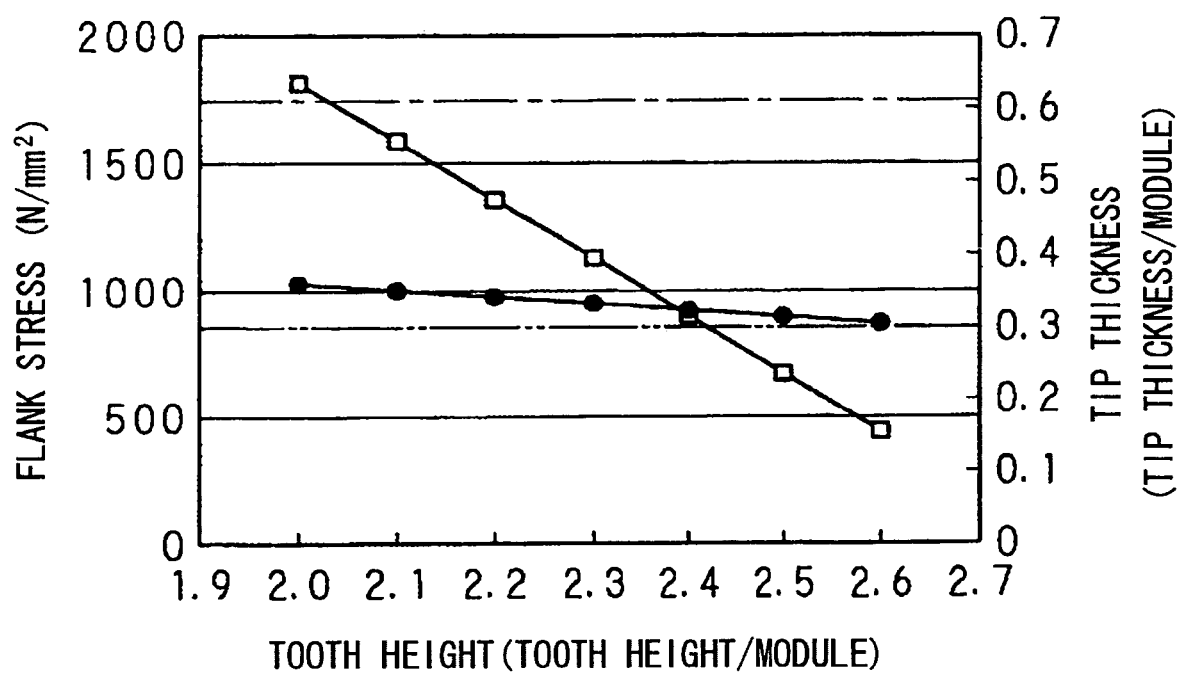
FIG. 16 is a graph showing relations of the tooth height of the pinion with the flank stress and with the thickness of tooth tip.

FIG. 16 is a graph showing relations of the tooth height of the pinion 82 with the flank stress $\sigma_s$ and with the thickness of tooth tip in a case where E is 206000 N/mm²; $P_n$ is 946 N; b is 14 mm; $Z_1$ is 10; $Z_2$ is 97; m is 0.95; a pressure angle α is 25°; a helix angle β is 25°; $d_b$ is 10.308 mm; $\alpha_b$ is 25.283°; $\beta_g$ is 22.521°; and $N_b$ is 0.995 in the equation (31). In FIG. 16, the solid dots represent the flank stress, whereas the blank squares represent values given by dividing the thickness of tooth tip by the module value.

Where a target value of the flank stress $\sigma_H$ is defined to be not more than a design threshold 1760 N/mm² of a gear of an automotive power transmission system and a target value of the thickness of tooth tip is defined to be 0.3 or more times the module m, both of the above conditions may be simultaneously satisfied by defining the tooth height h to be 2.4 or less times the module m as indicated by FIG. 16.

Figure 17:
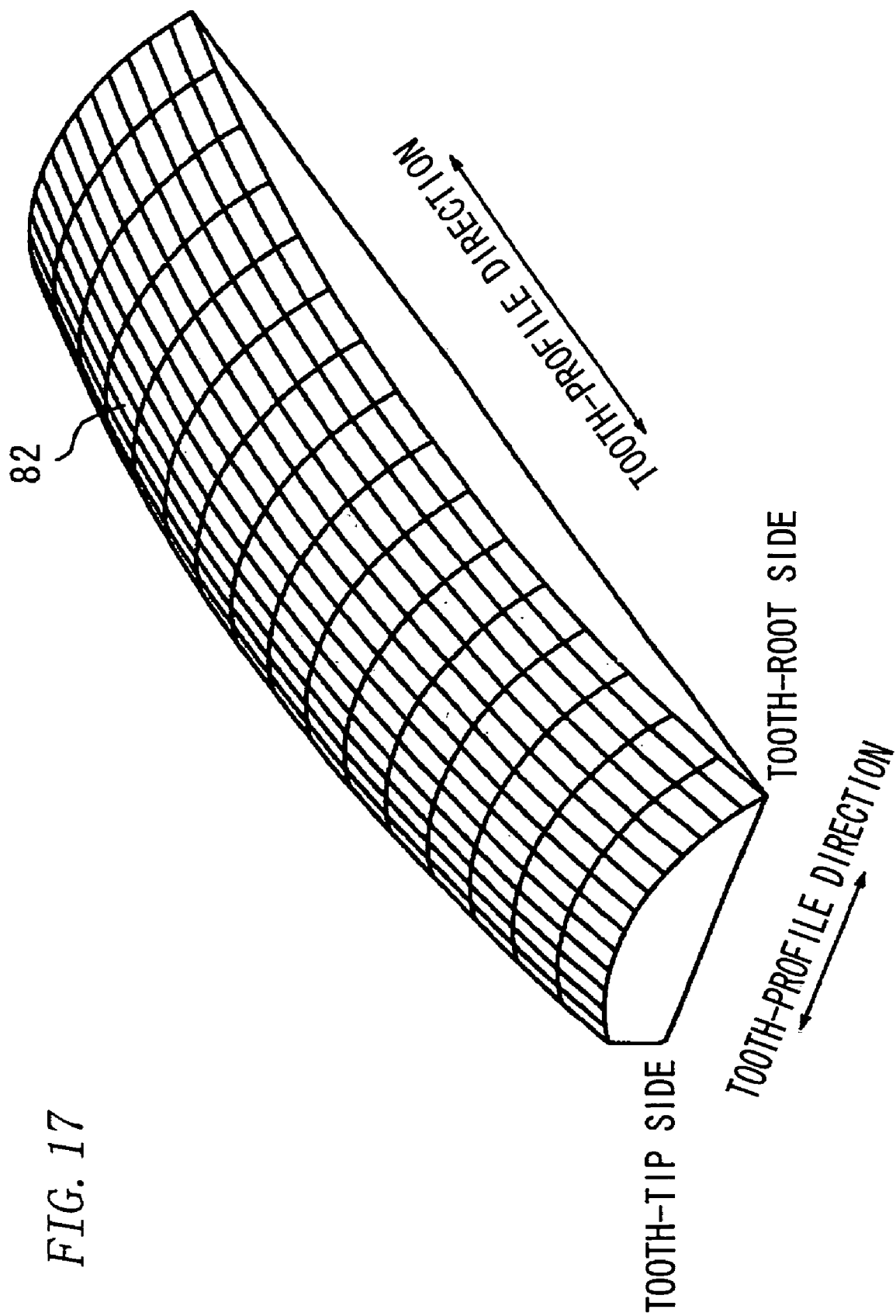
FIG. 17 is a diagram explanatory of a tooth-flank configuration of a reduction gear assembly used in the electric power steering system according to an embodiment of the invention.

FIG. 17 is a diagram explanatory of a tooth-flank configuration of the reduction gear assembly 8 used in the electric power steering system according to the embodiment of the invention. In order to compensate for the decrease of strength at tooth root, either one or both of the main gear 81 and the pinion 82 is formed to have a tooth-flank configuration shown in FIG. 17. FIG. 17 depicts the flank of the pinion 82 vertically and transversely divided in a mesh fashion. The tooth flank is configured such that a negative pressure angle error is provided in the profile direction to provide a greater pressure angle at tip than a pressure angle at root, whereas the flank is protruded in a direction of the increase of meshing stress on the gears or is protruded at its center. Furthermore, crowning is provided in a tooth-trace direction whereas the flank is also centrally protruded in the trace direction By configuring such a tooth flank, the contact stress on the flank of the pinion 82 used in the reduction gear assembly 8 may be uniformly distributed in the profile direction and the trace direction. The pinion having such a tooth-flank configuration is adapted to compensate for the insufficient strength at root by preventing uneven wear of the flank, thus contributing to the improvement of durability of the gear assembly.

While the reduction gear assembly 8 allows for the backlash in the light of durability, it is desirable to minimize the backlash because the backlash constitutes a non-linear dead time element as well as a causative factor of the rattling noises. In consideration of this regard and the working and assembly precisions, the backlash is allowed for although minimized. A notable reduction of friction is achieved by allowing for the backlash.

Figure 18:
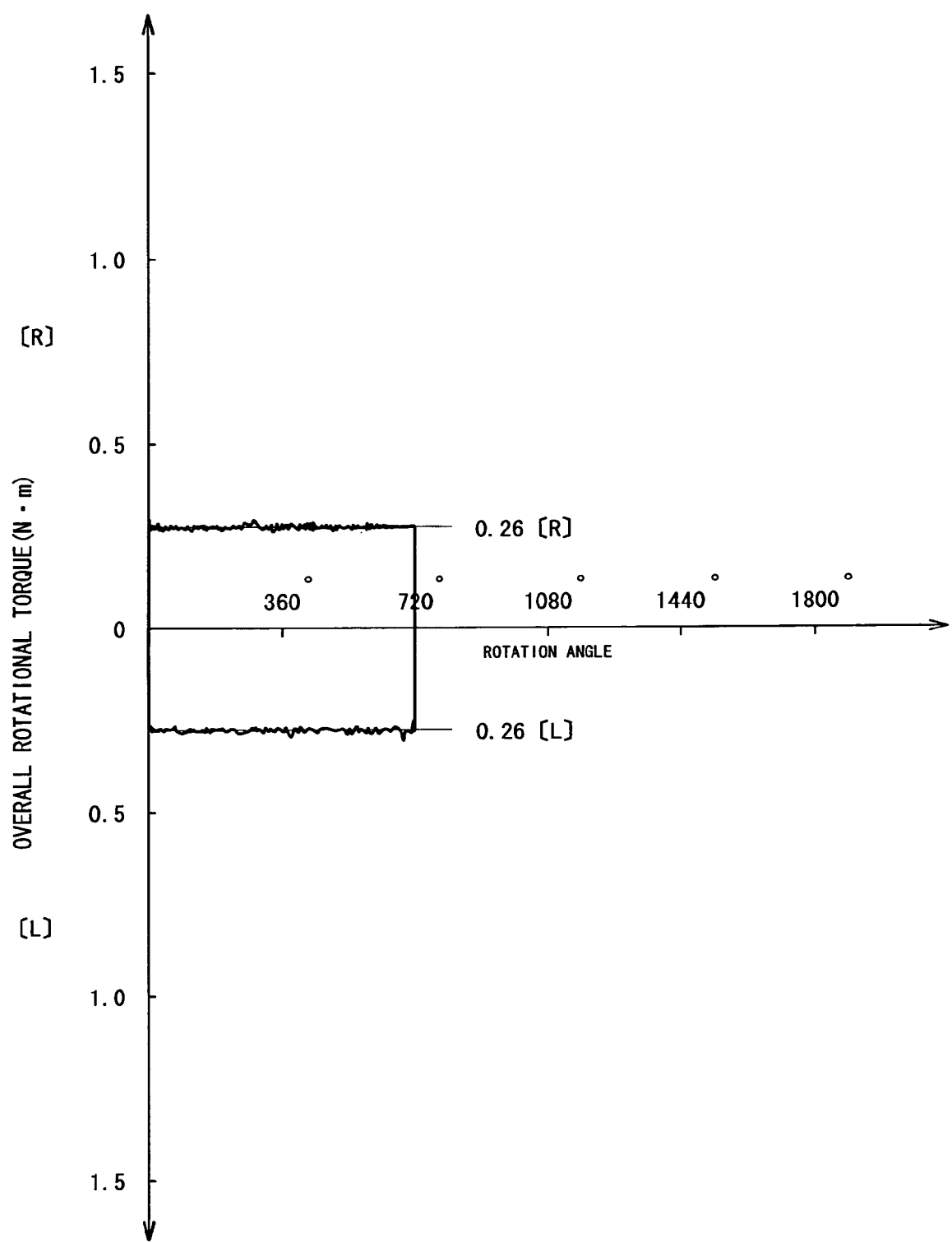
FIG. 18 is a graph showing measurement data on rotational torque about a steering shaft.

The one-stage spiral reduction gear assembly 8 for the assist motor 9 was subjected to a test to take measurements on the torque about the steering shaft 2. FIG. 18 shows the results which indicate that a required rotational torque is on the order of 0.26 Nm.

This rotational torque corresponds to a torque about the steering shaft equivalent of meshing friction between the pinion 82 and the main gear 81. Thus, the reduction gear assembly 8 is adapted to decrease the meshing friction. Specifically, the assembly is capable of decreasing the meshing friction to 0.6 Nm or less. An upper limit of the torque about the steering shaft equivalent of the meshing friction between these gears 81, 82 may preferably be 0.5 Nm, more preferably 0.4 Nm, even more preferably 0.3 Nm, and particularly preferably 0.2 Nm. A lower limit of the above value may preferably be 0.1 N.

The friction interposed between the reduction gear assembly 8 and the motor 9 may preferably be minimized in order to produce difference between a dragging feeling in the assist state and a dragging feeling in the non-assist state. The friction of the above values is small enough from the viewpoint of providing the favorable steering feeling.

Figure 19:
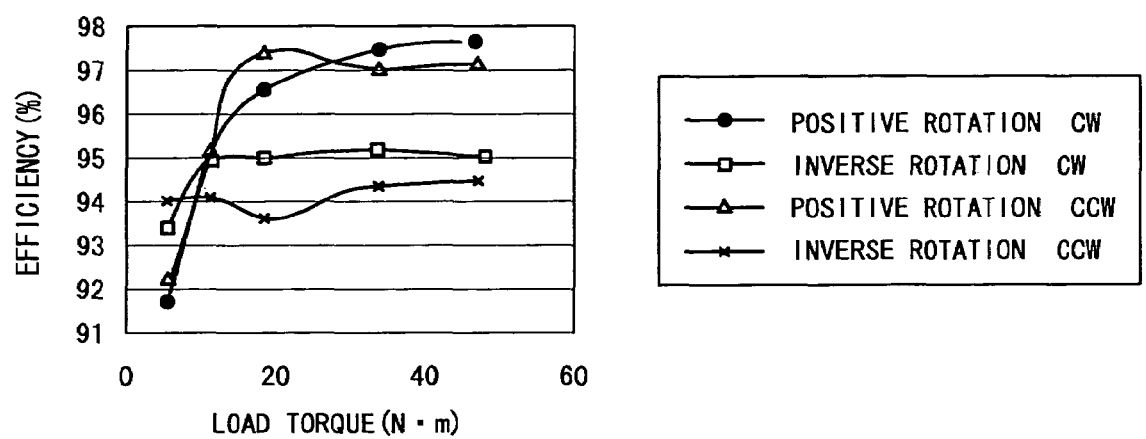
FIG. 19 is a graph showing measurement data on the efficiency of the reduction gear assembly.

The above one-stage spiral reduction gear assembly 8 also ensures an efficiency of 90% or more, as shown in FIG. 19. Specifically, the reduction gear assembly achieves an efficiency of 97%. Because of the increased efficiency of the reduction gear assembly 8, the load on the motor is dramatically reduced.

[2.3 Consideration for Friction of Manual Steering Gear and Reduction Gear Assemblies]

The friction does not depend upon input frequency and acts as a constant resistance to both of the positive and inverse inputs, thus constituting a main causative factor to decrease the torque transmissibility. The decreased torque transmissibility is always perceived as the dragging feeling in terms of the steering feeling. On the other hand, the friction presents the filtering effect against the disturbances and hence, the friction may have some magnitude from the viewpoint of the filtering effect. However, if the friction is significantly great, even the necessary road information is cut off.

With this in view, an upper limit of the sum of the friction of the manual steering gear 3 and that of the reduction gear assembly 8 may preferably be 1 Nm or less, more preferably 0.9 Nm, and even more preferably 0.8 Nm. A lower limit of the sum may preferably be 0.5 Nm, and more preferably 0.6 Nm.

With such a small friction, the steering mechanism A as a whole may attain the followability suited to an electronic control system.

[3. Steering Assist Motor; Rotor Inertia]

The steering assist motor 9 is a three-phase brushless motor. Specifically, the steering assist motor is the brush-less motor containing therein a rotor having the north and south poles of permanent magnets arranged in a circumferential direction thereof.

Elements reducing the torque transmissibility of the steering assist motor 9 include loss torque of the motor, cogging torque, rotor inertia and the like. The cogging torque means torque variations caused by structural reasons such as the number of poles or slots of the motor.

These elements may preferably have small values such as to increase the torque transmissibility of the motor. Specifically, the loss torque may preferably be 0.35 Nm or less (converted to the torque about the steering shaft); the cogging torque may preferably be 0.12 Nm or less (converted to the torque about the steering shaft); and the rotor inertia may preferably be 0.012 kgm$^2$ or less (converted to the torque about the steering shaft).

The loss torque and the cogging torque may also preferably be reduced to small values because these torques cause the decrease of the torque transmissibility of the motor 9. With this in view, an upper limit of the total sum (converted to the torque about the steering shaft) of the friction of the manual steering gear 3, the friction of the reduction gear assembly 8, the loss torque of the motor 9 and the cogging torque of the motor may preferably be 1.35 Nm. A lower limit of the above total sum may preferably be 0.5 Nm and more preferably 0.6 Nm. The total sum may preferably be on the order of 1.2 Nm.

Figure 20:
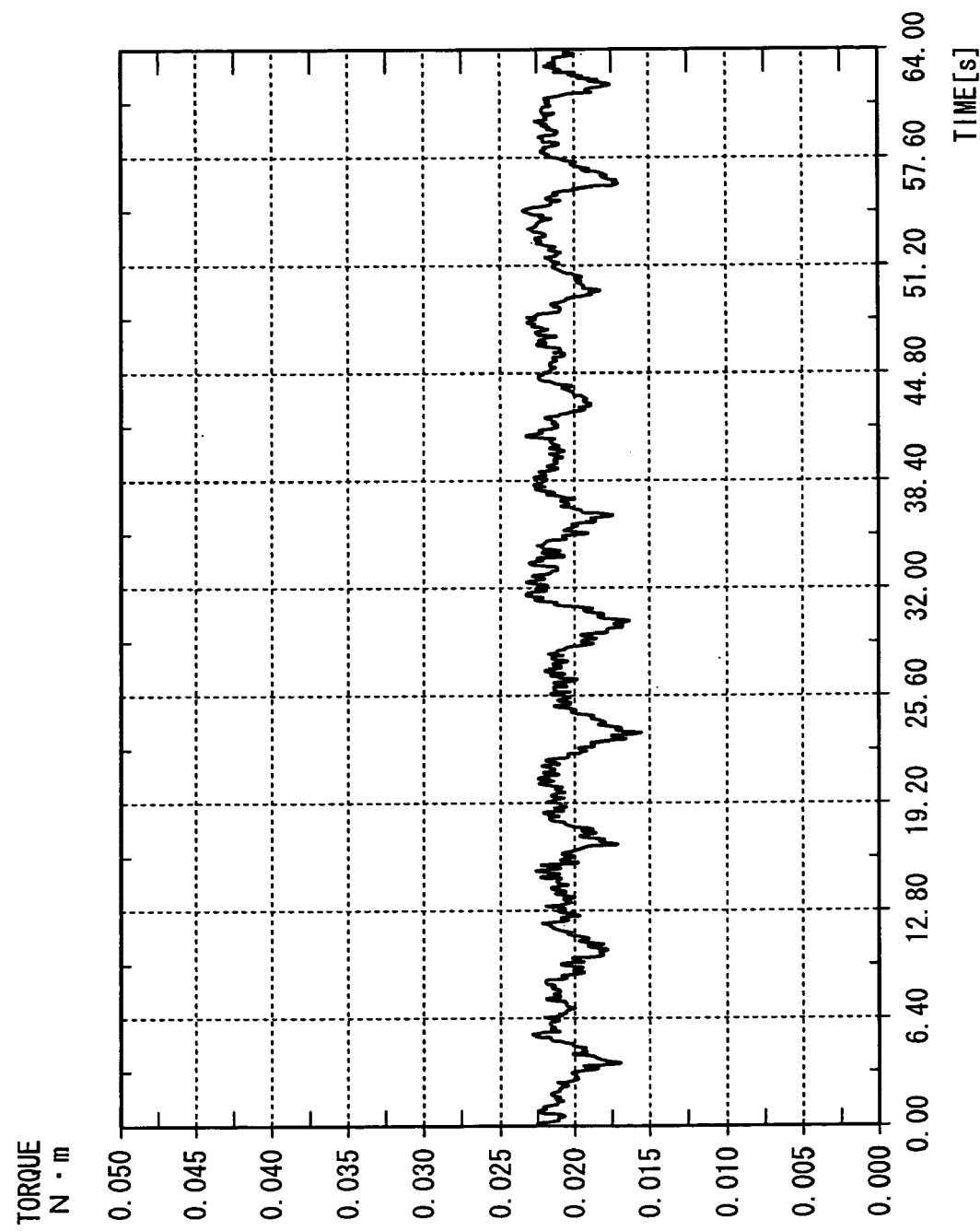
FIG. 20 is a graph showing measurement data on motor loss torque.

The embodiment employs, as the motor 9, a 10-pole/12-slot motor having five pairs of SN poles (10 poles in total) and four pairs of stators (a total number of 12 slots for UVW-three-phases). FIG. 20 shows a characteristic curve (cogging torque curve) of the 10-pole/12-slot motor. The motor characteristic curve is related to torque about the output shaft of the motor.

As shown in FIG. 20, the 10-pole/12-slot motor 9 has a loss torque of about 0.02 Nm (about the output shaft of the motor) and a cogging torque of about 0.008 Nm (about the output shaft of the motor). The waveform of FIG. 20 has a P-P (Peak-to-Peak) minimum value of 0.016 Nm and a P-P maximum value of 0.024 Nm.

The loss torque and cogging torque about the output shaft of the motor may be converted into values about the steering shaft, as follows.

Loss torque (equivalent of torque about the steering shaft)=0.02 Nm×column gear reduction ratio 9.7=0.19 Nm. Cogging torque (equivalent of torque about the steering shaft)=0.008 Nm×column gear reduction ratio 9.7=0.08 Nm.

That is, the converted values are less than the aforesaid upper limits of the loss torque and cogging torque, which limits are defined for the purpose of achieving the high torque transmissibility.

It is determined that an 8-pole/12-slot motor, a 14-pole/12-slot motor, a 12-pole/18-slot motor, a 10-pole/15-slot motor and the like are also capable of limiting the loss torque to 0.35 Nm or less and the cogging torque to 0.12 Nm or less, just as the 10-pole/12-slot motor.

As described above, the embodiment negates the need for employing a high power motor or a reduction gear assembly of high reduction ratio because the elements responsible for the decrease of torque transmissibility are limited to small values, the elements exemplified by the friction of the manual steering gear, the friction of the reduction gear assembly, the loss torque of the motor, the cogging torque of the motor and the like. Thus, the embodiment is adapted to obtain the required assist torque even from the motor 9 providing a relatively small output and having a relatively small rotor inertia.

With such a small rotor inertia, the mechanical system exhibits a low inertia and good followability, providing the good steering feeling with less inertia feeling.

Since the motor 9 is disposed in parallel to the steering shaft 2 and oriented vertically downwardly, the motor 9 is subjected to a decreased inertial force about the steering shaft 2 while a difference between inertial forces on transversely opposite sides of the motor is decreased.

[4. Motor Drive Circuit (Drive Circuit)]

[4.1 Consideration for Motor Drive Circuit]

The electric power steering system employing the brush-less motor is normally provided with switching means (typically exemplified by a relay) for electrically isolating a motor drive circuit from the motor, as needed, in the event of a failure of the motor drive circuit (hereinafter, also referred to as "drive circuit"). In this case, it is preferred to use the minimum possible number of switching means because of the limitations for cost and space reasons. Therefore, the system uses the minimum number of switching means required for cutting off the current supplied from the motor drive circuit to the motor. For instance, an electric power steering system employing a three-phase brushless motor uses two relays as the switching means for cutting off two phase currents of the three phase currents supplied from the drive circuit to the motor.

In the above constitution wherein the number of relays used as the switching means is minimized, some of the phase-current paths between the brushless motor and the drive circuit may include the relay while the other does not include the relay. Therefore, a motor/drive circuit system including the brushless motor and the drive circuit includes different resistance components of the individual phase currents. In the electric power steering system having such a circuit configuration, the motor/drive circuit system as the transmission element has gain and phase varying from one phase current to another, the motor/drive circuit system receiving a phase voltage to be applied to the brushless motor (command value) and outputting a phase current actually flowing through the motor. As a result, the amplitude and phase of the current through the brushless motor varies from one phase to another, even though an equal voltage based on control is applied to the individual phases of the brushless motor. Such differences among the phases of the motor current cause torque ripple in the brushless motor, such that the driver manipulating the steering wheel may have the uncomfortable feeling while the torque transmissibility is decreased.

The following constitution is preferred for suppressing the torque ripple caused by the different gains and phases of the individual phase currents of the motor/drive circuit system.

That is, a preferred electric power steering system operating to apply a steering assist force to a vehicular steering mechanism by driving a brushless motor based on a target value decided according to a vehicle steering operation, the system comprises: control calculation means for calculating a command value of voltage to be applied to the brushless motor based on the target value; a drive circuit for driving the brushless motor based on the command value; and resistance adjusting means for adjusting resistance components of a motor/drive circuit system including the brushless motor and the drive circuit in a manner that inter-phase differences of the resistance components of the motor/drive circuit system are decreased to below a predetermined value (inclusive).

The above constitution reduces the inter-phase differences of the resistance components of the motor/drive circuit system to below the predetermined value (inclusive), so that the motor/drive circuit system has substantially equalized gains at the respective phases and substantially equalized phases. As a result, substantially the same phase current flows through any one of the phases of the brushless motor when the same phase voltage is applied to the motor. Thus is ensured that the brushless motor is decreased in the torque ripple whereby the driver manipulating the steering wheel may not have the uncomfortable feeling. In addition, the torque transmissibility is also increased.

It is preferred that the electric power steering system further comprises switching means (such as a relay element) interposed in at least one of the current supply paths provided in correspondence to the respective phases of the brushless motor for supplying the current from the drive circuit to the brushless motor, and that the resistance adjusting means includes a resistance having a resistance value corresponding to a resistance value of the switching means in closed state and interposed in a current supply path without the switching means, in order that the inter-phase differences of resistance values of the current supply paths are decreased to below a predetermined value (inclusive).

In this case, the inter-phase differences of the resistance values of the current supply paths for supplying the current from the drive circuit to the brushless motor are decreased to below the predetermined value (inclusive) and hence, the inter-phase differences of the resistance components of the motor/drive circuit system are eliminated or decreased. Therefore, the motor/drive circuit system has the substantially equalized gains at the respective phases, and the substantially equalized phases. Thus, the system reduces the torque ripple in the brushless motor, thereby preventing the driver from having the uncomfortable feeling during the vehicle steering operation.

It is also preferred that the drive circuit has a constitution wherein as many switching device pairs as the phases of the brushless motor are interconnected in parallel, the switching device pair including a Hi-side switching device disposed on a source side and a Lo-side switching device disposed on a ground side and connected in series with the Hi-side switching device, and wherein a contact point between the Hi-side switching device and the Lo-side switching device is connected to the brushless motor via the current supply path, and that the resistance adjusting means includes a resistance for adjusting a resistance value of a Hi-side current supply path and/or a Lo-side current supply path in a manner that inter-phase differences of the Hi-side current supply paths from the power source to the Hi-side switching devises and/or inter-phase differences of the Lo-side current supply paths from the power source to the Lo-side switching devices are decreased to below a predetermined value (inclusive).

In this case, the inter-phase differences of the resistance values of the Hi-side current supply paths and/or of the resistance values of the Lo-side current supply paths are decreased to below the predetermined value (inclusive), so that the inter-phase differences of the resistance components of the motor/drive circuit system are decreased or eliminated. Thus, the motor/drive circuit system has substantially equalized gains at the respective phases and substantially equalized phases, whereby the brushless motor may be decreased in the torque ripple.

It is preferred that the resistance adjusting means further includes a bus bar for wirings of the current supply paths and/or for wiring in the drive circuit, the bus bar having its sectional area and/or length adjusted in a manner to decrease the inter-phase differences of the resistance components of the motor/drive circuit system to below the predetermined value (inclusive).

In this case, the bus bar for wiring has its sectional area and/or length defined properly, so that the inter-phase differences of the resistance components of the motor/drive circuit system are decreased to below the predetermined value (inclusive). This negates the need for adding a resistor or the like for inter-phase resistance adjustment. Therefore, the motor/drive circuit system may have the inter-phase gain differences and the phase differences eliminated or decreased, while avoiding cost increase.

[4.2 Fundamental Consideration for Prior-Art Motor Drive Circuit]

Figure 23:
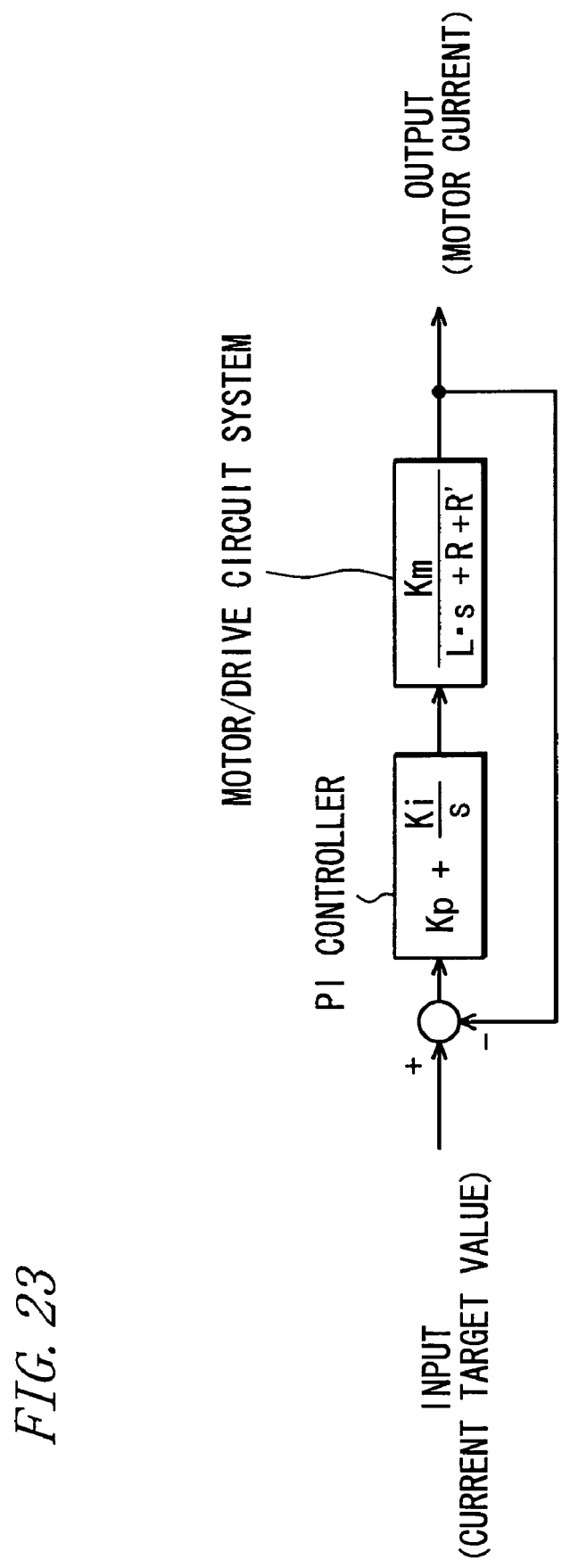
FIG. 23 is a block diagram showing a current control system by using transfer functions.

FIG. 23 is a block diagram showing an arrangement of a current control system of the electric power steering system. The current control system receives an input of a target value of current to be applied to the motor 9 and outputs the current to the motor 9. The current control system performs a proportional-plus-integral control calculation (hereinafter, referred to as "PI control calculation") on a difference between the target current value and the value of current flowing through the motor 9 and then, applies a voltage decided by the calculation to the motor 9. In a case where the brushless motor is used, the motor may be regarded as a first-order lag element per phase, which is dependent upon per-phase inductance L and resistance R. A transfer function of the first-order lag element may be expressed as K/(L·S+R) where K denotes the constant. In actual fact, however, there also exist external resistance such as of the wirings of the motor, of the wirings of the drive circuit and the like. Provided that the drive circuit and the motor are regarded as a single element of the motor/drive circuit system in consideration of this fact, a transfer function Gm(s) is represented by the following equation:

$$Gm(s)=Km/(L \cdot s+R+R') \qquad (41),$$

where Km denotes the constant, and R' denotes the external resistance including those of the wirings of the motor, the drive circuit and the like.

The motor/drive circuit system has characteristic values L, R, R' which decides the above transfer function Gm(s). Of these, inter-phase differences of the inductance L and of the internal resistance R are substantially negligible. However, in a case where the relay as the switching means is interposed, as described above, the relay is not normally interposed in every one of the phases so that the external resistance R' produce inter-phase differences. In addition, partly because it is difficult to equalize the lengths of bus bars used for wirings between the switching devices, such as power MOS transistors, and the sources or between the switching devices and the ground points in the drive circuit, the above external resistance R' may have inter-phase differences. Therefore, the conventional electric power steering system employing the brushless motor encounters the inter-phase gain differences and the phase differences of the motor/drive circuit system as the transmission element as a result of the inter-phase differences of the external resistance R'.

It is confirmed from the measurements of frequency characteristics of the motor/drive circuit system that such differences produce significant inter-phase differences of the responsivity of the motor/drive circuit system.

Figure 25:
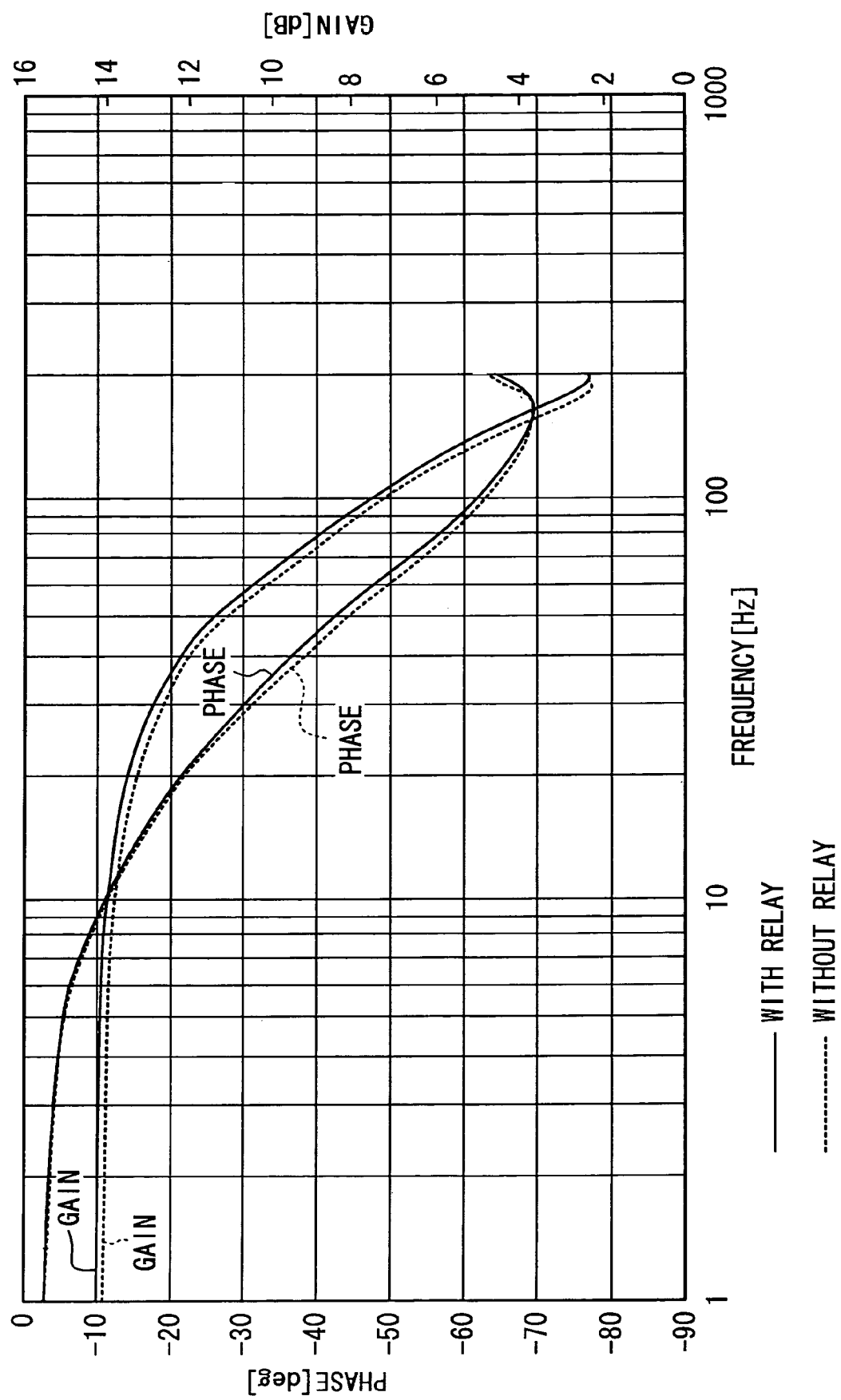
FIG. 25 is a Bode diagram showing characteristics of a motor/drive circuit system in a conventional electric power steering system.

Thus, FIG. 25 is a Bode diagram showing two examples of measurements taken on the frequency characteristics of the motor/drive circuit system of the electric power steering system employing the brushless motor. In FIG. 25, characteristic curves represented by the solid lines show a gain characteristic and a phase characteristic as the results of the first measurement example. That is, the solid lines represent line-to-line frequency characteristic of the motor/drive circuit system in a case where a line-to-line inductance L of the motor is 162[µH], a line-to-line internal resistance R is 53[mΩ], and a line-to-line external resistance R' is 6[mΩ]. The external resistance R' (=6 [mΩ]) of this measurement example includes a contact resistance (=2×1.5 [mΩ]) which is a resistance of the above two relays in the ON state. In contrast, characteristic curves represented by the broken lines in FIG. 25 shows a gain characteristic and a phase characteristic as the results of the second measurement example. That is, the broken lines represent line-to-line frequency characteristic of the motor/drive circuit system in a case where a line-to-line inductance L of the motor is 162[µH], a line-to-line internal resistance R is 53[mΩ], and a line-to-line external resistance R' is 4.5[mΩ]. A subject of the measurement example is a line which does not include one relay (switching means). Hence, the external resistance R' (=4.5[mΩ]) of this measurement example does not include a contact resistance of the above one relay (the other measurement conditions are the same as those of the first measurement example). As seen from the Bode diagram (gain characteristic and phase characteristic) showing the measurement results of the first and the second measurement examples, a significant difference of the responsivity (amplitude and phase of the phase current) of the motor/drive circuit system occurs between the phase with the relay interposed and the phase without the relay.

According to the embodiment, therefore, the electric power steering system employing the brushless motor adopts the following constitution to eliminate the inter-phase gain differences and the phase differences of the motor/drive circuit system. That is, the electric power steering system includes the resistance adjusting means wherein the motor/drive circuit system is provided with a suitable resistance interposed in a current path corresponding to the phase without the relay, such as to eliminate or decrease the inter-phase differences of the resistance components of the motor/drive circuit system.

[4.3 General Constitution of Control Unit Including Drive Circuit (Drive Circuit)]

Figure 21:
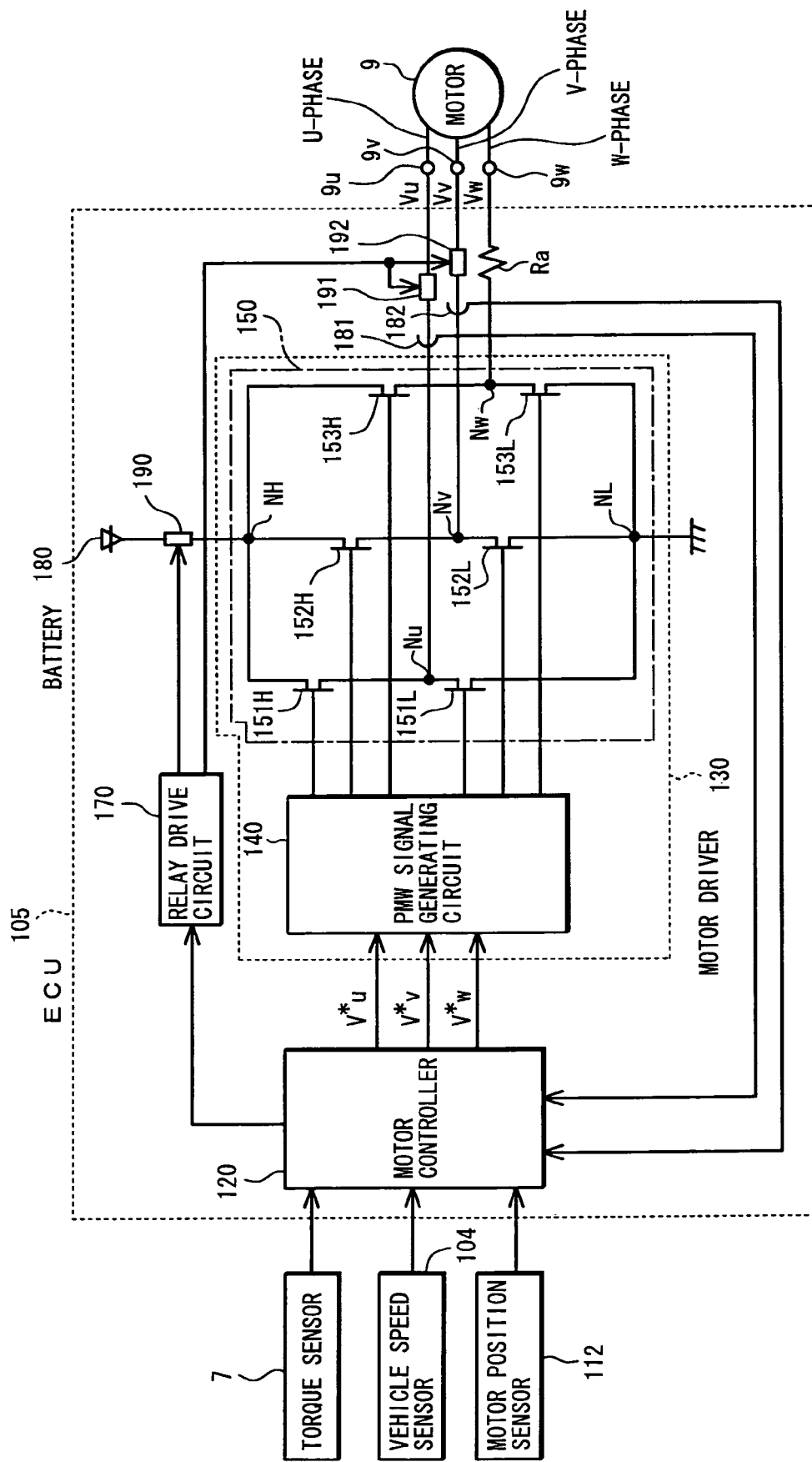
FIG. 21 is a block diagram showing an arrangement of an ECU as a control unit of the electric power steering system.

FIG. 21 shows a control unit (ECU) 105 including a motor drive circuit (motor driver circuit) 150. The steering system includes, as components associated with the control unit 105, the electric motor (brushless motor) 9 for steering assist; a position sensor 112 such as a resolver for detecting a rotational position of the rotor of the motor 9; the torque sensor (vehicle-steering detector) 7; and a vehicle speed sensor 104. The control unit 105 drivably controls the motor 9 based on sensor signals from the sensors 112, 7, and 104.

The torque sensor 7 detects a steering torque applied by manipulating the steering wheel and outputs a steering torque signal Ts indicative of the steering torque. On the other hand, the vehicle speed sensor 104 detects a vehicle speed as a running speed of the vehicle and outputs a vehicle speed signal Vs indicative of the vehicle speed. The ECU 105 as the control unit drives the motor 9 based on these steering torque signal Ts and vehicle speed signal Vs and the rotational position of the rotor detected by the position sensor 112.

The ECU 105 is supplied with current from an on-board battery 180 by means of an ignition switch and includes a motor controller 120, a motor driver 130, a relay drive circuit 170 and two current detectors 181, 182. The motor controller 120 is control calculation means constituted by a microcomputer and operates by executing a predetermined program stored in an internal memory thereof. The motor driver 130 includes a PWM signal generating circuit 140 and a drive circuit 150.

The motor driver 130 is disposed in the vicinity of the motor 9 and is electrically connected to the motor 9 by means of the minimum required length of wire for minimizing electrical resistance. A single case accommodates the motor driver 130 along with the drive circuits and interface circuits of the torque sensor 7, the vehicle speed sensor 104, the current detector 181 and the motor position sensor (motor rotational angle sensor) 112, and the motor controller (microcomputer and the like) 120. The case is disposed in the vicinity of the motor 9.

The motor drive circuit 150 includes: FETs (Field Effect Transistor) 151H, 152H, 153H as power switching devices disposed on a power-line side and in correspondence to a U-phase, a V-phase and a W-phase of the motor 9, respectively; and FETs 151L, 152L, 153L as power switching device disposed on a ground-line side and in correspondence to the U-phase, the V-phase and the W-phase of the motor 9, respectively. The power-line side FET (hereinafter, referred to as "Hi-side FET") 15jL and the ground-line side FET (hereinafter, referred to as "Lo-side FET") 15jH corresponding to the same phase are interconnected in series to form a pair (j=1, 2, 3). A power-line side circuit portion including the FETs 151H to 153H are generally called an "upper arm", whereas a ground-line side circuit portion including the FETs 151L to 153L are generally called a "lower arm". Individual contact points Nu, Nv, Nw between the upper arm and the lower arm are connected to terminals 9u, 9v, 9w of the respective phases of the motor by means of power lead lines (specifically, constituted by the bas bars), thus constituting the current supply paths of the respective phases for supplying a driving current from the drive circuit 150 to the motor 9. A relay 191 is interposed in a current supply path (hereinafter, referred to as "u-phase current supply path") constituted by a lead wire interconnecting the contact point Nu corresponding to the u-phase and the motor terminal 9u, whereas a relay 192 is interposed in a current supply path (hereinafter, referred to as "V-phase current supply path") constituted by a lead wire interconnecting the contact point Nv corresponding to the V-phase and the motor terminal 9v. Furthermore, the drive circuit 150 also has a relay 190 interposed between a contact point (a power-side branching point to be described hereinlater) where source terminals of the Hi-side FETs 151H to 153H are interconnected and the battery 180. In contrast, no relay is interposed in a current supply path (hereinafter, referred to as "W-phase current supply path") constituted by a lead wire interconnecting the contact point Nw corresponding to the W-phase and the motor terminal 9w.

Out of the two current detectors 181, 182, one current detector 181 detects a u-phase current iu flowing through the lead wire (the u-phase current supply path) interconnecting the contact point Nu of the drive circuit 150 and a motor terminal 161. The other current detector 182 detects a v-phase current iv flowing through the lead wire (the V-phase current supply path) interconnecting the contact point Nv of the drive circuit 150 and the motor terminal 9v. Current values detected by these current detectors 181, 182 are inputted to the motor controller 120 as a u-phase current detection value Iu and a v-phase current detection value Iv, respectively.

The motor controller 120 receives the steering torque detected by the torque sensor 7, the vehicle speed detected by the vehicle speed sensor 104, and the u-phase and v-phase current detection values iu, iv detected by the current detectors 181, 182. The motor controller 120 decides the target value of current to be applied to the motor 9 based on the steering torque and the vehicle speed and by referring to a table which is called an assist map and correlates the steering torque with the target current value. Then, the motor controller performs a proportional-plus-integral calculation based on a difference between the target current value and each of the motor current values calculated from the above motor current detection values iu, iv, thereby determining respective command values of phase voltages V*u, V*v, V*w to be applied to the motor 9.

In the calculation of the individual command values of phase-voltages V*u, V*v, V*w to be applied to the motor, voltages and currents as a three-phase alternating current involved in the motor drive are normally expressed based on a rotating orthogonal coordinate system (referred to as "d-q coordinates") consisting of a d-axis representing a direction of magnetic flux from a magnetic field of the rotor of the motor, and a q-axis which is orthogonal to the d-axis and which has a phase advanced from the d-axis by π/2. Such d-q coordinates permit the current to be applied to the motor to be handled as a direct current consisting of a d-axis component and a q-axis component. In this case, the d-axis component and the q-axis component of the motor current value are calculated from the above u-phase and v-phase current detection values iu, iv based on a coordinate conversion. Subsequently, a d-axis voltage command value is calculated by performing a proportional-plus-integral calculation based on a difference between a d-axis component of the above target current value and the d-axis component of the motor current value, whereas a q-axis voltage command value is calculated by performing a proportional-plus-integral calculation based on a difference between a q-axis component of the above target current value and the q-axis component of the motor current value. The respective command values of the above phase-voltages V*u, V*v, V*w are calculated from these d-axis and q-axis voltage command values based on the coordinate conversion.

The motor controller 120 not only calculates the aforesaid command values of phase-voltages V*u, V*v, V*w but also outputs a relay control signal based on a result of a predetermined failure detection process, the signal used for controlling a relay drive circuit 70.

In the motor driver 130, the PWM signal generating circuit 140 receives the respective command values of the phase-voltages V*u, V*v, V*w from the motor controller 120 and generates PWM signals varying in duty ratio according to the command values V*u, V*v, V*w. As described above, the drive circuit 150 is a PWM voltage inverter constituted using the Hi-side FETs 151H to 153H and the Lo-side FETs 151L to 153L. The drive circuit provides ON/OFF control of these FETs 151H to 153H and FETs 151L to 153L based on the PWM signal, so as to generate the individual phase-voltages Vu, Vv, Vw to be applied to the motor 9. These phase-voltages Vu, Vv, Vw are outputted from the ECU 105 to be applied to the motor 9. According to the applied voltages, currents flow through u-phase, v-phase and w-phase field coils (not shown) of the motor 9, respectively, so that the motor 9 generates a steering assist torque (motor torque) according to the currents.

The relay drive circuit 170 operates based on the relay control signal outputted from the motor controller 120. The relay drive circuit 170 maintains the relays 190, 191, 192 in a closed state until the circuit receives from the motor controller 120 a signal indicative of the detection of a failure, so as to continue power supply to the motor driver 130 and the motor 9. When a failure is detected by the failure detection process of the motor controller 120, the relay drive circuit 170 receives from the motor controller 120 the signal indicative of the detection of the failure. In response to this, the relay drive circuit 170 switches the relays 190, 191, 192 to an open state, so as to cut off the power supply to the motor driver 130 and the motor 9.

[4.4 Constitution of Principal Part of Motor/Drive Circuit System]

The electric power steering system according to the embodiment has the following constitution such that the inter-phase differences (among the u-, v-, w-phases) of the resistance components of the motor/drive circuit system including the drive circuit 150, the brushless motor 9, the lead wires interconnecting these components, and the like may be eliminated or decreased. In this embodiment, as well, the transfer function Gm(s) of the motor/drive circuit system may be represented by the following equation in respect of each phase (FIG. 23).

$$Gm(s)=Km/(L \cdot s+R+R') \qquad (42),$$

where Km denotes the constant, and R' denotes the external resistance including wiring resistances of the motor 9, the drive circuit 150, the lead wires forming the current supply paths of the individual phases, and the like.

As described above, the relay 191 is interposed in the u-phase current supply path interconnecting the contact point Nu in the drive circuit 150 and the motor terminal 9u, whereas the relay 192 is interposed in the v-phase current supply path interconnecting the contact point Nv in the drive circuit 150 and the motor terminal 9v. However, no relay is interposed in the w-phase current supply path interconnecting the contact point Nw in the drive circuit 150 and the motor terminal 9w.

According to the embodiment, therefore, a resistance element Ra is interposed in the w-phase current supply path, as shown in FIG. 21. The resistance element Ra has a resistance value substantially equal to a resistance value of the relay 191 or 192 in ON state.

By inserting such a resistance element Ra, the inter-phase differences (u-, v-, w-phases) of the resistance components constituting the external resistance R' and involved in the electrical connection between the drive circuit 150 and the motor 9 or of the resistance values of the current supply paths for current supply from the drive circuit 150 to the motor 9 are decreased or eliminated. Specifically, a resistor equivalent to the resistance element Ra may be inserted in the w-phase current supply path including no relay. Alternatively, the insertion of the above resistance element Ra may also be implemented by properly defining the sectional area (width or thickness) and/or the length of the bas bar constituting the lead wire of the w-phase current supply path, as will be described hereinlater.

The embodiment also provides adjustment of the resistance of the wirings in the drive circuit 150 in order to eliminate the inter-phase differences of the external resistance R'. In a case where a three-phase voltage inverter shown in FIG. 22(a) is used as the drive circuit 150, it is difficult to equalize the lengths of the individual phase wires between the power source and the FETs 151H to 153H as the Hi-side switching devices, or the lengths of the individual phase wires between the ground point and the FETs 151L to 153L as the Lo-side switching devices. According to the embodiment, therefore, a bus bar 155H included in the current supply paths from the battery 8 as the power source to the Hi-side EFTs 151H to 153H and extending from a junction point (hereinafter, referred to as "power-side branching point") NH toward the respective Hi-side EFTs 151H to 153H has a configuration shown in FIG. 22(b). Specifically, a width W1 of a bus bar 155H portion extending from the power-side branching point NH to a source terminal of the Hi-side FET 151H, a width W2 of a bus bar 155H portion extending from the power-side branching point NH to a source terminal of the Hi-side FET 152H, and a width W3 of a bus bar 155H portion extending from the power-side branching point NH to a source terminal of the Hi-side FET 153H are defined such that the individual bus bar portions extending from the power-side branching point NH to the three source terminals of the Hi-side FETs 151H to 153H may have substantially equal resistance values (normally, W1=W3>W2). On the other hand, a bus bar 155L included in the current supply paths from the ground oint to the Lo-side EFTs 151L to 153L and extending from a junction point (hereinafter, referred to as "ground-side branching point") NL toward the respective Lo-side EFTs 151L to 153L has a configuration shown in FIG. 22(c). Specifically, a width W4 of a bus bar 155L portion extending from the ground-side branching point NL to a source terminal of the Lo-side FET 151L, a width W5 of a bus bar 155L portion extending from the ground-side branching point NL to a source terminal of the Lo-side FET 152L, and a width W6 of a bus bar 155L portion extending from the ground-side branching point NL to a source terminal of the Lo-side FET 153L are defined such that the individual bus-bar portions extending from the ground-side branching point NL to the three source terminals of the Lo-side FETs 151L to 153L may have substantially equal resistance values (normally, W4=W6>W5).

The inter-phase differences (u-, v-, w-phases) of the resistance components constituting the external resistance R' and involved in the wirings in the drive circuit 150 are decreased or eliminated by making the aforementioned definition (adjustment) of the widths W1 to W6 of the bus bar forming the wirings in the drive circuit 150. The inter-phase differences of the internal resistance R of the motor 9 are substantially negligible. Hence, the inter-phase differences of the resistance components of the internal resistance R and the external resistance R' of the motor/drive circuit system may be decreased to below a predetermined value (inclusive) (preferably to 10% or less, or more preferably to 5% or less) by making the aforementioned inter-phase adjustment of the external resistance R'.

In general, it is not easy to change the thickness or length of the bus bar. Therefore, the embodiment opts to accomplish the inter-phase adjustment of the wiring resistances by properly defining the widths W1 to W3, W4 to W6 of the bus bars 155H, 155L. However, it is also possible to accomplish the inter-phase adjustment of the wiring resistances by adjusting the width and/or the thickness (or the sectional area) and/or the length of the bus bars 155H, 155L, thereby to decrease or eliminate the inter-phase differences of the resistance components in the drive circuit 150.

[4.5 Action and Effect of Drive Circuit of the Embodiment]

Figure 24:
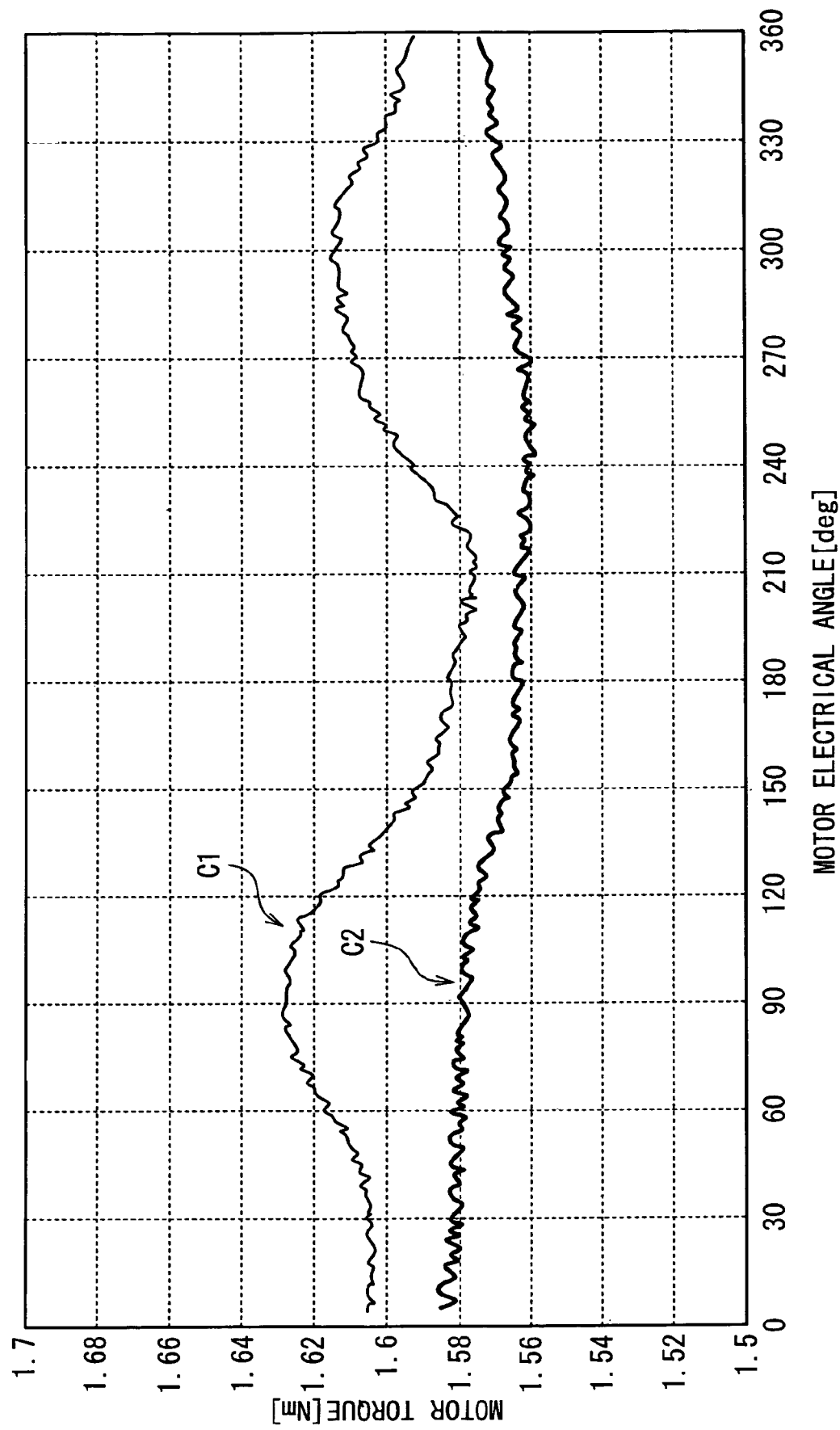
FIG. 24 is a waveform chart of motor torque for explaining a torque ripple reduction effect.

According to the embodiment as described above, the current supply paths for current supply from the drive circuit 150 to the motor 9 and of the wiring resistance values in the drive circuit are eliminated or decreased. Thus, the inter-phase differences of the external resistance R' of the motor/drive circuit system are eliminated or decreased. Since the inter-phase differences of the internal resistance R and of the inductance L of the motor 9 are substantially negligible, the inter-phase differences of the resistance components in the motor/drive circuit system may be eliminated or decreased. In addition, the individual gains of the individual phases and the individual phases of the motor/drive circuit system may be substantially equalized. Therefore, when the same phase voltage is applied to each of the u-, v- and w-phases, substantially the same current flows through the motor 9. As a result, the torque ripple in the motor 9 may be decreased. In the conventional electric power steering system, for example, the variation of the motor torque against the motor electrical angle assumes a waveform represented by a characteristic curve C1 (the thinner curve) in FIG. 24. According to the embodiment, on the other hand, the variation of the motor torque against the motor electrical angle assumes a waveform represented by a characteristic curve C2 (the thicker curve) in FIG. 24. It is apparent that the embodiment achieves a notable reduction of the torque ripple. In the illustrated steering system outputting the motor torque represented by the characteristic curve C2 shown in FIG. 24, the inter-phase differences of the resistance components of the motor/drive circuit system are decreased to 1% or less. That is, the embodiment is adapted to reduce the torque ripple of the motor, thereby preventing the driver from having the uncomfortable feeling during the vehicle steering operation.

Furthermore, the embodiment negates the need for adding a resistor and the like for providing the inter-phase adjustment of resistances because the resistance components of the motor/drive circuit system are adjusted by properly defining the widths or the like of the bus bar used for the wiring purpose. Thus, the inter-phase gain differences and the phase differences of the motor/drive circuit system are decreased or eliminated without entailing the cost increase.

[4.6 Modifications of Drive Circuit]

Figure 22:
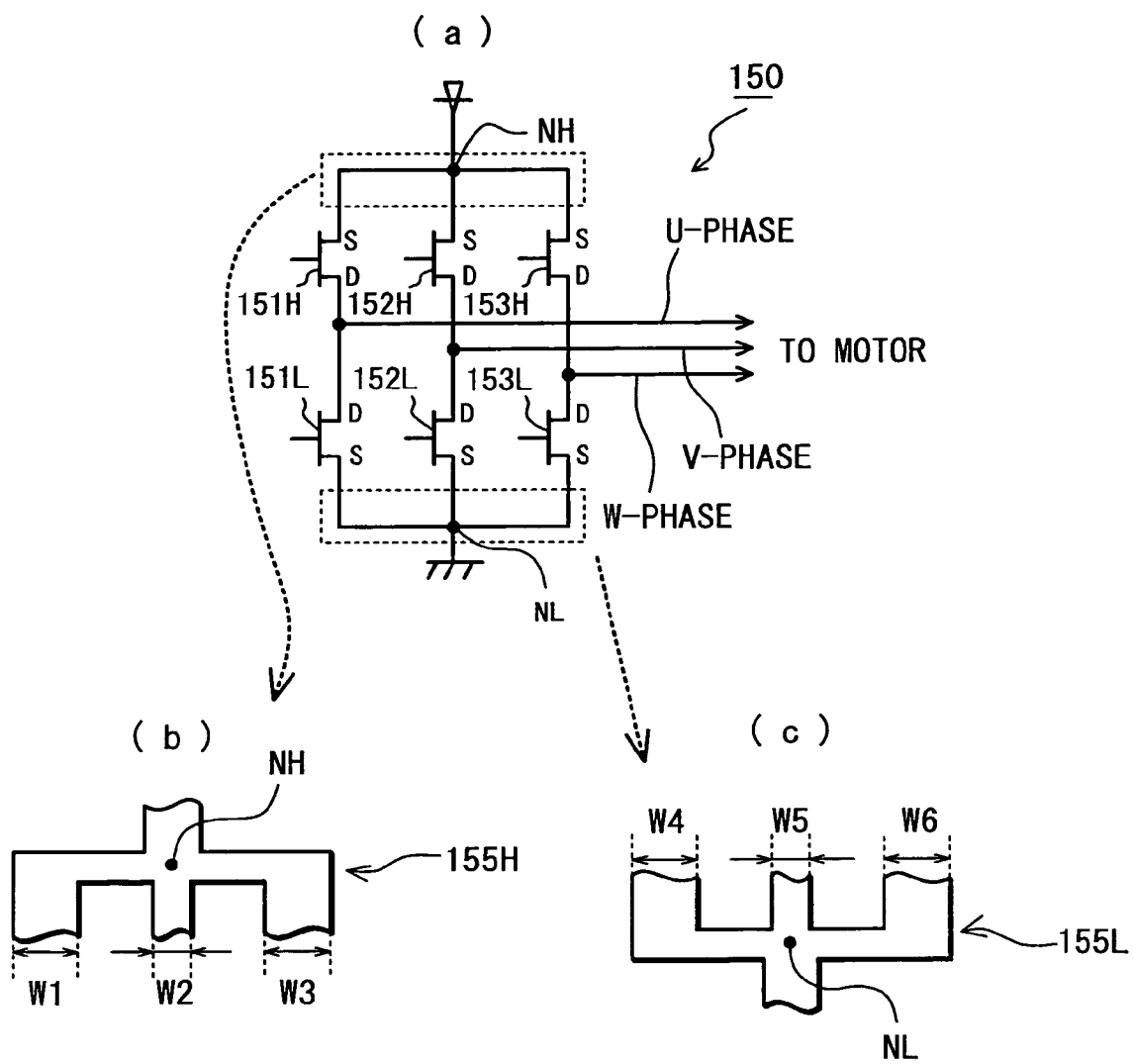
FIG. 22 is a group of diagrams including a circuit diagram (a) explanatory of phase-to-phase adjustment of wiring resistances in a drive circuit and schematic diagrams (b and c) showing configurations of principal parts.

In order to decrease or eliminate the inter-phase differences of the resistance components of the motor/drive circuit system, the above embodiment is constituted such that out of the current supply paths for current supply from the drive circuit 150 to the motor 9, the current supply path without a relay has the resistance element Ra for adjustment interposed therein (FIG. 21) and that the configurations of the bus bars forming the wirings in the drive circuit 150 are adjusted (FIG. 22). Alternatively, the embodiment may also be constituted to employ either one of these two resistance adjusting means for providing the inter-phase adjustment of the resistance components of the motor/drive circuit system. In a case where the relays are interposed in all the current supply paths extending from the drive circuit 150 to the motor 9, for example, only the inter-phase adjustment of the wiring resistances in the drive circuit 150 (for example, the proper definition of the width of the bus bars) may well serve the purpose. Furthermore, the steering system may also be constituted to employ any other resistance adjusting means than the above two resistance adjusting means so long as the alternative means serves to decrease or eliminate the inter-phase differences of the resistance components of the motor/drive circuit system.

While the above embodiment employs the three-phase brushless motor 9 as a drive source of the electric power steering system, the number of phases of the brushless motor is not limited to three. The invention is also applicable to an electric power steering system employing a brushless motor having four or more phases.

[5. Linearity of Steering Feeling]

[5.1 Torque Pulsation Compensation]

[5.1.1 Consideration for Torque Pulsation of Motor 9]

The electric motor may encounter a problem that the output torque thereof suffers ripples (pulsations). The ripples are classified broadly into: cogging torque (mechanical ripple) resulting from motor constitution including the number of rotor poles, the number of slots for stator coils and the like; and electrical ripple resulting from a distorted waveform of induced electromotive force with respect to an idealistic waveform. Such torque ripples contained in the motor output constitute one causative factor of degrading the steering feeling provided by the steering system. This leads to a strong demand for suppressing the torque ripples in the steering system.

In this connection, some conventional systems are adapted to reduce the torque ripples by changing the configuration of the slot at its portion opposing rotor magnets or adjusting a skew angle (Prior Art 8).

The three-phase brushless motor generally used as the electric motor of the electric power steering system may encounter the following problem. That is, the motor may provide an output torque containing the torque ripple (electrical ripple) caused by high-order components of current generated by the rotation of a distorted magnetic field. This results in the degraded steering feeling.

Therefore, the following constitution may preferably be adopted in order to suppress the torque ripple caused by the high-order current components and to improve the steering feeling in linearity.

That is, a preferred electric power steering system operating to decide a target current value of an electric motor according to an operation of a steering member and to provide steering assist by applying the motor power to a steering mechanism, the system comprises: torque-ripple compensation deciding means which uses rotational position information on the electric motor and the decided target current value to decide a high-order-component compensation value for canceling torque ripple caused by predetermined high-order components of a current flowing through the motor; correcting means for correcting the decided target current value by using the compensation value supplied from the torque-ripple compensation deciding means; and feedback control means for providing feedback control of the electric motor based on the target current value corrected by the correcting means.

In the electric power steering system having the above constitution, the torque-ripple compensation deciding means uses the rotational position information on the electric motor and the target current value decided according to the operation of the steering member, thereby estimating torque ripple caused by the predetermined high-order components of the current of the target current value when the target current is supplied to the motor. Then, the deciding means decides the high-order-component compensation value for canceling the estimated torque ripple. On the other hand, the feedback control means provides the feedback control of the electric motor based on the target current value which is corrected by the correcting means based on the compensation value supplied from the torque-ripple compensation deciding means. When the control means permits the supply of the current of the corrected target current value, therefore, the current removed of the predetermined high-order components is supplied to the motor so that the torque ripple associated with the high-order components may be suppressed.

It is preferred in the above electric power steering system that the torque-ripple compensation deciding means varies the high-order-component compensation value according to the decided target current value.

In this case, the above compensation value is varied according to a motor load. Even when the motor load is varied, the feedback control means may control the electric motor by using the target current value corrected with a more proper compensation value. Hence, the degradation of the steering feeling is more assuredly prevented.

In the above electric power steering system, the torque-ripple compensation deciding means may include: a high-order-current distortion compensating portion for deciding the high-order-component compensation value; and a magnetic field distortion compensating portion which uses the rotational position information on the electric motor and the decided target current value to decide a magnetic-field-distortion compensation value for suppressing torque ripple caused by a distorted magnetic field formed in the motor.

In this case, the target current value is corrected by using not only the high-order-component compensation value decided by the high-order-current distortion compensating portion but also the magnetic-field-distortion compensation value decided by the magnetic field distortion compensating portion. When the feedback control means applies the current of the target current value, not only the torque ripple caused by the high-order components but also the torque ripple caused by the distorted magnetic field formed in the electric motor may be suppressed. Thus, the steering feeling may be prevented from being degraded by these ripples.

It is preferred that the above electric power steering system further comprises: a current control system including the electric motor and the feedback control means; rotational-speed detecting means for detecting a rotational speed of the electric motor based on the rotational position information; and gain compensation calculating means for determining a gain compensation value for compensating for gain decrease dependant upon a frequency characteristic of the current control system, the compensation value determined based on the rotational speed of the electric motor supplied from the rotational-speed detecting means, and is characterized in that the correcting means corrects the decided target current value by using the compensation value supplied from the torque-ripple compensation deciding means and the gain compensation value supplied from the gain compensation calculating means.

In this case, the feedback control means provides the feedback control of the electric motor based on the target current value corrected with the compensation value supplied from the torque-ripple compensation deciding means and the gain compensation value supplied from the gain compensation calculating means. Hence, the control means is capable of compensating for the decreased gain of the current through the motor according to the frequency characteristic of the current control system. The current gain is decreased more as the rotational speed of the motor is increased. Thus, the control means may prevent the steering feeling from being degraded in conjunction with the gain decrease.

Furthermore, the above electric power steering system may further comprise phase compensation calculating means for determining a phase compensation value for compensating for phase delay dependant upon the frequency characteristic of the current control system, the phase compensation value determined based on the rotational speed of the electric motor supplied from the rotational-speed detecting means, and is characterized in that the correcting means corrects the decided target current value by using the compensation value supplied from the torque-ripple compensation deciding means, the gain compensation value supplied from the gain compensation calculating means and the phase compensation value supplied from the phase compensation calculating means.

In this case, the feedback control means provides the feedback control of the electric motor based on the target current value corrected with the compensation value supplied from the torque-ripple compensation deciding means, the gain compensation value supplied from the gain compensation calculating means and the phase compensation value supplied from the phase compensation calculating means. Hence, the control means is capable of compensating for the phase delay of the current through the motor according to the frequency characteristic of the current control system. The current phase is more delayed relative to induced voltage as the rotational speed of the motor is increased. Thus, the steering system may prevent the steering feeling from being degraded in conjunction with the phase delay.

[5.1.2 Constitution of Electric Motor and Overview of Drive Control thereof]

Figure 26:
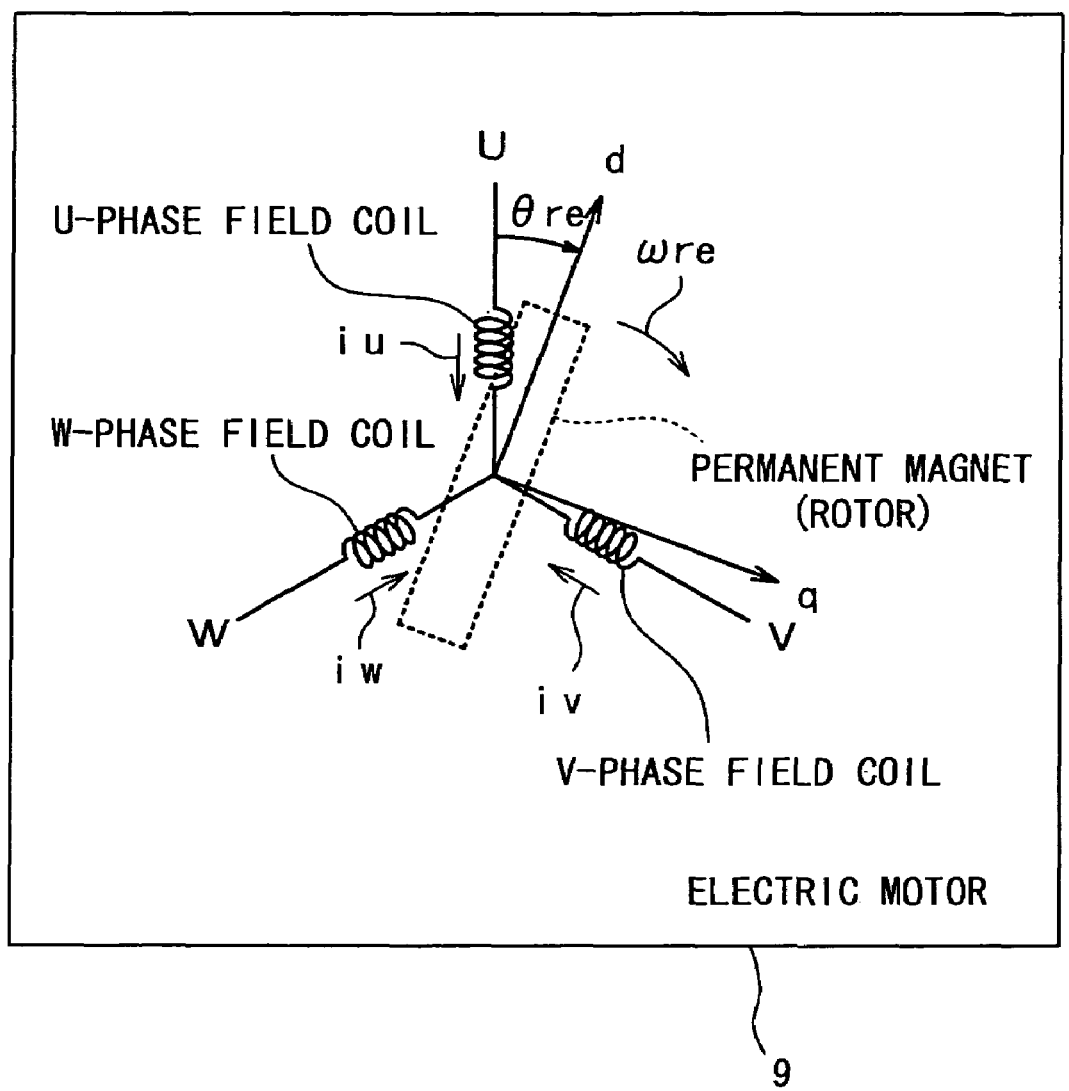
FIG. 26 is a diagram showing a relation between three-phase-AC coordinates and d-q coordinates of an electric motor.

Referring to FIG. 26, the electric motor 9 is constituted by a three-phase star-wired brushless motor of sinusoidal drive system, which includes a rotor having, for example, a permanent magnet and U-phase, V-phase and W-phase field coils (stator windings).

In order for the motor 9 to generate a required steering assist force, the respective phase field coils are supplied with the respective phase currents of individual target values. That is, individual current command values i*u, i*v and i*w for the respective phase field coils are represented by the following equations (41) to (43), provided that I* denotes the maximum value (amplitude) of the supply current.

$$i^*u = I^* \times \sin\theta re \quad (41)$$

$$i^*v = I^* \times \sin(\theta re - 2\pi/3) \quad (42)$$

$$i^*w = I^* \times \sin(\theta re - 4\pi/3) = -i^*u - i^*v \quad (43),$$

where θre denotes the rotational angle (electrical angle) of the permanent magnet (rotor) in positive rotation in clockwise direction with respect to, for example, the U-phase filed coil, as shown in the figure. This electrical angle constitutes information indicating a rotational position of the rotor and is expressed as θre=(p/2)×θm, where θm denotes the mechanical angle indicating the actual rotational angle of the rotor, and p denotes the number of poles of the rotor. Hereinafter, the term "angle" means the electrical angle unless otherwise stated.

The electric motor 9 is subjected to the feedback control provided by a feedback controller 400 which is described hereinlater and is included in the aforesaid ECU 105. This feedback control uses the d-q coordinates. Specifically, the d-q coordinates define the direction of magnetic flux from the permanent magnet as the d-axis, and a direction perpendicular to the d-axis as the q-axis. The d-q coordinates constitute a rotating coordinate system which rotates in synchronism with the rotation of the above magnet (revolving magnetic field). When deciding a command value of voltage applied to the electric motor 9, the ECU 105 first converts the respective current command values i*u, i*v, i*w of the phase field coils, as represented by the above equations (41) to (43), to a d-axis current command value i*d and a q-axis current command value i*q which are represented by the following equations (44) and (45), respectively. Then, the ECU decides the above command value of application voltage based on the current command values i*d and i*q so converted in terms of the d-q coordinates. By converting the respective current command values i*u, i*v, i*w on three-phase-AC coordinates (rest frame) to the current command values i*d and i*q on the d-q coordinates in this manner, the ECU 105 is capable of controlling the supply current based on the AC-current quantity even when the motor 5 is rotated. Thus, the ECU 105 may provide a high-accuracy drive control of the motor 9 as reducing the phase delay and such, thereby facilitating the generation of the required steering assist force.

$$i^*d = 0 \quad (44),$$

$$i^*q = -\sqrt{(3/2)} \times I^* \quad (45).$$

The respective quantities of current actually flowing through the U-phase, V-phase and W-phase field coils of the electric motor 9 are determined as follows. The current detectors 181, 182 detect a U-phase current detection value iu and a V-phase current detection value iv. These detection values iu and iv are substituted in the following equations (46) and (47) for obtaining a d-axis current detection value id and a q-axis current detection value iq, which represent values converted based on the d-q coordinates. As will be specifically described hereinlater, the ECU 105 provides the feedback control based on the above d-axis current command value i*d and q-axis current command value i*q, and the d-axis current detection value id and q-axis current detection value iq.

$$id = \sqrt{2}\{iv \times \sin\theta re - iu \times \sin(\theta re - 2\pi/3)\} \quad (46)$$

$$iq = \sqrt{2}\{iv \times \cos\theta re - iu \times \cos(\theta re - 2\pi/3)\} \quad (47)$$

[5.1.3 Constitution and Operation of ECU]

FIG. 27 is a block diagram showing an example of a specific arrangement of the ECU 105. As shown in the figure, the ECU 105 includes various functions such as the phase compensating portion 213 which receives the torque signal Ts from the torque sensor 7.

A section enclosed by the broken line in FIG. 27 constitutes the feedback controller 400 for providing the feedback control of the electric motor 9. The motor position sensor 112 and a rotor-angle-position detector 235 constitute rotational-position information acquiring means for acquiring the rotational position information (electrical angle) of the electric motor 9.

A microcomputer constituting the motor controller 120 of the ECU is provided with a plurality of function blocks which perform predetermined computations required for the motor control by executing programs previously stored in a nonvolatile memory (not shown) incorporated in the microcomputer. As shown in FIG. 27, the microcomputer includes: a target current-value calculator 214; a rotational direction specifying portion 215; a convergence correcting portion 216; an adder 217; a magnetic field distortion compensating portion 218; a high-order-current distortion compensating portion 219; a rotor angular-speed calculator 220; adders 221, 222; subtracters 223, 224; a d-axis current PI controller 225; a q-axis current PI controller 226; a d-q/three-phase-AC coordinates converter 227; a sign inversion adder 228; a three-phase-AC/d-q coordinates converter 229 and a sinusoidal ROM table 230. Thus, the microcomputer constitutes the motor controller which decides a required steering assist force based on the input signals such as the vehicle speed signal Vs from the vehicle speed sensor 104 and then, applies an output signal (command) corresponding to the decided steering assist force to the motor driver.

The motor controller 120 is provided with a torque-ripple compensation deciding portion 301 which includes the above magnetic field distortion compensating portion 218 and high-order-current distortion compensating portion 219. A calculation result given by the compensation deciding portion 301 is reflected in the command signal inputted to the motor driver, whereby the torque ripple caused by a distorted magnetic field formed in the electric motor 9 and the torque ripple caused by the high-order components of the current through the motor 9 are reduced, as will be specifically described hereinlater. Furthermore, the rotor angular-speed calculator 220 constitutes the rotational-speed detecting means for detecting a rotational speed of the electric motor 9 based on the rotational position information supplied from the above rotational-position information acquiring means.

When the torque sensor 7 applies the torque detection signal Ts to the ECU 105 constituted as described above, the phase compensator 213 compensates for the phase of the input torque detection signal Ts and outputs the resultant signal to the target current-value calculator 214. The ECU 105 also receives the vehicle speed signal Vs, which is outputted from the vehicle speed sensor 104 in a predetermined sampling cycle. The input vehicle speed signal Vs is applied to the target current-value calculator 214 and the convergence correcting portion 216. When a sensor signal Sr from the position sensor 112 is inputted to the rotor angular-position detector 235 of the ECU 105, the rotor angular-position detector 235 detects a rotational position of the permanent magnet (rotor) of the electric motor 9, or the aforesaid electrical angle θre, based on the input sensor signal Sr. Then, the rotor angular-position detector 235 outputs an angle signal indicative of the detected electrical angle θre to the magnetic field distortion compensating portion 218, the high-order-current distortion compensating portion 219, the rotor angular-speed calculator 220 and the sinusoidal ROM table 230.

The target current-value calculator 214 decides a target current value It based on the phase compensated torque detection signal Ts and the vehicle speed signal vs, the target current value indicating a value of current to be supplied to the electric motor 5. More specifically, the calculator 214 previously stores a table called an assist map, which correlates the torque as determined at the steering shaft 2, the aforesaid target current value It for generating the required steering assist force according to the torque, and the vehicle speed. The calculator 214 refers the individual values of the torque detection signal Ts and the vehicle speed signal Vs, as input parameters, to the above table, thereby acquiring the target current value It, which is outputted to the rotational direction specifying portion 215 and the adder 217.

The target current value It is equivalent to the q-axis current command value i*q represented by the aforesaid equation (45) and has a sign indicating a direction of the assist force based on the motor power. That is, the sign of the target current value It specifies the rotational direction of the motor rotor. For instance, a positive sign or a negative sign directs the electric motor 9 to be so rotated as to assist a rightward steering or a leftward steering of the steering member 1.

The rotational direction specifying portion 215 determines on the rotational direction of the rotor based on the sign of the target current value It inputted from the target current-value calculator 214 and then, generates a direction signal Sdir indicating the rotational direction of the rotor. The resultant signal is outputted to the convergence correcting portion 216. The convergence correcting portion 216 receives the vehicle speed signal Vs, the direction signal Sdir and a rotor angular speed ωre which is calculated by the rotor angular-speed calculator 220 based on the electrical angle θre inputted from the rotor angular-position detector 235. The correcting portion 216 performs a predetermined calculation using these input signals, so as to determine a compensation current value ic for ensuring a convergence performance of the vehicle. The adder 217 adds the compensation current value ic to the target current value It and outputs the resultant sum as a q-axis fundamental-current command value i*q0.

The above q-axis fundamental-current command value i*q0 represents a fundamental command value (target current value) of the supply current corresponding to a motor load (which is, a torque to be generated by the electric motor 9) for generating the required steering assist force. This command value is applied to the magnetic field distortion compensating portion 218 and high-order-current distortion compensating portion 219 of the torque-ripple compensation decision portion 301 at a time. Furthermore, this command value is also outputted to the adder 222 which adds this command value so as to reflect the calculation results obtained by the magnetic field distortion compensating portion 218 and high-order-current distortion compensating portion 219.

On the other hand, a d-axis directed current is not involved in the torque and hence, a d-axis fundamental-current command value i*d0 representing a fundamental command value of d-axis current has a value "0". Thus, the command value is set as i*d0=0 and inputted in the adder 221.

The magnetic field distortion compensating portion 218 uses the electrical angle θre as the information indicating the rotational position of the electric motor 9 and supplied from the rotor angular-position detector 235 and the q-axis fundamental-current command value i*q0 supplied from the adder 217, thereby deciding a magnetic-field-distortion compensation value for suppressing the torque ripple caused by the distorted magnetic field formed in the motor 9. Specifically, when a current of a value specified by the q-axis fundamental-current command value i*q0 is supplied to the individual phase field coils of the electric motor 9, the field distortion compensating portion 218 estimates the torque ripple appearing in the motor output torque due to distorted waveforms of induced electromotive forces in the individual phase field coils (the distorted magnetic field in the motor 9) relative to the idealistic waveform. Then, the distortion compensating portion calculates a current compensation value for each of the d-axis current and the q-axis current, such as to change the q-axis fundamental-current command value i*q0 to reduce the estimated torque ripple. Thus, the distortion compensating portion decides d-axis current compensation value Δid1 and q-axis current compensation value Δiq1 (the details of which will be described hereinlater). The magnetic field distortion compensating portion 218 outputs the resultant d-axis current compensation value Δid1 and q-axis current compensation value Δiq1 for magnetic field distortion compensation to the corresponding adders 221 and 222.

The d-axis current compensation value Δid1 and q-axis current compensation value Δiq1 outputted from the magnetic field distortion compensating portion 218 are so corrected as to minimize the gain decrease and the phase delay which depend upon the frequency characteristics of the current control system including the electric motor 9, as will be described hereinlater.

The high-order-current distortion compensating portion 219 uses the aforesaid electrical angle θre and q-axis fundamental-current command value i*q0 so as to decide a high-order-component compensation value for canceling the torque ripple caused by the high-order components of the current flowing through the motor 9. Specifically, the high-order-current distortion compensating portion 219 estimates the torque ripple caused by certain high-order components of the current flowing through the individual phase field coils when the current of the value specified by the q-axis fundamental-current command value i*q0 is supplied to the individual phase field coils of the electric motor 9. Then, the distortion compensating portion calculates a current compensation value for each of the d-axis current and the q-axis current, such as to change the q-axis fundamental-current command value i*q0 to cancel the estimated torque ripple. Thus, the distortion compensating portion decides d-axis current compensation value Δid2 and q-axis current compensation value Δiq2 (the details of which will be described hereinlater). The high-order-current distortion compensating portion 219 outputs the resultant d-axis current compensation value Δid2 and q-axis current compensation value Δiq2 for high-order component compensation to the corresponding adders 221 and 222.

The d-axis current compensation value Δid2 and q-axis current compensation value Δiq2 outputted from the high-order-current distortion compensating portion 219 are so corrected as to minimize the gain decrease and phase delay which depend upon the frequency characteristics of the current control system including the electric motor 9, as will be described hereinlater.

The above adders 221 and 222 each constitute correcting means which corrects the target current value of each corresponding d-axis current or q-axis current based on each corresponding d-axis current or q-axis current compensation value supplied from the torque-ripple compensation deciding portion 301, the target current value decided according to the operation of the steering member 1.

Specifically, the adder 221 calculates a sum of the d-axis fundamental-current command value i*d0 set therein, the d-axis current compensation value Δid1 for magnetic field distortion compensation supplied from the magnetic field distortion compensating portion 218 and the d-axis current compensation value Δid2 for high-order current compensation supplied from the high-order-current distortion compensating portion 219 as represented by the following equation (48), thereby determining the d-axis current command value i*d reflecting the calculation result supplied from the torque-ripple compensation deciding portion 301. Then, the adder 221 outputs the resultant d-axis current command value i*d to the subtracter 223 of the feedback controller 400.

On the other hand, the adder 222 calculates a sum of the q-axis fundamental-current command value i*q0 supplied from the adder 217, the q-axis current compensation value Δiq1 for magnetic field distortion compensation supplied from the magnetic field distortion compensating portion 218 and the q-axis current compensation value Δiq2 for high-order current compensation supplied from the high-order-current distortion compensating portion 219 as represented by the following equation (49), thereby determining the q-axis current command value i*q reflecting the calculation result supplied from the torque-ripple compensation deciding portion 301. Then, the adder 222 outputs the resultant q-axis current command value i*q to the subtracter 224 of the feedback controller 400.

$$i*d = i*d0 + \Delta id1 + \Delta id2 \quad (48)$$

$$i*q = i*q0 + \Delta iq1 + \Delta iq2 \quad (49)$$

In addition to the d-axis current command value i*d supplied from the adder 221, the subtracter 223 also receives the d-axis current detection value id from the three-phase-AC/d-q coordinates converter 229, the detection value obtained by converting the current actually supplied to the electric motor 9 into the d-axis current. Likewise, in addition to the q-axis current command value i*q supplied from the adder 222, the subtracter 224 also receives the q-axis current detection value iq from the three-phase-AC/d-q coordinates converter 229, the detection value obtained by converting the current actually supplied to the electric motor 9 into the q-axis current.

More specifically, the V-phase current detection value iv and U-phase current detection value iu obtained by the respective V-phase current detector 182 and U-phase current detector 181 are inputted to the three-phase-AC/d-q coordinates converter 229 via a detected current-value correcting portion 250 (the details of which will be described hereinlater). Furthermore, the converter 229 also receives a sin-value of the electrical angle θre from the sinusoidal ROM table 230, the electrical angle θre determined when the above detection current is allowed to flow. The sinusoidal ROM table 230 stores the angle θ and the sin-value of the angle θ as correlating these parameters with each other. At receipt of the electrical angle θre from the rotor angular-position detector 235, therefore, the ROM table immediately outputs the sin-value thereof to the d-q/three-phase-AC coordinates converter 227 and the three-phase-AC/d-q coordinates converter 229.

Using the U-phase current detection value iu, the V-phase current detection value iv and the sin-value so inputted and the aforementioned equations (46) and (47), the three-phase-AC/d-q coordinates converter 229 calculates the aforesaid d-axis current detection value id (=√2{iv×sin θre−iu×sin(θre−2π/3)} and the q-axis current detection value iq (=√2{iv×cos θre−iu×cos (θre−2π/3)} and then, outputs the calculation results to the respectively corresponding subtracters 223, 224.

The subtracter 223 subtracts the input d-axis current detection value id from the d-axis current command value i*d, so as to determine a d-axis current deviation ed (=i*d-id) which is a difference between these input values. Likewise, the subtracter 224 subtracts the input q-axis current detection value iq from the q-axis current command value i*q, so as to determine a q-axis current deviation eq (=i*q−iq) which is a difference between these input values. These subtracters 223, 224 output the resultant d-axis current deviation ed and q-axis current deviation eq to the d-axis current PI controller 225 and the q-axis current PI controller 226, respectively.

The d-axis current PI controller 225 and q-axis current PI controller 226 substitute the d-axis current deviation ed and q-axis current deviation eq, supplied from the respectively corresponding subtracters 223, 224, in the following equations (50) and (51), respectively, thereby calculating respective d-axis voltage command value v*d and q-axis voltage command value v*q. Then, the controllers output the calculation results to the d-q/three-phase-AC coordinates converter 227.

$$v^*d = K_p\{ed + (1/Ti)\int(ed)dt\} \quad (50)$$

$$v^*q = K_p\{eq + (1/Ti)\int(eq)dt\} \quad (51),$$

where Kp and Ti denote the proportional gain and the integration time, respectively. These values are previously set in the d-axis current PI controller 225 and q-axis current PI controller 226 according to motor characteristics and the like.

Inputted to the d-q/three-phase-AC coordinates converter 227 are a decoupled d-axis voltage command value v*d from the d-axis current PI controller 225, a decoupled q-axis voltage command value v*q from the q-axis current PI controller 226 and the sin-value from the sinusoidal ROM table 230. This converter 27 uses the following equations (52) and (53) for converting the above d-axis voltage command value v*d and q-axis voltage command value v*q, as application voltage command values on the d-q coordinates, to U-phase voltage command value v*u and V-phase voltage command value v*v, as application voltage command values on the three-phase-AC coordinates. Then, the converter outputs the converted values to the above three-phase PWM signal generating circuit 140 (three-phase PWM modulator circuit). The output values from this converter 227 are also inputted to the sign inversion adder 228. The sign inversion adder 228 uses the following equation (54) for determining a W-phase voltage command value v w from the above U-phase voltage command value v*u and V-phase voltage command value v*v. Then, the adder outputs the resultant value to the three-phase PWM signal generating circuit 140.

$$v^*u = \sqrt{(2/3)}\{v^*d \times \cos\theta re - v^*q \times \sin\theta re\} \quad (52)$$

$$v^*v = \sqrt{(2/3)}\{v^*d \times \cos(\theta re - 2\pi/3) - v^*q \times \sin(\theta re - 2\pi/3)\} \quad (53)$$

$$v^*w = -v^*u - v^*v \quad (54)$$

The three-phase PWM signal generating circuit 140 generates PWM signals Su, Sv and Sw which individually have duty ratios corresponding to the respective U-phase voltage command value v* u, V-phase voltage command value v*v and W-phase voltage command value v*w and then, outputs the resultant signals to the motor drive circuit 150.

The motor drive circuit 150 includes a PWM voltage inverter possessing a bridge circuit employing power switching devices such as MOSFETs. The circuit turns ON/OFF the individual switching devices according to the above PWM signals Su, Sv and Sw, thereby applying the voltage from the battery 180 to the respective U-phase, V-phase and W-phase field coils (FIG. 26) of the electric motor 9. Thus, the current flows through the individual phase field coils of the electric motor 9 so that the motor 9 generates a torque Tm according to the current. The torque, as the steering assist force, is applied to the aforesaid steering mechanism. When the electric motor 9 is driven in this manner, the feedback controller 400 provides the feedback control of the motor 9 such as to equalize the above d-axis current detection value id and q-axis current detection value iq to the d-axis current command value i*d and q-axis current command value i*q. Thus is provided the steering assist based on the required steering assist force.

[5.1.4 Constitution and Frequency Characteristics of Current Control System]

Figure 30:
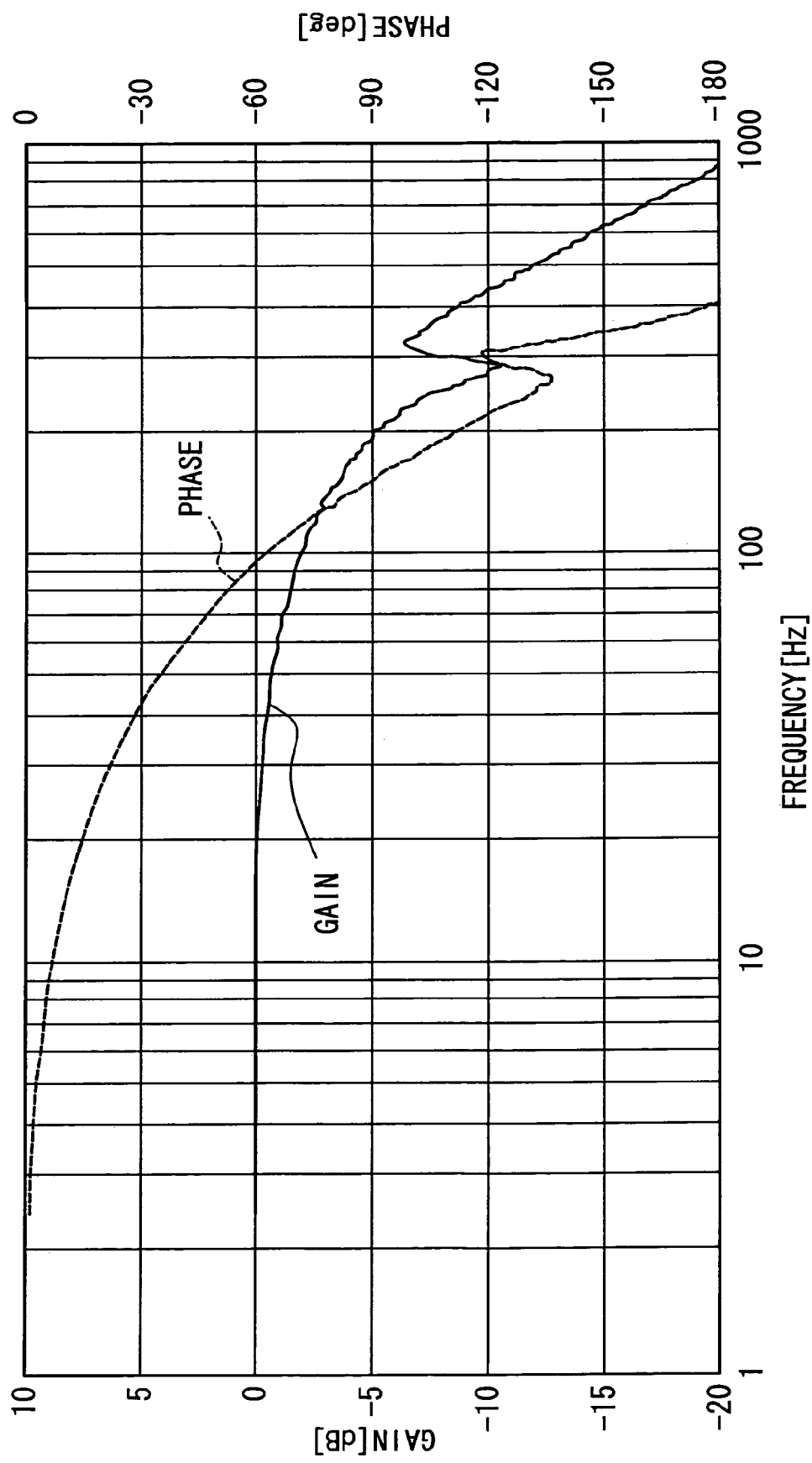
FIG. 30 is a Bode diagram showing specific characteristics of a current control system shown in FIG. 27.

According to the embodiment, as shown in FIG. 27, the above feedback controller 400, the electric motor 9 as the control subject thereof and the motor position sensor 112 constitute the current control system having a feedback loop. This current control system has the frequency characteristics defined by impedances of the coils disposed in the motor 9, and the like. The current control system has a d-axis current feedback loop which receives the d-axis current command value i*d and outputs the d-axis current detection value id, and a q-axis current feedback loop which receives the q-axis current command value i*q and outputs the q-axis current detection value iq. In a case where these loops are both closed loops, the system has a transfer function represented by a Bode diagram shown in FIG. 30, for example. Thus, in this current control system, as indicated by the solid line in FIG. 30, the gain is decreased from 1 (dB=0) as the frequency is increased in a practical frequency range. On the other hand, the phase delay is increased as the frequency is increased, as indicated by the broken line in the figure. The following approach is taken to reduce the influences of such frequency characteristics of the current control system. The data represented by the solid line and broken line in FIG. 30 are tabulated as a frequency characteristic map to be described hereinlater, which is stored in the magnetic field distortion compensating portion 218 and the high-order-current distortion compensating portion 219 of the torque-ripple compensation deciding portion 301. The compensation values outputted from the respective compensating portions are so corrected as to minimize the gain decrease and the phase delay dependant upon the frequency characteristics of the system.

[5.1.5 Constitution and Operations of Magnetic Field Distortion Compensating Portion]

Figure 28:
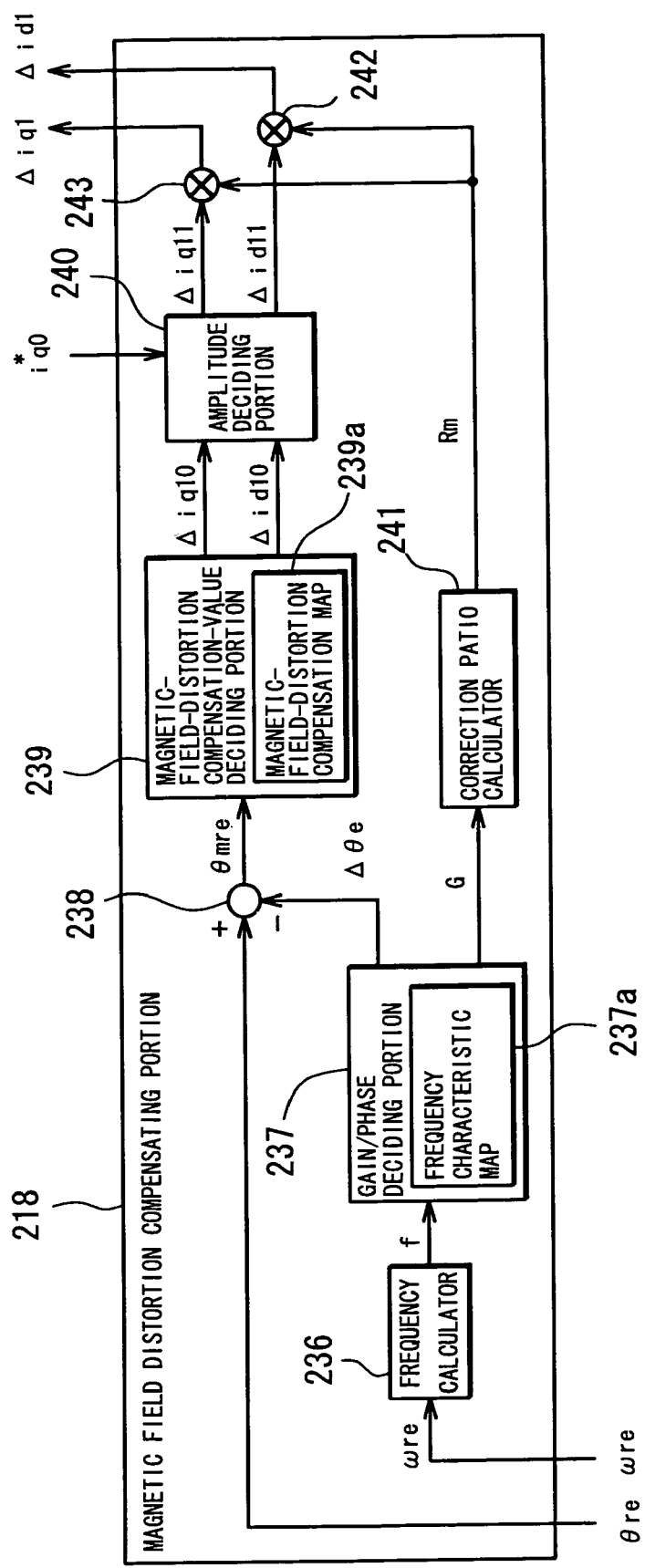
FIG. 28 is a block diagram showing a specific example of an arrangement of a magnetic field distortion compensating portion shown in FIG. 27.

FIG. 28 is a block diagram showing a specific example of an arrangement of the magnetic field distortion compensating portion shown in FIG. 27. As shown in the figure, the magnetic field distortion compensating portion 218 is provided with function blocks which include a frequency calculator 236, a gain/phase deciding portion 237, a subtracter 238, a magnetic-field-distortion compensation-value deciding portion 239, an amplitude deciding portion 240, a correction ratio calculator 241 and multipliers 242, 243. The microcomputer executes the programs thereby causing the individual blocks to perform predetermined computations. The above frequency calculator 236, gain/phase deciding portion 237 and correction ratio calculator 241 constitute gain compensation calculating means which uses the rotational speed of the electric motor 9 (FIG. 27) for determining a gain compensation value for compensating for the gain decrease dependent upon the frequency characteristic of the current control system. Furthermore, the frequency calculator 236 and the gain/phase deciding portion 237 also serve as phase compensation calculating means which uses the rotational speed of the motor 9 for determining a phase compensation value for compensating for the phase delay dependant upon the frequency characteristic of the current control system.

Specifically, the frequency calculator 236 receives from the rotor angular-speed calculator 220 the rotor angular speed core which is the rotational angular speed equivalent of the electrical angle of the electric motor 9. The frequency calculator 236 substitutes the input rotor angular speed ωre in the following equation (55), thereby determining a frequency f of the torque ripple caused by the magnetic field distortion appearing in the motor output. The frequency f is also a fundamental frequency of the torque ripple caused by the distorted high-order current components.

$$f = S \times \omega re/(2\pi) \tag{55},$$

where S represents the number of slots in the electric motor 5.

The above gain/phase deciding portion 237 stores a frequency characteristic map 237a corresponding to the frequency characteristics of the current control system represented by the Bode diagram (FIG. 30) (that is, the data indicating the relations of the frequency with the gain and the phase as indicated by the solid line and broken line in FIG. 30). When receiving the frequency f from the frequency calculator 236, the gain/phase deciding portion 237 refers to the frequency characteristic map 237a to determine a gain G and a phase difference Δθe of the current control system in correspondence to the input frequency f. The deciding portion 237 outputs the respective values to the correction ratio calculator 241 and the subtracter 238. In the current control system, as described above, with the increase of the frequency (namely, the increase of the rotor angular speed ore or the rotational speed of the electric motor 9), the gain is decreased from 1 while the phase delay is increased.

The subtracter 238 receives the electrical angle ere from the rotor angular-position detector 235 (FIG. 27) and the phase difference Δθe, as the phase compensation value, from the gain/phase deciding portion 237, so as to subtract the phase difference Δθe from the electrical angle θre. The subtracter 238 outputs a corrected electrical angle θmre (=θre−Δθe), as the subtraction result, to the magnetic-field-distortion compensation-value deciding portion 239. In this manner, the subtracter 238 corrects the detected electrical angle θre with the phase difference Δθe, thereby compensating for the phase delay dependent upon the frequency characteristic of the current control system.

The magnetic-field-distortion compensation-value deciding portion 239 stores a magnetic field distortion compensation map 239a which tabulates relations of the above electrical angle with the respective values of field-distortion-compensation components of the d-axis current and q-axis current. The magnetic-compensation-value deciding portion 239 refers to the magnetic field distortion compensation map 239a thereby determining a d-axis-current unit compensation value Δid10 for magnetic field distortion compensation and a q-axis-current unit compensation value Δiq10 for magnetic field distortion compensation, which values correspond to the corrected electrical angle θmre inputted thereto.

A detailed description is made as below on a method of preparing the magnetic field distortion compensation map 239a. If sinusoidal currents iu, iv, iw are supplied to the respective phase field coils in a case where a distorted magnetic field is formed in the electric motor 9 under no-load operation or where the induced electromotive force under no-load has a distorted waveform relative to the idealistic waveform, the motor output sustains the torque ripple caused by the distorted magnetic field. If instantaneous values e0u, e0v, e0w of the no-load induced electromotive force as determined at the respective phase field coils are known, it is possible to decide current values i0u, i0v, i0w of the respective phase field coils such as to provide a constant output torque from the motor 5 (e.g., 1[Nm]) and to obviate the torque ripple resulting from the distorted magnetic field. Provided that the output torque is at a fixed value T, for example, such currents i0u, i0v, i0w of the individual phase field coils may be calculated based on the following equations (56), (57) and (58), respectively:

$$i0u = \left\{ \begin{array}{c} (e0u - e0v) + \\ (e0u - e0w) \end{array} \right\} \times T \left/ \left\{ \begin{array}{c} (e0u - e0v)^2 + \\ (e0u - e0w)^2 + (e0u - e0v)^2 \end{array} \right\} \right. \tag{56}$$

$$i0v = \{T - (e0u - e0w) \times iu\}/(e0v - e0w) \tag{57}$$

$$i0w = \{T - (e0u - e0v) \times iu\}/(e0w - e0v) \tag{58}$$

The currents i0u, i0v, i0w of the respective phase field coils, as calculated based on the above equations (56) to (58), may be converted to respective values on the d-q coordinates by using the following equations (59) and (60) having the electrical angle θ as a variable. Thus are obtained a d-axis current value i0d and a q-axis current value i0q, which may provide a constant value T of the output torque, as obviating the torque ripple resulting from the distorted magnetic field:

$$i0d = \sqrt{2}\{i0v \times \sin\theta - i0u \times \sin(\theta - 2\pi/3)\} \tag{59}$$

$$i0q = \sqrt{2}\{i0v \times \cos\theta - i0u \times \cos(\theta - 2\pi/3)\} \tag{60}$$

Since it is possible to calculate the d-axis current value i0d and the q-axis current value i0q, as described above, the magnetic field distortion compensation map 239a may be prepared as follows.

Figure 31:
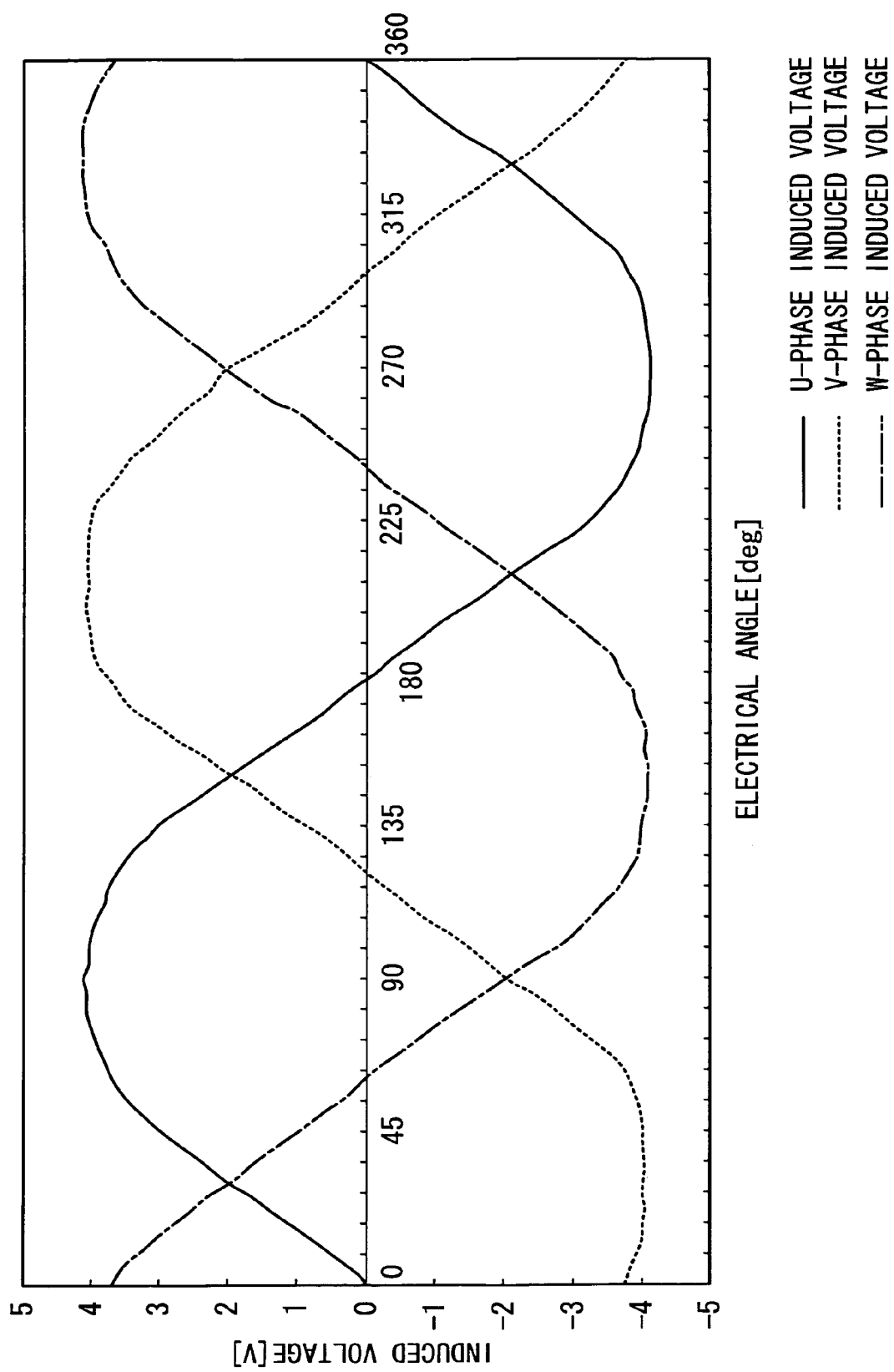
FIG. 31 is a waveform chart showing a specific example of measurement data on no-load induced electromotive force (induced voltage) of the electric motor.
Figure 32:
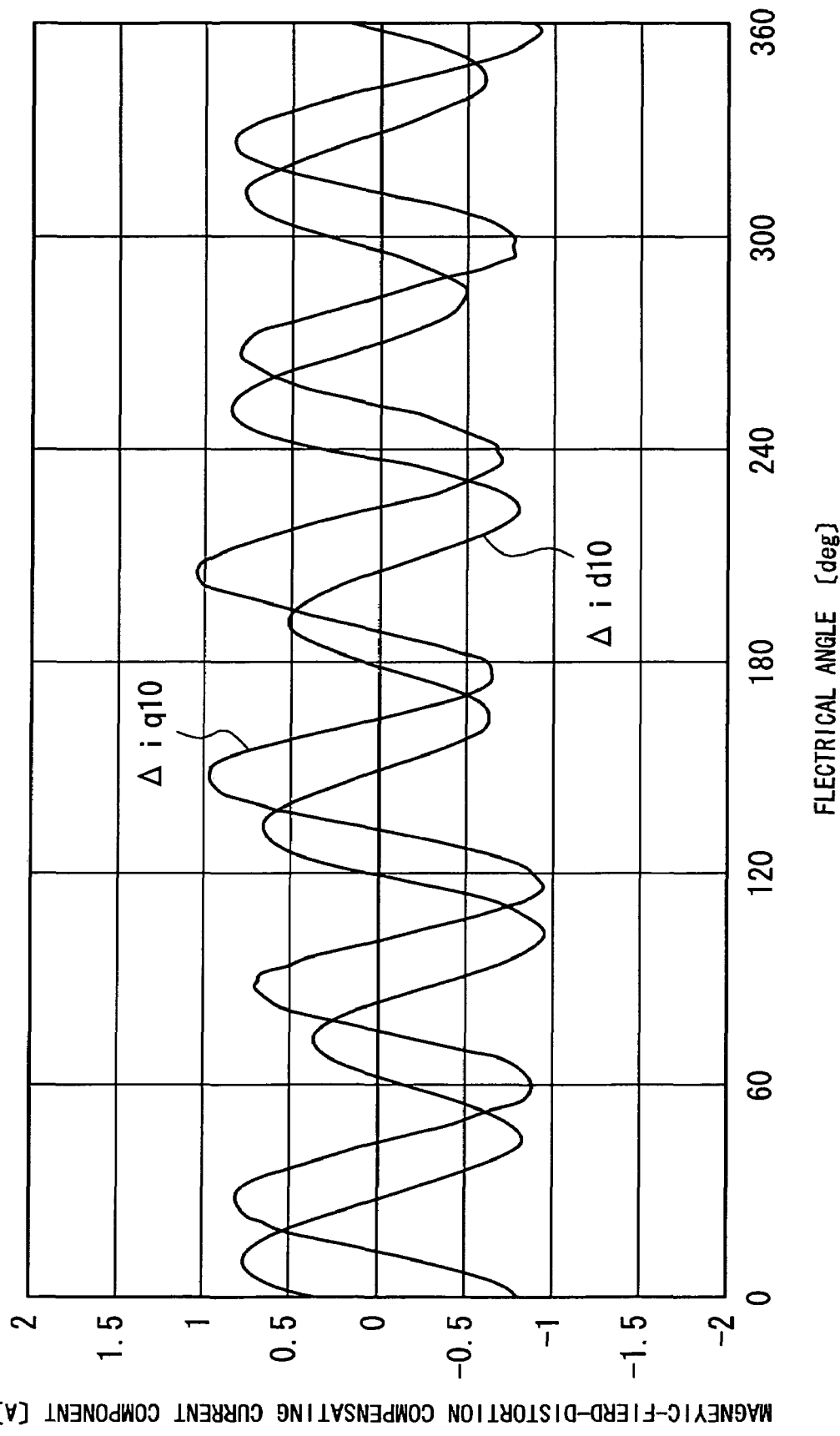
FIG. 32 is a waveform chart showing a specific waveform of a magnetic-field-distortion compensating current element decided by the above magnetic field distortion compensating portion.
Figure 33:
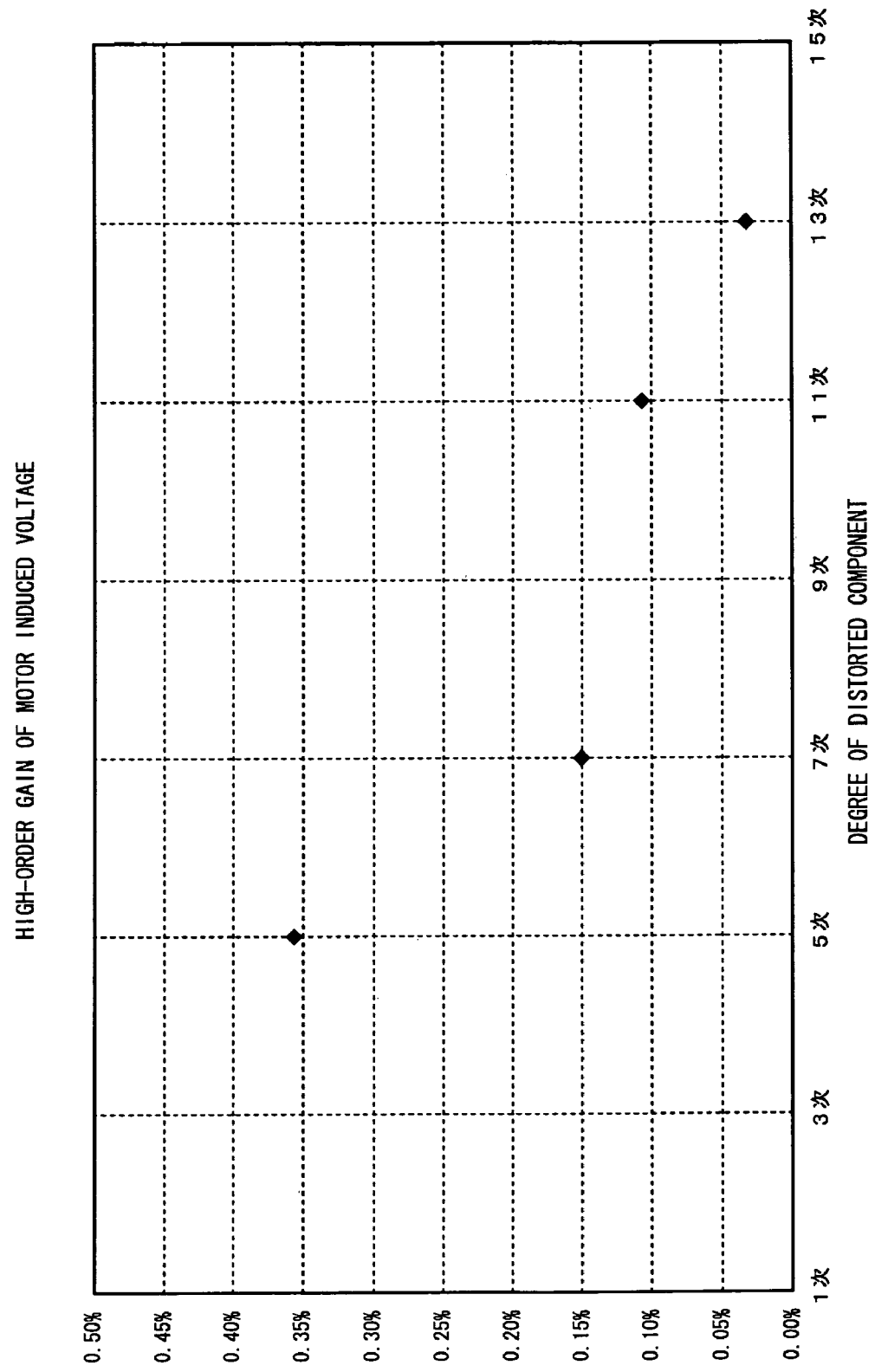
FIG. 33 is a graph showing a measurement example of ratios of high-order components to a first-order component, the components contained in an induced voltage of the above electric motor.

First, as shown in FIG. 31, experimental data on the no-load induced electromotive forces (induced voltages) at the respective phase field coils of the electric motor 9 are acquired by taking measurements on the instantaneous values e0u, e0v, e0w thereof at each of the varied electrical angles of the motor 9. A d-axis current value i0d1 and a q-axis current value i0q1 are determined by using the experimental data and the above equations (56) to (60), the values required for permitting the motor 9 to output a unit torque (1[Nm]) without inducing the torque ripple from the distorted magnetic field formed therein. Further determined are a d-axis current value i0d2 and a q-axis current value i0q2 required for permitting the motor 9 to output the above unit torque in a case where the no-load induced electromotive force has a distortion-free waveform (in this case, the d-axis current value i0d2 and q-axis current value i0q2 are easily determined by applying the respective experimental data items to the predetermined calculations because the output torque is proportional to the q-axis current, whereas the d-axis current may be set to "0"). A difference between the d-axis current value i0d1 and the d-axis current value i0d2 is determined for each value of the electrical angle, thereby obtaining the aforesaid d-axis-current unit compensation value Δid10 (=i0d1−i0d2). On the other hand, a difference between the q-axis current value i0q1 and the q-axis current value i0q2 is determined for each value of the electrical angle, thereby obtaining the aforesaid q-axis-current unit compensation value Δiq10 (=i0q1−i0q2). Then, the electrical angles may be correlated with the d-axis current unit compensation values Δid10 and with the q-axis-current unit compensation values Δiq10. As shown in FIG. 32, for example, there may be obtained each current waveform showing the electrical angle and the value of the magnetic-field-distortion compensating current component converted to the d-axis current component or the q-axis current component corresponding to the electrical angle. The magnetic-field-distortion compensating current component is a current component which is capable of suppressing the distortion of the magnetic field. A table correlating these data items may be obtained as the magnetic field distortion compensation map 239a.

The magnetic-field-distortion compensation-value deciding portion 239 refers to the magnetic field distortion compensation map 239a prepared as described above, thereby determining the d-axis-current unit compensation value $\Delta id10$ and the q-axis-current unit compensation value $\Delta iq10$ corresponding to the corrected electrical angle θmre inputted from the subtracter 238. Then, the deciding portion 239 outputs the resultant values to the amplitude deciding portion 240.

In addition to the d-axis current unit compensation value $\Delta id10$ and the q-axis current unit compensation value $\Delta iq10$ supplied from the magnetic-field-distortion compensation-value deciding portion 239, the q-axis fundamental-current command value i*q0, equivalent to the required steering assist force, from the adder 217 (FIG. 27) is also inputted to the amplitude deciding portion 240. The amplitude deciding portion 240 multiplies the respective d-axis-current unit compensation value $\Delta id10$ and q-axis-current unit compensation value $\Delta iq10$ per unit torque by the q-axis fundamental-current command value i*q0 so inputted, thereby determining a d-axis current compensation value $\Delta id11$ and a q-axis current compensation value $\Delta iq11$ individually corresponding to the above required steering assist force. The amplitude deciding portion 240 outputs the resultant d-axis current compensation value $\Delta id11$ and q-axis current compensation value $\Delta iq11$ to the respective multipliers 242, 243

The aforesaid correction ratio calculator 241 receives the gain G of the current control system, which is decided by the gain/phase deciding portion 237. The correction ratio calculator 241 calculates an inverse 1/G of the gain G so as to obtain a correction ratio Rm as the aforesaid gain compensation value. Then, the correction ratio calculator 241 outputs the correction ratio Rm to the multipliers 242, 243.

The multiplier 242 multiplies the d-axis current compensation value $\Delta id11$ supplied from the amplitude deciding portion 240 by the correction ratio Rm supplied from the correction ratio calculator 241, thereby determining the d-axis current compensation value $\Delta id1$ for magnetic-field-distortion compensation. Then, the multiplier outputs the compensation value to the adder 221 (FIG. 27). Likewise, the multiplier 243 multiplies the q-axis current compensation value $\Delta iq11$ supplied from the amplitude deciding portion 240 by the correction ratio Rm supplied from the correction ratio calculator 41, thereby determining the q-axis current compensation value $\Delta iq1$ for magnetic-field-distortion compensation. Then, the multiplier outputs the compensation value to the adder 222 (FIG. 27). In this manner, the multipliers 242, and 243 correct the d-axis current compensation value $\Delta id11$ and the q-axis current compensation value $\Delta iq11$ with the correction ratio Rm, thereby compensating for the gain decrease dependant upon the frequency characteristics of the current control system.

[5.1.6 Constitution and Operations of High-Order-Current Distortion Compensating Portion]

Figure 29:
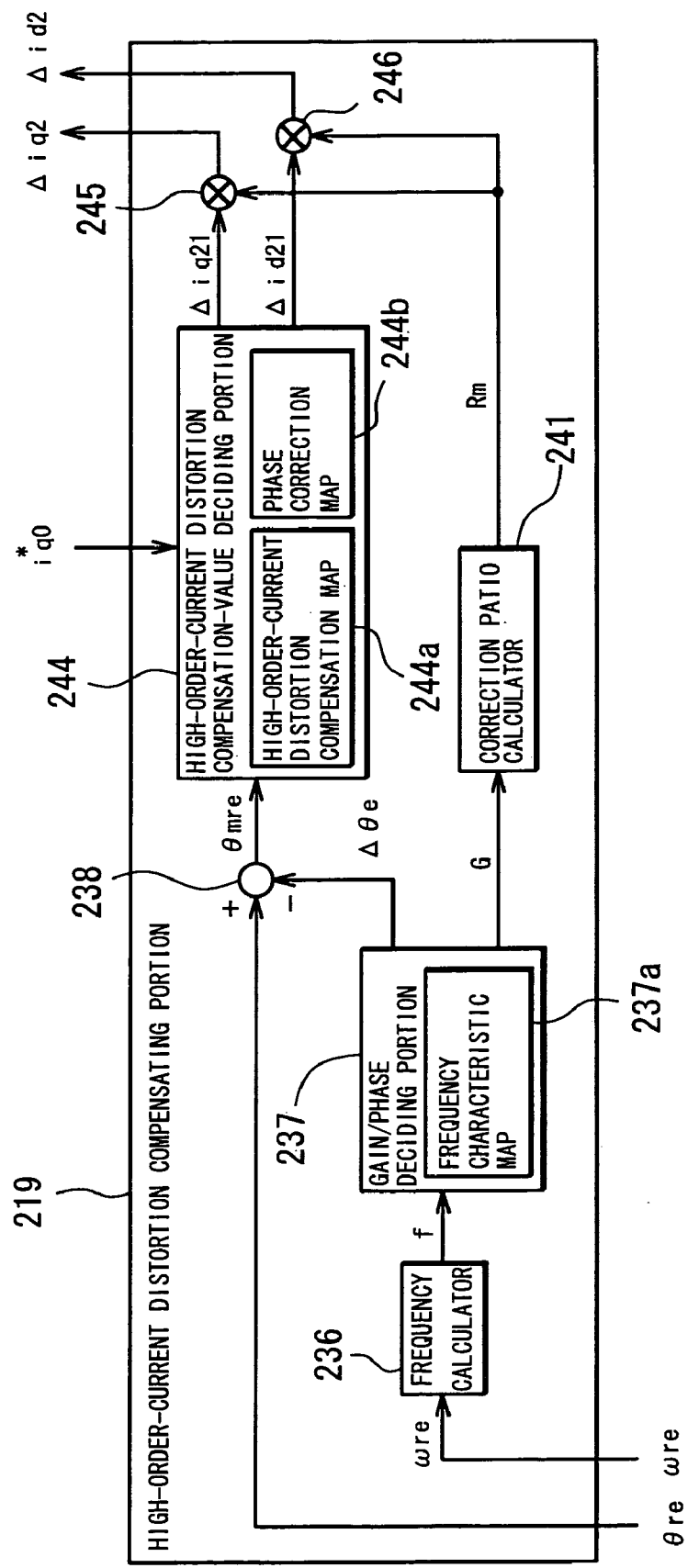
FIG. 29 is a block diagram showing a specific example of an arrangement of a high-order-current distortion compensating portion shown in FIG. 27.

FIG. 29 is a block diagram showing a specific example of an arrangement of the high-order-current distortion compensating portion shown in FIG. 27. As shown in the figure, the high-order-current distortion compensating portion 219 is provided with function blocks including the frequency calculator 236, the gain/phase deciding portion 237, the subtracter 238, the correction ratio calculator 241, a high-order-current distortion compensation-value deciding portion 244 and multipliers 245, 246. The microcomputer executes programs thereby causing the individual blocks to perform predetermined computations. Out of these function blocks, the frequency calculator 236, the gain/phase deciding portion 237, the subtracter 238 and the correction ratio calculator 241 are constituted to perform the same computations as those of the magnetic field distortion compensating portion 218. That is, these function blocks are adapted to calculate a phase compensation value $\Delta\theta e$ and a gain compensation value Rm for compensating for the phase delay and the gain decrease which are dependant upon the frequency characteristics of the current control system.

The high-order-current distortion compensation-value deciding portion 244 stores a high-order-current distortion compensation map 244a and a phase correction map 244b. The high-order-current distortion compensation map 244a tabulates a relation between the q-axis fundamental-current command value i*q0 and the gain of each of predetermined high-order components relative to the first-order component, the high-order components including, for example, the fifth-order, seventh-order, eleventh-order and thirteenth-order components. The phase correction map 244b tabulates a relation between each of the above high-order components and the correction value for compensating for its phase delay relative to that of the first-order component. When supplied with the corrected electrical angle θmre from the subtracter 28 and the q-axis fundamental-current command value i*q0 from the adder 217 (FIG. 27), the high-order-current distortion compensation-value deciding portion 244 refers to the high-order-current distortion compensation map 244a and the phase correction map 244b, thereby determining a d-axis-current fundamental compensation value $\Delta id21$ and a q-axis-current fundamental compensation value $\Delta iq21$ for high-order current distortion compensation.

A detailed description is made as below on a method of preparing the high-order-current distortion compensation map 244a and the phase correction map 244b. In the electric motor 9, the motor drive circuit 150 (FIG. 27) applies a sinusoidal alternating current to the individual phase field coils by chopping a direct current from the battery 180. Furthermore, the motor drive circuit 150 drives the switching devices constituting the bridge circuit therein as interposing a minor dead time such as to prevent the switching devices from shorting with one another. Because of these factors and the like, the currents flowing through the individual phase field coils contain higher harmonic content, such as the fifth-order, the seventh-order, the eleventh-order and the thirteenth-order harmonics, superimposed on the sinusoidal current component (fundamental harmonic). Therefore, the following procedure may be adopted. Experimental data on the currents flowing through the respective phase field coils are previously acquired, while measurement is taken on the respective values of the high-order components superimposed on the currents of the acquired values. Based on the measurement values of each of the high-order components, the adders 221, 222 may perform addition processes for determining the compensation value for each high-order component, as converted based on the d-q coordinates, in a manner to cancel the high-order current component. That is, the aforesaid d-axis-current fundamental compensation value $\Delta id21$ and q-axis-current fundamental compensation value $\Delta iq21$ may be divided into respective compensation values $\Delta id2\text{-}5$, $\Delta iq2\text{-}5$ for canceling the fifth-order component; respective compensation values $\Delta id2\text{-}7$, $\Delta iq2\text{-}7$ for canceling the seventh-order component;

respective compensation values $\Delta id2\text{-}11$, $\Delta iq2\text{-}11$ or canceling the eleventh-order component; and respective compensation values $\Delta id2\text{-}13$, $\Delta iq2\text{-}13$ for canceling the thirteenth-order component; as represented by the following equations (61) and (62).

$$\Delta id21 = id2\text{-}5 + \Delta id2\text{-}7 + \Delta id2\text{-}11 + \Delta id2\text{-}13 \tag{61}$$

$$\Delta iq21 = -\Delta iq2\text{-}5 + \Delta iq2\text{-}7 + \Delta iq2\text{-}11 + \Delta iq2\text{-}13 \tag{62}$$

The respective superimposition ratios of the predetermined high-order components vary according to the motor load (output torque) as the required steering assist force, namely, the q-axis fundamental-current command value i*q0. Hence, the respective current phases of the high-order components also delay relative to that of the first-order component according the q-axis fundamental-current command value i*q0. In the output torque from the electric motor 9, the fifth-order and seventh-order components appear as the sixth-order component. Hence, the compensation values for the fifth-order current $\Delta id2\text{-}5$, $\Delta iq2\text{-}5$ and the compensation values for the seventh-order current $\Delta id2\text{-}7$, $\Delta iq2\text{-}7$ are represented by the following equations (63) to (66), respectively:

$$\Delta id2\text{-}5 = i5(i^*q0) \times \sin[6\{\theta re + \theta5(i^*q0)\}] \tag{63}$$

$$\Delta iq2\text{-}5 = i5(i^*q0) \times \cos[6\{\theta re + \theta5(i^*q0)\}] \tag{64}$$

$$\Delta id2\text{-}7 = i7(i^*q0) \times \sin[6\{\theta re + \theta7(i^*q0)\}] \tag{65}$$

$$\Delta iq2\text{-}7 = i7(i^*q0) \times \cos[6\{\theta re + \theta7(i^*q0)\}] \tag{66}$$

In the output torque from the electric motor 9, the eleventh-order and thirteenth-order components appear as the twelfth-order component. Hence, the compensation values for the eleventh-order current $\Delta id2\text{-}11$, $\Delta iq2\text{-}11$ and the compensation values for the thirteenth-order current $\Delta id2\text{-}13$, $\Delta iq2\text{-}13$ are represented by the following equations (67) to (70), respectively:

$$\Delta id2\text{-}11 = i11(i^*q0) \times \sin[12\{\theta re + \theta11(i^*q0)\}] \tag{67}$$

$$\Delta iq2\text{-}11 = i11(i^*q0) \times \cos[12\{\theta re + \theta11(i^*q0)\}] \tag{68}$$

$$\Delta id2\text{-}13 = i13(i^*q0) \times \sin[12\{\theta re + \theta13(i^*q0)\}] \tag{69}$$

$$\Delta iq2\text{-}13 = -i13(i^*q0) \times \cos[12\{\theta re + \theta13(i^*q0)\}] \tag{70}$$

By using the above equations (63) to (70), the respective compensation values for the fifth-order, seventh-order, eleventh-order and thirteenth-order components can be calculated with respect to each of the d-axis current and q-axis current. Therefore, the high-order-current distortion compensation map 244a and the phase correction map 244b may be prepared as follows.

Figure 34:
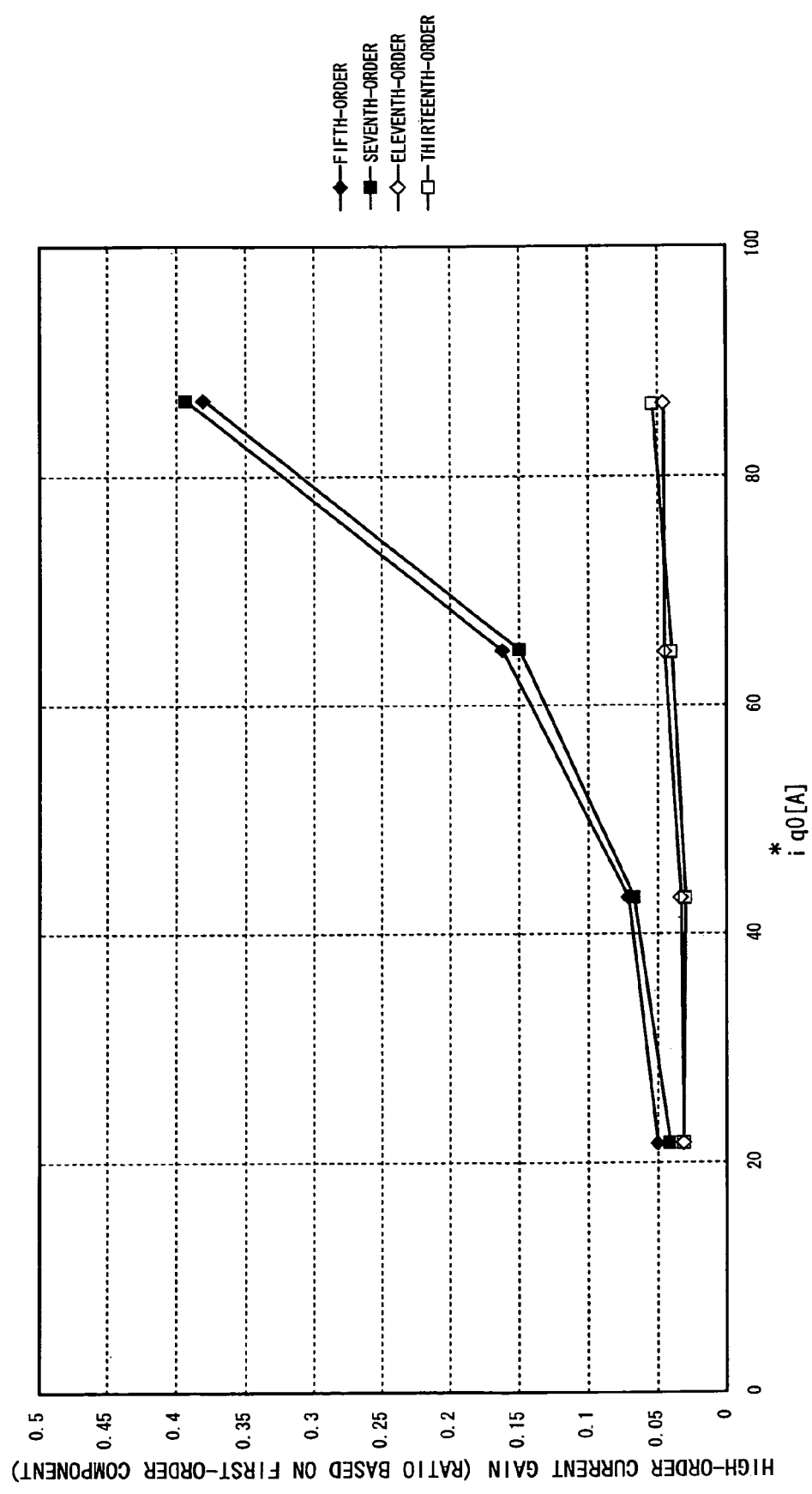
FIG. 34 is a graph showing a measurement example of a target current value of the above electric motor and gain variations of the high-order components relative to the first-order component.

First, experimental data are acquired with respect to a gain of each of the high-order components relative to the first-order component (fundamental wave), as varying the supply current to vary the output torque from the electric motor 9. Thus is obtained a graph, as shown in FIG. 34 for example, which shows a relation between the q-axis fundamental-current command value i*q0 and the high-order current gain with respect to each of the high-order components. In the figure, each set of four plots indicate the output torques from the electric motor 9 as provided at each of the high-order components. Starting from the left side as seen in the figure, the respective plots represent the gains at the torques of 1.0, 2.0, 3.0 and 4.0 [Nm]. Based on the graph so prepared, a table correlating, for example, a table correlating the value of i5(i*q0) equivalent to the amplitude of the fifth-order component and used in the above equations (63) and (64) with the value of the q-axis fundamental-current command value i*q0 may be obtained as the high-order-current distortion compensation map 244a.

Furthermore, based on the waveform of the motor supply current as measured with the output torque (motor load) varied as described above, experimental data are acquired with respect to the phase delay of each of the high-order components relative to the fundamental wave contained in the current waveform. Based on the acquired data, a correction value for canceling the phase delay may be determined. As a correction value for the fifth-order component, for example, the value of $\theta5(i^*q0)$ used in the above expressions (63) and (64) may be determined. A table correlating the correction value so determined with the q-axis fundamental-current command value i*q0 may be obtained as the phase correction map 244b.

When supplied with the corrected electrical angle θmre from the subtracter 238 correcting the electrical angle with the phase compensation value Δθe inputted from the gain/phase deciding portion 237, and the q-axis fundamental-current command value i*q0 from the adder 217 (FIG. 27), the high-order-current distortion compensation-value deciding portion 244 refers to the high-order-current distortion compensation map 244a and the phase correction map 244b prepared as described above, thereby deciding the d-axis-current fundamental compensation value $\Delta id21$ and the q-axis-current fundamental compensation value $\Delta iq21$ corresponding to the corrected electrical angle θmre and the q-axis fundamental-current command value i*q0 so inputted. The high-order-current distortion compensation-value deciding portion 244 outputs the d-axis-current fundamental compensation value $\Delta id21$ and the q-axis-current fundamental compensation value $\Delta iq21$ to the respective multipliers 245 and 246. The multipliers 245 and 246 multiply the respective input values by the gain compensation value Rm supplied from the correction ratio calculator 241. The resultant products, as the d-axis current compensation value $\Delta id2$ and the q-axis current compensation value $\Delta iq2$ for high-order component compensation, are outputted to the respectively corresponding adders 221, 222.

According to the embodiment of the aforementioned constitution, the high-order-current distortion compensating portion (torque-ripple compensation deciding means) 219 uses the corrected electrical angle θmre (rotational position information) and the q-axis fundamental-current command value i*q0 (target current value) for estimating the torque ripple caused by the fifth-order, seventh-order, eleventh-order and thirteenth-order components of the current through the electric motor 9, when a current of a value specified by the q-axis fundamental-current command value i*q0 is supplied to the individual phase filed coils of the motor 9. Based on the estimation, the compensating portion 219 decides the d-axis current compensation value $\Delta id2$ and the q-axis current compensation value $\Delta iq2$ for high-order current distortion compensation which are used for varying the q-axis fundamental-current command value i*q0 in a manner to cancel the estimated torque ripple. On the other hand, the magnetic field distortion compensating portion (torque-ripple compensation deciding means) 218 uses the corrected electrical angle θmre and the q-axis fundamental-current command value i*q0 for estimating the torque ripple caused by the distorted magnetic field in the electric motor 9, when the current of the value specified by the q-axis fundamental-current command value i*q0 is supplied to the individual phase field coils of the motor. Based on the estimation, the compensating portion 218 decides the d-axis current compensation value $\Delta id1$ and the q-axis current compensation value $\Delta iq1$ for magnetic field distortion compensation which are used for varying the q-axis fundamental-current command value i*q0 in a manner to cancel the estimated torque ripple. As indicated by the above equations (48) and (49), the adders 221 and 222 (correcting means) use the resultant d-axis current compensation value Δid1 and d-axis current compensation value Δid2, and the resultant q-axis current compensation value Δiq1 and q-axis current compensation value Δiq2 for varying the corresponding command values of the d-axis current and q-axis current. The feedback controller (feedback control means) 400 drives the electric motor 9 based on the command values so varied. As a result, the torque ripple caused by the high-order components and the torque ripple caused by the distorted magnetic field are suppressed when the current based on the above target current value flows through the electric motor 9. Therefore, the steering feeling is prevented from being degraded due to these ripples.

According to the embodiment, the magnetic field distortion compensating portion 218 and the high-order-current distortion compensating portion 219 are provided with the gain compensation calculating means including the frequency calculator 236, the gain/phase deciding portion 237 and the correction ratio calculator 241. The respective output values from the magnetic field distortion compensating portion 218 and the high-order-current distortion compensating portion 219 are corrected with the gain compensation value (correction ratio Rm) calculated by the calculating means. Thus is provided the compensation for the gain decrease of the current through the motor according to the frequency characteristics of the current control system, the current gain decreasing as the rotational speed of the motor is increased. Therefore, the steering feeling is prevented from being degraded in conjunction with the gain decrease.

According to the embodiment, the magnetic field distortion compensating portion 218 and the high-order-current distortion compensating portion 219 are provided with the phase compensation calculating means including the frequency calculator 236 and the gain/phase deciding portion 237. The detected electrical angle θre is corrected with the phase compensation value (phase difference Δθe) calculated by the calculating means. Thus, the phase delay dependant upon the frequency characteristic of the current control system is compensated for. Thus is provided the compensation for the phase delay of the supply current through the motor 9 relative to the induced voltage even when the rotational speed of the electric motor 9 is varied, the phase delay occurring according to the frequency characteristic of the current control system. Therefore, the steering feeling is prevented from being degraded in conjunction with the phase delay.

Figure 35:
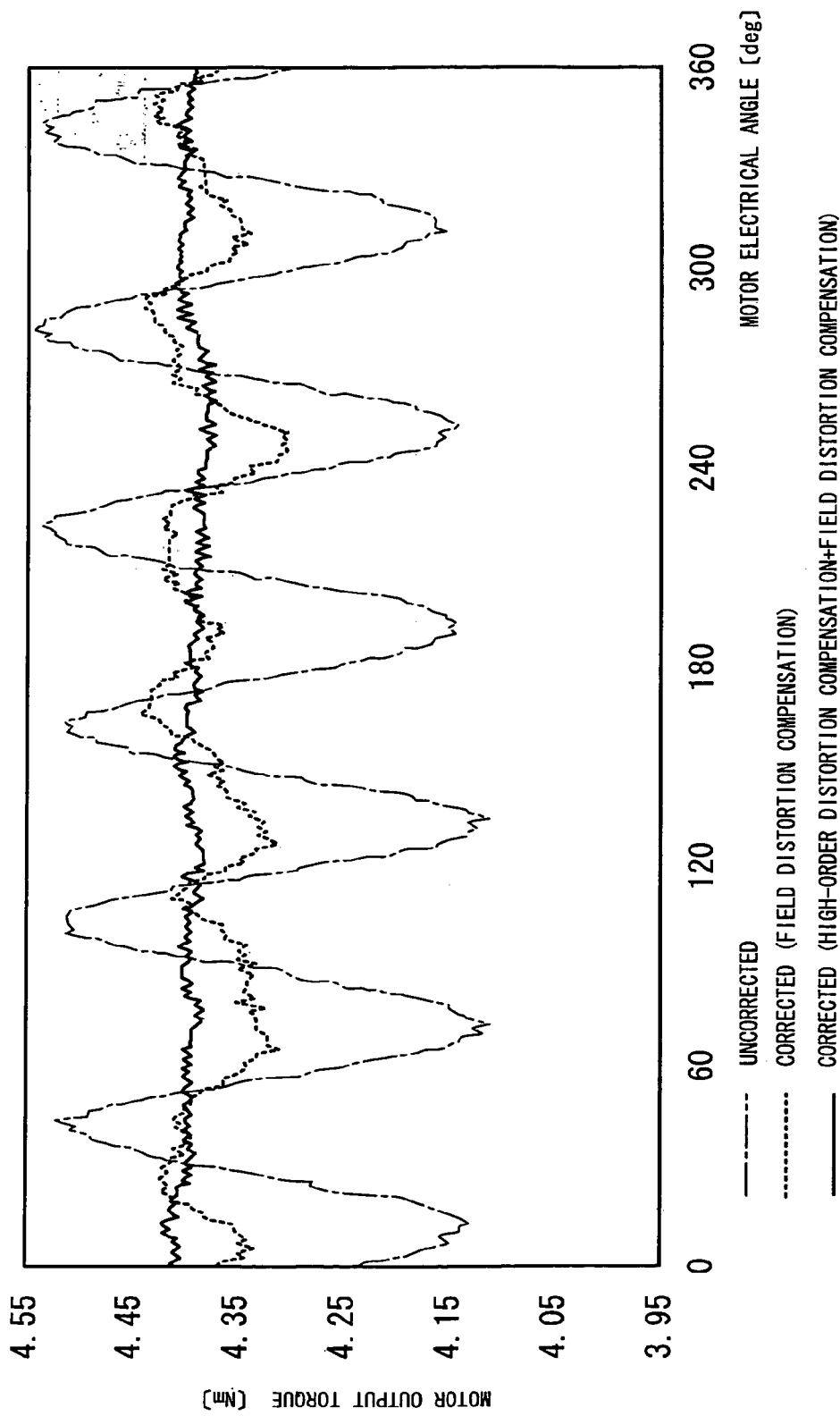
FIG. 35 is a waveform chart showing specific output torques from the above electric motor.

Now referring to FIG. 35 showing specific output torques from the electric motor, a detailed description is made on the working effect of the torque-ripple compensation deciding means.

In a case where the feedback controller 40 drives the electric motor 9 by using the d-axis fundamental-current command value i*d0 and the q-axis fundamental-current command value i*q0 represented by the respective first terms of the above equations (48) and (49) rather than using the respective output values from the magnetic field distortion compensating portion 218 and the high-order-current distortion compensating portion 219, the motor output torque significantly fluctuates due to the appearance of a great torque ripple, as indicated by the dot-dash line in FIG. 35.

In a case where the feedback controller 400 drives the electric motor 9 by using the output value from the magnetic field distortion compensating portion 218, namely, the target current value specified by the respective sums of the first and second terms of the respective equations (48) and (49), the motor output torque is removed of the ripple caused by the distorted magnetic field and hence, the torque has a detection waveform represented by the dot line in the figure.

In a case where the feedback controller 400 drives the electric motor 5 by using the output values from the magnetic field distortion compensating portion 218 and the high-order-current distortion compensating portion 219, namely, the target current value specified by the respective sums of the first to third terms of the respective equations (48) and (49), the motor output torque is removed of not only the ripple caused by the distorted magnetic field but also the ripple caused by the fifth-order, seventh-order, eleventh-order and thirteenth-order components. Specifically, the sixth-order ripple determined by the above equations (63) to (66) and the twelfth-order ripple determined by the above equations (67) to (70) are removed from the motor output torque, so that the torque has a stable detection waveform with extremely small fluctuations, as represented by the solid line in the figure. That is, the embodiment is adapted to damp a substantial quantity of torque ripple in a system wherein with the increase of the q-axis fundamental-current command value i*q0 (the motor load for generating the required steering assist force), the high-order components are more prone to be superimposed on the current through the electric motor 9, as shown in FIG. 34, so that the quantity of torque ripple caused by the superimposed high-order components is also increased to degrade the steering feeling. As a result, the system may perform the assist operation in a stable manner during a steering operation requiring steering assist of a relatively great assist force, such as steering without driving for changing the tire angle of the steerable wheels of the vehicle at standstill.

While the foregoing description illustrates the constitution which decides the compensation value for canceling the torque ripple caused by the predetermined high-order components including the fifth-order, the seventh-order, the eleventh-order and the thirteenth-order components, the invention is not limited to this. An alternative constitution may also be made which decides a compensation value for compensating for (canceling) higher harmonic components prone to be superimposed on the fundamental wave (the first-order component), the higher harmonics including, for example, the fifth-order and the seventh-order components as shown in FIG. 34.

The foregoing description also illustrates the case where the magnetic field distortion compensating portion 218 and the high-order-current distortion compensating portion 219 of the torque ripple compensation deciding portion 301 contain therein the gain compensation calculating means and the phase compensation calculating means, which share some function blocks. However, the invention is not limited to this. An alternative constitution may also be made as follows, for example. Instead of providing the above calculating means in the compensating portions 218, 219 of the torque-ripple compensation deciding portion 301, these calculating means may be interposed between the compensation deciding portion 301 and the feedback controller 400. The compensating portions 218, 219 may use the electrical angle θre supplied from the rotor angular-position detector 235 and the q-axis fundamental-current command value i*q0 supplied from the adder 222 thereby to decide the respective compensation values for the magnetic field distortion compensation and for the high-order current distortion compensation. Subsequently, these values so decided may be corrected with the gain compensation value determined by the gain compensation calculating means and the phase compensation value determined by the phase compensation calculating means, respectively. The corrected values may be inputted, as the command values, to the feedback controller 400.

While the foregoing description illustrates the constitution, for example, wherein the high-order-current distortion compensation map 244a is stored in the high-order-current distortion compensation-value deciding portion 244, an alternative constitution may also be made such that the mathematical equations (61) to (70) are stored in the microcomputer while the deciding portion 244 performs the calculations based on these mathematical equations thereby deciding the compensation value.

While the foregoing description illustrates the case where the three-phase brushless motor is used as the electric motor 9, the invention is not limited to this. The invention is also applicable to systems employing the other types of motors such as brushless motors having different numbers of phases than three, and DC motors with brushes.

[5.2 Dead Zone]

[5.2.1 Consideration for Dead Zone]

Now, description is made on a dead zone defined by a predetermined region which has a zero steering torque set to a midpoint and in which the electric motor is not driven.

The aforesaid Prior Art 13 proposes an electric power steering system designed to vary the width of the dead zone according to a condition such as a steering speed.

The aforementioned conventional electric power steering system is based on insufficient knowledge about the width of the dead zone in respect of an assist characteristic (steering assist characteristic; a relation between the steering torque and the assist torque (motor current)) and the definition of a gradient at a boundary between the dead zone and an assist (steering assist) zone.

The inventors have discovered a problem that if the dead zone width is too small, the vehicle running straight ahead is prone to wandering and that if the dead zone width is too great, the driver may perceive frictions occurring at the various parts of the vehicle. Thus, the steering feeling is seriously degraded. The inventor have also discovered a problem that if the gradient of the assist characteristic curve at the boundary between the dead zone and the assist zone is too great, a torque variation at assist start tends to be transmitted to the handle as a rapping impact, and that if the gradient is too small, the steering feeling is seriously degraded because of the aforementioned frictions. These problems were unsolved because how friction torque (loss torque) about the shaft of the electric motor affects the steering feeling in the assist state or in the non-assist state is unknown.

The following constitution may be adopted to obviate the wandering of the vehicle running straight ahead and the friction sensation thereby to provide the good steering feeling.

That is, a preferred electric power steering system wherein an upper shaft (the input shaft 22) connected to the steering member is coupled to a lower shaft (the output shaft 24) by means of an interconnection shaft (such as the torsion bar 23), the lower shaft connected to the steering mechanism (the manual steering gear 3) by means of a transmission shaft (having an upper end thereof connected to the lower shaft by means of a universal joint, for example, and a lower end thereof rotatably connected to the steering mechanism); wherein the electric motor is coupled to the lower shaft (the output shaft 24) by means of a gear mechanism (the reduction gear assembly 8); wherein a transverse steering torque applied to the steering member is detected based on a torsion of the interconnection shaft; wherein the electric motor is driven according to the detected steering torque thereby applying a steering assist torque to the lower shaft; and wherein a predetermined range having a zero steering torque set to a midpoint is defined as a dead zone to deactivate the electric motor, the system is characterized in that a one-side width of the dead zone is defined to be not more than a sum of a friction torque occurring at the steering mechanism and friction torques occurring at the lower shaft and the transmission shaft. In this case, an electric power steering system obviating the wandering of the vehicle running straight ahead and the friction sensation and providing the good steering feeling may be realized.

Furthermore, the following constitution may be adopted to prevent the torque fluctuation at assist start from being transmitted as an impact and to provide the good steering feeling without the friction sensation. That is, the preferred electric power steering system is characterized in that in a case where the steering torque is equal to a sum of loss torques occurring at the one-side width, the electric motor and the gear mechanism, the steering assist torque is defined to be not more than the loss torque. In this case, an electric power steering system preventing the torque fluctuation at assist start from being transmitted as the impact and providing the good steering feeling without the friction sensation may be realized.

[5.2.2 Preferred Mode Related to Dead Zone]

Receiving a steering torque Ts detected by the torque sensor 7, a target current calculator 124 uses the steering torque Ts and the like for deciding a target current value It of current to be supplied to the motor 9, as referring to the table, called the assist map, which correlates the steering toque with the target current value.

Figure 36:
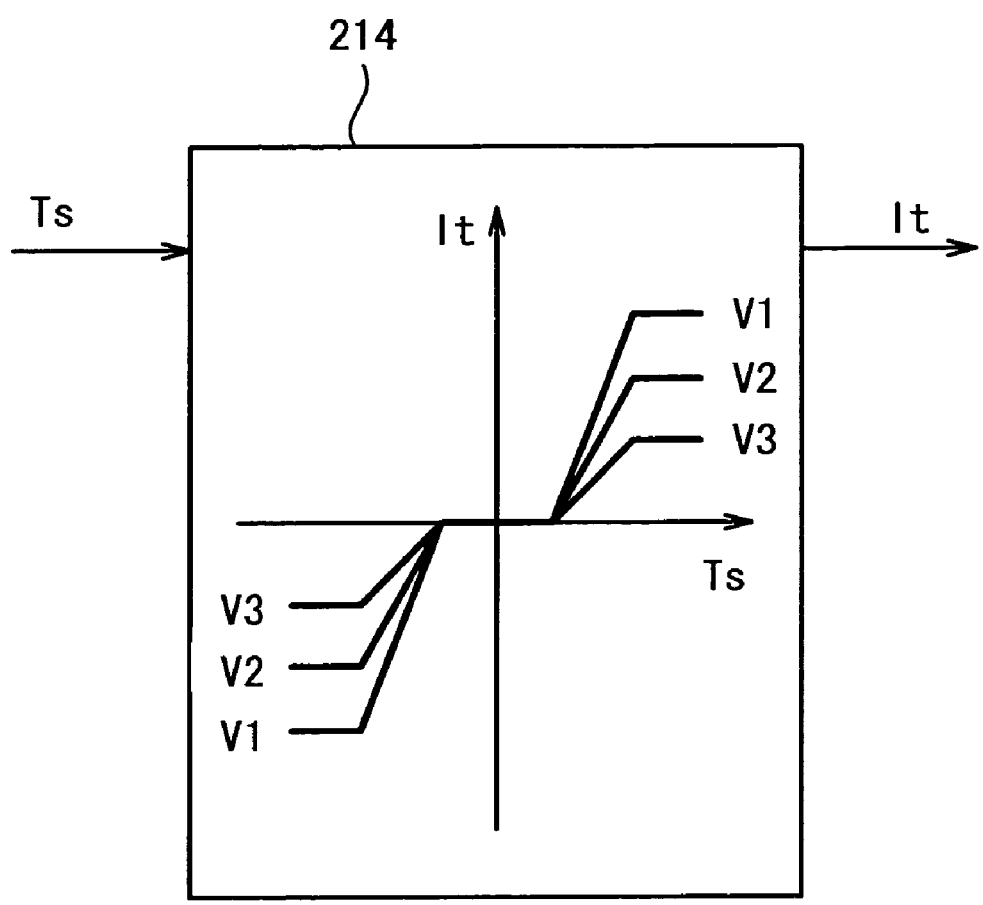
FIG. 36 is a diagram showing an assist map.

The assist map of the target current calculator 124 (the motor controller 120) variably defines a function according to the vehicle speed detection signal Vs (Vs: V1, V2, V3). As shown in FIG. 36, the function operates such that if the steering torque signal Ts exceeds the predetermined dead zone, the target current value It is increased in proportion to the increase of the steering torque signal Ts and that if the steering torque signal Ts is further increased to above a predetermined value, the target current value It is saturated. It is noted that V1<V2<V3 . . . . The above function is defined to decrease a ratio of the target current value It to the steering torque signal T as the vehicle speed detection signal V1, V2, V3 is increased, and to provide a small saturation value of the target current value It. The target current value It decided by the target current calculator 124 is applied to the adder 217.

FIG. 37 is a schematic diagram schematically showing the electric power steering system shown in FIG. 1. The electric power steering system has an arrangement wherein the upper shaft (input shaft) 22 connected to the steering member 1 (handle) is coupled to the lower shaft (output shaft) 24 by means of the torsion bar 23 (interconnection shaft), whereas the output shaft 24 is coupled to the steering mechanism (manual steering gear) 3 by means of a transmission shaft 29. The input shaft 22, the output shaft 24 and the torsion bar 23 constitute a steering shaft 33. The input shaft 22 is carried on bearings 22a, 22b at its upper part and lower part, whereas the output shaft 24 is carried on bearings 24a, 24b at its upper part and lower part. The electric motor 9 is coupled to the output shaft by means of the reduction gears 81, 82. The driving gear 82 of the reduction gear assembly is carried on two bearings 82a, 82b.

The transmission shaft 29 has its upper end and lower end rotatably connected to the output shaft 24 and the pinion shaft 31 of the manual steering gear 3 by means of two universal joints 29a, 29b, respectively. The pinion shaft 31 is carried on two bearings 31a, 31b and has the pinion teeth 35 thereof meshed with the rack teeth 36. The rack shaft 32 is carried on a bearing 32a. Each of the opposite ends (only one end is shown in FIG. 37) of the rack shaft is rotatably coupled to one end of the tie rod 4a, the other end of which is rotatably coupled to one end of the knuckle arm 4b. The knuckle arm 4b has the other end thereof rotatably coupled to a shaft of the steerable wheel not shown. The steering mechanism is principally constituted by the manual steering gear 3 but also includes the tie rods 4a and the knuckle arms 4b.

The characteristics of steering torque signal Ts-target current value It (assist torque) of the above assist map not only include the aforementioned definitions but also defines the one-side width Td of the dead zone to be Td≦Tf1+Tf2 (equivalent of the torque about the steering shaft).

It is noted here that Tf1 denotes the friction torque of the overall steering mechanism (manual steering gear 3) 34, whereas Tf2 denotes the friction torque of the output shaft 24, the transmission shaft 29 and the universal joints 29a, 29b (FIG. 37).

Figure 38:
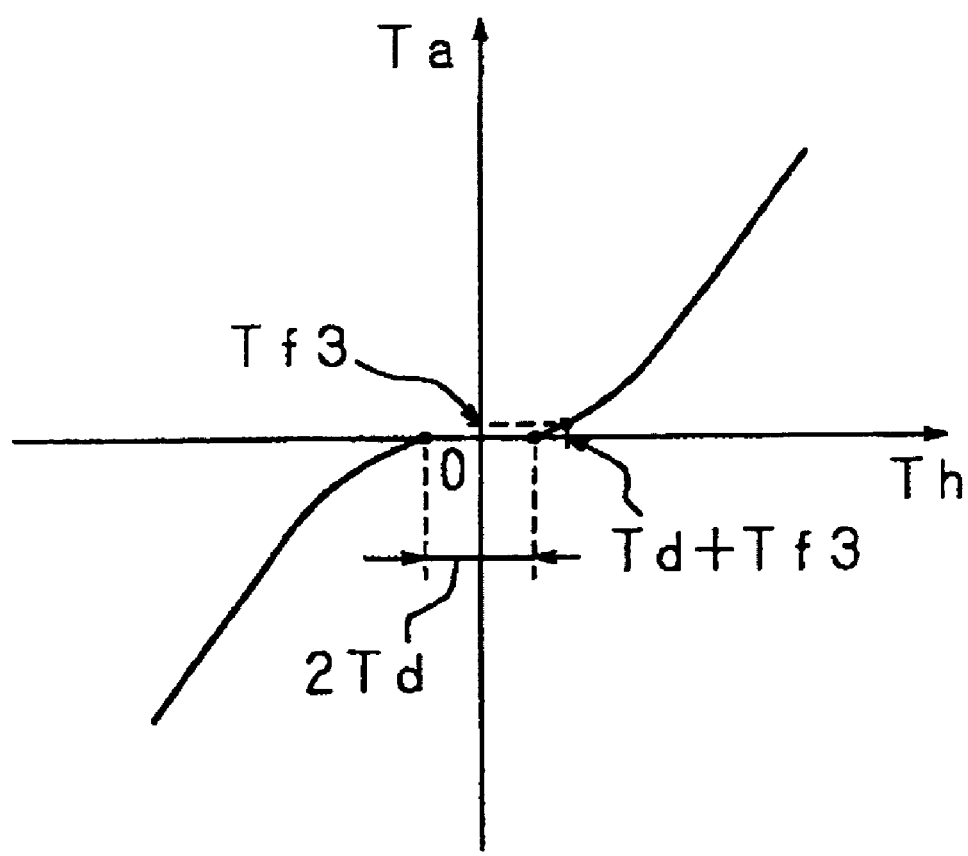
FIG. 38 is a diagram showing an exemplary assist characteristic.

As shown in a characteristic graph of FIG. 38, the characteristic of the steering torque signal Ts-target current value It (assist torque) of the assist map is defined such that an assist torque Ta is Ta≦Tf3 (equivalent of the torque about the steering shaft), provided that a steering torque Th=Td+Tf3. It is noted here that Tf3 denotes the loss torque about the electric motor shaft 9 including the friction torque about the reduction gear assembly 8 (FIG. 37).

The above torques Tf1, Tf2, Tf3 (equivalent of the torques about the steering shaft) may be defined as, for example, Tf1≦0.6 Nm, Tf2≦0.3 Nm, Tf3≦0.5 Nm. According to the prior art, Td is defined as Td=1.0 to 1.7 Nm. The above definitions permit this electric power steering system to start providing the steering assist without suffering the drag of the loss torque about the electric motor shaft 9 before the steering torque is increased to the torque value (Tf1+Tf2) transmitted to the tires (steerable wheels). Therefore, the electric power steering system features a smooth torque fluctuation at assist start and obviates the wandering of the vehicle running straight ahead and the friction sensation thereby to provide the good steering feeling.

[5.3 Phase Compensating Portion]

[5.3.1 Consideration for Phase Compensation Characteristic]

In the electric power steering system, a proportional integrator typically provides a current control (feedback control) such that a current of the target value may flow through the electric motor, the target value defined based on a steering toque indicated by the torque detection signal outputted from the torque sensor.

The proportional integrator may preferably have high values of a proportional gain and an integral gain (hereinafter, collectively referred to as "PI gain") in the light of increasing the responsivity of the overall steering system. Unfortunately, however, the electric power steering system includes a mechanical resonant system including a spring element constituted by the torsion bar interposed in the steering shaft for detecting the steering torque, and an inertial element constituted by the electric motor. Therefore, if the PI gain value is too high, the system tends to operate unstably (or is prone to vibrations) at resonant frequencies of the resonant system, which are near natural frequencies of the mechanical system of the electric power steering system (specifically, in the range of 10 to 25 Hz).

Therefore, the PI gain is not set to such a high value in order to ensure system stabilization at the expense of high responsivity of the overall system. Furthermore, the system is provided with the phase compensator for improving phase characteristic in a practical frequency band. Specifically, the torque sensor applies the torque detection signal to the phase compensator. The phase compensator advances the phase of the torque detection signal, thereby improving the responsivity of the overall system.

The phase compensator has its characteristics so defined as to decrease a resonant-frequency gain in order to prevent the system from becoming a vibratory system. In defining the characteristics of the phase compensator, therefore, damping at the resonant frequencies must be increased to meet a steer-without-driving assist characteristic of high gain. However, the phase compensator has a characteristic that the increased damping at the resonant frequencies leads to the increase of damping in a wide frequency region centered on the resonant frequencies. Consequently, damping in a low-frequency region is increased, so that phase delay in the low-frequency region is increased.

Vibrations during steer without driving may be suppressed by employing the phase compensator featuring high damping. During steer with driving, however, the phase delay in the low-frequency region is so great as to lessen the steering feeling in a low-load region corresponding to a neighborhood of a neutral position of the handle. Hence, the driver may experience a loadless steering feeling. This loadless steering feeling becomes particularly significant when the vehicle speed is high. What is worse, this drawback is even more significant in a high-efficiency electric power steering system decreased in the friction.

Prior Art 14 discloses an electric power steering system including software-type phase compensation means implemented in software. The phase compensation means uses the vehicle speed as a parameter for varying its characteristics in correspondence to high vehicle speed, intermediate vehicle speed and low vehicle speed. However, the system of Prior Art 14 simply varies the characteristics according to the vehicle speed. That is, this system does not differentiate between steering assist during steer without driving and steering assist during steer with driving. Hence, the system does not overcome the above problem related to the phase compensator whose characteristics are defined based on the steer-without-driving assist characteristic.

That is, if the vibrations during steer without driving are suppressed by means of the phase compensator, the phase delay is increased so that the driver experiences the loadless steering feeling during driving.

The following constitution may be adopted to suppress the loadless steering feeling.

That is, a preferred electric power steering system driving an electric motor to generate a steering assist force according to a steering torque, comprises: a torque sensor for detecting the steering torque; phase compensation means operating when a target control value of the electric motor is generated based on an output from the torque sensor; and means for varying the characteristics of the phase compensation means depending upon whether a steering mode is steer with driving or steer without driving.

The system differentiates between the steering assist during steer without driving and the steering assist during driving so as to vary the characteristics of the phase compensation means accordingly. Thus, the system is adapted to provide a relatively small damping in the low-frequency region as a steer-with-driving assist characteristic, even though the vibrations are suppressed by defining the steer-without-driving assist characteristic to provide a relatively high damping in the low-frequency region as compared with the damping of the steer-with-driving characteristic. Thus, the loadless steering feeling during driving may be lessened.

It is also preferred that the system further comprises: a first phase compensator for steer with driving and a second phase compensator for steer without driving, as the phase compensation means; and means for switching the phase compensators in order to generate the target control value by means of the first phase compensator in the case of steer with driving, and to generate the target control value by means of the second phase compensator in the case of steer without driving. A proper steering feeling may be provided easily by switching the phase compensator between steer with driving and steer without driving.

It is preferred that the phase compensation means is represented by a transfer function Gc(s) of the following equation, and that parameters $\zeta_2$ and $\omega_2$ of the transfer function Gc(s) are set to values to reduce or cancel a peak of a gain characteristic of an open-loop torque transfer function of the electric power steering system, the peak induced from natural vibrations of the mechanical system and the counter-electromotive force of the motor:

$$Gc(s)=(s^2+2\zeta_2\omega_2 s+\omega_2^2)/(s^2+2\zeta_1\omega_1 s+\omega_1^2) \quad (71)$$

where $\zeta_1$ denotes the compensated damping coefficient; $\zeta_2$ denotes the damping coefficient of a compensated system; $\omega_1$ denotes the compensated natural angular frequency; and $\omega_2$ denotes the natural angular frequency of the compensated system, all these symbols representing the parameters of the function Gc(s).

The above constitution is adapted to ensure the system stability and to improve the responsivity of the system, because the phase compensation means reduces or cancels the peak of the gain characteristic of the open-loop torque transfer function, the peak induced from the natural vibrations of the mechanical system and the counter-electromotive force of the motor. In order to limit an input/output steady-state gain to 1, the phase compensation means may also take another mode represented by the following equation where the function Gc(s) is multiplied by a gain correction coefficient $\omega_1^2/\omega_2^2$:

$$Gc(s)=\omega_1^2(s^2+2\zeta_2\omega_2 s+\omega_2^2)/\{\omega_2^2(s^2+2\zeta_1\omega_1 s+\omega_1^2)\} \quad (72)$$

It is further preferred that the parameters $\zeta_1$ and $\zeta_2$ of the transfer function Gc(s) of the phase compensation means are defined to satisfy the following equations:

$$2^{-1/2} \leq \zeta_1 \leq 1 \quad (73)$$

$$0 < \zeta_2 < 2^{-1/2} \quad (74)$$

In this case, the parameter $\zeta_2$ as the damping coefficient of the compensated system is selected from the range of $0<\zeta_2<2^{-1/2}$, so that an adequate phase compensation may be provided. Furthermore, the parameter $\zeta_1$ as the compensated damping coefficient is selected from the range of $2^{-1/2} \leq \zeta_1 \leq 1$, so that the phase compensation may ensure the system stability and improve the responsivity of the system.

It is preferred that the parameters $\omega_1$ and $\omega_2$ of the transfer function Gc(s) of the phase compensation means are defined to satisfy the following equation and to take values approximating $2\pi \times f_P$, provided that $f_P$ denotes the frequency of the peak of the gain characteristic of the open-loop torque transfer function:

$$\omega_1=\omega_2 \quad (75).$$

One design parameter is deleted by defining the relation $\omega_1=\omega_2$. Furthermore, the parameter $\omega_1$ as the compensated natural angular frequency takes the value approximating $2\pi \times f_P$, whereby system destabilization due to the natural vibrations of the mechanical system is obviated. Hence, the phase compensation design may be simplified, while the control system may be even further stabilized and improved in responsivity.

It is preferred that the parameter $\omega_1$ of the transfer function Gc(s) of the phase compensation means is defined to satisfy the following expression:

$$\omega_1 < \omega_2 \quad (76),$$

where $\omega_m$ denotes the angular frequency of the natural vibrations of the mechanical system.

Since the parameter $\omega_1$ as the compensated natural angular frequency is smaller than the angular frequency $\omega_m$ of the natural vibrations of the mechanical system, the control system is prevented from being destabilized by the natural vibrations of the mechanical system. Thus, the control system may more reliably maintain stability and achieve the improved responsivity.

[5.3.2 Preferred Mode of Phase Compensation Means]

First, a basic study on phase compensation design will be described.

The conventional technique related to the phase compensation in the control design of the electric power steering system has been proposed as a measure for compensating for a peak of the natural vibration frequencies of the mechanical system (hereinafter, referred to as "mechanical-system peak"), which are mechanical resonant frequencies. However, the technique does not consider an influence of the counter-electromotive force of the motor. According to the conventional technique, a peak of a system gain characteristic of the electric power steering system or of a gain characteristic of the open-loop torque transfer function (hereinafter, referred to as "system peak") is regarded as the peak of the mechanical system. However, the results of the following simulation reveal that the counter-electromotive force in the motor exerts such a significant influence on the characteristics of the system that the mechanical-system peak and the peak of the overall system (system peak) have different frequencies.

Figure 39:
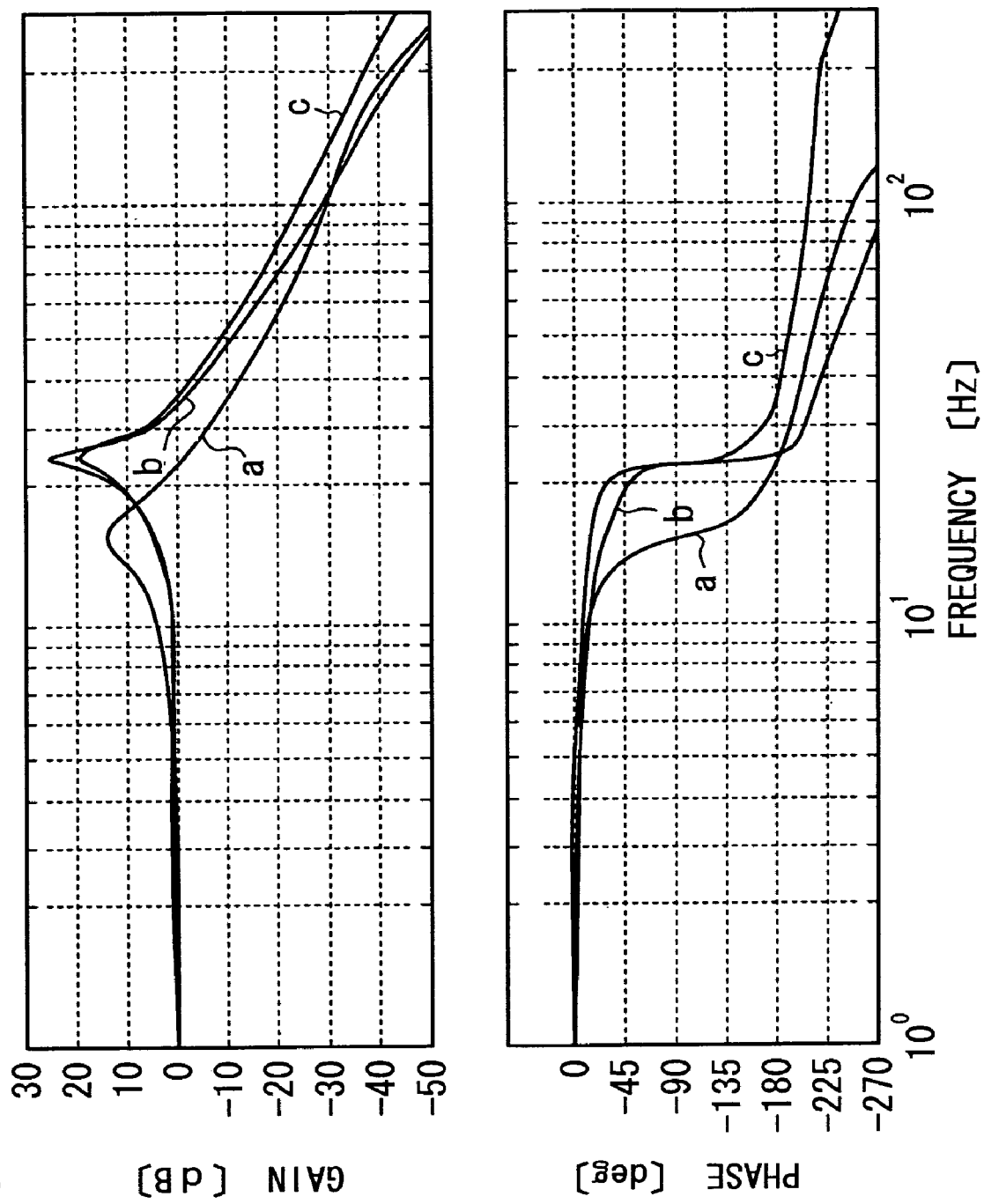
FIG. 39 is a Bode diagram showing characteristics of an open-loop torque transfer function in the electric power steering system as determined by simulation, the characteristics determined with a non-interactive control provided and without the non-interactive control.

Referring to FIG. 39, description is made on this point. It is noted that the term "open-loop torque transfer function", as used herein, means a transfer function representing a relation between an input defined by a target value of torque to be generated by the motor 9 and an output defined by a torque (hereinafter, referred to "motor torque") actually generated by the motor as determined in a state where a steering angle is fixed (for example, the handle is fixed to a neutral position). The target value of torque to be generated by the motor 9 corresponds to the target current value of the current control system, whereas the motor torque corresponds to the value of current actually flowing through the motor. Hence, the open-loop torque transfer function is equivalent to a transfer function of the electric power steering system with the fixed steering angle, the system having an input of the target current value and an output of the value of current actually flowing through the motor.

FIG. 39 is a Bode diagram (gain plot and phase plot) showing the open-loop torque transfer function of the electric power steering system employing a brushless motor, as obtained by a simulation (numerical experiment). The Bode diagram shows a case where a non-interactive control is provided in a control system for d-axis current and q-axis current of the motor, and a case where the non-interactive control is not provided. The influence of the counter-electromotive force can be eliminated by providing the non-interactive control, so that the characteristics of the mechanical system may be obtained. The conditions of the simulation are listed as below.

Inertia on motor output side: Im=7.89×10$^{-5}$[N·m·s$^2$/rad]
Viscosity on motor output side: Cm=1.39×10$^{-3}$[N·m·s/rad]
Reduction ratio of reduction gears: n=9.7
Elasticity of torsion bar: K=162.95[N·m/rad]
Toque constant of motor: K$_T$=5.12×10$^{-2}$[N·m/A]
Inductance of motor: L=9.2×10$^{-5}$[H]
Resistance of motor: R=6.1×10$^{-2}$[Ω]
Number of motor pole pairs: P=4
Constant of counter-electromotive force: φfp=4.93×10$^{-2}$ [V·s/rad]
Proportional gain of PI controller: Kp=L×(2π×75)
Integral gain of PI controller: Ki=R×(2π×75)

Let us take note of the gain plot of FIG. 39. In FIG. 39, a curve 'a' represents a gain characteristic of the case where the non-interactive control is not provided. The curve has a peak frequency of about 17 Hz, which is a frequency of the system peak (hereinafter, referred to "system peak frequency" or simply to "peak frequency", and represented by a symbol "fp"). A curve 'b' represents a gain characteristic of the case where the non-interactive control is provided. The curve has a peak frequency fp of about 22 Hz. A curve 'c' represents a gain characteristic only related to elasticity/inertia, which is a gain characteristic of a mechanical element alone. The curve also has a peak frequency of about 22 Hz. Thus, the peak frequency of the mechanical system (hereinafter, referred to as "mechanical-system peak frequency" and represented by a symbol "fm") is about 22 Hz. This indicates that the system peak has a different frequency from that of the mechanical-system peak.

Figure 40:
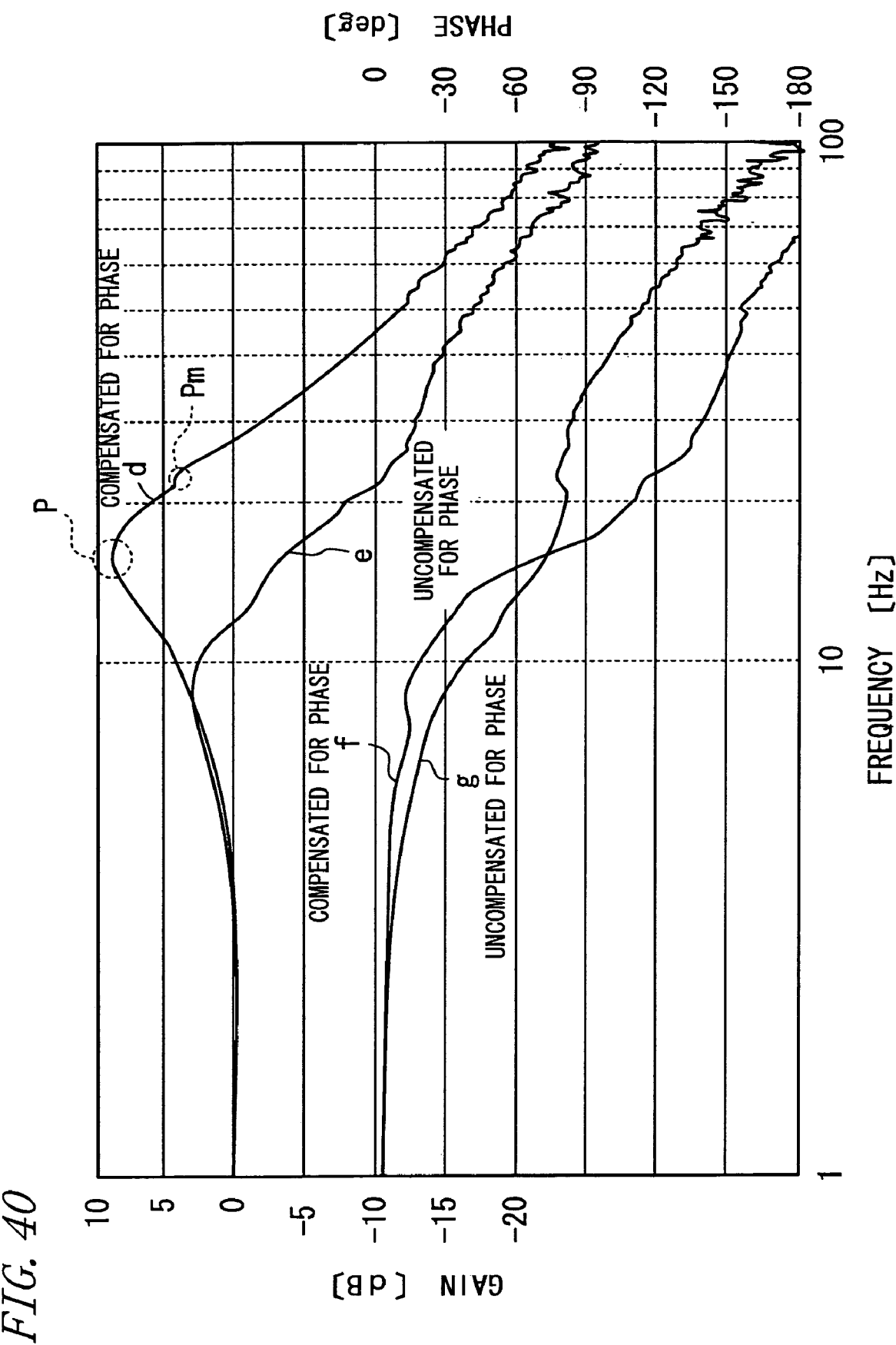
FIG. 40 is a group of Bode diagrams showing characteristics of the electric power steering system providing phase compensation and of the electric power steering system not providing the phase compensation.

Next, let us take note of FIG. 40 showing a gain characteristic of the open-loop torque transfer function of the above electric power steering system subjected to phase compensation. In FIG. 40, a curve 'd' represents a gain characteristic of a case where the phase compensation is not provided. The curve corresponds to the curve 'a' in FIG. 39 (which represents the gain characteristic of the case where the non-interactive control is not provided). A peak P of the gain characteristic represented by the curve 'd' reflects the influence of the counter-electromotive force, as described above. The peak P is at a lower frequency than a mechanical-system peak Pm (which corresponds to the peak of the curve 'b' or 'c' in FIG. 39).

Since the conventional technique does not consider the influence of the counter-electromotive force, the above peak P is regarded as the mechanical-system peak Pm and the phase compensation is so provided as to cancel the peak P. Therefore, some phase compensator design may have a drawback that even after the phase compensation is provided, the overall system is prone to destabilization (prone to vibrations) due to the influence of the mechanical-system peak Pm. In the electric power steering system according to the embodiment, therefore, the phase compensator is designed with consideration given to the point that the gain peak P of the overall system differs from the mechanical-system peak Pm due to the influence of the counter-electromotive force.

As described above, the steering system of the invention is designed such that the manual steering gear 3 and the reduction gear assembly 8 are decreased in friction values. Specifically, the sum of the friction of the manual steering gear and that of the reduction gear assembly, equivalent of the friction about the steering shaft, is 1 Nm or less, and preferably 0.9 Nm or less. The preferred values of the individual frictional elements are those described above.

Figure 41:
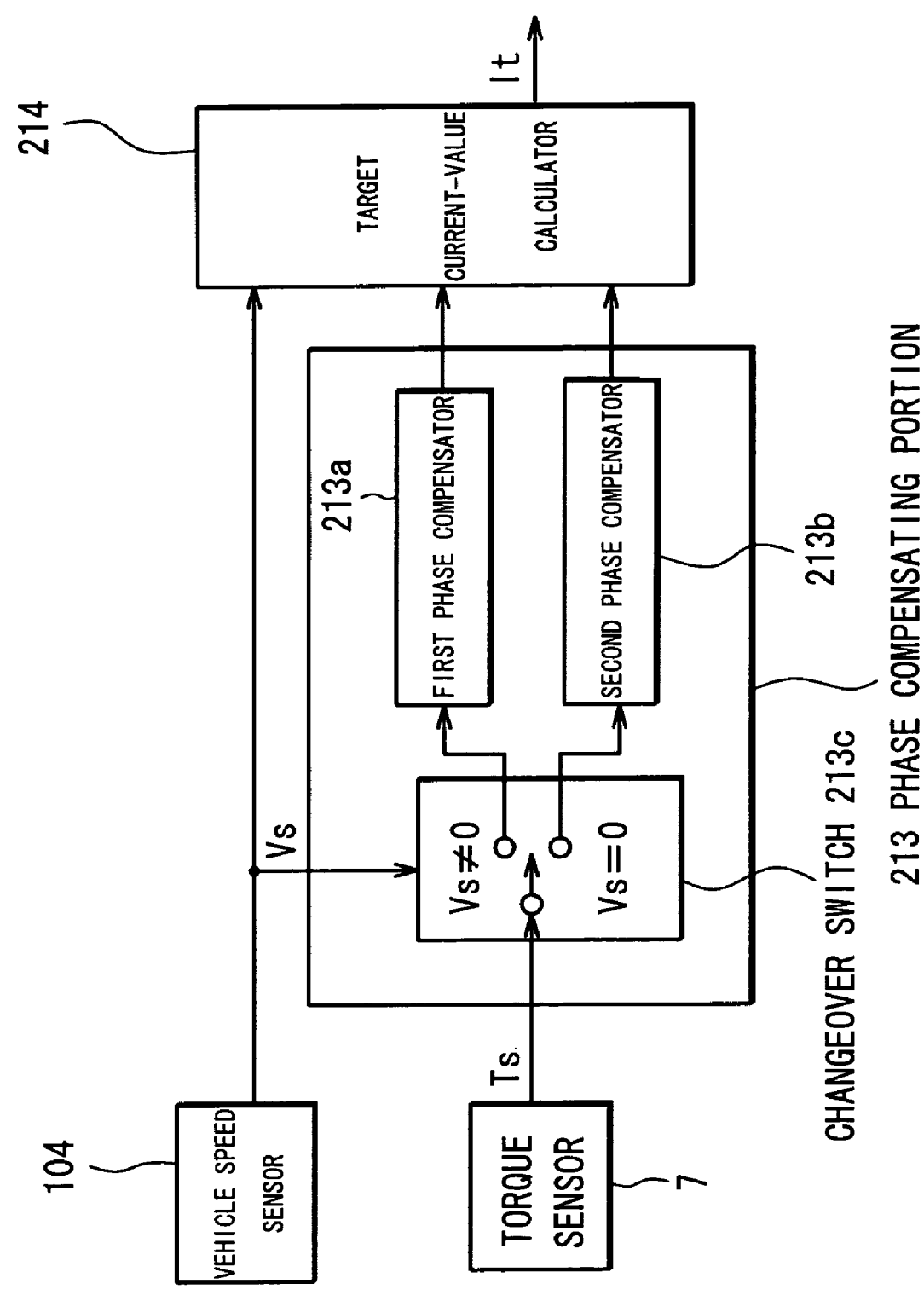
FIG. 41 is a block diagram principally showing the phase compensating portion of the ECU.

FIG. 41 is a block diagram principally showing the phase compensating portion 213 of the ECU 105. The phase compensating portion 213 functions in association with the microcomputer executing a program.

The phase compensating portion 213 is supplied with the steering torque detection signal Ts outputted from the torque sensor 3.

The phase compensating portion 213 subjects the steering torque detection signal Ts to a filtering process for phase compensation and then, outputs the processed signal to the target current-value calculator 214. The phase compensating portion 213 includes: a first phase compensator 213a and a second phase compensator 213b individually having different characteristics; and a changeover switch 213c for switchably applying the steering torque detection signal Ts to the first phase compensator 213a or the second phase compensator 213b.

The changeover switch 213C (means for varying the characteristics of the phase compensator) is supplied with the vehicle speed signal Vs from the vehicle speed sensor 104. The changeover switch selects either of the phase compensators (phase compensation means) 213a, 213b based on whether the signal indicates steer with driving (Vs≠0) or steer without driving (Vs=0). In the case of steer with driving, the changeover switch 213c selects the fist phase compensator 213a responsible for the phase compensation during steer with driving. Hence, the steering torque detection signal Ts is applied to the first phase compensator 213a, which applies an output to the target current-value calculator 214.

In the case of steer without driving, on the other hand, the second phase compensator 213b responsible for the phase compensation during steer without driving is selected. Thus, the steering torque detection signal Ts is applied to the second phase compensator 213b, which applies an output to the target current-value calculator 214.

Based on the filtered signal from the first phase compensator 213a or the second phase compensator 213b, and the above vehicle speed signal Vs, the target current-value calculator 214 calculates a target value of current to be supplied to the motor 9 and outputs the calculated value as the target current value I$_t$.

The phase compensating portion 213 is described as below.

It is known that a frequency characteristic of the open-loop torque transfer function, which represents the characteristic of the overall electric power steering system, can be approximated using a transfer function of a second-order lag system in the practical frequency band. FIG. 40 is a Bode diagram showing the frequency characteristics of the cases where the phase compensation is not provided and where the phase compensation is provided. In FIG. 40, as well, a characteristic of the transfer function of the second-order lag system can be observed.

First, description is made on the case where the phase compensation is not provided. The curve 'd' represents the gain characteristic of the case where the phase compensation is not provided. As indicated by the curve 'd', the gain characteristic of the open-loop torque transfer function of the overall system has a peak frequency fp of about 17 Hz, which is corresponded by a gain of about 9 dB. That is, the system is poor in stability. As seen from a curve 'f' representing a characteristic of the case where the phase compensation is not provided, phase delay is increased in a frequency range of 20 Hz to 30 Hz. The following is a general formula of a transfer function G(s) of the second-order lag system:

$$G(s)=\omega_n^2/(s^2+2\zeta_2\omega_n s+\omega_n^2),$$

where s denotes the Laplace operator; ζ$_2$ denotes the damping coefficient; and ω$_n$ denotes the natural angular frequency.

The transfer function Gc(s) of the phase compensator 213a, 213b should be so defined as to cancel the system peak P which is the peak of the gain characteristic of the transfer function G(s) of the above second-order lag system representing the compensated system. According to the embodiment, the transfer function G(s) is determined based on the following equation:

$$Gc(s)=(s^2+2\zeta_2\omega_2 s+\omega_2^2)/(s^2+2\zeta_1\omega_1 s+\omega_1^2),$$

where s denotes the Laplace operator; $\zeta_1$ denotes the compensated damping coefficient; $\zeta_2$ denotes the damping coefficient of the compensated system; $\omega_2$, denotes the compensated natural angular frequency; and $\omega_2$ denotes the natural angular frequency of the compensated system. The embodiment provides the electric power steering system including the phase compensator whose parameters are defined effectively from the standpoint of realizing a control system having a desired frequency characteristic.

In a case where the gain characteristic of the compensated system contains a peak, it is known that the parameter $\zeta_2$ of the formula representing the transfer function G(s) of the system takes a value of $\zeta_2 < 2^{-1/2}$. Therefore, adequate phase compensation is not provided if the value of the parameter $\zeta_2$ of the formula representing the transfer function G(s) of the phase compensator is selected from the range represented by the expression: $2^{-1/2} < \zeta_2 < 1$. As a result, the electric power steering system tends to work as an instable control system (vibratory system).

Therefore, the value of the parameter $\zeta_2$ of the transfer function of the phase compensator should be selected from a range excluding the range expressed as: $2^{-1/2} < \zeta_2 < 1$.

If the value of the damping coefficient $\zeta_1$ compensated by the phase compensating portion 213 is selected from the range expressed as: $0 < \zeta_1 < 2^{-1/2}$, the compensated gain characteristic contains a peak so that the compensated control system is prone to instable operation.

Therefore, the value of the parameter $\zeta_1$ of the transfer function of the phase compensator should be selected from a range excluding the range expressed as: $0 < \zeta_1 < 2^{-1/2}$.

Hence, the embodiment defines the parameters $\zeta_1$ and $\zeta_2$ of the phase compensators 15a, 15b having the transfer function G(s) in a manner to satisfy the following expressions:

$$2^{-1/2} \leq \zeta_1 \leq 1,$$

$$0 < \zeta_2 < 2^{-1/2}.$$

By making such definitions, the embodiment ensures the system stability while improving the responsivity of the system.

The peak frequency fp of the overall system differs from the mechanical-system peak frequency fm, which is higher than the system peak frequency fp. Therefore, in order to prevent the system from working unstably (vibratory system) in a frequency band near $\omega_1$, the gain must be adequately decreased at the angular frequency $\omega_m$ of the natural vibrations of the mechanical system. If $\omega_m < \omega_1$, the gain is not adequately decreased at $\omega_m$, so that the system is prone to vibrations in the frequency band near $\omega_1$. In order to compensate for the mechanical-system peak effectively, therefore, the parameter $\omega_1$ of the phase compensator may preferably be defined in a manner to satisfy the following expression:

$$\omega_m > \omega_1.$$

Figure 42:
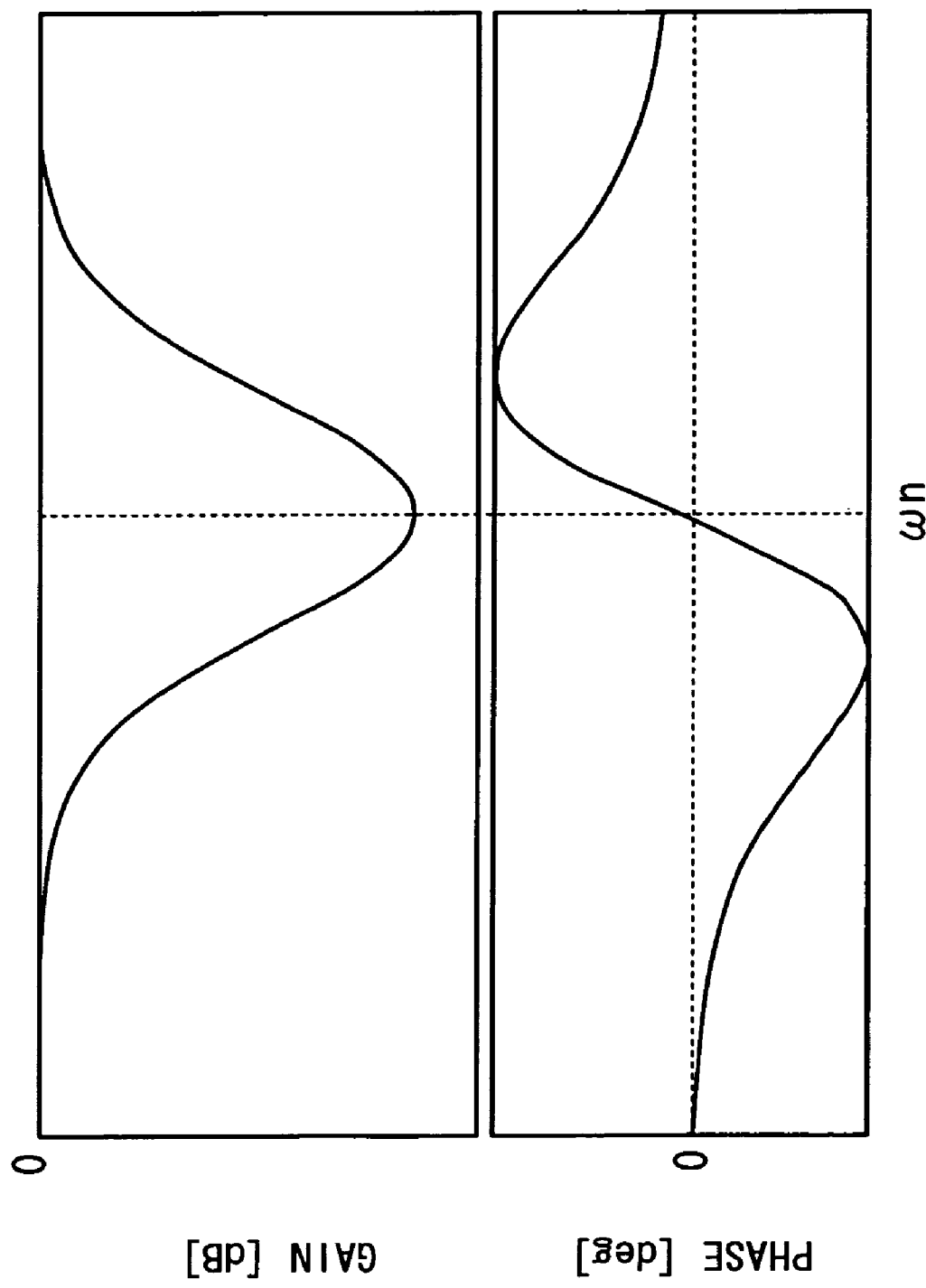
FIG. 42 is a Bode diagram showing characteristics of the phase compensating portion.

If the parameters $\zeta_1$, $\zeta_2$ and $\omega_1$ are defined as described above, the electric power steering system may have characteristics which include a gain represented by a curve 'e' in FIG. 40 and a phase characteristic represented by a curve 'g' in FIG. 40. FIG. 42 is a Bode diagram showing the characteristics of the phase compensator. It is apparent from these figures that the phase compensation based on the above definitions achieves a notable reduction of the gain peak value so that the phase delay near 20 Hz may be decreased.

The phase compensator, as described above, facilitates the phase compensation design and ensures the stability of the control system. In addition, the phase compensator improves the responsivity of the system so as to provide the open-loop torque transfer function, which has a desired frequency characteristic.

Furthermore, for the purpose of implementing the preferred compensator design, the parameters $\omega_1$ and $\omega_2$ of the transfer function Gc(s) of the phase compensator are first considered. The parameter $\omega_1$ represents the compensated natural angular frequency or, in other words, the target natural angular frequency. That $\omega_1$ and $\omega_2$ are of different values means that the natural angular frequency of the compensated system does not achieve the target natural angular frequency. In the phase compensation of the control system of the electric power steering system, the compensated system may desirably have a natural angular frequency equal to the target natural angular frequency. Hence, definition is made as $\omega_1 = \omega_2$, from which $\omega_n = \omega_1 = \omega_2$ is deduced. This will be hereinafter referred to as "natural angular frequency of compensator". If the compensated natural angular frequency is defined as $\omega_n = 2\pi \cdot fp$ against the peak frequency fp of the gain characteristic of the open-loop torque transfer function of the overall system, the system destabilization (vibratory system) due to the influence of the mechanical-system peak Pm may be obviated. The compensated natural angular frequency may preferably be defined as $\omega_m > \omega_1$ such that the overall system may not become vibratory due to the influence of the mechanical-system peak Pm, as described above.

It is more preferred to define the parameters of the transfer function of the phase compensator in a manner to satisfy the following expressions:

$$\omega_m > \omega_1 = \omega_2 = \omega_m,$$

$$\omega_n = 2\pi \cdot fp,$$

$$2^{-1/2} \leq \zeta_1 \leq 1,$$

$$0 < \zeta_2 < 2^{-1/2}.$$

Thus, one design parameter is deleted by setting $\omega_1$ and $\omega_2$ to the same value, so that both the responsivity and the stability may be satisfied effectively and easily.

The parameter fp of $\omega n = 2\pi \cdot fp$ (which will hereinafter be represented by a symbol "fn" for differentiation from the system peak frequency fp and be referred to as "natural frequency of compensator") need not have the same value as that of the peak frequency fp but may a value near the peak frequency fp to serve well the practical use. Hence, the natural angular frequency $\omega_n$ of compensator may be defined by the following expression:

$$2\pi \times (fp - \alpha) \leq \omega_n \leq 2\pi \times (fp + \beta).$$

According to the embodiment, both the first phase compensator 213a for steer with driving and the second phase compensator 213b for steer without driving have the transfer function represented by the above formula Gc(s). While the first phase compensator 213a and the second phase compensator 213b have mutually different values of the parameters of Gc(s), these values are selected from the above ranges.

For instance, in a case where $\omega_n = 2\pi \times 21$ Hz, $\zeta_1 = 1$, $\zeta_2 = 0.2$ are selected as the parameters of the first phase compensator 213a for steer with driving, $\omega_n = 2\pi \times 20$ Hz, $\zeta_1 = 1$, $\zeta_2 = 0.2$ may be selected as the parameters of the second phase compensator 213b for steer without driving, whereby these phase compensators 213a, 213b may have different characteristics.

In the above example, the value of $\omega_n$ of the second phase compensator 213b for steer without driving is smaller than that of the first phase compensator 213a and hence, a damping peak of the second phase compensator 213b is on a lower frequency side than a damping peak of the first phase compensator 213a. As a result, the second phase compensator 213b has higher damping quantity in a low frequency region as a whole.

On the other hand, the value $\omega_n$ of the first phase compensator 213a is greater than that of the second phase compensator 213b, so that the damping quantity and phase delay in the low frequency region are relatively small during steer with driving. Thus, the loadless steering feeling may be lessened.

The first phase compensator 213a may also have the parameter values varied according to the vehicle speed. For instance, the parameters may be set to $\omega_2=2\pi \times 21$ Hz, $\zeta_1=1$, $\zeta_2=0.2$ when the vehicle speed is low, whereas the parameters may be set to $\omega_n=2\pi \times 23$ Hz, $\zeta_1=1$, $\zeta_2=0.3$ when the vehicle speed is medium or above. The damping peak may be shifted to a high frequency side by increasing the value of $\omega_n$, whereas the damping quantity may be decreased by increasing the value of $\zeta_2$. Thus, the steering feeling may be improved even further.

According to the embodiment, the first phase compensator 213a and the second phase compensator 213b are discretely provided as the phase compensator and are switched by means of the changeover switch 213c. Alternatively, the two phase compensators may be replaced by a single phase compensator, while the values of the parameters ($\omega_n$, $\zeta_1$, $\zeta_2$) of the Gc(s) thereof may be varied depending upon whether the steering assist mode is steer with driving or steer without driving.

It is noted that, the transfer function and the characteristics of the phase compensator are not limited to the above.

[5.4 Compensation for Transverse Vehicle Wandering]

[5.4.1 Consideration for Transverse Vehicle Wandering]

The electric power steering system encounters a phenomenon wherein because of the differences of mechanical efficiencies of the manual steering gears and a vehicular support portion or the differences of the rotational directions of frictional elements, the vehicle slightly wanders rightward or leftward although the driver tries to retain the steering torque in a neutral-steer position (position of zero steering torque). In straight-ahead driving, therefore, the driver must keep applying the steering torque in the opposite direction to the direction of vehicle wandering. This results in a degraded steering feeling.

Prior Art 15 provides difference between a rightward-steering assist characteristic and a leftward-steering assist characteristic such as to cancel a difference between a rightward-steering load and a leftward-steering load of the vehicle. According to Prior Art 15, however, an assist torque for preventing the transverse vehicular wandering is not applied to the steering shaft in the neutral-steer position so that the transverse vehicular wandering is not obviated. A steering torque in the opposite direction to the direction of the vehicle wandering is required for preventing the vehicle wandering. This results in the degraded steering feeling.

The following constitution may be adopted to improve the steering feeling by preventing the vehicle wandering.

Specifically, a preferred electric power steering system comprising means for determining a value of assist control current (target motor current value) for causing the motor 9 to generate an assist torque according to a steering torque detected by a torque sensor is characterized in that a value of wandering compensating current for causing the motor to generate a torque for preventing vehicle wandering is added (as an offset value) to the assist control current value.

According to the constitution, the compensating current value equivalent to the torque for preventing the transverse vehicle wandering is added to the assist control current value. Hence, the vehicle wandering may be obviated without the steering torque applied by the driver for preventing the vehicle wandering. Thus is improved the steering feeling.

Furthermore, the wandering compensating current may be varied according to the vehicle speed. For instance, in the case of vehicle speed=0 so that the vehicle does not wander, the wandering compensating current is not applied. The wandering compensating current may be applied only when the vehicle is running. Alternatively, the wandering compensating current may be so varied as to be progressively (contiguously) increased according to the increase of the vehicle speed.

[5.4.2 Preferred Mode of Suppressing Transverse Vehicle Wandering]

A processing for suppressing the vehicle wandering is carried out by the ECU 105 (target current-value calculator 214) executing a computer program.

Figure 43:
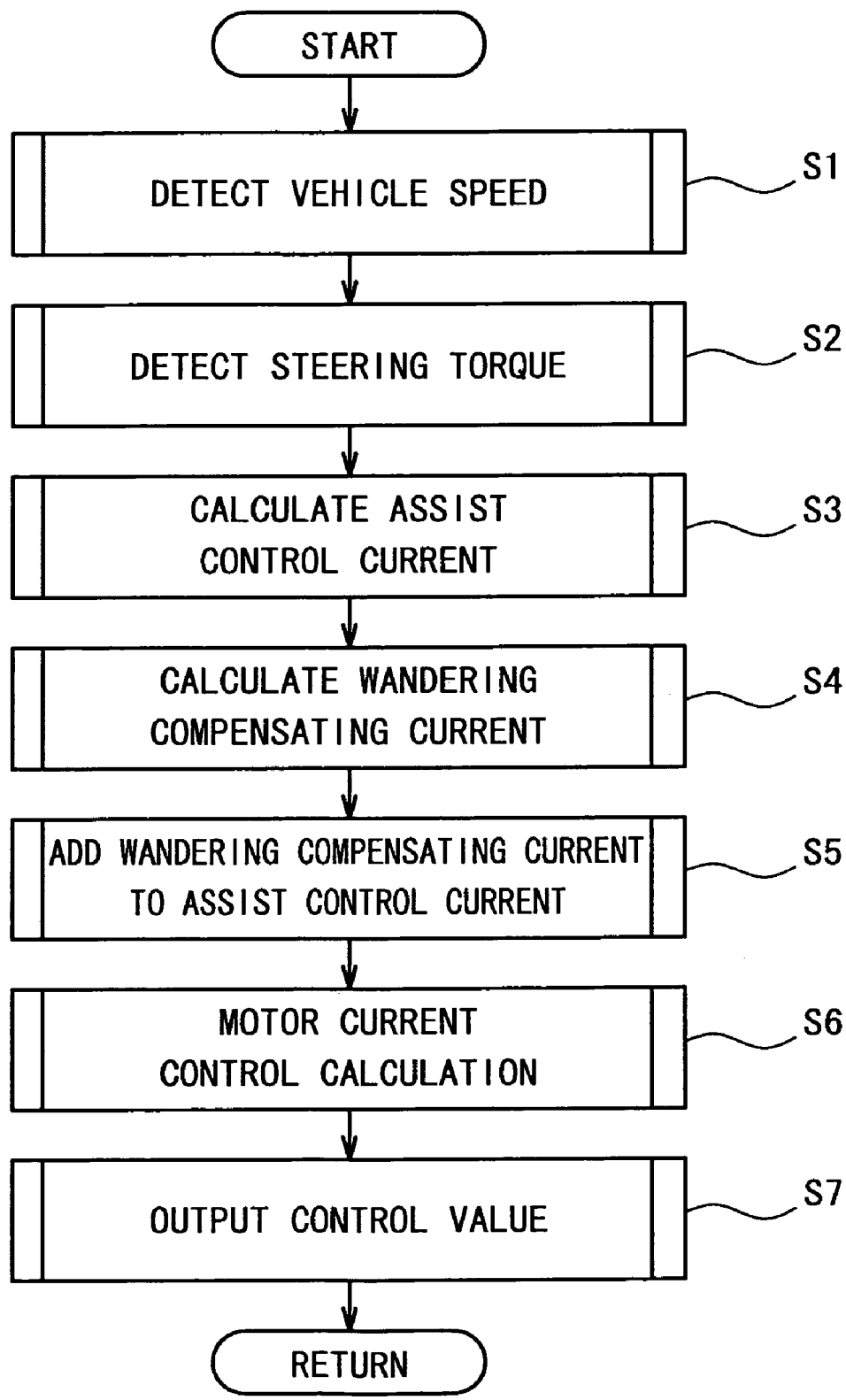
FIG. 43 is a flow chart showing a procedure for calculating a wandering compensating current.

As shown in FIG. 43, when the vehicle speed sensor 104 detects the vehicle speed Vs (Step S1) whereas the torque sensor 7 detects the steering torque Ts (Step S2), the target current-value calculator 14 calculates the assist control current value as the target motor current value (Step S3). This calculation is performed using the assist map (FIG. 36) showing the relation between the steering torque Ts and a target motor current value Is (on a per-speed basis). The assist map 32 of FIG. 36 defines a region near the steer-torque neutral position (zero-torque position) is defined as the dead zone. Hence, an assist torque (target current value Is) corresponding to the position is at 0.

The ECU 105 also performs a wandering compensating current calculation (Step S4). It is noted here that the compensating current has a fixed value set by an experiment or tuning such as not to provide the uncomfortable steering feeling.

The wandering compensating current value, as the offset value, is added to the assist control current value (Step S5), whereby a characteristic is obtained which is equivalent to the characteristic of the assist map shown in FIG. 36 shifted in a vertical direction (Is-axis direction).

The compensating current value is added to the assist control current value thereby causing the motor 9 to generate the torque to prevent the transverse vehicle wandering. Thus, the vehicle wandering may be prevented although the driver does not apply the steering torque in the opposite direction to the direction of the vehicle wandering. As a result, the degradation of the steering feeling may be obviated.

The assist control current value combined with the compensating current value is used for the feedback control of the motor 9. The feedback controller 400 performs a calculation of motor current control (Step S6) and outputs a control value to the motor (Step S7).

Figure 44:
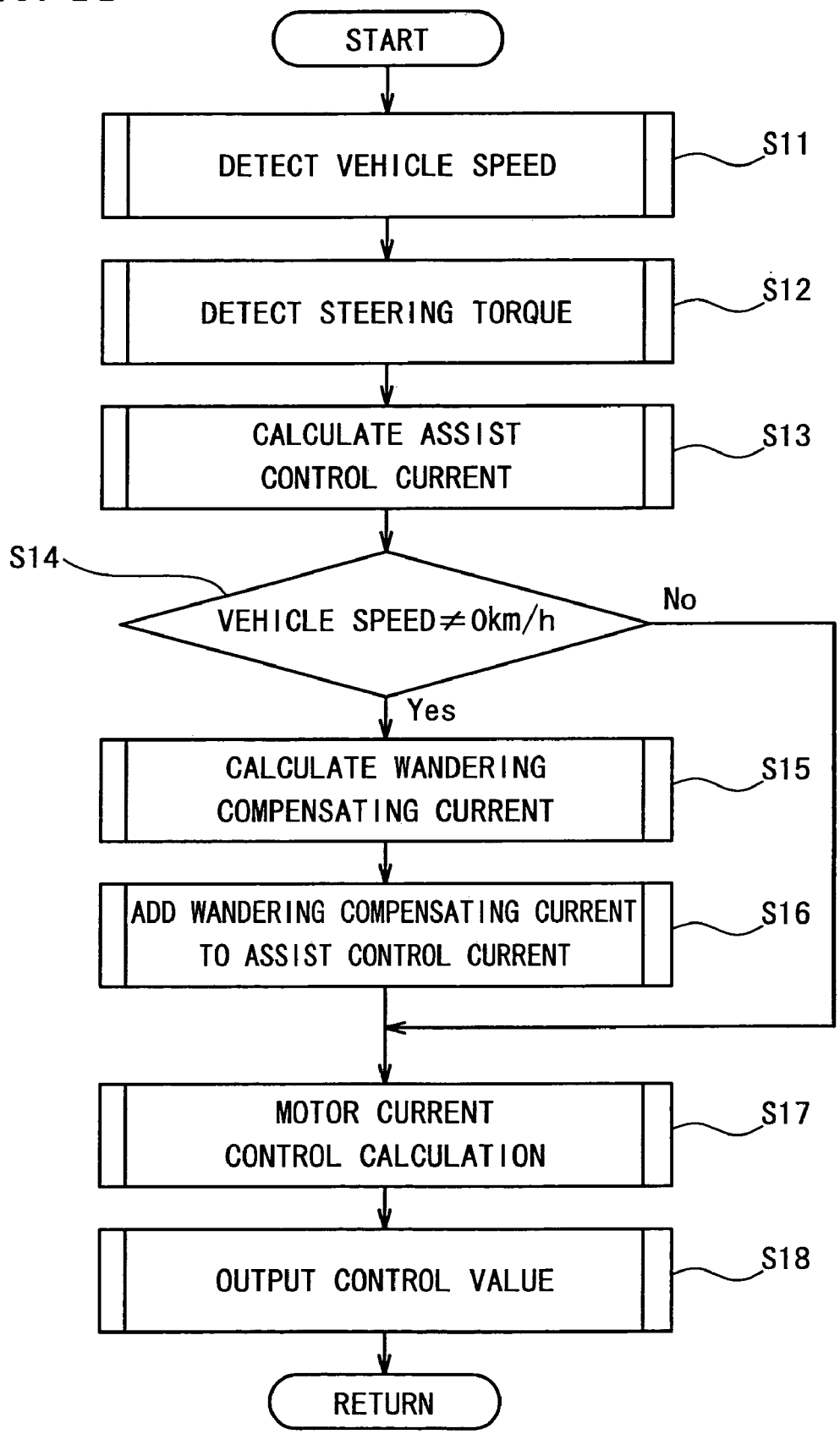
FIG. 44 is a flow chart showing another procedure for calculating the wandering compensating current.

As also shown in FIG. 44, the control flow may be arranged such that the compensating current value is not added in a case where the vehicle speed is zero and that the compensating current value is added only when the vehicle is running. As indicated by Step S14 in FIG. 44, if the vehicle speed is zero, the calculation of the wandering compensating current (Step S15) and the addition of the wandering compensating current (Step S16) are omitted, while the control is provided using the assist control current value determined in Step S13 (the same calculation as that of Step S3). Unless the vehicle speed is zero, the same processes related to the wandering compensating current as those of FIG. 43 (Steps S15, S16) may be performed. When the vehicle is at standstill so that there are no difference of the rotational directions of the frictional elements and the like which cause the problem of the vehicle wandering, a more proper control may be provided by inhibiting the addition of the wandering compensating current.

Figure 45:
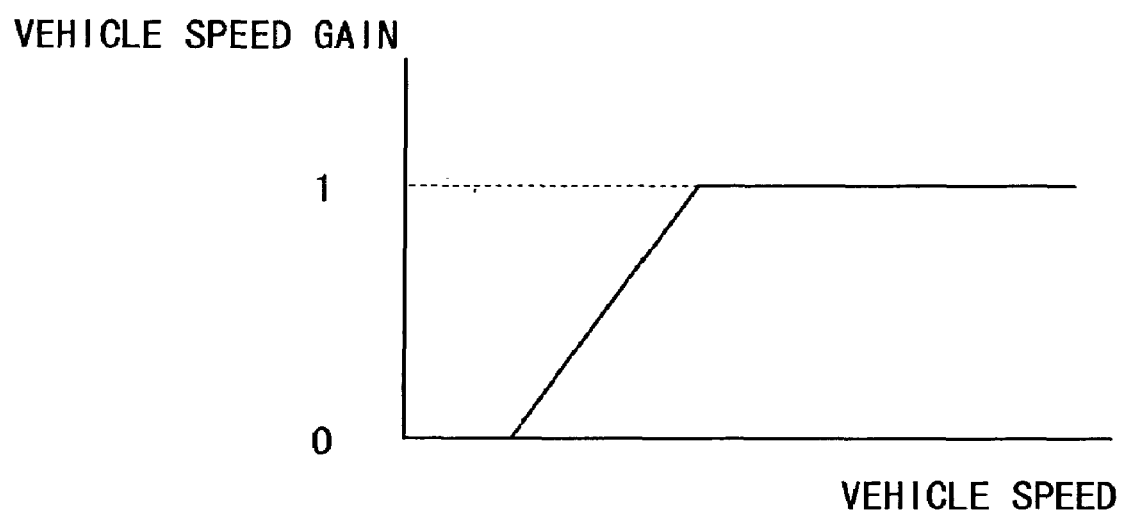
FIG. 45 is a graph showing a relation between the vehicle speed and the vehicle speed gain G(v) in the calculation of the wandering compensating current.

The above compensating current value may be a function of the vehicle speed. Specifically, a vehicle speed gain G(v) against the vehicle speed may be previously defined as shown in FIG. 45, so that the compensating current value may be determined based on an equation: compensating current value=Ic·G(v) (where Ic denotes the fixed current value). According to FIG. 45, the vehicle speed gain at vehicle speeds of zero or so is set to zero, and is contiguously increased with the increase of the vehicle speed. The vehicle speed gain is set to one when the vehicle speed exceeds a predetermined value.

[5.5 Compensation for Temperature Characteristic of Current Detector]

[5.5.1 Consideration for Temperature Characteristic of Current Detector]

The electric power steering system is provided with the torque sensor for detecting the steering torque applied to the handle as the steering means for steering purpose. The target value of the current to be supplied to the electric motor (hereinafter, referred to as "target current value") is determined based on the steering torque detected by the torque sensor. The proportional-plus-integral calculation is performed based on the difference between the target current value and the value of the current actually flowing through the electric motor, so as to generate a command value to be applied to driving means of the electric motor. The driving means of the electric motor includes: a PWM signal generating circuit for generating a pulse-width modulation signal (hereinafter, referred to as "PWM signal") having a duty ratio corresponding to the command value; and a motor drive circuit constituted by a power transistor ON/OFF controlled according to the duty ratio of the PWM signal. Thus, the driving means is adapted to apply a voltage corresponding to the duty ratio to the electric motor. The current caused to flow through the electric motor by such voltage application is detected by the current detector. The difference between the target current value and the detected current value is used as the difference based on which the above command value is generated.

In the electric power steering system employing the three-phase brushless motor, it is a common practice to provide the current detectors for any two of the three phases of the motor. For instance, the current detectors for the U-phase and V-phase are provided for detecting the U-phase current and the V-phase current of the current flowing through the motor.

The aforementioned constitution may sometimes encounter an event where the detector actually detects some current through the motor although the current to be applied to the motor is set to zero. Such a detected current is called an offset current. A value of the current detected by the detector during the operation of the motor indicates a value of the current including the current through the motor and the offset current superimposed thereon. The value of such an offset current varies from one-phase current detector to another. If the motor control is provided disregarding the influence of the offset current, there occurs an error between the current to be applied to each phase of the motor and the current actually applied to each phase. This leads to the occurrence of the torque ripple, which is perceived by the driver steering the handle as the uncomfortable steering feeling.

The conventional steering system eliminates the aforementioned influence of the offset current as follows. The system retains a correction value equivalent to the offset current (hereinafter, referred to as "offset correction value"), such as to correct the detected current value by subtracting the offset correction value from the detected current value supplied from the current detector. Specifically, a current value detected by the current detector at switch-on of the ignition switch is retained as the offset correction value. During the operation of the motor, the detected current value is corrected by subtracting the offset correction value from the detected current value supplied from the current detector. Subsequently, the motor control is provided based on the corrected current value.

During the operation of the motor, however, the offset current occurring in the current detector varies due to the influence of temperature fluctuations. Because of the influence of temperature fluctuations, a gain, namely a ratio of an output value to a measurement value (input value) of the current detector also varies. The gain is equivalent to an inclination of straight line representing a correlation between the measurement value and the output value. The conventional constitution provides the motor control which takes into account the offset current detected at switch-on of the ignition switch. However, when significant variations of the offset current and the gain are induced by the temperature fluctuations, the correction only using the initial offset correction value cannot offer an adequate effect.

The following constitution may be adopted to obviate the torque ripple so as to provide a smooth steering feeling even when the offset current in the current detector and the gain are varied due to the temperature fluctuations during the operation of the motor.

That is, a preferred electric power steering system operating to drive a brushless motor based on a target current value decided according to a vehicle steering operation, thereby applying a steering assist force to a steering mechanism of a vehicle, the system comprises motor-current detecting means for detecting a current flowing through the brushless motor and outputting a detected current value; temperature detecting means for detecting a temperature at place in the vicinity of the motor current detecting means; correcting means for correcting the detected current value according to the detected temperature value; motor control means for generating a command value based on a difference between the target current value and a corrected detection current value corrected by the correcting means, the command value used for driving the brushless motor; and a motor drive circuit for driving the brushless motor according the command value.

According to the above constitution, the current value detected by the motor-current detecting means is corrected according to the temperature, whereby a value of the current actually flowing through the motor may be determined. Therefore, the value of the current flowing through the motor may be determined correctly even if the current value detected by the motor-current detecting means is varied due to the influence of temperature fluctuations. Thus, the occurrence of the torque ripple is prevented, so that the system is able to provide the smooth steering feeling to the driver.

It is preferred that the correcting means includes: offset-correction value setting means for setting a predetermined offset correction value according to the detected temperature, the offset correction value used for correcting the offset current occurring in the motor-current detecting means; and current-value correcting means for correcting the detected current value based on the offset correction value.

According to the constitution, the value of the current actually flowing through the motor may be determined by defining the predetermined offset correction value according to the temperature, and performing the predetermined correction such as to subtract the above offset correction value from the current value detected by the motor-current detecting means. Therefore, the value of the current flowing through the motor may be determined correctly, even if the offset current occurring in the motor-current detecting means is varied due to the influence of the temperature fluctuations. Accordingly, the torque ripple caused by the variations of the offset current is obviated, so that the system is able to provide the smooth steering feeling to the driver.

It is preferred that the correcting means further includes coefficient defining means for defining a gain correction coefficient according to the detected temperature, the gain correction coefficient used for correcting the variations of the gain as the ratio of the output value to the input value of the motor-current detecting means, and that the current-value correcting means corrects the detected current value based on the offset correction value and the gain correction coefficient.

According to the above constitution, the value of the current actually flowing through the motor may be determined by defining the predetermined offset correction value according to the temperature, defining the predetermined gain correction coefficient according to the temperature, and performing the predetermined correction processing such as to multiply a difference by the above gain correction coefficient, the difference obtained by subtracting the above offset correction value from the current value detected by the motor-current detecting means.

Therefore, the value of the current flowing through the motor is determined correctly, even if the offset current occurring in the motor-current detecting means or the gain of the motor-current detecting means is varied due to the influence of the temperature fluctuations. Accordingly, the torque ripple caused by the variations of the offset current or of the gain is obviated, so that the system is able to provide the smooth steering feeling to the driver.

[5.5.2 Preferred Mode of Compensation for Temperature Characteristic]

As shown in FIG. 27, a temperature detector 240 is disposed in the vicinity of the U-phase current detector 181 and the V-phase current detector 182, so as to detect the temperatures of the U-phase current detector 181 and the V-phase current detector 182 for outputting temperature values h indicative of the temperatures of the current detectors.

The detected current-value correcting portion 250 updates the predetermined offset correction value and gain correction coefficient based on the U-phase current detection value iu, the V-phase current detection value iv, the temperature value h and the like. It is noted here that the offset correction value is a value for eliminating the influence of the offset current which is detected by the current detector when the current to be applied to the motor is zero. The gain value is a ratio of the output value to the measurement value (input value) of the current detector. Hence, the gain value is equivalent to the inclination of the straight line representing the correlation between the measurement value and the output value. As will be described hereinlater, the gain correction coefficient is a coefficient defined according to the temperature in order to correct the gain value varied due to the temperature fluctuations. Specifically, the gain correction coefficient is an inverse of a ratio of the gain value to a gain value which is used as a reference at the temperature when the correction is made.

The detected current-value correcting portion 250 subtracts the offset correction value from each of the U-phase current detection value iu and the V-phase current detection value iv. Then, the detected current-value correcting portion multiplies the respective subtraction results by the gain correction coefficient thereby correcting the U-phase current detection value iu and the V-phase current detection value iv. These corrected current values are outputted as a U-phase motor current value imu and a V-phase motor current value imv. In this manner, the offset current value varied due to the temperature fluctuations is corrected by subtracting the offset correction value from the detected current value, while the gain value varied due to the temperature fluctuations is corrected by multiplying the subtraction results by the gain correction coefficient. A detailed description on the correction processing operation by the detected current-value correcting portion 250 will be made hereinlater.

Based on the electrical angle Ere of the rotor, the three-phase-AC/d-q coordinates converter 229 converts the U-phase motor current value imu and the V-phase motor current value imv to a d-axis motor current value id and a q-axis motor current value iq which are the values on the d-q coordinates. The d-axis motor current value id and the q-axis motor current value iq are inputted to the subtracter 223 and the subtracter 224, respectively.

Figure 46:
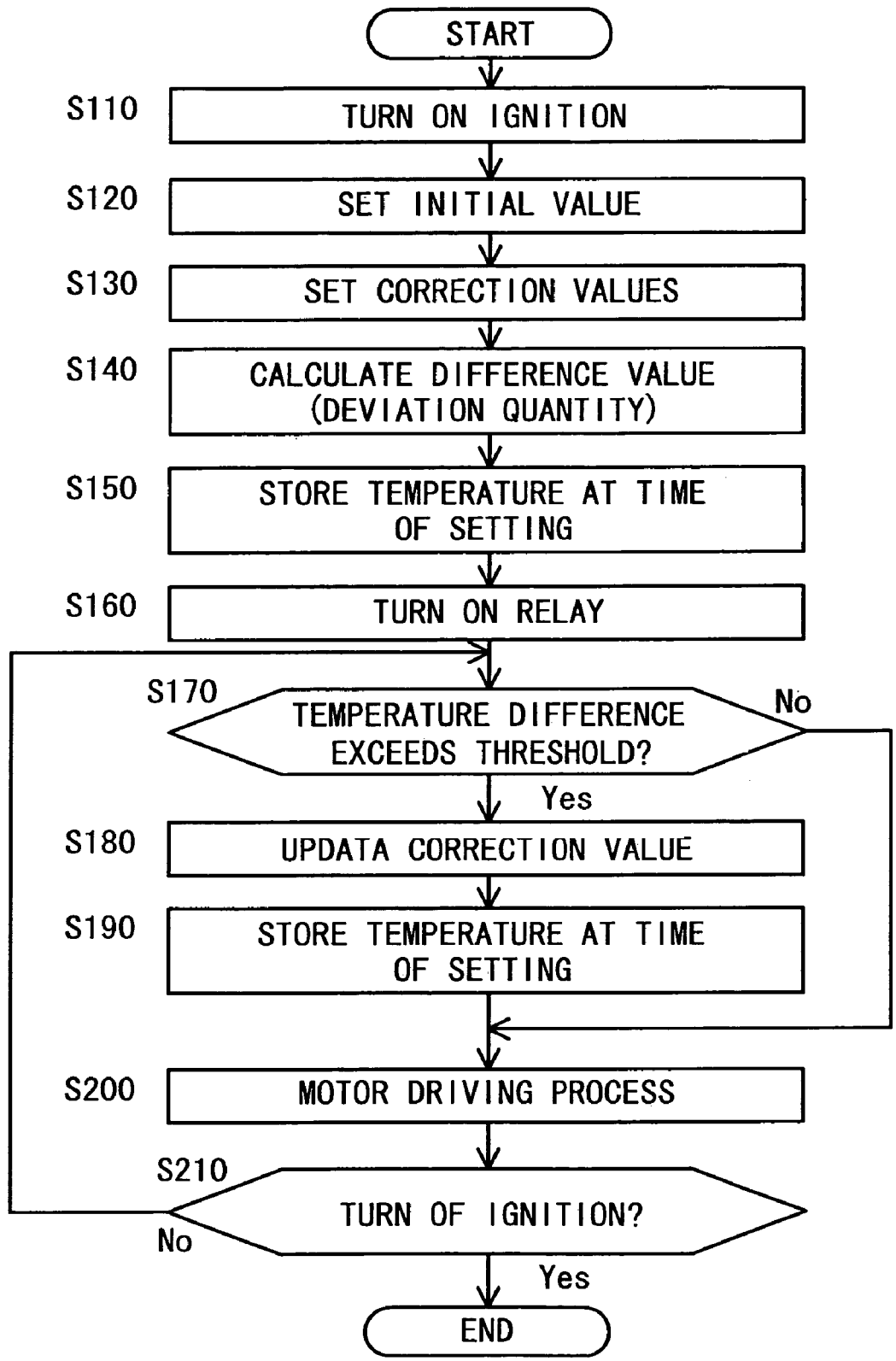
FIG. 46 is a flow chart showing a procedure for correcting a detected motor current value.

Next, description is made on the correction processing by the detected current-value correcting portion 250. FIG. 46 is a flow chart showing a procedure for correcting the detected current value. It is noted that the functions of the detected current-value correcting portion 250 of FIG. 27 are implemented by executing Step S120, Step S130, Step S140, Step S150, Step S170, Step S180 and Step S190 shown in this flow chart.

The electric power steering system operates as follows. When the ignition switch is turned on (Step S110), the microcomputer (ECU 105) sets initial values of the parameters (variables) which are referred to in the programs executed by the microcomputer (Step S120). Specifically, a U-phase offset correction value iou and a V-phase offset correction value iov are set to zero, while a U-phase gain correction coefficient gu and a V-phase gain correction coefficient gv are set to one. When these U-phase offset correction value iou, V-phase offset correction value iov, U-phase gain correction coefficient gu and V-phase gain correction coefficient gv (hereinafter, these values are collectively referred to as "correction value") are to the initial values, the operation flow proceeds to Step S130.

In Step S130, the U-phase current detection value iu detected by the U-phase current detector 181 and the V-phase current detection value iv detected by the V-phase current detector 182 are set to the U-phase offset correction value iou and the V-phase offset correction value iov, respectively. That is, the values of the offset currents produced in the U-phase current detector 181 and the V-phase current detector 182 immediately after the switch-on of the ignition switch are set as the U-phase offset correction value iou and the V-phase offset correction value iov, respectively. In Step S130, the gain correction coefficient corresponding to the temperatures h detected by the temperature detector 240 are also set as the U-phase gain correction coefficient gu and the V-phase gain correction coefficient gv. The gain correction coefficient corresponding to the temperature h is calculated based on a table or a mathematical equation correlating the temperature h with the gain correction coefficient. The table or the mathematical equation is based on predetermined values obtained by measuring the gain variations associated with the temperature fluctuations, for example. The table or the mathematical equation is previously stored in the detected current-value correcting portion 170. When the correction values are set as described above, the operation flow proceeds to step S140.

In Step S140, differences (quantities of deviation) of the U-phase offset correction value iou and the V-phase offset correction value iov from predetermined offset reference values corresponding to the temperature h detected by the temperature detector 240 are calculated as a U-phase offset difference value dou and a V-phase offset difference value dov, respectively. The offset reference value is obtained by measuring an offset current of a predetermined current detector as a reference at each temperature level. Hence, the offset reference value principally corresponds to the temperature of the temperature detector of interest. The correlation between the temperature and the offset reference value is previously stored in the detected current-value correcting portion 250 as the predetermined table or mathematical equation. It is noted that the current detector as the reference is different from the U-phase current detector 181 or the V-phase current detector 182, so that the U-phase current detection value iu detected by the U-phase current detector 181 and the V-phase current detection value iv detected by the V-phase current detector 182 each have a certain quantity of deviation from the current value detected by the current detector as the reference, the deviation occurring according to the individual variability of the detectors. The above difference values as the deviation quantities are used in a processing of Step S180 to be described hereinlater. The above offset reference value may also be a mean value of the offset current values of plural current detectors as measured at each temperature level.

In Step S150, the temperature h detected by the temperature detector 240 is stored as a temperature at the time of setting. Subsequently, the relay is closed (turned ON) (Step S160).

In Step S170, the present temperature h detected by the temperature detector 240 is compared with the temperature at the time of setting and determination is made as to whether a temperature difference therebetween exceeds a predetermined threshold or not. If the temperature difference exceeds the threshold, the operation flow proceeds to Step S180. If not, the operation flow proceeds to Step S200, omitting processes of Step S180 and S190.

In Step S180, an offset reference value corresponding to the present temperature h detected by the temperature detector 240 is calculated based on the predetermined table or mathematical equation described above. Alternative U-phase offset correction value iou and V-phase offset correction value iov are calculated by adding the U-phase offset difference value dou and V-phase offset difference value dov calculated in Step S140 to the offset reference value thus calculated, respectively. In Step S180, the gain correction coefficients corresponding to the temperature h detected by the temperature detector 240, as calculated based on the predetermined table or mathematical equation described in Step S130, are set again as the U-phase gain correction coefficient gu and the V-phase gain correction coefficient gv. When the correction values are updated as described above, the operation flow proceeds to Step S190.

In Step S190, the temperature at the time of setting is updated by deleting the stored temperature at the time of setting and re-storing the present temperature h detected by the temperature detector 240 as the temperature at the time of setting. Subsequently, the operation flow proceeds to Step S200.

In Step S200, the detected current-value correcting portion 250 subtracts the U-phase offset correction value iou from the U-phase current detection value iu, corrects the U-phase current detection value iu by multiplying the subtraction result by the U-phase gain correction coefficient gu, and outputs the corrected value as the U-phase motor current value imu. Furthermore, the detected current-value correcting portion 250 subtracts the V-phase offset correction A value iov from the V-phase current detection value iv, corrects the V-phase current detection value iv by multiplying the subtraction resultant by the V-phase gain correction coefficient gv, and outputs the corrected value as the V-phase motor current value imv. The aforementioned motor driving process is performed based on these output current values.

In Step S210, determination is made as to whether the ignition switch is turned off or not. If the ignition switch is turned off, the aforementioned process is terminated so that the electric power steering system is deactivated. If not, the operation flow returns to Step S170, so that the processes of Step S170 to Step S210 are repeated while the electric power steering system is operated.

According to the electric power steering system of the embodiment as described above, the offset correction value detected at switch-on of the ignition switch is updated according to the temperature fluctuating during the operation of the motor, while the gain correction coefficient is updated according to the temperature fluctuations. The value obtained by subtracting the above offset correction value from the current value detected by the current detector is multiplied by the above gain correction coefficient, whereby the value of the current actually flowing through the motor is determined. Therefore, the correct value of the current flowing through the motor may be determined even though the offset current occurring in the current detector and the gain of the current detector are varied due to the influence of the temperature fluctuations. Thus is prevented the torque ripple caused by the varied offset current and gain. Hence, the electric power steering system is capable of providing the smooth steering feeling to the driver.

[5.5.3 Modifications]

According to the above embodiment, the offset correction value and the gain correction coefficient are updated according to the temperature fluctuations, while the value obtained by subtracting the above offset correction value from the current value detected by the current detector is multiplied by the above gain correction coefficient thereby to determine the value of the current actually flowing through the motor. However, an alternative constitution may also be adopted wherein only the offset correction value is updated according to the temperature fluctuations as disregarding the above gain variations and wherein the above offset correction value is subtracted from the current value detected by the current detector thereby to determine the value of the current actually flowing through the motor. This constitution does not correct the varied gain of the current detector. In a case where the gain variation is small, this constitution is adapted to prevent the torque ripple caused by the varied offset current, thus providing the smooth steering feeling to the driver.

According to the above embodiment, the U-phase current and the V-phase current are detected by the U-phase current detector 181 and the V-phase current detector 182, respectively. However, a W-phase current detector may also be added to detect the W-phase current. While motor 9 of the above embodiment is the three-phase brushless motor, a brushless motor having n-phases (n denoting an integer of 4 or more). In this case, (n−1) or more current detectors are provided in correspondence the individual phases.

[5.6 Phase Alignment in Reduction Gear Assembly]

[5.6.1 Consideration for Mesh of Gear Teeth of Reduction Gear Assembly and Torque Variations thereof]

One of important performances of the electric power steering system is the smooth steering feeling during driving or particularly when the steering member is in the neutral position.

On the other hand, the ripple (pulsation) of the output torque encountered by the electric motor is classified broadly into the cogging torque caused by structural factors such as the number of poles, slots and the like of the motor, and the electrical ripple occurring in the motor as a result of the induced electromotive force having the waveform distorted relative to the idealistic waveform. Of these ripples, the cogging torque of the electric motor is responsible for seriously degrading the steering feeling when the steering member is in the neutral position. In the electric power steering systems of this type, efforts have heretofore been made to reduce the cogging torque itself occurring in the electric motor by improving the combination of the poles number and slots number of the motor (Prior Art 7), by improving a teeth configuration (Prior Art 18) or such.

However, the conventional measures for reducing the cogging torque by improving-the internal structure of the electric motor have a drawback that the electric motor per se is complicated in structure and increased in cost, resulting in an increased manufacture cost of the electric power steering system.

On the other hand, in the electric power steering systems of this type, the torque ripple occurs not only in the electric motor but also in the reduction gear assembly, for example, which transmits the motor output to a steer-assisted shaft (output shaft 24) as reducing the rotational speed of the output shaft of the motor. Specifically, such a reduction gear assembly encounters the torque variations according to the degree of meshing engagement between gears. The torque variations are particularly significant in a case where one of the gears is pressed against the other gear in order to obviate a gear-to-gear backlash.

Therefore, the electric power steering systems of this type may not be able to prevent the degraded steering feeling so effectively by merely reducing the cogging torque of the electric motor itself because if the reduction gear assembly encounters the torque variations, the varied torque is transmitted to the steer-assisted shaft.

Therefore, the following constitution may be adopted to prevent the degradation of the steering feeling of the electric power steering system at lower cost. The constitution is designed to easily suppress the torque variations at the steer-assisted shaft although the cogging torque of the electric motor is not reduced.

That is, a preferred electric power steering system comprises: a steer-assisted shaft (such as the output shaft) as a power assist subject operatively connected to a steering member; a torque sensor for detecting a steering torque based on a relative rotational displacement of the steering member; an electric motor for secondarily driving the steer-assisted shaft into rotation based on the detection result supplied from the sensor; and a reduction gear assembly for transmitting the rotation of an output shaft of the motor to the steer-assisted shaft as reducing the rotational speed of the motor, and is characterized in that the reduction gear assembly is designed to involve torque variations associated with the rotation thereof, which have substantially the same cycle as that of a cogging torque of the electric motor and the opposite phase to that of the cogging torque.

In this case, the torque of the reduction gear assembly is varied substantially in the same cycle as that of the cogging torque of the electric motor and in the opposite phase to that of the cogging torque so that these torques cancel each other. Therefore, the torque variations of the steer-assisted shaft may be easily suppressed without decreasing the cogging torque of the electric motor.

In the brushless motor containing therein the rotor having the n-poles and s-poles of permanent magnets arranged in a circumferential direction thereof, as will be described in an embodiment to be described hereinlater, it is known that the rotor rotated at an extremely low speed produces ripple containing as many waves as the number of poles (the total number of the s-poles and n-poles) in one revolution. In a case where the first gear and the second gear are meshed with each other in a substantially backlash-free state, on the other hand, torque variations of the first gear as seen from the second gear constitute ripple containing as many waves as the number of teeth of the first gear.

It is therefore preferred that the above reduction gear assembly includes: the first gear (driving gear) coaxially coupled to the output shaft of the electric motor and having as many teeth as the number of poles of the motor; and the second gear (driven gear) mounted to the steer-assisted shaft (output shaft) in a manner to be meshed with the first gear. In this case, the first gear coaxially coupled to the output shaft of the electric motor has as many teeth as the number of poles of the motor. Therefore, if the meshing engagement between the first gear and the second gear is adjusted in a manner that the bottom of the first gear is aligned with the tooth tip of the second gear when the cogging torque of the electric motor is at maximum (when the torque variation of the first gear is at minimum), it is ensured that the torque variation of the reduction gear assembly and the cogging torque of the electric motor cancel each other.

[5.6.2 Preferred Mode of Reducing Torque Variations]

As shown in FIG. 1, the reduction gear assembly 8 includes: the first gear 82 as the driving gear constituted by a spiral gear coupled to the output shaft 91 of the electric motor 9; and the second gear 81 as the driven gear unitarily rotatably fitted on the steer-assisted shaft (output shaft 24) as the power assist subject. The second gear 81 is constituted by an involute helical gear rotated about an axis parallel to an axis of the first gear 82 and having a greater number of teeth than that of the first gear 82. The second gear is meshed with a substantially intermediate portion of the first gear 82 with respect to the axial direction thereof. Therefore, the revolving motion of the output shaft 91 of the electric motor 9 is transmitted to the output shaft 24 as decelerated by way of the meshing engagement between the first gear 82 and the second gear 81.

The first gear 82 is rotatably carried on the two bearings 82a, 82b, which each have an elastic ring (O-ring) 84 fitted thereon. Thus, the bearings 82a, 82b are mounted to a reduction-gear housing 85 by means of the elastic rings 84. These elastic rings 84, 84 serve to resiliently pressurize the first gear 82 and the second gear 81 toward each other. Even when the first gear 82 and the second gear 81 are worn at their tooth flanks due to long term use, these gears 81, 82 are effectively maintained in mutual contact in accordance with the wear, whereby the occurrence of backlash may be avoided.

The electric motor 9 includes the brushless motor containing therein the rotor having the n-poles and s-poles of permanent magnets arranged in a circumferential direction thereof.

The embodiment employs, as the motor 9, a brushless motor having five pairs of s-poles and n-poles (ten poles in total) and four sets of stators (a total number of 12 stators for three phases of U, V, W). When the rotor (output shaft 91) is rotated at an extremely low speed, such an electric motor 9 produces ripple (cogging torque Ti) containing as many waves as the number of poles (10 poles in the embodiment) in one revolution, as shown in FIG. 1(*a*).

Figure 47:
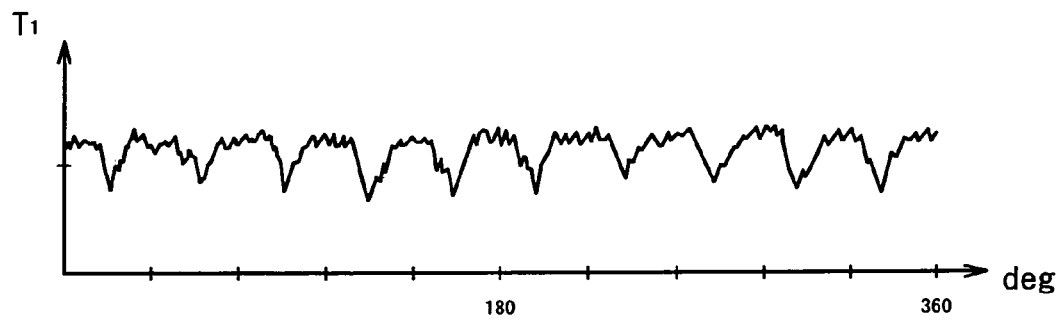
FIG. 47 (a) is a graph showing a cogging torque, (b) graphically showing torque variations in the reduction gear assembly, (c) graphically showing torque variations in an output shaft.
Figure 47:
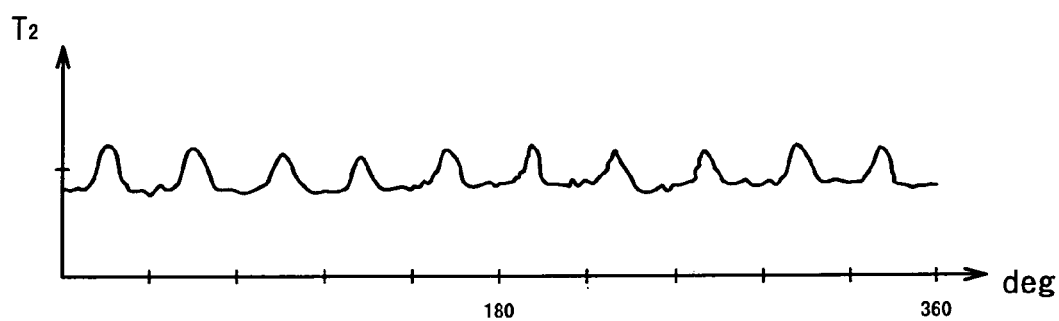
Figure 47:
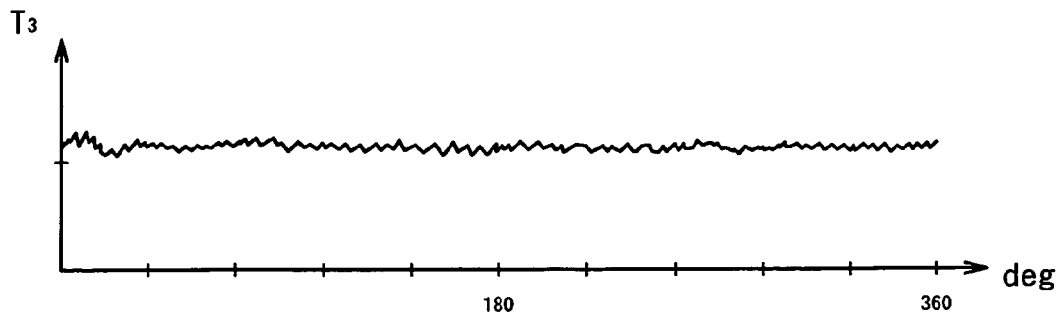
Figure 48:
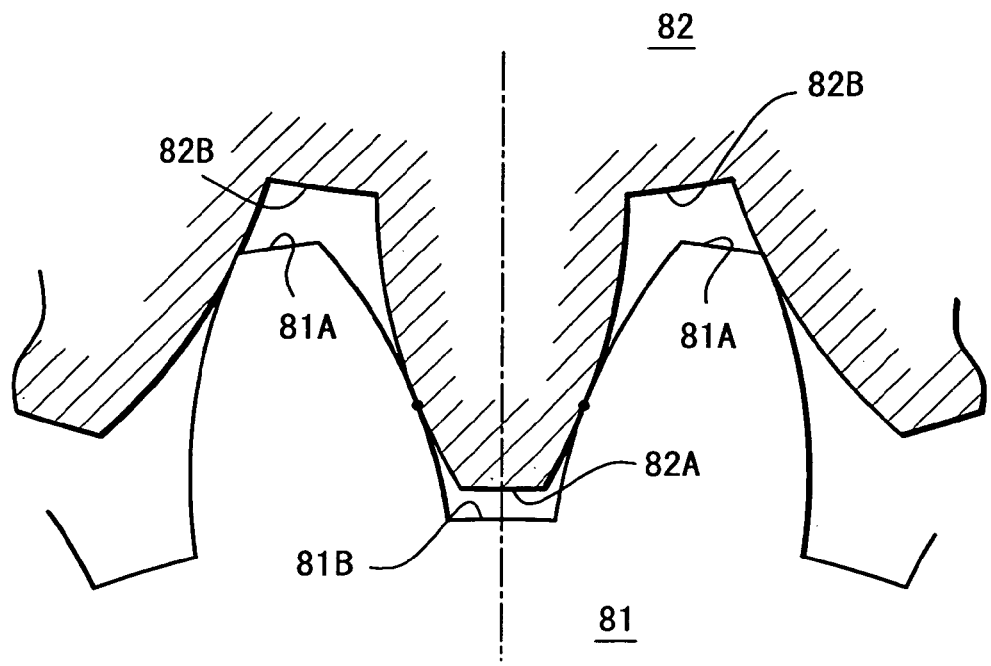
FIG. 48 is a group of diagrams showing meshing states of a first gear and a second gear, (a) showing a state where the torque of the first gear is at maximum, (b) showing a state where the torque of the first gear is at minimum.
Figure 48:
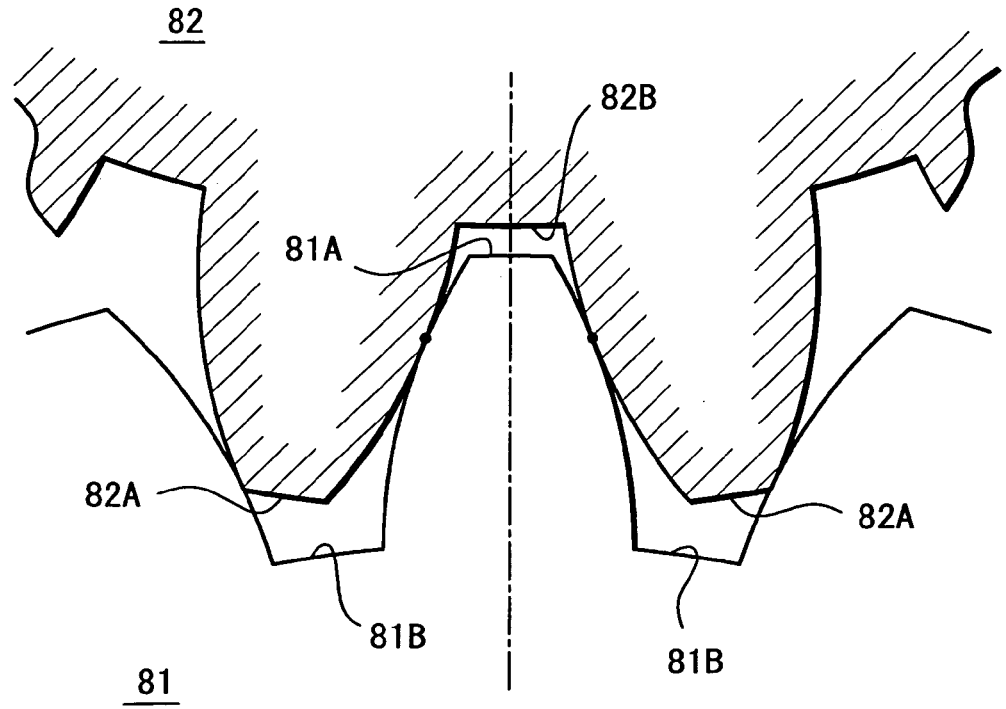

On the other hand, the reduction gear assembly 8 of the embodiment has the first gear 82 and the second gear 81 meshed with each other as maintained in a substantially backlash-free state by way of the urging forces of the elastic rings 84. In this case, as shown in FIG. 47(*b*), the reduction gear assembly produces ripple (torque variation T2) containing as many of waves as the number of teeth of the first gear 82 in one revolution. The ripple constitutes the torque variation as seen from the second gear 81. Such a torque variation T2 caused by the first gear 82 is at maximum when the first gear 82 and the second gear 81 are in a meshing engagement shown in FIG. 48(*a*), where a tooth tip 82A of the first gear is aligned with a bottom 81B of the second gear 81. Conversely, the torque variation is at minimum when the first gear and the second gear is in a meshing engagement shown in FIG. 48(*b*), where a bottom 82B of the first gear 82 is aligned with a tooth tip 81A of the second gear 81.

According to the embodiment, therefore, a gear having ten teeth which is the same number of the poles of the electric motor is employed as the first gear 82 coaxially coupled to the output shaft 91 of the electric motor 9. Thus, the per-revolution waves number of the cogging torque Ti of the electric motor 9 is matched with the per-revolution waves number of the torque variation T2 of the first gear 82. In addition, a coupling angle about a rotational axis between the first gear 82 and the output shaft 91 is adjusted such that the first gear 82 is meshed with the second gear 81 in a manner to bring the bottom 82B thereof into alignment with the tooth tip 81A of the second gear 81 when the cogging torque T1 of the electric motor 9 is at maximum. Thus is provided the arrangement wherein the cogging torque T1 of the electric motor 9 and the torque variation T2 of the first gear 82 substantially have the same cycle and the opposite phases.

In the electric power steering system according to the embodiment, therefore, the ripple (T1 in FIG. 1(*a*) and the ripple T2 in FIG. 1(*b*)) occurring in the electric motor 9 and the reduction gear assembly 8 cancel each other as shown in FIG. 47(*c*), so that a torque variation T3 occurring at the second steering shaft 24 as the steer-assisted shaft may be substantially eliminated. Accordingly, the torque variation T3 occurring at the second steering shaft 24 may be easily suppressed even when the cogging torque T1 in the electric motor 9.

[6 Non-Interactive Control]

As shown in FIG. 27, the ECU 105 includes a non-interactive control calculator 450 for providing a non-interactive control of the motor 9.

It is noted here that the term "interaction" means that when an operation quantity of one of plural control system is varied, an operation quantity of any other control is varied. On the other hand, the term "non-interactive control" means a control which inhibits the interaction between the interactive control systems so as to handle the control systems as non-interactive, independent systems.

In a control wherein measured values of the d-axis current and the q-axis current are fed back to the respective target values of the d-axis current and the q-axis current of the brushless motor 9, as described above, the induced electromotive force of the motor 9 causes interaction between a d-axis control system and a q-axis control system. That is, varying the target value of the d-axis current affects the measured value of the q-axis current, whereas varying the target value of the q-axis current affects the measured value of the d-axis current. The interaction between the q-axis current and the d-axis current appears as an electrical viscous friction, which constitutes a factor to decrease a motor efficiency.

The non-interactive control calculator (non-interactive control means) 450 serves to obviate the interaction between the q-axis and the d-axis and performs a decoupling calculation based on the motor angular speed calculated based on the dq-axes currents (id, iq) as the measured values and the rotational angle of the motor.

The detected d-axis current id is affected by a control system dedicated to the q-axis, whereas the detected q-axis current iq is affected by a control system dedicated to the d-axis. However, the decoupling calculation eliminates such an interaction.

Specifically, the non-interactive control calculator 450 corrects dq-axes target voltages generated by the PI controllers 225, 226 so as to generate decoupled dq-axes target voltages (V*d, V*q), which are applied to the d-q/three-phase-AC coordinates converter 227.

In the control of the brushless motor 9, the electrical viscous friction may be decreased by providing the q-axis/d-axis non-interactive control whereby the motor efficiency may be increased.

[7 Damping of Road Noise in Rack Shaft]

[7.1 Consideration for Road Noise]

In order to prevent the degradation of the steering feeling, the steering system is required of suppressing the disturbances (noises from road surface; road noises) inversely inputted from the steerable wheels to the steering mechanism according to the conditions of the road surface on which the vehicle travels.

In this connection, some of the conventional systems are arranged to cut off an unwanted frequency band of the above road noises thereby preventing an adverse effect of the disturbances on the steering mechanism (Prior Art 2).

On the other hand, some of the conventional systems have a constitution wherein a bush assembly part formed of a rubber-like elastic material is interposed as a damper between the rack shaft included in the steering mechanism and a ball joint connected to the steerable wheel, such as to damp the road noises, as taught by Prior Art 19, for example.

However, the aforementioned disturbances include some road information (the degree of steerable-wheel slip on the road surface, and the like) to be physically perceived by the driver via the steering member. It is extremely difficult to exclusively cut off the unwanted frequency band. In consequence, the conventional systems have a problem that the unwanted road noises are inversely inputted to the steering mechanism, thus causing vibrations or degrading the steering feeling. Specifically, the conventional system such as that of Prior Art 2 which controllably cuts off the unwanted frequency band tends to make improper definition of the cut-off frequencies, thus failing to assuredly eliminating the adverse effect of the road noises. On the other hand, the conventional system, such as that of Prior Art 19 which employs the bush assembly part (damper), entails the degraded steering feeling as a result of the damper damping necessary road information. In addition, the system of Prior Art 19 has another drawback. In order to prevent the decrease of vibration absorptivity at the bush assembly part, an air-dischargeable cylinder shaft is interposed between the bush assembly part and the ball joint and is connected with the bush assembly part. Hence, the system has a complicated and large structure.

The following constitution may be adopted which has a simple structure for assuredly preventing the road noises from adversely affecting the steering mechanism, thereby avoiding the degradation of steering feeling.

That is, a preferred electric power steering system for providing steering assist by applying a power of an electric motor to a steering mechanism extending from a steering member to steerable wheels is characterized in that the steering mechanism comprises: a rack shaft connected with the steerable wheels at the transversely opposite ends thereof; and a viscoelastic member having predetermined viscous friction and elasticity, and that the viscoelastic member is provided in a manner that the viscous friction and elasticity of the viscoelastic member act on the rack shaft.

The inventors have found that the electric power steering system of the above constitution is capable of cutting off the unwanted frequency band of the disturbances (road noises) inversely inputted from the steerable wheels connected with the rack shaft by virtue of the provision of the viscoelastic member adapted to apply the viscous friction and elasticity thereof to the rack shaft. The inventors and the like noted that frequency dependency may be imparted to the road noises inversely inputted from the steerable wheels to the rack shaft by applying the viscous friction and elasticity of the viscoelastic member to the rack shaft. This approach differs from the technique of Prior Art 19 in the manner to apply the elasticity and friction to the rack shaft. The inventors and the like also noted that a wanted frequency band and the unwanted frequency band of the road noises are located on a low-frequency side (e.g., less than 10 Hz) and a high-frequency side (e.g., 10 Hz or more), respectively. The inventors and the like have also found that only the road noises in the high-frequency band can be cut off by way of the viscous friction and elasticity of the viscoelastic member.

The above electric power steering system may preferably satisfy the following inequality (81):

$$2(KJ)^{1/2} \leq C \tag{81}$$

where C denotes the viscous friction constant of the above viscoelastic member; K denotes the elastic constant of the viscoelastic member; and J denotes the inertia of the rack shaft as determined at the steerable-wheel side.

In this case, vibrations (resonance) at a secondary vibration system formed between the rack shaft and the steerable wheels are assuredly prevented by way of the viscous friction and elasticity of the above viscoelastic member. Thus, the degraded steering feeling resulting from the vibrations may be more effectively obviated.

In the above electric power steering system, the viscoelastic member may comprise: an inner cylinder; an outer cylinder surrounding the inner cylinder via a gap; an elastic material interconnecting the inner cylinder and the outer cylinder and having the elastic constant K; and a viscous material filled in the gap between the inner cylinder and the outer cylinder and having the viscous friction constant C.

In this case, the viscoelastic member integrating the above elastic material and viscous material is used so that the member may be easily assembled in the system. Furthermore, the simple structure is adapted to suppress the vibrations at the steering mechanism whereby the degradation of the steering feeling may be easily obviated.

It is preferred in the above electric power steering system that a highly viscous lubricant is interposed between the rack shaft and the viscoelastic member.

In this case, because of the highly viscous lubricant interposed between the rack shaft and the viscoelastic member, the system may be increased in the ability to cut off the unwanted road noises by way of the viscous friction and elasticity of the viscoelastic member. Thus, the system more effectively preventing the road noises from adversely affecting the steering mechanism may be constructed easily.

[7.2 Preferred Mode of Viscoelastic Member]

As shown in FIG. 1, disposed in the rack housing 33 accommodating the rack shaft 32 is a cylindrical viscoelastic member 500 having predetermined viscous friction and elasticity such that the viscous friction and elasticity thereof may act on the rack shaft 32. The viscoelastic member 500 is connected to the rack shaft 32 via the highly viscous lubricant applied to the rack shaft 32. The lubricant has a selected viscosity such that the lubricant may provide resistance against the rack shaft 32 to be moved relatively quickly but may not provide resistance against the rack shaft 32 to be moved relatively slowly. The lubricant contributes to the increase of the ability to cut off the road noises unnecessary for the motor control, the noise cutoff ability principally based on the viscous friction and elasticity of the viscoelastic member 500.

Figure 49:
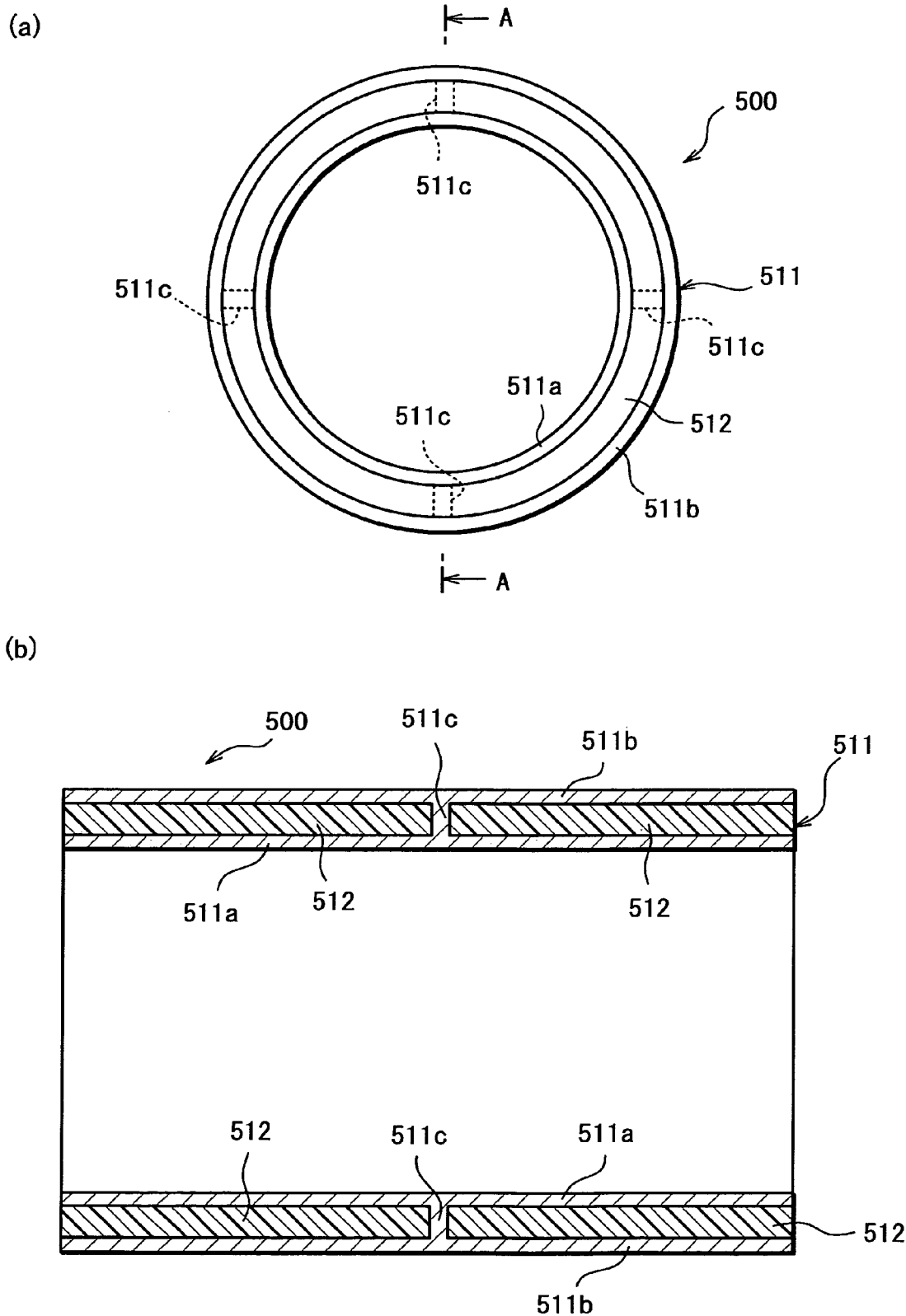
FIG. 49 is a group of enlarged views showing an exemplary constitution of a viscoelastic member, (a) showing the member in plan, (b) showing the member in section taken on the line A-A in (a)

Going into details with reference to FIG. 49 as well, the viscoelastic member 500 is formed in one piece in the form of a metal container of a double-cylinder structure which includes: an inner cylinder 511*a* and an outer cylinder 511*b* surrounding the inner cylinder 511*a* via a gap. The container 511 is provided with a plurality of beams 511*c* which integrally interconnect the inner cylinder 511*a* and the outer cylinder 511*b* as located axially centrally of the container 511 and which are arranged in a circumferential direction at 90° intervals, for example. The beams 511*c* are formed of a flat spring material, for example, thus constituting an elastic material of the viscoelastic member 500. Furthermore, the beams prevent the whole body of the container 511 from becoming a rigid body due to the inner cylinder 511*a* and the outer cylinder 511*b* integrally interconnected. On the other hand, a viscous material 512 such as formed from a synthetic rubber material is filled in individual gap sections defined between the inner cylinder 511*a* and the outer cylinder 511*b* and partitioned by the beams 511*c*. The viscous material constitutes the viscous material of the viscoelastic member 500. An inside surface of the inner cylinder 511*a* is in close contact with an outside surface of the rack shaft 32 via the lubricant while an outside surface of the outer cylinder 511*b* is fixed to an inside surface of the rack housing 33, whereby the viscoelastic member 500 is mounted on the rack shaft 32. Thus, the viscoelastic member is adapted to apply the elasticity and the viscous friction thereof to the rack shaft 32 transversely moved, as seen in the figure, according to the steering of the steering member 1 or the disturbances (road noises) inversely inputted from the steerable wheels 5. The viscoelastic member may also have an alternative constitution to the above. That is, the individual parts of the container 511 are formed of the same metal material while the elasticity is imparted to the beams by reducing the thickness thereof.

The viscoelastic member 500 applies the viscous friction and elasticity thereof to the rack shaft 32, so that the frequency dependency may be imparted to the road noises inversely inputted from the steerable wheels 5 to the rack shaft 32. Hence, the viscoelastic member is capable of cutting off the unwanted high-frequency band of 10 Hz or more, for example, which is included in the frequency band of the road noises. More specifically, the rack shaft 32 is moved at a relatively low speed and in a long cycle, in a case where the rack shaft 32 is moved according to the steering of the steering member 1 or to the road information to be physically perceived by the driver, such as the degree of slip of the steerable wheels 5 on the road surface. The viscous friction and elasticity of the viscoelastic member 500 provide little resistance against the relatively slow movement of the rack shaft 32, thus permitting the movement of the rack shaft 32.

In contrast, when the rack shaft 32 is moved by the disturbances of the high frequency band unnecessary for the assist control of the electric motor 9, the rack shaft 32 is moved at a relatively high speed and in a short cycle. The viscous friction and elasticity of the viscoelastic member 500 work as resistance against such a relatively quick movement of the rack shaft 32 so as to suppress the movement of the rack shaft 32, whereby the disturbances are prevented from being transmitted from the rack shaft 32 to the steering mechanism A.

In the viscoelastic member 500, the material (compositions) of the viscous material 512 is properly changed such that the viscous friction constant C of the viscous material 512 may satisfy the following inequality (81). Thus, the viscoelastic member is adapted to easily suppress the vibrations at the vibration system formed between the rack shaft 32 and the steerable wheels 5.

$$2(KJ)^{1/2} \leq C \tag{81}$$

where J denotes the inertia of the rack shaft 32 as determined at the steerable-wheel side 4; and K denotes the elastic constant of the viscoelastic member 500 (beams 11c). The viscous friction and elasticity of suitable values may be applied to the rack shaft 32 by using the viscoelastic member 500 having such a viscous friction constant C. Thus, the vibrations of the above vibration system may be suppressed.

More specifically, the above vibration system is represented by a transfer function $1/(Js^2+Cs+K)$ of the secondary vibration system, the function expressed using the aforesaid inertia J, the elastic constant K and viscous friction constant C of the viscoelastic member 10, and the Laplace operator s. This transfer function can be expanded to the following equations (82) and (83). Therefore, a natural angular frequency $\omega n$ and a damping coefficient $\zeta$ of the above vibration system are represented by the following equations (84) and (85), respectively, on condition that the detonators of the equations (82) and (83) are of the same value.

$$1/(Js^2 + Cs + K) = (1/J)/(s^2 + Cs/J + K/J) \tag{82}$$
$$= (1/J)/(s^2 + 2\zeta\omega ns + \omega n^2) \tag{83}$$
$$\omega n = (K/J)^{1/2} \tag{84}$$
$$\zeta = C/2J\omega n = C/2(KJ)^{1/2} \tag{85}$$

It is noted here that if the above damping coefficient $\zeta$ has a value of one or more, the vibrations (resonance) at the secondary vibration system are assuredly prevented. Hence, the aforementioned inequality (81) may be derived from the above equation (85).

A proper range of the above damping coefficient $\zeta$ may be defined using the following inequality (86):

$$0.4 \leq \zeta \leq 2 \tag{86}$$

Specifically, a value of $0.8(KJ)^{1/2}$ or more is selected for the above viscous friction constant C by selecting a value of 0.4 or more for the damping coefficient $\zeta$ defined by the above inequality (86). Hence, the viscoelastic member 500 is able to apply the viscous friction and elasticity as the minimum required load (resistance) to the rack shaft 32. Even when the disturbances are inputted from the steerable wheels 5, for example, the vibrations of the rack shaft 32 and the resultant degradation of the steering feeling may be reduced enough to be hardly perceived by the driver, partly because of the resistance applied from the viscoelastic member 500 to the rack shaft 32 and partly because of the use of the highly viscous lubricant.

In theory, a requirement for preventing step response of the secondary vibration system from overshooting relative to steady state is that the damping coefficient $\zeta$ has a value of $2^{-1/2}$ or more. Specifically, the viscous friction constant C may preferably be defined by the above equation (85) to be $(2(KJ)^{1/2}/2^{1/2})$ or more, because the above vibration system may constitute a relatively stable system, a natural frequency curve of which includes no peak gain.

By selecting a damping coefficient $\zeta$ of 2 or less, the viscous friction and elasticity applied from the viscoelastic member 500 to the rack shaft 32 may be limited whereby the rack shaft 32 and then, the steering mechanism A may be prevented from being decreased in the responsivity. What is more, because of the limited viscous friction and elasticity (resistance) applied from the viscoelastic member 500 to the rack shaft 32, the driver may be prevented from suffering an excessively increased load during the steering of the steering member 1.

It is noted that in a case where a damping coefficient $\zeta$ of less than 0.4 is selected, the viscoelastic member 500 applies insufficient viscous friction and elasticity to the rack shaft 32, so that the above vibration system including the rack shaft 32 is not stabilized. Hence, the degradation of the steering feeling due to the vibrations at the vibration system is likely to occur.

In a case where a damping coefficient $\zeta$ of more than 2 is selected, the viscous friction and elasticity applied by the viscoelastic member 500 are increased more than necessary, so that the driver may encounter a relatively difficult steering operation. Hence, the steering feeling may be degraded to some degree.

In the electric power steering system according to the embodiment of the above constitution, the viscoelastic member 500 applies the viscous friction and elasticity to the rack shaft 32 thereby cutting off the unwanted frequency band of the disturbances (road noises) inversely inputted from the steerable wheels 5 connected to the rack shaft 32. This prevents the road noises of the unwanted frequency band from being inversely inputted to the steering mechanism A. Hence, the simple constitution may ensure the reduction of the adverse effect of the road noises on the steering mechanism A, thereby obviating the degradation of the steering feeling. Since the viscoelastic member 500 is disposed in a free space between the rack shaft 32 and the rack housing 33, the system need not be increased in size.

Furthermore, the embodiment utilizes the highly viscous lubricant interposed between the rack shaft 32 and the viscoelastic member 500 for enhancing the ability of the viscoelastic member 500 to cut off the unwanted road noises, the ability based on the viscous friction and elasticity of the member. It is therefore easy to construct the system adapted for more effective elimination of the adverse effect of the road noises on the steering mechanism A.

While the foregoing description illustrates the case where the viscoelastic member 500 is interposed between the rack shaft 32 and the rack housing 33, the invention does not limit the constitution or configuration of the viscoelastic member, the number of the viscoelastic members, nor the use of the highly viscous lubricant, so long as the predetermined viscous friction and elasticity may be applied to the rack shaft 32. However, it is more preferred to use the member 500 integrating the viscous material and the elastic material as shown in FIG. 49, because the member 500 may be readily assembled in the system. The use of the above member is further preferred in that such a simple constitution may easily prevent the degraded steering feeling by suppressing the vibrations in the system and that the system may have a decreased number of components.

[8 Vibration Suppression in Steering Mechanism (Improvement of Convergence)]

[8.1 Consideration for Vibration Suppression in Steering Mechanism]

The steering system is prone to vibrate due to the elasticity (spring) of the torsion bar 23. In some cases, for example, the system may suffer a lowered convergence performance when the driver lets go of the steering member 1. One of the conventional systems is constituted such that a spiral bush interposed between the input shaft and the output shaft applies friction (resistance) for preventing the decrease of convergence performance (Prior Art 20).

Another conventional system, as exemplified by Prior Art 21, has a constitution wherein a viscous-friction compensation value defined according to the steering angular speed of the steering member is corrected based on the vehicle speed, whereby the degradation of the steering feeling is controllably suppressed.

However, the following drawback is encountered by the conventional system such as of Prior Art 20 which applies friction. The output from the above torque sensor contains hysteresis so that the neutral position of the steering member is indeterminable. This drawback may lead to the degradation of the steering feeling. On the other hand, the system of Prior Art 21 provides the correction in a manner to increase the viscous friction during vehicle travel at high speed and to eliminate the viscous friction during vehicle travel at low speed. That is, the assist torque suffers an impaired linearity at a vehicle speed corresponding to a boundary between the high-speed vehicle travel and the low-speed vehicle travel. As a result, the steering feeling is degraded.

The following constitution may be adopted for the purpose of easily suppressing the vibrations at the steering mechanism and preventing the degradation of the steering feeling.

That is, a preferred electric power steering system for providing steering assist by applying a power of an electric motor to a steering mechanism extending from a steering member to steerable wheels is characterized in that the steering mechanism comprises: an input shaft and an output shaft connected to the steering member and the steerable wheels, respectively; and a torsion bar connected to the input shaft and the output shaft at one end thereof and the other end thereof, that a viscoelastic member is interposed between the input shaft and the output shaft, or between the torsion bar and either one of the input shaft and the output shaft, and that the viscoelastic member has a viscous friction constant C defined to satisfy the following inequality (91):

$$0.8((K1+K2)J)^{1/2} \leq C \tag{91},$$

where K1 denotes the elastic constant of the torsion bar; K2 denotes the elastic constant of the viscoelastic member and J denotes the inertia of the torsion bar as determined at steering-member side.

According to the electric power steering system of the above constitution, the viscoelastic member having the viscosity constant C satisfying the inequality (91) is interposed in the steering mechanism at place between the input shaft and the output shaft or between the torsion bar and either one of the input shaft and the output shaft. In this system, the inventors and the like have found that the viscoelastic member is capable of applying a proper viscous friction to the steering mechanism. The inventors and the like have also found that the vibrations in the steering mechanism caused by the elasticity of the torsion bar may be easily suppressed by way of the viscous friction of the viscoelastic member.

It is preferred in the above electric power steering system that the viscoelastic member has the viscous friction constant C defined to satisfy the following inequality (92):

$$0.8((K1+K2)J)^{1/2} \leq C \leq 4((K1+K2)J)^{1/2} \tag{92}$$

In this case, the viscous friction applied from the viscoelastic member to the steering mechanism is limited by the right term of the inequality (92), so that the steering mechanism may be prevented from being decreased in the responsivity.

In the above electric power steering system, the viscoelastic member may comprise: an inner cylinder; an outer cylinder surrounding the inner cylinder via a gap; an elastic material interconnecting the inner cylinder and the outer cylinder and having the elastic constant K2; and a viscous material filled in the gap between the inner cylinder and the outer cylinder and having the viscous friction constant C.

In this case, the viscoelastic member integrating the above elastic material and the viscous material is used so that the member may be easily assembled in the system. Furthermore, the simple structure is adapted to suppress the vibrations at the steering mechanism whereby the degradation of the steering feeling may be easily suppressed.

[8.2 Preferred Mode of Viscoelastic Member]

Figure 50:
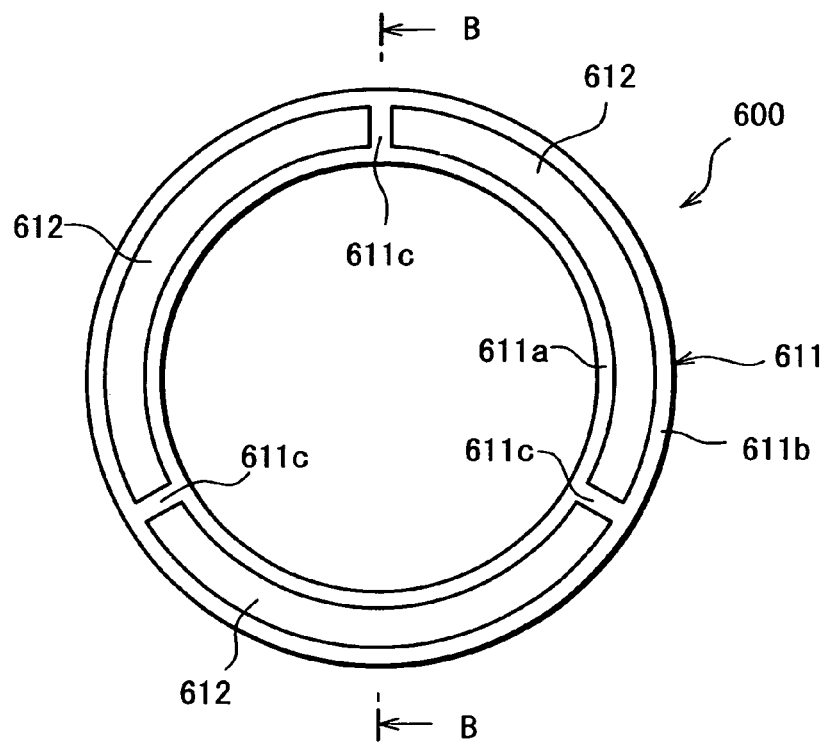
FIG. 50 is a group of enlarged views showing another exemplary constitution of the viscoelastic member, (a) showing the member in plain, (b) showing the member in section taken on the line B-B in (a)
Figure 50:
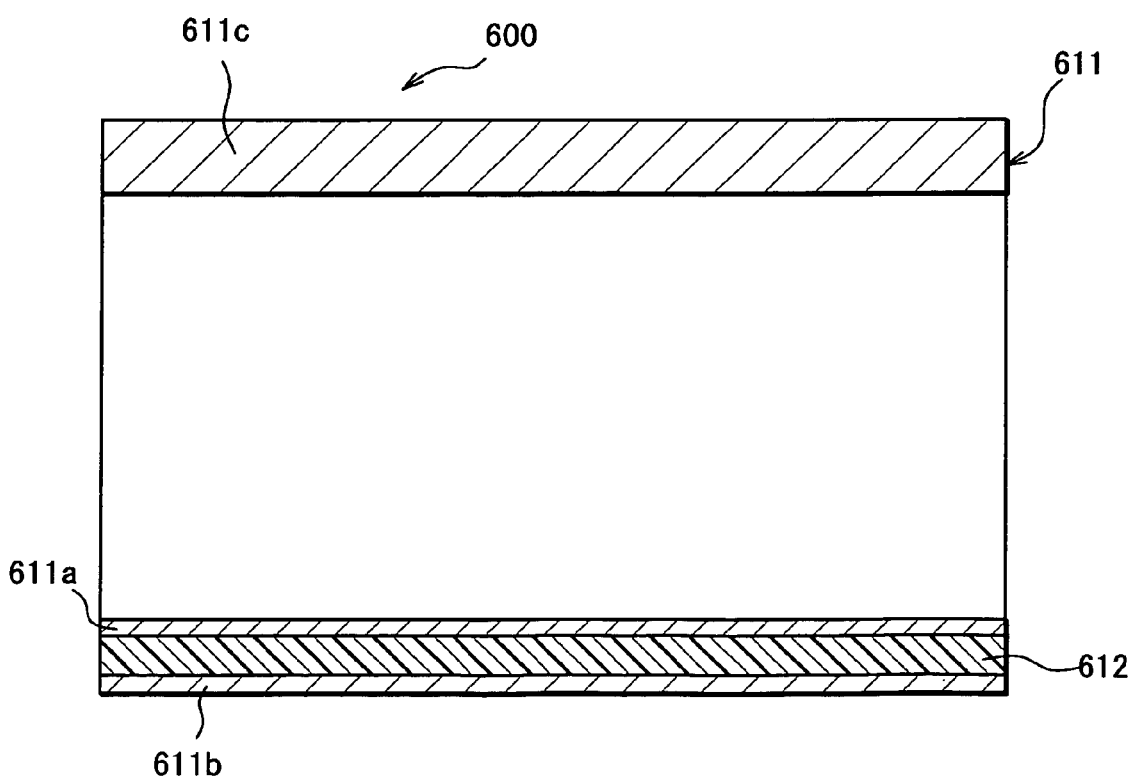

As shown in FIG. 1, a cylindrical viscoelastic member 600 is interposed between the input shaft 22 and the output shaft 24. Also referring to FIG. 50, the viscoelastic member 600 is formed in one piece in the form of a metal container 611 of a double-cylinder structure including an inner cylinder 611*a* and an outer cylinder 611*b* surrounding the inner cylinder 611*a* via a gap. The container 611 is provided with a plurality of beams 611*c* which integrally interconnect the inner cylinder 611*a* and the outer cylinder 611*b* as arranged in a circumferential direction at 120° intervals, for example. The beams 611*c* are formed of a flat spring material, thus constituting an elastic material of the viscoelastic member 600. On the other hand, a viscous material 612 such as formed from a synthetic rubber material is filled in individual gap sections defined between the inner cylinder 611*a* and the outer cylinder 611*b* and partitioned by the beams 611*c*. The viscous material constitutes the viscous material of the viscoelastic member 600. An inside surface of the inner cylinder 611*a* is in close contact with an outside surface of the input shaft 22 while an outside surface of the outer cylinder 611*b* is in close contact with an inside surface of the output shaft 24, whereby the viscoelastic member 600 is interposed between the input shaft 22 and the output shaft 24. Thus, the viscoelastic member is adapted to apply the elasticity and the viscous friction thereof to the input and output shafts 22, 24 circumferentially pivoted according to the steering of the steering member 1. The viscoelastic member may also have an alternative constitution to the above. That is, the individual parts of the container 11 are formed of the same metal material while the elasticity is imparted to the beams by reducing the thickness thereof.

In the viscoelastic member 600, the material (compositions) of the viscous material 612 is properly changed such that the viscous friction constant C of the viscous material 612 may satisfy the following inequality (91) or preferably the following inequality (92). Thus, the viscoelastic member is adapted to easily suppress the vibrations at the steering mechanism A due to the elasticity (spring) of the torsion bar 23.

$$0.8((K1+K2)J)^{1/2} \leq C \tag{91}$$

$$0.8((K1+K2)J)^{1/2} \leq C \leq 4((K1+K2)J)^{1/2} \tag{92}$$

where J denotes the inertia of the torsion bar 23 as determined at the steering-member side 1 (upper spring); K1 denotes the elastic constant of the torsion bar 23; and K2 denotes the elastic constant of the beams 611c. The viscous friction of a suitable value may be applied to the steering shaft 2 by using the viscoelastic member 600 having such a viscous friction constant C. Thus, the vibrations at the steering mechanism A may be suppressed. Furthermore, an upper limit of the viscous friction constant C is defined by the value of the right term of the inequality (92), whereby the steering mechanism A may be prevented from being decreased in the responsivity. It is noted that the inertia J of the upper spring is principally constituted by the inertia of the steering member 1.

More specifically, the above vibration system of the steering mechanism A is represented by a transfer function $1/(Js^2+Cs+K0)$ of the secondary vibration system, the function expressed using the aforesaid inertia J of the upper spring, the sum K0 of the elastic constants K1 and K2, the viscous friction constant C, and the Laplace operator s. This transfer function can be expanded to the following equations (93) and (94). Therefore, the natural angular frequency ωn and the damping coefficient ζ of the above vibration system are represented by the following equations (95) and (96), respectively, on condition that the detonators of the equations (93) and (94) are of the same value.

$$1/(Js^2 + Cs + K0) = (1/J)/(s^2 + Cs/J + K0/J) \tag{93}$$

$$= (1/J)/(s^2 + 2\zeta\omega ns + \omega n^2) \tag{94}$$

$$\omega n = (K0/J)^{1/2} \tag{95}$$

$$\zeta = C/2J\omega n = C/2(K0J)^{1/2}. \tag{96}$$

A proper range of the above damping coefficient ζ is defined by the following inequality (97). Then, the above inequalities (91) and (92) can be obtained by substituting the above equation (96) in this inequality (97) and rewriting the inequality accordingly. The inequalities (91) and (92) define the viscous friction constant C using the above inertia J and the elastic constant K0 (=K1+K2).

$$0.4 \leq \zeta \leq 2 \tag{97}$$

Specifically, by selecting a value of 0.4 or more for the damping coefficient ζ defined by the above inequality (97), the viscoelastic member 600 is adapted to apply the viscous friction thereof as the minimum required load (resistance) between the input and output shafts 22, 24, namely to the steering shaft 2 of the steering mechanism A. Even when the disturbances and the like are inputted from the steerable wheels 5, the vibrations of the steering shaft 2 and the resultant variation of the steering feeling may be reduced enough to be hardly perceived by the driver, because of the resistance applied from the viscoelastic member 600 to the steering shaft 2.

In theory, a requirement for preventing the step response of the secondary vibration system from overshooting relative to steady state is that the damping coefficient ζ has a value of $2^{-1/2}$ or more. Specifically, the viscous friction constant C may preferably be defined by the above equation (96) to be $(2(K0J)^{1/2}/2^{1/2})$ or more, because the above vibration system may constitute a relatively stable system, a natural frequency curve of which includes no peak gain. For instance, when the driver lets go of the steering member 1 at transition from turn to straight-ahead drive of the vehicle, the viscoelastic member 60 is capable of applying a proper viscous friction to the steering shaft 2 thereby preventing the steering member 1 being returned to the neutral position from overshooting. As a result, the steering member 1 is prevented from suffering the lowered convergence performance. In the meantime, the detection output from the torque sensor 7 is prevented from containing hysteresis whereby the drawback that the neutral position of the steering member 1 is indeterminable may be obviated. Furthermore, it is preferred to define the value of the damping coefficient ζ to be 1 or more, or to define the viscous friction constant C to be $(2(K0J)^{1/2})$ or more because the vibrations (resonance) at the above vibration system may be prevented.

By selecting a damping coefficient ζ of 2 or less, the viscous friction applied from the viscoelastic member 600 to the steering mechanism A may be limited whereby the steering mechanism A may be prevented from being decreased in the responsivity. This assuredly prevents hysteresis from appearing in the detection output from the torque sensor 7. What is more, because of the limited viscous friction (resistance) applied from the viscoelastic member 600 to the steering shaft 2, the driver may be prevented from suffering an excessively increased load during the steering of the steering member 1.

In a case where a damping coefficient ζ of less than 0.4 is selected, the viscoelastic member 600 applies insufficient viscous friction to the steering mechanism A, so that the above vibration system in the mechanism A is not stabilized. Hence, the degradation of the steering feeling due to the vibrations at the vibration system is likely to occur.

In a case where a damping coefficient ζ of more than 2 is selected, the viscous friction applied by the viscoelastic member 600 is increased more than necessary, so that the driver may encounter a relatively difficult steering operation. Hence, the steering feeling may be degraded to some degree.

A specific example of the numerical values of the viscous friction constant C is as follows. A design value of the elastic constant K1 of the torsion bar 23, as converted to a value about the steering shaft 2, is K1=29(kgf·cm/deg)=29×9.8× $10^{-2}$×180/π(Nm/rad)=162.8(Nm/rad). A design value of the elastic constant K2 of the viscoelastic member 600, as converted to a value about the steering shaft 2, is K2<1(kgf·cm/deg)=5.6(Nm/rad) or so. Therefore, the sum K0 of these elastic constants K1, K2 is in the range of 163 to 169(Nm/rad). An example of the measured value of the inertia J of the upper spring or the steering-member-1 side of the torsion bar 23 is in the range of 0.020 to 0.025(kg·m$^2$).

By substituting the specific values of the elastic constant K0 and the inertia J in the above inequality (92), $1.44 \leq C \leq 8.22$ may be obtained as a specific range of the preferred viscous friction constant C.

In the electric power steering system according to the embodiment of the above constitution, the viscoelastic member 600 having the viscous friction constant C defined by the above inequality (91) is interposed between the input and output shaft 22, 24, for applying the proper viscous friction to the steering shaft 2 of the steering mechanism A. Therefore, the steering system is capable of easily suppressing the vibrations at the steering mechanism A and of preventing the steering feeling from being degraded by the vibrations. Furthermore, the viscous friction constant C is defined by the value of the right term of the inequality (92) whereby the viscous friction of the viscoelastic member 600 applied between the input and output shafts 22, 24 may be limited so as to prevent the steering mechanism A from being decreased in responsivity. This makes it possible, for example, to more assuredly prevent an excessive delay in the return of the steering member 1. Thus is obviated the degradation of the steering feeling. Furthermore, the viscous friction is also effective to prevent hysteresis from appearing in the detection output from the torque sensor 7, whereby the drawback that the neutral position of the steering member 1 is indeterminable may be obviated. This also leads to the prevention of the degraded steering feeling. In addition, the vibrations at the steering mechanism A are suppressed by means of the viscoelastic member 600. This negates the need for a complicated drive control of the electric motor 9 in contrast to the aforementioned Prior Art 2 wherein the degraded steering feeling due to the vibrations is prevented by way of the assist control. The electric power steering system of the embodiment provides an easy suppression of the vibrations in the steering mechanism A. Therefore, the steering system of the embodiment may be applied to a vehicle carrying an electric power steering system featuring a much smaller friction about the torsion bar (e.g., on the order of 0.05N) than a hydraulic-type steering system, thus easily improving the ride quality and drivability of the vehicle.

Figure 51:
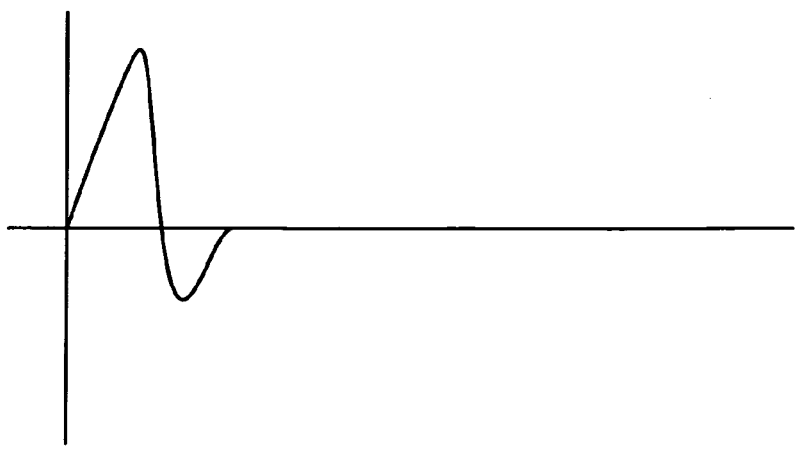
FIG. 51 is a group of graphs showing test results on impulse response of the electric power steering system, (a) and (b) graphically showing the results of the tests conducted with the viscoelastic member interposed between input and output shafts and with a frictional member interposed between the input and output shafts, (c) graphically showing the result of the test conducted without the viscoelastic member or the frictional member interposed between the input and output shafts.
Figure 51:
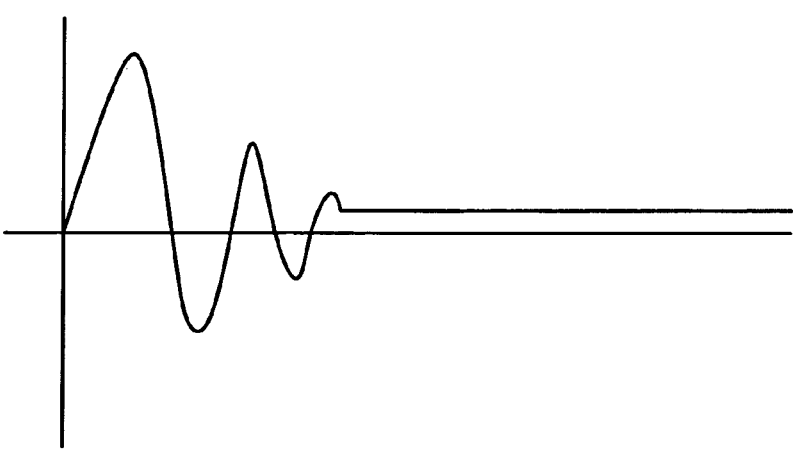
Figure 51:
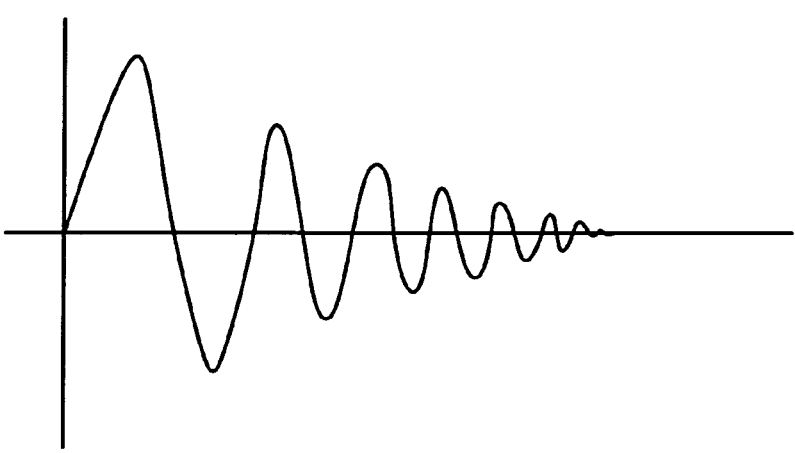

Referring to FIG. 51, a specific description is made on the results of an evaluation test conducted by the inventors and the like.

The evaluation test used an article of the example of the invention wherein the viscoelastic member 600 was interposed between the input and output shafts 22, 24; a prior-art article wherein a friction material (spiral bush) was interposed between the input and output shafts 22, 24; and a comparative article without the viscoelastic member 600 or the friction material. An impulse was applied to each of the steering mechanisms from the steering-wheel side thereof, while a response waveform of each steering mechanism was detected by means of a vibration meter installed on the steering-member side. As shown in FIG. 51(a), the article of the example responded to the input impulse with only one vibration which immediately converged.

In contrast, the prior-art article responded to the input impulse with a few vibrations, as shown in FIG. 51(b). The prior-art article had a longer convergence time than the inventive article and suffered a steady-state deviation (deviation of the steering member 1 from the neutral position), which is dependent on the friction constant of the friction material and the like.

As shown in FIG. 51(c), the comparative article responded to the input impulse with several vibrations which took much longer time to converge as compared with the inventive article.

While the foregoing description illustrates the case where the viscoelastic member 600 is interposed between the input and output shafts 22, 24, the invention is not limited to this. What is required is that the viscoelastic member having the viscous friction constant C defined to satisfy the inequality (91) is interposed between the torsion bar 23 and the input shaft 22 or between the torsion bar 23 and the output shaft 24.

While the foregoing description illustrates the viscoelastic member 600 wherein the beams (elastic material) 611c and the viscous material (viscous friction member) 612 are disposed in the container 611, the invention may employ any viscoelastic member having the aforementioned viscous friction constant C and elastic constant K2. The constitution and configuration of the viscoelastic member as well as the number of the viscoelastic members are not limited to the above. However, it is more preferred to use the viscoelastic member 600 incorporating the viscous material and the elastic material in the container 611 because the member 600 may be easily assembled in the steering mechanism A. Furthermore, the use of the above member is favorable in that such a simple constitution is capable of easily preventing the degradation of the steering feeling by suppressing the vibrations at the steering mechanism A.

What is claimed is:

1. An electric power steering system for providing a steering assist by applying a power of a steering assist motor to a steering mechanism, comprising:
    road-noise suppression control means for controlling the steering assist motor by damping torque transmission in a frequency region representing road noises which is in a higher frequency region than a frequency region representing road information,
    means for decreasing a friction value of the steering mechanism enough to allow intrinsic vibrations of the steering mechanism to appear, and
    means to set rotor inertia of the steering assist motor to a value small enough to allow a frequency of the intrinsic vibrations of the steering mechanism to be present in the frequency region where the torque transmission is damped by the road-noise suppression control means.

2. An electric power steering system, comprising
    a steering assist motor for applying a torque to a steering mechanism including a steering gear via a reduction gear assembly and for permitting a friction of the steering gear and a friction of the reduction gear assembly to act as resistance for reducing the transmission of the torque of the steering assist motor,
    wherein the steering assist motor has a rotor inertia, converted to a value about a steering shaft, of 0.012 kgm$^2$ or less, and wherein the sum of the friction of the steering gear and the friction of the reduction gear assembly, convened to a value about the steering shaft, is defined to be 1 Nm or less.

3. An electric power steering system according to claim 2, further comprising means for controlling the steering assist motor by damping torque transmission in a frequency region representing road noises.

* * * * *